US012014118B2

(12) United States Patent
Gruber et al.

(10) Patent No.: US 12,014,118 B2
(45) Date of Patent: Jun. 18, 2024

(54) MULTI-MODAL INTERFACES HAVING SELECTION DISAMBIGUATION AND TEXT MODIFICATION CAPABILITY

(71) Applicant: Apple Inc., Cupertino, CA (US)

(72) Inventors: Thomas R. Gruber, Santa Cruz, CA (US); Mohammed A. Tayyeb, Cupertino, CA (US); Ron C. Santos, San Jose, CA (US); Madhusudan Chinthakunta, Saratoga, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/555,030

(22) Filed: Dec. 17, 2021

(65) Prior Publication Data

US 2022/0107780 A1 Apr. 7, 2022

Related U.S. Application Data

(63) Continuation of application No. 15/917,410, filed on Mar. 9, 2018, now Pat. No. 11,231,903.

(Continued)

(51) Int. Cl.

*G06F 3/16* (2006.01)
*G06F 3/04817* (2022.01)

(Continued)

(52) U.S. Cl.

CPC .......... *G06F 3/167* (2013.01); *G06F 3/04817* (2013.01); *G06F 3/0482* (2013.01);

(Continued)

(58) Field of Classification Search

CPC .... G06F 3/167; G06F 3/04817; G06F 3/0482; G06F 3/0488; G06F 3/048;

(Continued)

(56) References Cited

U.S. PATENT DOCUMENTS 6,603,397 B2 8/2003 Bronson
6,721,409 B1 4/2004 Dell et al.

(Continued)

FOREIGN PATENT DOCUMENTS

AU 2014100581 B4 9/2014
AU 2015203483 A1 7/2015

(Continued)

OTHER PUBLICATIONS

Nuance Dragon NaturallySpeaking Version 13 End-User Workbook; Sep. 2014; Nuance Communications, Inc .; Revision 1; pp. 1-118.*

(Continued)

*Primary Examiner* — Andrew R Dyer
(74) *Attorney, Agent, or Firm* — DLA Piper LLP (US)

(57) ABSTRACT

Systems and processes for operating an intelligent automated assistant to perform intelligent list reading are provided. In accordance with one example, a method includes, at an electronic device having one or more processors, receiving a first user input of a first input type, the first user input including a plurality of words; displaying, on the touch-sensitive display, the plurality of words; receiving a second user input of a second input type indicating a selection of a word of the plurality of words, the second input type different than the first input type; receiving a third user input; modifying the selected word based on the third user input to provide a modified one or more words; and displaying, on the touch-sensitive display, the modified one or more words.

48 Claims, 21 Drawing Sheets

Related U.S. Application Data

(60) Provisional application No. 62/506,571, filed on May 15, 2017.

(51) Int. Cl.
*G06F 3/0482* (2013.01)
*G06F 3/0488* (2022.01)
*G10L 15/26* (2006.01)

(52) U.S. Cl.
CPC .... *G06F 3/0488* (2013.01); *G06F 2203/0381* (2013.01); *G10L 15/26* (2013.01)

(58) Field of Classification Search
CPC ....................... G06F 2203/0381; G10L 15/26; H04M 1/725; H04W 4/02
USPC .......................................................... 715/727
See application file for complete search history.

(56) References Cited

U.S. PATENT DOCUMENTS 7,007,298 B1 2/2006 Shinzaki et al.
7,117,152 B1 10/2006 Mukherji et al.
7,492,913 B2 2/2009 Connor et al.
8,055,296 B1 11/2011 Persson et al.
8,090,571 B2 1/2012 Elshishiny et al.
8,095,364 B2 1/2012 Longe et al.
8,099,289 B2 1/2012 Mozer et al.
8,099,395 B2 1/2012 Pabla et al.
8,099,418 B2 1/2012 Inoue et al.
8,103,510 B2 1/2012 Sato
8,103,947 B2 1/2012 Lunt et al.
8,107,401 B2 1/2012 John et al.
8,112,275 B2 2/2012 Kennewick et al.
8,112,280 B2 2/2012 Lu
8,115,772 B2 2/2012 Ostermann et al.
8,117,026 B2 2/2012 Lee et al.
8,117,037 B2 2/2012 Gazdzinski
8,117,542 B2 2/2012 Radtke et al.
8,121,413 B2 2/2012 Hwang et al.
8,121,837 B2 2/2012 Agapi et al.
8,122,094 B1 2/2012 Kotab
8,122,353 B2 2/2012 Bouta
8,130,929 B2 3/2012 Wilkes et al.
8,131,557 B2 3/2012 Davis et al.
8,135,115 B1 3/2012 Hogg, Jr. et al.
8,138,912 B2 3/2012 Singh et al.
8,140,330 B2 3/2012 Cevik et al.
8,140,335 B2 3/2012 Kennewick et al.
8,140,368 B2 3/2012 Eggenberger et al.
8,140,567 B2 3/2012 Padovitz et al.
8,145,489 B2 3/2012 Freeman et al.
8,150,694 B2 4/2012 Kennewick et al.
8,150,700 B2 4/2012 Shin et al.
8,155,956 B2 4/2012 Cho et al.
8,156,005 B2 4/2012 Vieri
8,156,060 B2 4/2012 Borzestowski et al.
8,160,877 B1 4/2012 Nucci et al.
8,160,883 B2 4/2012 Lecoeuche
8,165,321 B2 4/2012 Paquier et al.
8,165,886 B1 4/2012 Gagnon et al.
8,166,019 B1 4/2012 Lee et al.
8,166,032 B2 4/2012 Sommer et al.
8,170,790 B2 5/2012 Lee et al.
8,170,966 B1 5/2012 Musat et al.
8,171,137 B1 5/2012 Parks et al.
8,175,872 B2 5/2012 Kristjansson et al.
8,175,876 B2 5/2012 Bou-Ghazale et al.
8,179,370 B1 5/2012 Yamasani et al.
8,188,856 B2 5/2012 Singh et al.
8,190,359 B2 5/2012 Bourne
8,190,596 B2 5/2012 Nambiar et al.
8,194,827 B2 6/2012 Jaiswal et al.
8,195,467 B2 6/2012 Mozer et al.
8,195,468 B2 6/2012 Weider et al.
8,200,489 B1 6/2012 Baggenstoss
8,200,495 B2 6/2012 Braho et al.
8,201,109 B2 6/2012 Van Os et al.
8,204,238 B2 6/2012 Mozer
8,205,788 B1 6/2012 Gazdzinski et al.
8,209,177 B2 6/2012 Sakuma et al.
8,209,183 B1 6/2012 Patel et al.
8,213,911 B2 7/2012 Williams et al.
8,219,115 B1 7/2012 Nelissen
8,219,406 B2 7/2012 Yu et al.
8,219,407 B1 7/2012 Roy et al.
8,219,555 B1 7/2012 Mianji
8,219,608 B2 7/2012 AlSafadi et al.
8,224,649 B2 7/2012 Chaudhari et al.
8,224,757 B2 7/2012 Bohle
8,228,299 B1 7/2012 Maloney et al.
8,233,919 B2 7/2012 Haag et al.
8,234,111 B2 7/2012 Lloyd et al.
8,239,206 B1 8/2012 LeBeau et al.
8,239,207 B2 8/2012 Seligman et al.
8,244,545 B2 8/2012 Paek et al.
8,244,712 B2 8/2012 Serlet et al.
8,250,071 B1 8/2012 Killalea et al.
8,254,829 B1 8/2012 Kindred et al.
8,255,216 B2 8/2012 White
8,255,217 B2 8/2012 Stent et al.
8,260,117 B1 9/2012 Xu et al.
8,260,247 B2 9/2012 Lazaridis et al.
8,260,617 B2 9/2012 Dhanakshirur et al.
8,260,619 B1 9/2012 Bansal et al.
8,270,933 B2 9/2012 Riemer et al.
8,271,287 B1 9/2012 Kermani
8,275,621 B2 9/2012 Alewine et al.
8,275,736 B2 9/2012 Guo et al.
8,279,171 B2 10/2012 Hirai et al.
8,280,438 B2 10/2012 Barbera
8,285,546 B2 10/2012 Reich
8,285,551 B2 10/2012 Gazdzinski
8,285,553 B2 10/2012 Gazdzinski
8,285,737 B1 10/2012 Lynn et al.
8,290,274 B2 10/2012 Mori et al.
8,290,772 B1 * 10/2012 Cohen .................. G06F 40/274 704/235
8,290,777 B1 10/2012 Nguyen et al.
8,290,778 B2 10/2012 Gazdzinski
8,290,781 B2 10/2012 Gazdzinski
8,296,124 B1 10/2012 Holsztynska et al.
8,296,145 B2 10/2012 Clark et al.
8,296,146 B2 10/2012 Gazdzinski
8,296,153 B2 10/2012 Gazdzinski
8,296,380 B1 10/2012 Kelly et al.
8,296,383 B2 10/2012 Lindahl
8,300,776 B2 10/2012 Davies et al.
8,300,801 B2 10/2012 Sweeney et al.
8,301,456 B2 10/2012 Gazdzinski
8,311,189 B2 11/2012 Champlin et al.
8,311,834 B1 11/2012 Gazdzinski
8,311,835 B2 11/2012 Lecoeuche
8,311,838 B2 11/2012 Lindahl et al.
8,312,017 B2 11/2012 Martin et al.
8,321,786 B2 11/2012 Lunati
8,326,627 B2 12/2012 Kennewick et al.
8,332,205 B2 12/2012 Krishnan et al.
8,332,218 B2 12/2012 Cross, Jr. et al.
8,332,224 B2 12/2012 Di Cristo et al.
8,332,748 B1 12/2012 Karam
8,335,689 B2 12/2012 Wittenstein et al.
8,340,975 B1 12/2012 Rosenberger
8,345,665 B2 1/2013 Vieri et al.
8,346,563 B1 1/2013 Hjelm et al.
8,346,757 B1 1/2013 Lamping et al.
8,352,183 B2 1/2013 Thota et al.
8,352,268 B2 1/2013 Naik et al.
8,352,272 B2 1/2013 Rogers et al.
8,355,919 B2 1/2013 Silverman et al.
8,359,234 B2 1/2013 Vieri
8,370,145 B2 2/2013 Endo et al.
8,370,158 B2 2/2013 Gazdzinski
8,371,503 B2 2/2013 Gazdzinski

(56) References Cited

U.S. PATENT DOCUMENTS 8,374,871 B2 2/2013 Ehsani et al.
8,375,320 B2 2/2013 Kotler et al.
8,380,504 B1 2/2013 Peden et al.
8,380,507 B2 2/2013 Herman et al.
8,381,107 B2 2/2013 Rottler et al.
8,381,135 B2 2/2013 Hotelling et al.
8,386,485 B2 2/2013 Kerschberg et al.
8,386,926 B1 2/2013 Matsuoka et al.
8,391,844 B2 3/2013 Novick et al.
8,392,717 B2 3/2013 Chai et al.
8,396,295 B2 3/2013 Gao et al.
8,396,714 B2 3/2013 Rogers et al.
8,396,715 B2 3/2013 Odell et al.
8,401,163 B1 3/2013 Kirchhoff et al.
8,406,745 B1 3/2013 Upadhyay et al.
8,407,239 B2 3/2013 Dean et al.
8,423,288 B2 4/2013 Stahl et al.
8,428,758 B2 4/2013 Naik et al.
8,433,572 B2 4/2013 Caskey et al.
8,433,778 B1 4/2013 Shreesha et al.
8,434,133 B2 4/2013 Kulkarni et al.
8,442,821 B1 5/2013 Vanhoucke
8,447,612 B2 5/2013 Gazdzinski
8,452,597 B2 5/2013 Bringert et al.
8,452,602 B1 5/2013 Bringert et al.
8,453,058 B1 5/2013 Coccaro et al.
8,457,959 B2 6/2013 Kaiser
8,458,115 B2 6/2013 Cai et al.
8,458,278 B2 6/2013 Christie et al.
8,463,592 B2 6/2013 Lu et al.
8,464,150 B2 6/2013 Davidson et al.
8,473,289 B2 6/2013 Jitkoff et al.
8,473,485 B2 6/2013 Wong et al.
8,477,323 B2 7/2013 Low et al.
8,478,816 B2 7/2013 Parks et al.
8,479,122 B2 7/2013 Hotelling et al.
8,484,027 B1 7/2013 Murphy
8,489,599 B2 7/2013 Bellotti
8,498,670 B2 7/2013 Cha et al.
8,498,857 B2 7/2013 Kopparapu et al.
8,514,197 B2 8/2013 Shahraray et al.
8,515,736 B1 8/2013 Duta
8,515,750 B1 8/2013 Lei et al.
8,521,513 B2 8/2013 Millett et al.
8,521,526 B1 8/2013 Lloyd et al.
8,521,531 B1 8/2013 Kim
8,521,533 B1 8/2013 Ostermann et al.
8,527,276 B1 9/2013 Senior et al.
8,533,266 B2 9/2013 Koulomzin et al.
8,537,033 B2 9/2013 Gueziec
8,539,342 B1 9/2013 Lewis
8,543,375 B2 9/2013 Hong
8,543,397 B1 9/2013 Nguyen
8,543,398 B1 9/2013 Strope et al.
8,560,229 B1 10/2013 Park et al.
8,560,366 B2 10/2013 Mikurak
8,571,528 B1 10/2013 Channakeshava
8,571,851 B1 10/2013 Tickner et al.
8,577,683 B2 11/2013 Dewitt
8,583,416 B2 11/2013 Huang et al.
8,583,511 B2 11/2013 Hendrickson
8,583,638 B2 11/2013 Donelli
8,589,156 B2 11/2013 Burke et al.
8,589,161 B2 11/2013 Kennewick et al.
8,589,374 B2 11/2013 Chaudhari
8,589,869 B2 11/2013 Wolfram
8,589,911 B1 11/2013 Sharkey et al.
8,595,004 B2 11/2013 Koshinaka
8,595,642 B1 11/2013 Lagassey
8,600,743 B2 12/2013 Lindahl et al.
8,600,746 B1 12/2013 Lei et al.
8,600,930 B2 12/2013 Sata et al.
8,606,090 B2 12/2013 Eyer
8,606,568 B1 12/2013 Tickner et al.
8,606,576 B1 12/2013 Barr et al.
8,606,577 B1 12/2013 Stewart et al.
8,615,221 B1 12/2013 Cosenza et al.
8,620,659 B2 12/2013 Di Cristo et al.
8,620,662 B2 12/2013 Bellegarda
8,626,681 B1 1/2014 Jurca et al.
8,630,841 B2 1/2014 Van Caldwell et al.
8,635,073 B2 1/2014 Chang
8,638,363 B2 1/2014 King et al.
8,639,516 B2 1/2014 Lindahl et al.
8,645,128 B1 2/2014 Agiomyrgiannakis
8,645,137 B2 2/2014 Bellegarda et al.
8,645,138 B1 2/2014 Weinstein et al.
8,654,936 B1 2/2014 Eslambolchi et al.
8,655,646 B2 2/2014 Lee et al.
8,655,901 B1 2/2014 Li et al.
8,660,843 B2 2/2014 Falcon et al.
8,660,849 B2 2/2014 Gruber et al.
8,660,924 B2 2/2014 Hoch et al.
8,660,970 B1 2/2014 Fiedorowicz
8,661,112 B2 2/2014 Creamer et al.
8,661,340 B2 2/2014 Goldsmith et al.
8,670,979 B2 3/2014 Gruber et al.
8,675,084 B2 3/2014 Bolton et al.
8,676,273 B1 3/2014 Fujisaki
8,676,583 B2 3/2014 Gupta et al.
8,676,904 B2 3/2014 Lindahl
8,677,377 B2 3/2014 Cheyer et al.
8,681,950 B2 3/2014 Vlack et al.
8,682,667 B2 3/2014 Haughay
8,687,777 B1 4/2014 Lavian et al.
8,688,446 B2 4/2014 Yanagihara
8,688,453 B1 4/2014 Joshi et al.
8,689,135 B2 4/2014 Portele et al.
8,694,322 B2 4/2014 Snitkovskiy et al.
8,695,074 B2 4/2014 Saraf et al.
8,696,364 B2 4/2014 Cohen
8,706,472 B2 4/2014 Ramerth et al.
8,706,474 B2 4/2014 Blume et al.
8,706,503 B2 4/2014 Cheyer et al.
8,707,195 B2 4/2014 Fleizach et al.
8,712,778 B1 4/2014 Thenthiruperai
8,713,119 B2 4/2014 Lindahl et al.
8,713,418 B2 4/2014 King et al.
8,719,006 B2 5/2014 Bellegarda
8,719,014 B2 5/2014 Wagner
8,719,039 B1 5/2014 Sharifi
8,731,610 B2 5/2014 Appaji
8,731,912 B1 5/2014 Tickner et al.
8,731,942 B2 5/2014 Cheyer et al.
8,739,208 B2 5/2014 Davis et al.
8,744,852 B1 6/2014 Seymour et al.
8,751,971 B2 6/2014 Fleizach et al.
8,760,537 B2 6/2014 Johnson et al.
8,762,145 B2 6/2014 Ouchi et al.
8,762,156 B2 6/2014 Chen
8,762,469 B2 6/2014 Lindahl
8,768,693 B2 7/2014 Somekh et al.
8,768,702 B2 7/2014 Mason et al.
8,775,154 B2 7/2014 Clinchant et al.
8,775,177 B1 7/2014 Heigold et al.
8,775,341 B1 7/2014 Commons
8,775,931 B2 7/2014 Fux et al.
8,781,456 B2 7/2014 Prociw
8,781,841 B1 7/2014 Wang
8,793,301 B2 7/2014 Wegenkittl et al.
8,798,255 B2 8/2014 Lubowich et al.
8,798,995 B1 8/2014 Edara
8,799,000 B2 8/2014 Guzzoni et al.
8,805,690 B1 8/2014 Lebeau et al.
8,812,299 B1 8/2014 Su
8,812,302 B2 8/2014 Xiao et al.
8,812,321 B2 8/2014 Gilbert et al.
8,823,507 B1 9/2014 Touloumtzis
8,823,793 B2 9/2014 Clayton et al.
8,831,947 B2 9/2014 Wasserblat et al.
8,831,949 B1 9/2014 Smith et al.
8,838,457 B2 9/2014 Cerra et al.
8,855,915 B2 10/2014 Furuhata et al.
8,861,925 B1 10/2014 Ohme

(56) References Cited

U.S. PATENT DOCUMENTS 8,862,252 B2 10/2014 Rottler et al.
8,868,111 B1 10/2014 Kahn et al.
8,868,409 B1 10/2014 Mengibar et al.
8,868,431 B2 10/2014 Yamazaki et al.
8,868,469 B2 10/2014 Xu et al.
8,868,529 B2 10/2014 Lerenc
8,880,405 B2 11/2014 Cerra et al.
8,886,534 B2 11/2014 Nakano et al.
8,886,540 B2 11/2014 Cerra et al.
8,886,541 B2 11/2014 Friedlander
8,892,446 B2 11/2014 Cheyer et al.
8,893,023 B2 11/2014 Perry et al.
8,897,822 B2 11/2014 Martin
8,898,064 B1 11/2014 Thomas et al.
8,898,568 B2 11/2014 Bull et al.
8,903,716 B2 12/2014 Chen et al.
8,909,693 B2 12/2014 Frissora et al.
8,918,321 B2 12/2014 Czahor
8,922,485 B1 12/2014 Lloyd
8,930,176 B2 1/2015 Li et al.
8,930,191 B2 1/2015 Gruber et al.
8,938,394 B1 1/2015 Faaborg et al.
8,938,450 B2 1/2015 Spivack et al.
8,938,688 B2 1/2015 Bradford et al.
8,942,986 B2 1/2015 Cheyer et al.
8,943,423 B2 1/2015 Merrill et al.
8,964,947 B1 2/2015 Noolu et al.
8,972,240 B2 3/2015 Brockett et al.
8,972,432 B2 3/2015 Shaw et al.
8,972,878 B2 3/2015 Mohler et al.
8,976,063 B1 3/2015 Hawkins et al.
8,976,108 B2 3/2015 Hawkins et al.
8,977,255 B2 3/2015 Freeman et al.
8,983,383 B1 3/2015 Haskin
8,984,098 B1 3/2015 Tomkins et al.
8,989,713 B2 3/2015 Doulton
8,990,235 B2 3/2015 King et al.
8,994,660 B2 3/2015 Neels et al.
8,995,972 B1 3/2015 Cronin
8,996,350 B1 3/2015 Dub et al.
8,996,376 B2 3/2015 Fleizach et al.
8,996,381 B2 3/2015 Mozer et al.
8,996,639 B1 3/2015 Faaborg et al.
9,002,714 B2 4/2015 Kim et al.
9,009,046 B1 4/2015 Stewart
9,015,036 B2 4/2015 Karov et al.
9,020,804 B2 4/2015 Barbaiani et al.
9,026,425 B2 5/2015 Nikoulina et al.
9,026,426 B2 5/2015 Wu et al.
9,031,834 B2 5/2015 Coorman et al.
9,031,970 B1 5/2015 Das et al.
9,037,967 B1 5/2015 Al-Jefri et al.
9,043,208 B2 5/2015 Koch et al.
9,043,211 B2 5/2015 Haiut et al.
9,046,932 B2 6/2015 Medlock et al.
9,049,255 B2 6/2015 Macfarlane et al.
9,049,295 B1 6/2015 Cooper et al.
9,053,706 B2 6/2015 Jitkoff et al.
9,058,105 B2 6/2015 Drory et al.
9,058,332 B1 6/2015 Darby et al.
9,058,811 B2 6/2015 Wang et al.
9,063,979 B2 6/2015 Chiu et al.
9,064,495 B1 6/2015 Torok et al.
9,065,660 B2 6/2015 Ellis et al.
9,070,247 B2 6/2015 Kuhn et al.
9,070,366 B1 6/2015 Mathias et al.
9,071,701 B2 6/2015 Donaldson et al.
9,075,435 B1 7/2015 Noble et al.
9,075,824 B2 7/2015 Gordo et al.
9,076,448 B2 7/2015 Bennett et al.
9,076,450 B1 7/2015 Sadek et al.
9,081,411 B2 7/2015 Kalns et al.
9,081,482 B1 7/2015 Zhai et al.
9,082,402 B2 7/2015 Yadgar et al.
9,083,581 B1 7/2015 Addepalli et al.
9,094,636 B1 7/2015 Sanders et al.
9,098,467 B1 8/2015 Blanksteen et al.
9,101,279 B2 8/2015 Ritchey et al.
9,112,984 B2 8/2015 Sejnoha et al.
9,117,212 B2 8/2015 Sheets et al.
9,117,447 B2 8/2015 Gruber et al.
9,123,338 B1 9/2015 Sanders et al.
9,143,907 B1 9/2015 Caldwell et al.
9,159,319 B1 10/2015 Hoffmeister
9,164,983 B2 10/2015 Liu et al.
9,171,541 B2 10/2015 Kennewick et al.
9,171,546 B1 10/2015 Pike
9,183,845 B1 11/2015 Gopalakrishnan et al.
9,190,062 B2 11/2015 Haughay
9,202,520 B1 12/2015 Tang
9,208,153 B1 12/2015 Zaveri et al.
9,213,754 B1 12/2015 Zhan et al.
9,218,122 B2 12/2015 Thoma et al.
9,218,809 B2 12/2015 Bellegard et al.
9,218,819 B1 12/2015 Stekkelpa et al.
9,223,537 B2 12/2015 Brown et al.
9,230,561 B2 1/2016 Ostermann et al.
9,232,293 B1 1/2016 Hanson
9,236,047 B2 1/2016 Rasmussen
9,241,073 B1 1/2016 Rensburg et al.
9,245,151 B2 1/2016 LeBeau et al.
9,250,703 B2 2/2016 Hernandez-Abrego et al.
9,251,713 B1 2/2016 Giovanniello et al.
9,251,787 B1 2/2016 Hart et al.
9,255,812 B2 2/2016 Maeoka et al.
9,258,604 B1 2/2016 Bilobrov et al.
9,262,412 B2 2/2016 Yang et al.
9,262,612 B2 2/2016 Cheyer
9,263,058 B2 2/2016 Huang et al.
9,274,598 B2 3/2016 Beymer et al.
9,280,535 B2 3/2016 Varma et al.
9,282,211 B2 3/2016 Osawa
9,286,910 B1 3/2016 Li et al.
9,292,487 B1 3/2016 Weber
9,292,489 B1 3/2016 Sak et al.
9,292,492 B2 3/2016 Sarikaya et al.
9,299,344 B2 3/2016 Braho et al.
9,300,718 B2 3/2016 Khanna
9,301,256 B2 3/2016 Mohan et al.
9,305,543 B2 4/2016 Fleizach et al.
9,305,548 B2 4/2016 Kennewick et al.
9,311,308 B2 4/2016 Sankarasubramaniam et al.
9,311,912 B1 4/2016 Swietlinski et al.
9,313,317 B1 4/2016 LeBeau et al.
9,318,108 B2 4/2016 Gruber et al.
9,325,809 B1 4/2016 Barros et al.
9,325,842 B1 4/2016 Siddiqi et al.
9,330,659 B2 5/2016 Ju et al.
9,330,668 B2 5/2016 Nanavati et al.
9,330,720 B2 5/2016 Lee
9,335,983 B2 5/2016 Breiner et al.
9,338,493 B2 5/2016 Van Os et al.
9,342,829 B2 5/2016 Zhou et al.
9,342,930 B1 5/2016 Kraft et al.
9,349,368 B1 5/2016 Lebeau et al.
9,355,472 B2 5/2016 Kocienda et al.
9,361,084 B1 6/2016 Costa
9,367,541 B1 6/2016 Servan et al.
9,368,114 B2 6/2016 Larson et al.
9,377,871 B2 6/2016 Waddell et al.
9,378,456 B2 6/2016 White et al.
9,378,740 B1 6/2016 Rosen et al.
9,380,155 B1 6/2016 Reding et al.
9,383,827 B1 7/2016 Faaborg et al.
9,384,185 B2 7/2016 Medlock et al.
9,390,726 B1 7/2016 Smus et al.
9,396,722 B2 7/2016 Chung et al.
9,401,140 B1 7/2016 Weber et al.
9,401,147 B2 7/2016 Jitkoff et al.
9,406,224 B1 8/2016 Sanders et al.
9,406,299 B2 8/2016 Gollan et al.
9,408,182 B1 8/2016 Hurley et al.
9,412,392 B2 8/2016 Lindahl
9,418,650 B2 8/2016 Bharadwaj et al.

(56) References Cited

U.S. PATENT DOCUMENTS

| | | | |
|---|---|---|---|
| 9,423,266 | B2 | 8/2016 | Clark et al. |
| 9,424,246 | B2 | 8/2016 | Spencer et al. |
| 9,424,840 | B1 | 8/2016 | Hart et al. |
| 9,431,021 | B1 | 8/2016 | Scalise et al. |
| 9,432,499 | B2 | 8/2016 | Hajdu et al. |
| 9,436,918 | B2 | 9/2016 | Pantel et al. |
| 9,437,186 | B1 | 9/2016 | Liu et al. |
| 9,437,189 | B2 | 9/2016 | Epstein et al. |
| 9,442,687 | B2 | 9/2016 | Park et al. |
| 9,443,527 | B1 | 9/2016 | Watanabe et al. |
| 9,454,599 | B2 | 9/2016 | Golden et al. |
| 9,454,957 | B1 | 9/2016 | Mathias et al. |
| 9,465,798 | B2 | 10/2016 | Lin |
| 9,465,833 | B2 | 10/2016 | Aravamudan et al. |
| 9,465,864 | B2 | 10/2016 | Hu et al. |
| 9,466,027 | B2 | 10/2016 | Byrne et al. |
| 9,466,294 | B1 | 10/2016 | Tunstall-Pedoe et al. |
| 9,471,566 | B1 | 10/2016 | Zhang et al. |
| 9,472,196 | B1 | 10/2016 | Wang et al. |
| 9,483,388 | B2 | 11/2016 | Sankaranarasimhan et al. |
| 9,483,461 | B2 | 11/2016 | Fleizach et al. |
| 9,483,529 | B1 | 11/2016 | Pasoi et al. |
| 9,484,021 | B1 | 11/2016 | Mairesse et al. |
| 9,485,286 | B1 | 11/2016 | Sellier et al. |
| 9,495,129 | B2 | 11/2016 | Fleizach et al. |
| 9,501,741 | B2 | 11/2016 | Cheyer et al. |
| 9,502,025 | B2 | 11/2016 | Kennewick et al. |
| 9,508,028 | B2 | 11/2016 | Bannister et al. |
| 9,510,044 | B1 | 11/2016 | Pereira et al. |
| 9,514,470 | B2 | 12/2016 | Topatan et al. |
| 9,516,014 | B2 | 12/2016 | Zafiroglu et al. |
| 9,519,453 | B2 | 12/2016 | Perkuhn et al. |
| 9,524,355 | B2 | 12/2016 | Forbes et al. |
| 9,529,500 | B1 | 12/2016 | Gauci et al. |
| 9,531,862 | B1 | 12/2016 | Vadodaria |
| 9,535,906 | B2 | 1/2017 | Lee et al. |
| 9,536,527 | B1 | 1/2017 | Carlson |
| 9,536,544 | B2 | 1/2017 | Osterman et al. |
| 9,547,647 | B2 | 1/2017 | Badaskar |
| 9,548,050 | B2 | 1/2017 | Gruber et al. |
| 9,548,979 | B1 | 1/2017 | Johnson et al. |
| 9,569,549 | B1 | 2/2017 | Jenkins et al. |
| 9,575,964 | B2 | 2/2017 | Yadgar et al. |
| 9,576,575 | B2 | 2/2017 | Heide |
| 9,578,173 | B2 | 2/2017 | Sanghavi et al. |
| 9,602,946 | B2 | 3/2017 | Karkkainen et al. |
| 9,607,612 | B2 | 3/2017 | Deleeuw |
| 9,612,999 | B2 | 4/2017 | Prakah-Asante et al. |
| 9,619,200 | B2 | 4/2017 | Chakladar et al. |
| 9,620,113 | B2 | 4/2017 | Kennewick et al. |
| 9,620,126 | B2 | 4/2017 | Chiba |
| 9,626,955 | B2 | 4/2017 | Fleizach et al. |
| 9,633,004 | B2 | 4/2017 | Giuli et al. |
| 9,633,191 | B2 | 4/2017 | Fleizach et al. |
| 9,633,660 | B2 | 4/2017 | Haughay |
| 9,633,674 | B2 | 4/2017 | Sinha |
| 9,646,313 | B2 | 5/2017 | Kim et al. |
| 9,648,107 | B1 | 5/2017 | Penilla et al. |
| 9,652,453 | B2 | 5/2017 | Mathur et al. |
| 9,658,746 | B2 | 5/2017 | Cohn et al. |
| 9,659,002 | B2 | 5/2017 | Medlock et al. |
| 9,659,298 | B2 | 5/2017 | Lynch et al. |
| 9,665,567 | B2 | 5/2017 | Li et al. |
| 9,665,662 | B1 | 5/2017 | Gautam et al. |
| 9,668,121 | B2 | 5/2017 | Naik et al. |
| 9,672,725 | B2 | 6/2017 | Dotan-Cohen et al. |
| 9,672,822 | B2 | 6/2017 | Brown et al. |
| 9,690,542 | B2 | 6/2017 | Reddy et al. |
| 9,691,161 | B1 | 6/2017 | Yalniz et al. |
| 9,691,378 | B1 | 6/2017 | Meyers et al. |
| 9,697,016 | B2 | 7/2017 | Jacob |
| 9,697,822 | B1 | 7/2017 | Naik et al. |
| 9,697,827 | B1 | 7/2017 | Lilly et al. |
| 9,698,999 | B2 | 7/2017 | Mutagi |
| 9,720,907 | B2 | 8/2017 | Bangalore et al. |
| 9,721,566 | B2 | 8/2017 | Newendorp et al. |
| 9,721,570 | B1 | 8/2017 | Beal et al. |
| 9,723,130 | B2 | 8/2017 | Rand |
| 9,734,817 | B1 | 8/2017 | Putrycz |
| 9,734,839 | B1 | 8/2017 | Adams |
| 9,741,343 | B1 | 8/2017 | Miles et al. |
| 9,747,083 | B1 | 8/2017 | Roman et al. |
| 9,747,093 | B2 | 8/2017 | Latino et al. |
| 9,755,605 | B1 | 9/2017 | Li et al. |
| 9,760,566 | B2 | 9/2017 | Heck et al. |
| 9,767,710 | B2 | 9/2017 | Lee et al. |
| 9,772,994 | B2 | 9/2017 | Karov et al. |
| 9,786,271 | B1 | 10/2017 | Combs et al. |
| 9,792,907 | B2 | 10/2017 | Bocklet et al. |
| 9,798,719 | B2 | 10/2017 | Karov et al. |
| 9,812,128 | B2 | 11/2017 | Mixter et al. |
| 9,813,882 | B1 | 11/2017 | Masterman |
| 9,818,400 | B2 | 11/2017 | Paulik et al. |
| 9,823,811 | B2 | 11/2017 | Brown et al. |
| 9,823,828 | B2 | 11/2017 | Zambetti et al. |
| 9,824,379 | B2 | 11/2017 | Khandelwal et al. |
| 9,824,691 | B1 | 11/2017 | Montero et al. |
| 9,830,044 | B2 | 11/2017 | Brown et al. |
| 9,830,449 | B1 | 11/2017 | Wagner |
| 9,842,168 | B2 | 12/2017 | Heck et al. |
| 9,842,584 | B1 | 12/2017 | Hart et al. |
| 9,846,685 | B2 | 12/2017 | Li |
| 9,846,836 | B2 | 12/2017 | Gao et al. |
| 9,858,925 | B2 | 1/2018 | Gruber et al. |
| 9,858,927 | B2 | 1/2018 | Williams et al. |
| 9,886,953 | B2 | 2/2018 | Lemay et al. |
| 9,887,949 | B2 | 2/2018 | Shepherd et al. |
| 9,911,415 | B2 | 3/2018 | Vanblon et al. |
| 9,916,839 | B1 | 3/2018 | Scalise et al. |
| 9,922,642 | B2 | 3/2018 | Pitschel et al. |
| 9,928,835 | B1 | 3/2018 | Tang |
| 9,934,777 | B1 | 4/2018 | Joseph et al. |
| 9,934,785 | B1 | 4/2018 | Hulaud |
| 9,946,862 | B2 | 4/2018 | Yun et al. |
| 9,948,728 | B2 | 4/2018 | Linn et al. |
| 9,959,129 | B2 | 5/2018 | Kannan et al. |
| 9,959,506 | B1 | 5/2018 | Karppanen |
| 9,966,065 | B2 | 5/2018 | Gruber et al. |
| 9,966,068 | B2 | 5/2018 | Cash et al. |
| 9,967,381 | B1 | 5/2018 | Kashimba et al. |
| 9,971,495 | B2 | 5/2018 | Shetty et al. |
| 9,984,686 | B1 | 5/2018 | Mutagi et al. |
| 9,986,419 | B2 | 5/2018 | Naik et al. |
| 9,990,129 | B2 | 6/2018 | Yang et al. |
| 9,990,176 | B1 | 6/2018 | Gray |
| 9,990,921 | B2 | 6/2018 | Vanblon et al. |
| 9,996,626 | B1 | 6/2018 | Bailey et al. |
| 9,998,552 | B1 | 6/2018 | Ledet |
| 10,001,817 | B2 | 6/2018 | Zambetti et al. |
| 10,013,416 | B1 | 7/2018 | Bhardwaj et al. |
| 10,013,654 | B1 | 7/2018 | Levy et al. |
| 10,013,979 | B1 | 7/2018 | Roma et al. |
| 10,019,436 | B2 | 7/2018 | Huang |
| 10,025,378 | B2 | 7/2018 | Venable et al. |
| 10,027,662 | B1 | 7/2018 | Mutagi et al. |
| 10,032,451 | B1 | 7/2018 | Mamkina et al. |
| 10,032,455 | B2 | 7/2018 | Newman et al. |
| 10,037,758 | B2 | 7/2018 | Jing et al. |
| 10,043,516 | B2 | 8/2018 | Saddler et al. |
| 10,049,161 | B2 | 8/2018 | Kaneko |
| 10,049,663 | B2 | 8/2018 | Orr et al. |
| 10,049,668 | B2 | 8/2018 | Huang et al. |
| 10,055,390 | B2 | 8/2018 | Sharifi et al. |
| 10,055,681 | B2 | 8/2018 | Brown et al. |
| 10,074,360 | B2 | 9/2018 | Kim |
| 10,074,371 | B1 | 9/2018 | Wang et al. |
| 10,078,487 | B2 | 9/2018 | Gruber et al. |
| 10,083,213 | B1 | 9/2018 | Podgorny et al. |
| 10,083,690 | B2 | 9/2018 | Giuli et al. |
| 10,088,972 | B2 | 10/2018 | Brown et al. |
| 10,089,072 | B2 | 10/2018 | Piersol et al. |
| 10,096,319 | B1 | 10/2018 | Jin et al. |
| 10,101,887 | B2 | 10/2018 | Bernstein et al. |
| 10,102,359 | B2 | 10/2018 | Cheyer |

(56) References Cited

U.S. PATENT DOCUMENTS 10,115,055 B2 10/2018 Weiss et al.
10,127,901 B2 11/2018 Zhao et al.
10,127,908 B1 11/2018 Deller et al.
10,134,425 B1 11/2018 Johnson, Jr.
10,135,965 B2 11/2018 Woolsey et al.
10,146,923 B2 12/2018 Pitkänen et al.
10,169,329 B2 1/2019 Futrell et al.
10,170,123 B2 1/2019 Orr et al.
10,170,135 B1 1/2019 Pearce et al.
10,175,879 B2 1/2019 Missig et al.
10,176,167 B2 1/2019 Evermann
10,176,802 B1 1/2019 Ladhak et al.
10,176,808 B1 1/2019 Lovitt et al.
10,178,301 B1 1/2019 Welbourne et al.
10,185,542 B2 1/2019 Carson et al.
10,186,254 B2 1/2019 Williams et al.
10,186,266 B1 1/2019 Devaraj et al.
10,191,627 B2 1/2019 Cieplinski et al.
10,191,646 B2 1/2019 Zambetti et al.
10,191,718 B2 1/2019 Rhee et al.
10,192,546 B1 1/2019 Piersol et al.
10,192,552 B2 1/2019 Raitio et al.
10,192,557 B2 1/2019 Lee et al.
10,199,051 B2 2/2019 Binder et al.
10,200,824 B2 2/2019 Gross et al.
10,210,860 B1 2/2019 Ward et al.
10,216,351 B2 2/2019 Yang
10,216,832 B2 2/2019 Bangalore et al.
10,223,066 B2 3/2019 Martel et al.
10,225,711 B2 3/2019 Parks et al.
10,228,904 B2 3/2019 Raux
10,229,356 B1 3/2019 Liu et al.
10,237,711 B2 3/2019 Linn et al.
10,242,501 B1 3/2019 Pusch et al.
10,248,308 B2 4/2019 Karunamuni et al.
10,249,300 B2 4/2019 Booker et al.
10,255,922 B1 4/2019 Sharifi et al.
10,261,830 B2 4/2019 Gupta et al.
10,269,345 B2 4/2019 Castillo et al.
10,275,513 B1 4/2019 Cowan et al.
10,289,205 B1 5/2019 Sumter et al.
10,296,160 B2 5/2019 Shah et al.
10,297,253 B2 5/2019 Walker, II et al.
10,303,772 B2 5/2019 Hosn et al.
10,304,463 B2 5/2019 Mixter et al.
10,311,482 B2 6/2019 Baldwin
10,311,871 B2 6/2019 Newendorp et al.
10,325,598 B2 6/2019 Basye et al.
10,332,509 B2 6/2019 Catanzaro et al.
10,332,513 B1 6/2019 D'souza et al.
10,332,518 B2 6/2019 Garg et al.
10,339,224 B2 7/2019 Fukuoka
10,339,925 B1 * 7/2019 Rastrow ................ H04L 67/306
10,346,540 B2 7/2019 Karov et al.
10,346,753 B2 7/2019 Soon-Shiong et al.
10,346,878 B1 7/2019 Ostermann et al.
10,353,975 B2 7/2019 Oh et al.
10,354,168 B2 7/2019 Bluche
10,354,677 B2 7/2019 Mohamed et al.
10,356,243 B2 7/2019 Sanghavi et al.
10,360,716 B1 7/2019 Van Der Meulen et al.
10,365,887 B1 7/2019 Mulherkar
10,366,160 B2 7/2019 Castelli et al.
10,366,692 B1 7/2019 Adams et al.
10,372,814 B2 8/2019 Gliozzo et al.
10,372,881 B2 8/2019 Ingrassia, Jr. et al.
10,389,876 B2 8/2019 Engelke et al.
10,402,066 B2 9/2019 Kawana
10,403,283 B1 9/2019 Schramm et al.
10,409,454 B2 9/2019 Kagan et al.
10,410,637 B2 9/2019 Paulik et al.
10,417,037 B2 9/2019 Gruber et al.
10,417,344 B2 9/2019 Futrell et al.
10,417,554 B2 9/2019 Scheffler
10,418,032 B1 * 9/2019 Mohajer ............ G10L 15/1815
10,437,928 B2 10/2019 Bhaya et al.
10,446,142 B2 10/2019 Lim et al.
10,453,117 B1 10/2019 Reavely et al.
10,469,665 B1 11/2019 Bell et al.
10,474,961 B2 11/2019 Brigham et al.
10,475,446 B2 11/2019 Gruber et al.
10,482,875 B2 11/2019 Henry
10,490,195 B1 11/2019 Krishnamoorthy et al.
10,496,364 B2 12/2019 Yao
10,496,705 B1 12/2019 Irani et al.
10,497,365 B2 12/2019 Gruber et al.
10,504,518 B1 12/2019 Irani et al.
10,512,750 B1 12/2019 Lewin et al.
10,515,133 B1 12/2019 Sharifi
10,521,946 B1 12/2019 Roche et al.
10,528,386 B2 1/2020 Yu
10,540,976 B2 1/2020 Van Os et al.
10,558,893 B2 2/2020 Bluche
10,566,007 B2 2/2020 Fawaz et al.
10,568,032 B2 2/2020 Freeman et al.
10,580,409 B2 3/2020 Walker, II et al.
10,582,355 B1 3/2020 Lebeau et al.
10,585,957 B2 3/2020 Heck et al.
10,586,369 B1 3/2020 Roche et al.
10,599,449 B1 3/2020 Chatzipanagiotis et al.
10,629,186 B1 4/2020 Slifka
10,630,795 B2 4/2020 Aoki et al.
10,642,934 B2 5/2020 Heck et al.
10,659,851 B2 5/2020 Lister et al.
10,671,428 B2 6/2020 Zeitlin
10,706,841 B2 7/2020 Gruber et al.
10,721,190 B2 7/2020 Zhao et al.
10,732,708 B1 8/2020 Roche et al.
10,743,107 B1 8/2020 Yoshioka et al.
10,748,546 B2 8/2020 Kim et al.
10,755,032 B2 8/2020 Douglas et al.
10,757,499 B1 8/2020 Vautrin et al.
10,769,385 B2 9/2020 Evermann
10,783,151 B1 9/2020 Bushkin et al.
10,783,883 B2 9/2020 Mixter et al.
10,789,945 B2 9/2020 Acero et al.
10,791,176 B2 9/2020 Phipps et al.
10,795,944 B2 10/2020 Brown et al.
10,796,100 B2 10/2020 Bangalore et al.
10,803,255 B2 10/2020 Dubyak et al.
10,811,013 B1 10/2020 Secker-Walker et al.
10,842,968 B1 11/2020 Kahn et al.
10,846,618 B2 11/2020 Ravi et al.
10,860,629 B1 12/2020 Gangadharaiah et al.
10,861,483 B2 12/2020 Feinauer et al.
10,880,668 B1 12/2020 Robinson et al.
10,885,277 B2 1/2021 Ravi et al.
10,892,996 B2 1/2021 Piersol
10,909,459 B2 2/2021 Tsatsin et al.
10,944,859 B2 3/2021 Weinstein et al.
10,957,311 B2 3/2021 Solomon et al.
10,974,139 B2 4/2021 Feder et al.
10,978,056 B1 4/2021 Challa et al.
10,978,090 B2 4/2021 Binder et al.
10,983,971 B2 4/2021 Carvalho et al.
11,037,565 B2 6/2021 Kudurshian et al.
11,061,543 B1 7/2021 Blatz et al.
11,076,039 B2 7/2021 Weinstein et al.
11,132,172 B1 9/2021 Naik et al.
11,169,660 B2 11/2021 Gupta et al.
2002/0002039 A1 1/2002 Qureshey et al.
2002/0135618 A1 9/2002 Maes et al.
2002/0141597 A1 10/2002 Wilcock
2003/0032457 A1 2/2003 Leung
2003/0078080 A1 4/2003 Miriyala
2004/0122674 A1 6/2004 Bangalore et al.
2004/0203899 A1 10/2004 Curtis et al.
2004/0259536 A1 12/2004 Keskar et al.
2005/0075875 A1 4/2005 Shozakai et al.
2005/0170849 A1 8/2005 Mcclelland
2005/0179929 A1 8/2005 Jain
2006/0116884 A1 6/2006 Itaki et al.
2006/0121890 A1 6/2006 Chae
2007/0038939 A1 2/2007 Challen et al.

(56) References Cited

U.S. PATENT DOCUMENTS

2007/0072553 A1 3/2007 Barbera
2007/0136066 A1 6/2007 Qu
2007/0143100 A1* 6/2007 Agapi .................. G06F 40/247 707/E17.098
2007/0250315 A1* 10/2007 Bennett .................. H04M 11/10 704/235
2007/0250841 A1 10/2007 Scahill et al.
2007/0263804 A1 11/2007 Lai et al.
2008/0057876 A1 3/2008 Hsia et al.
2008/0115056 A1* 5/2008 Escapa .................. G06F 40/111 715/255
2008/0125102 A1 5/2008 Abel et al.
2009/0003620 A1 1/2009 Mckillop et al.
2009/0119100 A1 5/2009 Akella et al.
2009/0163243 A1 6/2009 Barbera
2009/0203370 A1 8/2009 Giles et al.
2009/0222349 A1 9/2009 Burger et al.
2009/0239508 A1 9/2009 Waddell
2010/0099354 A1 4/2010 Johnson
2011/0175932 A1* 7/2011 Yu ...................... G06F 3/04845 345/661
2011/0246891 A1 10/2011 Schubert et al.
2011/0295590 A1 12/2011 Lloyd et al.
2012/0002820 A1 1/2012 Leichter
2012/0005602 A1 1/2012 Anttila et al.
2012/0008754 A1 1/2012 Mukherjee et al.
2012/0010886 A1 1/2012 Razavilar
2012/0011138 A1 1/2012 Dunning et al.
2012/0013609 A1 1/2012 Reponen et al.
2012/0015629 A1 1/2012 Olsen et al.
2012/0016658 A1 1/2012 Wu et al.
2012/0016678 A1 1/2012 Gruber et al.
2012/0019400 A1 1/2012 Patel et al.
2012/0020490 A1 1/2012 Leichter
2012/0020503 A1 1/2012 Endo et al.
2012/0022787 A1 1/2012 LeBeau et al.
2012/0022857 A1 1/2012 Baldwin et al.
2012/0022860 A1 1/2012 Lloyd et al.
2012/0022868 A1 1/2012 LeBeau et al.
2012/0022869 A1 1/2012 Lloyd et al.
2012/0022870 A1 1/2012 Kristjansson et al.
2012/0022872 A1 1/2012 Gruber et al.
2012/0022874 A1 1/2012 Lloyd et al.
2012/0022876 A1 1/2012 LeBeau et al.
2012/0022967 A1 1/2012 Bachman et al.
2012/0023088 A1 1/2012 Cheng et al.
2012/0023095 A1 1/2012 Wadycki et al.
2012/0023462 A1 1/2012 Rosing et al.
2012/0026395 A1 2/2012 Jin et al.
2012/0029661 A1 2/2012 Jones et al.
2012/0029910 A1 2/2012 Medlock et al.
2012/0034904 A1 2/2012 LeBeau et al.
2012/0035907 A1 2/2012 Lebeau et al.
2012/0035908 A1 2/2012 Lebeau et al.
2012/0035924 A1 2/2012 Jitkoff et al.
2012/0035925 A1 2/2012 Friend et al.
2012/0035926 A1 2/2012 Ambler
2012/0035931 A1 2/2012 LeBeau et al.
2012/0035932 A1 2/2012 Jitkoff et al.
2012/0035935 A1 2/2012 Park et al.
2012/0036556 A1 2/2012 LeBeau et al.
2012/0039539 A1 2/2012 Boiman et al.
2012/0039578 A1 2/2012 Issa et al.
2012/0041752 A1 2/2012 Wang et al.
2012/0041756 A1 2/2012 Hanazawa et al.
2012/0041759 A1 2/2012 Barker et al.
2012/0042014 A1 2/2012 Desai et al.
2012/0042343 A1 2/2012 Laligand et al.
2012/0052945 A1 3/2012 Miyamoto et al.
2012/0053815 A1 3/2012 Montanari et al.
2012/0053829 A1 3/2012 Agarwal et al.
2012/0053945 A1 3/2012 Gupta et al.
2012/0055253 A1 3/2012 Sinha
2012/0056815 A1 3/2012 Mehra
2012/0058783 A1 3/2012 Kim et al.
2012/0059655 A1 3/2012 Cartales
2012/0059813 A1 3/2012 Sejnoha et al.
2012/0060052 A1 3/2012 White et al.
2012/0062473 A1 3/2012 Xiao et al.
2012/0064975 A1 3/2012 Gault et al.
2012/0065972 A1 3/2012 Strifler et al.
2012/0066212 A1 3/2012 Jennings
2012/0066581 A1 3/2012 Spalink
2012/0075054 A1 3/2012 Ge et al.
2012/0075184 A1 3/2012 Madhvanath
2012/0077479 A1 3/2012 Sabotta et al.
2012/0078611 A1 3/2012 Soltani et al.
2012/0078624 A1 3/2012 Yook et al.
2012/0078627 A1 3/2012 Wagner
2012/0078635 A1 3/2012 Rothkopf et al.
2012/0078747 A1 3/2012 Chakrabarti et al.
2012/0082317 A1 4/2012 Pance et al.
2012/0083286 A1 4/2012 Kim et al.
2012/0084086 A1 4/2012 Gilbert et al.
2012/0084087 A1 4/2012 Yang et al.
2012/0084089 A1 4/2012 Lloyd et al.
2012/0084251 A1 4/2012 Lingenfelder et al.
2012/0084634 A1 4/2012 Wong et al.
2012/0088219 A1 4/2012 Briscoe et al.
2012/0089331 A1 4/2012 Schmidt et al.
2012/0089659 A1 4/2012 Halevi et al.
2012/0094645 A1 4/2012 Jeffrey
2012/0101823 A1 4/2012 Weng et al.
2012/0105257 A1 5/2012 Murillo et al.
2012/0108166 A1 5/2012 Hymel
2012/0108221 A1 5/2012 Thomas et al.
2012/0109632 A1 5/2012 Sugiura et al.
2012/0109753 A1 5/2012 Kennewick et al.
2012/0109997 A1 5/2012 Sparks et al.
2012/0110456 A1 5/2012 Larco et al.
2012/0114108 A1 5/2012 Katis et al.
2012/0116770 A1 5/2012 Chen et al.
2012/0117499 A1 5/2012 Mori et al.
2012/0117590 A1 5/2012 Agnihotri et al.
2012/0124126 A1 5/2012 Alcazar et al.
2012/0124177 A1 5/2012 Sparks
2012/0124178 A1 5/2012 Sparks
2012/0128322 A1 5/2012 Shaffer et al.
2012/0130709 A1 5/2012 Bocchieri et al.
2012/0130995 A1 5/2012 Risvik et al.
2012/0135714 A1 5/2012 King, II
2012/0136529 A1 5/2012 Curtis et al.
2012/0136572 A1 5/2012 Norton
2012/0136649 A1 5/2012 Freising et al.
2012/0136658 A1 5/2012 Shrum, Jr. et al.
2012/0136855 A1 5/2012 Ni et al.
2012/0136985 A1 5/2012 Popescu et al.
2012/0137367 A1 5/2012 Dupont et al.
2012/0287067 A1 5/2012 Ikegami
2012/0148077 A1 6/2012 Aldaz et al.
2012/0149342 A1 6/2012 Cohen et al.
2012/0149394 A1 6/2012 Singh et al.
2012/0150532 A1 6/2012 Mirowski et al.
2012/0150544 A1 6/2012 McLoughlin et al.
2012/0150580 A1 6/2012 Norton
2012/0158293 A1 6/2012 Burnham
2012/0158399 A1 6/2012 Tremblay et al.
2012/0158422 A1 6/2012 Burnham et al.
2012/0159380 A1 6/2012 Kocienda et al.
2012/0162540 A1 6/2012 Ouchi et al.
2012/0163710 A1 6/2012 Skaff et al.
2012/0166177 A1 6/2012 Beld et al.
2012/0166196 A1 6/2012 Ju et al.
2012/0166429 A1 6/2012 Moore et al.
2012/0166942 A1 6/2012 Ramerth et al.
2012/0166959 A1 6/2012 Hilerio et al.
2012/0166998 A1 6/2012 Cotterill et al.
2012/0173222 A1 7/2012 Wang et al.
2012/0173244 A1 7/2012 Kwak et al.
2012/0173464 A1 7/2012 Tur et al.
2012/0174121 A1 7/2012 Treat et al.
2012/0176255 A1 7/2012 Choi et al.
2012/0179457 A1 7/2012 Newman et al.
2012/0179467 A1 7/2012 Williams et al.

(56) References Cited

U.S. PATENT DOCUMENTS

2012/0179471 A1 7/2012 Newman et al.
2012/0185237 A1 7/2012 Gajic et al.
2012/0185480 A1 7/2012 Ni et al.
2012/0185781 A1 7/2012 Guzman et al.
2012/0185803 A1 7/2012 Wang et al.
2012/0191461 A1 7/2012 Lin et al.
2012/0192096 A1 7/2012 Bowman et al.
2012/0197743 A1 8/2012 Grigg et al.
2012/0197967 A1 8/2012 Sivavakeesar
2012/0197995 A1 8/2012 Caruso
2012/0197998 A1 8/2012 Kessel et al.
2012/0200489 A1 8/2012 Miyashita et al.
2012/0201362 A1 8/2012 Crossan et al.
2012/0203767 A1 8/2012 Williams et al.
2012/0208592 A1* 8/2012 Davis .................... H04W 4/50 705/26.1
2012/0209454 A1 8/2012 Miller et al.
2012/0209654 A1 8/2012 Romagnino et al.
2012/0209853 A1 8/2012 Desai et al.
2012/0209874 A1 8/2012 Wong et al.
2012/0210266 A1 8/2012 Jiang et al.
2012/0210378 A1 8/2012 Mccoy et al.
2012/0214141 A1 8/2012 Raya et al.
2012/0214517 A1 8/2012 Singh et al.
2012/0215640 A1 8/2012 Ramer et al.
2012/0215762 A1 8/2012 Hall et al.
2012/0221339 A1 8/2012 Wang et al.
2012/0221552 A1 8/2012 Reponen et al.
2012/0223889 A1 9/2012 Medlock et al.
2012/0223936 A1 9/2012 Aughey et al.
2012/0232885 A1 9/2012 Barbosa et al.
2012/0232886 A1 9/2012 Capuozzo et al.
2012/0232906 A1 9/2012 Lindahl
2012/0233207 A1 9/2012 Mohajer
2012/0233266 A1 9/2012 Hassan et al.
2012/0233280 A1 9/2012 Ebara
2012/0239403 A1 9/2012 Cano et al.
2012/0239661 A1 9/2012 Giblin
2012/0239761 A1 9/2012 Linner et al.
2012/0242482 A1 9/2012 Elumalai et al.
2012/0245719 A1 9/2012 Story, Jr. et al.
2012/0245939 A1 9/2012 Braho et al.
2012/0245941 A1 9/2012 Cheyer
2012/0245944 A1 9/2012 Gruber et al.
2012/0246064 A1 9/2012 Balkow
2012/0250858 A1 10/2012 Iqbal et al.
2012/0252367 A1 10/2012 Gaglio et al.
2012/0252540 A1 10/2012 Kirigaya
2012/0253785 A1 10/2012 Hamid et al.
2012/0253791 A1 10/2012 Heck et al.
2012/0253804 A1* 10/2012 Sugiura ................ G10L 15/187 704/235
2012/0254143 A1 10/2012 Varma et al.
2012/0254152 A1 10/2012 Park et al.
2012/0254290 A1 10/2012 Naaman
2012/0259615 A1 10/2012 Morin et al.
2012/0259638 A1 10/2012 Kalinli
2012/0262296 A1 10/2012 Bezar
2012/0265482 A1 10/2012 Grokop et al.
2012/0265528 A1* 10/2012 Gruber ................. G10L 15/183 704/235
2012/0265535 A1 10/2012 Bryant-Rich et al.
2012/0265787 A1 10/2012 Hsu et al.
2012/0265806 A1 10/2012 Blanchflower et al.
2012/0271625 A1 10/2012 Bernard
2012/0271634 A1 10/2012 Lenke
2012/0271635 A1 10/2012 Ljolje
2012/0271640 A1 10/2012 Basir
2012/0271676 A1 10/2012 Aravamudan et al.
2012/0275377 A1 11/2012 Lehane et al.
2012/0278744 A1 11/2012 Kozitsyn et al.
2012/0278812 A1 11/2012 Wang
2012/0284015 A1 11/2012 Drewes
2012/0284027 A1 11/2012 Mallett et al.
2012/0290291 A1 11/2012 Shelley et al.
2012/0290300 A1 11/2012 Lee et al.
2012/0290657 A1 11/2012 Parks et al.
2012/0290680 A1 11/2012 Hwang
2012/0295708 A1 11/2012 Hernandez-Abrego et al.
2012/0296638 A1 11/2012 Patwa
2012/0296649 A1 11/2012 Bansal et al.
2012/0296654 A1 11/2012 Hendrickson et al.
2012/0296891 A1 11/2012 Rangan
2012/0297341 A1 11/2012 Glazer et al.
2012/0297348 A1 11/2012 Santoro
2012/0303369 A1 11/2012 Brush et al.
2012/0303371 A1 11/2012 Labsky et al.
2012/0304124 A1 11/2012 Chen et al.
2012/0304239 A1 11/2012 Shahraray et al.
2012/0309363 A1 12/2012 Gruber et al.
2012/0310642 A1 12/2012 Cao et al.
2012/0310649 A1 12/2012 Cannistraro et al.
2012/0310652 A1 12/2012 O"Sullivan
2012/0310922 A1 12/2012 Johnson et al.
2012/0311478 A1 12/2012 Van Os et al.
2012/0311583 A1 12/2012 Gruber et al.
2012/0311584 A1 12/2012 Gruber et al.
2012/0311585 A1 12/2012 Gruber et al.
2012/0316774 A1 12/2012 Yariv et al.
2012/0316862 A1 12/2012 Sultan et al.
2012/0316875 A1 12/2012 Nyquist et al.
2012/0316878 A1 12/2012 Singleton et al.
2012/0316955 A1 12/2012 Panguluri et al.
2012/0317194 A1 12/2012 Tian
2012/0317498 A1 12/2012 Logan et al.
2012/0321112 A1 12/2012 Schubert et al.
2012/0323560 A1 12/2012 Perez et al.
2012/0324391 A1 12/2012 Tocci
2012/0327009 A1 12/2012 Fleizach
2012/0329529 A1 12/2012 Van Der Raadt
2012/0330660 A1 12/2012 Jaiswal
2012/0330661 A1 12/2012 Lindahl
2012/0330990 A1 12/2012 Chen et al.
2013/0002716 A1 1/2013 Walker et al.
2013/0005405 A1 1/2013 Prociw
2013/0006633 A1 1/2013 Grokop et al.
2013/0006637 A1 1/2013 Kanevsky et al.
2013/0006638 A1 1/2013 Lindahl
2013/0007240 A1 1/2013 Qiu et al.
2013/0007648 A1 1/2013 Gamon et al.
2013/0009858 A1 1/2013 Lacey
2013/0010575 A1 1/2013 He et al.
2013/0013313 A1 1/2013 Shechtman et al.
2013/0013319 A1 1/2013 Grant et al.
2013/0014026 A1 1/2013 Beringer et al.
2013/0014143 A1 1/2013 Bhatia et al.
2013/0018659 A1 1/2013 Chi
2013/0018863 A1 1/2013 Regan et al.
2013/0024277 A1 1/2013 Tuchman et al.
2013/0024576 A1 1/2013 Dishneau et al.
2013/0027875 A1 1/2013 Zhu et al.
2013/0028404 A1 1/2013 Omalley et al.
2013/0030787 A1 1/2013 Cancedda et al.
2013/0030789 A1 1/2013 Dalce
2013/0030804 A1 1/2013 Zavaliagkos et al.
2013/0030815 A1 1/2013 Madhvanath et al.
2013/0030904 A1 1/2013 Aidasani et al.
2013/0030913 A1 1/2013 Zhu et al.
2013/0030955 A1 1/2013 David
2013/0031162 A1 1/2013 Willis et al.
2013/0031476 A1 1/2013 Coin et al.
2013/0176208 A1 1/2013 Tanaka et al.
2013/0033643 A1 2/2013 Kim et al.
2013/0035086 A1 2/2013 Chardon et al.
2013/0035942 A1 2/2013 Kim et al.
2013/0035961 A1 2/2013 Yegnanarayanan
2013/0035994 A1 2/2013 Pattan et al.
2013/0036200 A1 2/2013 Roberts et al.
2013/0038618 A1 2/2013 Urbach
2013/0041647 A1 2/2013 Ramerth et al.
2013/0041654 A1 2/2013 Walker et al.
2013/0041661 A1 2/2013 Lee et al.
2013/0041665 A1 2/2013 Jang et al.
2013/0041667 A1 2/2013 Longe et al.

(56) References Cited

U.S. PATENT DOCUMENTS

2013/0041968 A1 2/2013 Cohen et al.
2013/0046544 A1 2/2013 Kay et al.
2013/0047178 A1 2/2013 Moon et al.
2013/0050089 A1 2/2013 Neels et al.
2013/0054550 A1 2/2013 Bolohan
2013/0054609 A1 2/2013 Rajput et al.
2013/0054613 A1 2/2013 Bishop
2013/0054631 A1 2/2013 Govani et al.
2013/0054675 A1 2/2013 Jenkins et al.
2013/0054706 A1 2/2013 Graham et al.
2013/0054945 A1 2/2013 Free et al.
2013/0055099 A1 2/2013 Yao et al.
2013/0055147 A1 2/2013 Vasudev et al.
2013/0060571 A1 3/2013 Soemo et al.
2013/0060807 A1 3/2013 Rambhia et al.
2013/0061139 A1 3/2013 Mahkovec et al.
2013/0063611 A1 3/2013 Papakipos et al.
2013/0066832 A1 3/2013 Sheehan et al.
2013/0067307 A1 3/2013 Tian et al.
2013/0067312 A1 3/2013 Rose
2013/0067421 A1 3/2013 Osman et al.
2013/0069769 A1 3/2013 Pennington et al.
2013/0073286 A1 3/2013 Bastea-Forte et al.
2013/0073293 A1 3/2013 Jang et al.
2013/0073346 A1 3/2013 Chun et al.
2013/0073580 A1 3/2013 Mehanna et al.
2013/0073676 A1 3/2013 Cockcroft
2013/0078930 A1 3/2013 Chen et al.
2013/0080152 A1 3/2013 Brun et al.
2013/0080162 A1 3/2013 Chang et al.
2013/0080167 A1 3/2013 Mozer
2013/0080177 A1 3/2013 Chen
2013/0080178 A1 3/2013 Kang et al.
2013/0080251 A1 3/2013 Dempski
2013/0082967 A1 4/2013 Hillis et al.
2013/0084882 A1 4/2013 Khorashadi et al.
2013/0085755 A1 4/2013 Bringert et al.
2013/0085761 A1 4/2013 Bringert et al.
2013/0086609 A1 4/2013 Levy et al.
2013/0090921 A1 4/2013 Liu et al.
2013/0091090 A1 4/2013 Spivack et al.
2013/0095805 A1 4/2013 LeBeau et al.
2013/0096909 A1 4/2013 Brun et al.
2013/0096911 A1 4/2013 Beaufort et al.
2013/0096917 A1 4/2013 Edgar et al.
2013/0097566 A1 4/2013 Berglund
2013/0097682 A1 4/2013 Zeljkovic et al.
2013/0100017 A1 4/2013 Papakipos et al.
2013/0100268 A1 4/2013 Mihailidis et al.
2013/0103391 A1 4/2013 Millmore et al.
2013/0103405 A1 4/2013 Namba et al.
2013/0106742 A1 5/2013 Lee et al.
2013/0107053 A1 5/2013 Ozaki
2013/0109412 A1 5/2013 Nguyen et al.
2013/0110505 A1 5/2013 Gruber et al.
2013/0110515 A1 5/2013 Guzzoni et al.
2013/0110518 A1 5/2013 Gruber et al.
2013/0110519 A1 5/2013 Cheyer et al.
2013/0110520 A1 5/2013 Cheyer et al.
2013/0110943 A1 5/2013 Menon et al.
2013/0111330 A1 5/2013 Staikos et al.
2013/0111348 A1 5/2013 Gruber et al.
2013/0111365 A1 5/2013 Chen et al.
2013/0111487 A1 5/2013 Cheyer et al.
2013/0111581 A1 5/2013 Griffin et al.
2013/0115927 A1 5/2013 Gruber et al.
2013/0117022 A1 5/2013 Chen et al.
2013/0124189 A1 5/2013 Baldwin et al.
2013/0124672 A1 5/2013 Pan
2013/0125168 A1 5/2013 Agnihotri et al.
2013/0130669 A1 5/2013 Xiao et al.
2013/0132081 A1 5/2013 Ryu et al.
2013/0132084 A1 5/2013 Stonehocker et al.
2013/0132089 A1 5/2013 Fanty et al.
2013/0132871 A1 5/2013 Zeng et al.
2013/0138440 A1 5/2013 Strope et al.
2013/0141551 A1 6/2013 Kim
2013/0142317 A1 6/2013 Reynolds
2013/0142345 A1 6/2013 Waldmann
2013/0144594 A1 6/2013 Bangalore et al.
2013/0144616 A1 6/2013 Bangalore
2013/0151258 A1 6/2013 Chandrasekar et al.
2013/0151339 A1 6/2013 Kim et al.
2013/0152092 A1 6/2013 Yadgar
2013/0154811 A1 6/2013 Ferren et al.
2013/0155948 A1 6/2013 Pinheiro et al.
2013/0156198 A1 6/2013 Kim et al.
2013/0157629 A1 6/2013 Lee et al.
2013/0158977 A1 6/2013 Senior
2013/0159847 A1 6/2013 Banke et al.
2013/0159861 A1 6/2013 Rottler et al.
2013/0165232 A1 6/2013 Nelson et al.
2013/0166278 A1 6/2013 James et al.
2013/0166303 A1 6/2013 Chang et al.
2013/0166332 A1 6/2013 Hammad
2013/0166442 A1 6/2013 Nakajima et al.
2013/0167242 A1 6/2013 Paliwal
2013/0170738 A1 7/2013 Capuozzo et al.
2013/0172022 A1 7/2013 Seymour et al.
2013/0173258 A1 7/2013 Liu et al.
2013/0173268 A1 7/2013 Weng et al.
2013/0173513 A1 7/2013 Chu et al.
2013/0173610 A1 7/2013 Hu et al.
2013/0173614 A1 7/2013 Ismalon
2013/0174034 A1 7/2013 Brown et al.
2013/0176147 A1 7/2013 Anderson et al.
2013/0176244 A1 7/2013 Yamamoto et al.
2013/0176592 A1 7/2013 Sasaki
2013/0179168 A1 7/2013 Bae et al.
2013/0179172 A1 7/2013 Nakamura et al.
2013/0179440 A1 7/2013 Gordon
2013/0179806 A1 7/2013 Bastide et al.
2013/0183942 A1 7/2013 Novick et al.
2013/0183944 A1 7/2013 Mozer et al.
2013/0185059 A1 7/2013 Riccardi
2013/0185066 A1 7/2013 Tzirkel-Hancock et al.
2013/0185074 A1 7/2013 Gruber et al.
2013/0185081 A1 7/2013 Cheyer et al.
2013/0185336 A1 7/2013 Singh et al.
2013/0187850 A1 7/2013 Schulz et al.
2013/0187857 A1 7/2013 Griffin et al.
2013/0190021 A1 7/2013 Vieri et al.
2013/0191117 A1 7/2013 Atti et al.
2013/0191408 A1 7/2013 Volkert
2013/0197911 A1 8/2013 Wei et al.
2013/0197914 A1 8/2013 Yelvington et al.
2013/0198159 A1 8/2013 Hendry
2013/0198841 A1 8/2013 Poulson
2013/0204813 A1 8/2013 Master et al.
2013/0204897 A1 8/2013 McDougall
2013/0204967 A1 8/2013 Seo et al.
2013/0207898 A1 8/2013 Sullivan et al.
2013/0210410 A1 8/2013 Xu
2013/0210492 A1 8/2013 You et al.
2013/0212501 A1 8/2013 Anderson et al.
2013/0218553 A1 8/2013 Fujii et al.
2013/0218560 A1 8/2013 Hsiao et al.
2013/0218574 A1 8/2013 Falcon et al.
2013/0218899 A1 8/2013 Raghavan et al.
2013/0219333 A1 8/2013 Palwe et al.
2013/0222249 A1 8/2013 Pasquero et al.
2013/0223279 A1 8/2013 Tinnakornsrisuphap et al.
2013/0225128 A1 8/2013 Gomar
2013/0226935 A1 8/2013 Bai et al.
2013/0226996 A1 8/2013 Itagaki et al.
2013/0231917 A1 9/2013 Naik
2013/0234947 A1 9/2013 Kristensson et al.
2013/0235987 A1 9/2013 Arroniz-Escobar
2013/0238312 A1 9/2013 Waibel
2013/0238326 A1 9/2013 Kim et al.
2013/0238540 A1 9/2013 O'donoghue et al.
2013/0238647 A1 9/2013 Thompson
2013/0238729 A1 9/2013 Holzman et al.
2013/0244615 A1 9/2013 Miller

(56) References Cited

U.S. PATENT DOCUMENTS

2013/0246048 A1 9/2013 Nagase et al.
2013/0246050 A1 9/2013 Yu et al.
2013/0246329 A1 9/2013 Pasquero et al.
2013/0253911 A1 9/2013 Petri et al.
2013/0253912 A1 9/2013 Medlock et al.
2013/0260739 A1 10/2013 Saino
2013/0262168 A1 10/2013 Makanawala et al.
2013/0268263 A1 10/2013 Park et al.
2013/0268956 A1 10/2013 Recco
2013/0275117 A1 10/2013 Winer
2013/0275136 A1 10/2013 Czahor
2013/0275138 A1 10/2013 Gruber et al.
2013/0275164 A1* 10/2013 Gruber .................... G10L 15/22 705/5
2013/0275199 A1 10/2013 Proctor, Jr. et al.
2013/0275625 A1 10/2013 Taivalsaari et al.
2013/0275899 A1 10/2013 Schubert et al.
2013/0279724 A1 10/2013 Stafford et al.
2013/0282709 A1 10/2013 Zhu et al.
2013/0283168 A1 10/2013 Brown et al.
2013/0283199 A1 10/2013 Selig et al.
2013/0283283 A1 10/2013 Wang et al.
2013/0285913 A1 10/2013 Griffin et al.
2013/0288722 A1 10/2013 Ramanujam et al.
2013/0289991 A1 10/2013 Eshwar et al.
2013/0289993 A1 10/2013 Rao
2013/0289994 A1 10/2013 Newman et al.
2013/0290001 A1 10/2013 Yun et al.
2013/0290222 A1 10/2013 Gordo et al.
2013/0290905 A1 10/2013 Luvogt et al.
2013/0291015 A1 10/2013 Pan
2013/0297078 A1 11/2013 Kolavennu
2013/0297198 A1 11/2013 Velde et al.
2013/0297317 A1 11/2013 Lee et al.
2013/0297319 A1 11/2013 Kim
2013/0297348 A1 11/2013 Cardoza et al.
2013/0300645 A1 11/2013 Fedorov
2013/0300648 A1 11/2013 Kim et al.
2013/0303106 A1 11/2013 Martin
2013/0304476 A1 11/2013 Kim et al.
2013/0304479 A1 11/2013 Teller et al.
2013/0304758 A1 11/2013 Gruber et al.
2013/0304815 A1 11/2013 Puente et al.
2013/0305119 A1 11/2013 Kern et al.
2013/0307855 A1 11/2013 Lamb et al.
2013/0307997 A1 11/2013 O'Keefe et al.
2013/0308922 A1 11/2013 Sano et al.
2013/0311179 A1 11/2013 Wagner
2013/0311184 A1 11/2013 Badavne et al.
2013/0311487 A1 11/2013 Moore et al.
2013/0311997 A1 11/2013 Gruber et al.
2013/0315038 A1 11/2013 Ferren et al.
2013/0316679 A1 11/2013 Miller et al.
2013/0316746 A1 11/2013 Miller et al.
2013/0317921 A1 11/2013 Havas
2013/0318478 A1 11/2013 Ogura
2013/0321267 A1 12/2013 Bhatti et al.
2013/0322634 A1 12/2013 Bennett et al.
2013/0322665 A1 12/2013 Bennett et al.
2013/0325340 A1 12/2013 Forstall et al.
2013/0325436 A1 12/2013 Wang et al.
2013/0325443 A1 12/2013 Begeja et al.
2013/0325447 A1 12/2013 Levien et al.
2013/0325448 A1 12/2013 Levien et al.
2013/0325460 A1 12/2013 Kim et al.
2013/0325480 A1 12/2013 Lee et al.
2013/0325481 A1 12/2013 Van Os et al.
2013/0325484 A1 12/2013 Chakladar et al.
2013/0325844 A1 12/2013 Plaisant
2013/0325967 A1 12/2013 Parks et al.
2013/0325970 A1 12/2013 Roberts et al.
2013/0325979 A1 12/2013 Mansfield et al.
2013/0326576 A1 12/2013 Zhang et al.
2013/0328809 A1 12/2013 Smith
2013/0329023 A1 12/2013 Suplee, III et al.
2013/0331127 A1 12/2013 Sabatelli et al.
2013/0332113 A1 12/2013 Piemonte et al.
2013/0332159 A1 12/2013 Federighi et al.
2013/0332162 A1 12/2013 Keen
2013/0332164 A1 12/2013 Nalk
2013/0332168 A1 12/2013 Kim et al.
2013/0332172 A1 12/2013 Prakash et al.
2013/0332400 A1 12/2013 González
2013/0332538 A1 12/2013 Clark et al.
2013/0332721 A1 12/2013 Chaudhri et al.
2013/0339256 A1 12/2013 Shroff
2013/0339454 A1 12/2013 Walker et al.
2013/0339991 A1 12/2013 Ricci
2013/0342672 A1 12/2013 Gray et al.
2013/0343584 A1 12/2013 Bennett et al.
2013/0343721 A1 12/2013 Abecassis
2013/0346065 A1 12/2013 Davidson et al.
2013/0346068 A1 12/2013 Solem et al.
2013/0346347 A1 12/2013 Patterson et al.
2013/0346488 A1 12/2013 Lunt et al.
2013/0347018 A1 12/2013 Limp et al.
2013/0347029 A1 12/2013 Tang et al.
2013/0347102 A1 12/2013 Shi
2013/0347117 A1 12/2013 Parks et al.
2014/0001255 A1 1/2014 Anthoine
2014/0002338 A1 1/2014 Raffa et al.
2014/0006012 A1 1/2014 Zhou et al.
2014/0006025 A1 1/2014 Krishnan et al.
2014/0006027 A1 1/2014 Kim et al.
2014/0006028 A1 1/2014 Hu
2014/0006030 A1 1/2014 Fleizach et al.
2014/0006153 A1 1/2014 Thangam et al.
2014/0006191 A1 1/2014 Shankar et al.
2014/0006483 A1 1/2014 Garmark et al.
2014/0006496 A1 1/2014 Dearman et al.
2014/0006562 A1 1/2014 Handa et al.
2014/0006947 A1 1/2014 Garmark et al.
2014/0006951 A1 1/2014 Hunter
2014/0006955 A1 1/2014 Greenzeiger et al.
2014/0008163 A1 1/2014 Mikonaho et al.
2014/0012574 A1 1/2014 Pasupalak et al.
2014/0012580 A1 1/2014 Ganong, III et al.
2014/0012586 A1 1/2014 Rubin et al.
2014/0012587 A1 1/2014 Park
2014/0019116 A1 1/2014 Lundberg et al.
2014/0019133 A1 1/2014 Bao et al.
2014/0019460 A1 1/2014 Sambrani et al.
2014/0028029 A1 1/2014 Jochman
2014/0028477 A1 1/2014 Michalske
2014/0028735 A1 1/2014 Williams et al.
2014/0032453 A1 1/2014 Eustice et al.
2014/0032678 A1 1/2014 Koukoumidis et al.
2014/0033071 A1 1/2014 Gruber et al.
2014/0035823 A1 2/2014 Khoe et al.
2014/0037075 A1 2/2014 Bouzid et al.
2014/0039888 A1 2/2014 Taubman et al.
2014/0039893 A1 2/2014 Weiner et al.
2014/0039894 A1 2/2014 Shostak
2014/0040274 A1 2/2014 Aravamudan et al.
2014/0040748 A1* 2/2014 Lemay ................ G06F 3/04817 715/728
2014/0040754 A1 2/2014 Donelli
2014/0040801 A1 2/2014 Patel et al.
2014/0040918 A1 2/2014 Li
2014/0040961 A1 2/2014 Green et al.
2014/0046934 A1 2/2014 Zhou et al.
2014/0047001 A1 2/2014 Phillips et al.
2014/0052451 A1 2/2014 Cheong et al.
2014/0052680 A1 2/2014 Nitz et al.
2014/0052791 A1 2/2014 Chakra et al.
2014/0053082 A1 2/2014 Park
2014/0053101 A1 2/2014 Buehler et al.
2014/0053210 A1 2/2014 Cheong et al.
2014/0057610 A1 2/2014 Olincy et al.
2014/0059030 A1 2/2014 Hakkani-Tur et al.
2014/0067361 A1 3/2014 Nikoulina et al.
2014/0067371 A1 3/2014 Liensberger
2014/0067402 A1 3/2014 Kim
2014/0067738 A1 3/2014 Kingsbury

(56) References Cited

U.S. PATENT DOCUMENTS

| | | | |
|---|---|---|---|
| 2014/0068751 | A1 | 3/2014 | Last |
| 2014/0074454 | A1 | 3/2014 | Brown et al. |
| 2014/0074466 | A1 | 3/2014 | Sharifi et al. |
| 2014/0074470 | A1 | 3/2014 | Jansche et al. |
| 2014/0074472 | A1 | 3/2014 | Lin et al. |
| 2014/0074482 | A1 | 3/2014 | Ohno |
| 2014/0074483 | A1 | 3/2014 | Van Os |
| 2014/0074589 | A1 | 3/2014 | Nielsen et al. |
| 2014/0074815 | A1 | 3/2014 | Plimton |
| 2014/0075453 | A1 | 3/2014 | Bellessort et al. |
| 2014/0078065 | A1 | 3/2014 | Akkok |
| 2014/0079195 | A1 | 3/2014 | Srivastava et al. |
| 2014/0080410 | A1 | 3/2014 | Jung et al. |
| 2014/0080428 | A1 | 3/2014 | Rhoads et al. |
| 2014/0081619 | A1 | 3/2014 | Solntseva et al. |
| 2014/0081633 | A1 | 3/2014 | Badaskar |
| 2014/0081635 | A1 | 3/2014 | Yanagihara |
| 2014/0081829 | A1 | 3/2014 | Milne |
| 2014/0081941 | A1 | 3/2014 | Bai et al. |
| 2014/0082500 | A1 | 3/2014 | Wilensky et al. |
| 2014/0082501 | A1 | 3/2014 | Bae et al. |
| 2014/0082545 | A1 | 3/2014 | Zhai et al. |
| 2014/0082715 | A1 | 3/2014 | Grajek et al. |
| 2014/0086458 | A1 | 3/2014 | Rogers |
| 2014/0087711 | A1 | 3/2014 | Geyer et al. |
| 2014/0088952 | A1 | 3/2014 | Fife et al. |
| 2014/0088961 | A1 | 3/2014 | Woodward et al. |
| 2014/0088964 | A1 | 3/2014 | Bellegarda |
| 2014/0088970 | A1 | 3/2014 | Kang |
| 2014/0092007 | A1 | 4/2014 | Kim et al. |
| 2014/0095171 | A1 | 4/2014 | Lynch et al. |
| 2014/0095172 | A1 | 4/2014 | Cabaco et al. |
| 2014/0095173 | A1 | 4/2014 | Lynch et al. |
| 2014/0095432 | A1 | 4/2014 | Trumbull et al. |
| 2014/0095601 | A1 | 4/2014 | Abuelsaad et al. |
| 2014/0095965 | A1 | 4/2014 | Li |
| 2014/0096077 | A1 | 4/2014 | Jacob et al. |
| 2014/0096209 | A1 | 4/2014 | Saraf et al. |
| 2014/0098247 | A1 | 4/2014 | Rao et al. |
| 2014/0100847 | A1 | 4/2014 | Ishii et al. |
| 2014/0101127 | A1 | 4/2014 | Simhon et al. |
| 2014/0104175 | A1 | 4/2014 | Ouyang et al. |
| 2014/0108017 | A1 | 4/2014 | Mason et al. |
| 2014/0108391 | A1 | 4/2014 | Volkert |
| 2014/0112556 | A1 | 4/2014 | Kalinli-Akbacak |
| 2014/0114554 | A1 | 4/2014 | Lagassey |
| 2014/0115062 | A1 | 4/2014 | Liu et al. |
| 2014/0115114 | A1 | 4/2014 | Garmark et al. |
| 2014/0118155 | A1 | 5/2014 | Bowers et al. |
| 2014/0118624 | A1 | 5/2014 | Jang et al. |
| 2014/0120961 | A1 | 5/2014 | Buck |
| 2014/0122059 | A1 | 5/2014 | Patel et al. |
| 2014/0122085 | A1 | 5/2014 | Piety et al. |
| 2014/0122086 | A1 | 5/2014 | Kapur et al. |
| 2014/0122136 | A1 | 5/2014 | Jayanthi |
| 2014/0122153 | A1 | 5/2014 | Truitt |
| 2014/0123022 | A1 | 5/2014 | Lee et al. |
| 2014/0128021 | A1 | 5/2014 | Walker et al. |
| 2014/0129006 | A1 | 5/2014 | Chen et al. |
| 2014/0129226 | A1 | 5/2014 | Lee et al. |
| 2014/0132935 | A1 | 5/2014 | Kim et al. |
| 2014/0134983 | A1 | 5/2014 | Jung et al. |
| 2014/0135036 | A1 | 5/2014 | Bonanni et al. |
| 2014/0136013 | A1 | 5/2014 | Wolverton et al. |
| 2014/0136187 | A1 | 5/2014 | Wolverton et al. |
| 2014/0136195 | A1 | 5/2014 | Abdossalami et al. |
| 2014/0136212 | A1 | 5/2014 | Kwon et al. |
| 2014/0136946 | A1 | 5/2014 | Matas |
| 2014/0136987 | A1 | 5/2014 | Rodriguez |
| 2014/0142922 | A1 | 5/2014 | Liang et al. |
| 2014/0142923 | A1 | 5/2014 | Jones et al. |
| 2014/0142935 | A1 | 5/2014 | Lindahl et al. |
| 2014/0142953 | A1 | 5/2014 | Kim et al. |
| 2014/0143550 | A1 | 5/2014 | Ganong, III et al. |
| 2014/0143721 | A1 | 5/2014 | Suzuki et al. |
| 2014/0143784 | A1 | 5/2014 | Mistry et al. |
| 2014/0146200 | A1 | 5/2014 | Scott et al. |
| 2014/0149118 | A1 | 5/2014 | Lee et al. |
| 2014/0152577 | A1 | 6/2014 | Yuen et al. |
| 2014/0153709 | A1 | 6/2014 | Byrd et al. |
| 2014/0155031 | A1 | 6/2014 | Lee et al. |
| 2014/0156262 | A1 | 6/2014 | Yuen et al. |
| 2014/0156269 | A1 | 6/2014 | Lee et al. |
| 2014/0156279 | A1 | 6/2014 | Okamoto et al. |
| 2014/0157319 | A1 | 6/2014 | Kimura et al. |
| 2014/0157422 | A1 | 6/2014 | Livshits et al. |
| 2014/0163751 | A1 | 6/2014 | Davis et al. |
| 2014/0163951 | A1 | 6/2014 | Nikoulina et al. |
| 2014/0163953 | A1 | 6/2014 | Parikh |
| 2014/0163954 | A1 | 6/2014 | Joshi et al. |
| 2014/0163962 | A1 | 6/2014 | Castelli et al. |
| 2014/0163976 | A1 | 6/2014 | Park et al. |
| 2014/0163977 | A1 | 6/2014 | Hoffmeister et al. |
| 2014/0163978 | A1 | 6/2014 | Basye et al. |
| 2014/0163981 | A1 | 6/2014 | Cook et al. |
| 2014/0163995 | A1 | 6/2014 | Burns et al. |
| 2014/0164305 | A1 | 6/2014 | Lynch et al. |
| 2014/0164312 | A1 | 6/2014 | Lynch et al. |
| 2014/0164476 | A1 | 6/2014 | Thomson |
| 2014/0164508 | A1 | 6/2014 | Lynch et al. |
| 2014/0164532 | A1 | 6/2014 | Lynch et al. |
| 2014/0164533 | A1 | 6/2014 | Lynch et al. |
| 2014/0164953 | A1 | 6/2014 | Lynch et al. |
| 2014/0169795 | A1 | 6/2014 | Clough |
| 2014/0171064 | A1 | 6/2014 | Das |
| 2014/0172412 | A1 | 6/2014 | Viegas et al. |
| 2014/0172878 | A1 | 6/2014 | Clark et al. |
| 2014/0173445 | A1 | 6/2014 | Grassiotto |
| 2014/0173460 | A1 | 6/2014 | Kim |
| 2014/0176814 | A1 | 6/2014 | Ahn |
| 2014/0179295 | A1 | 6/2014 | Luebbers et al. |
| 2014/0180499 | A1 | 6/2014 | Cooper et al. |
| 2014/0180689 | A1 | 6/2014 | Kim |
| 2014/0180697 | A1 | 6/2014 | Torok et al. |
| 2014/0181865 | A1 | 6/2014 | Koganei |
| 2014/0188335 | A1 | 7/2014 | Madhok et al. |
| 2014/0188460 | A1 | 7/2014 | Ouyang et al. |
| 2014/0188477 | A1 | 7/2014 | Zhang |
| 2014/0188478 | A1 | 7/2014 | Zhang |
| 2014/0188485 | A1 | 7/2014 | Kim et al. |
| 2014/0188835 | A1 | 7/2014 | Zhang et al. |
| 2014/0195226 | A1 | 7/2014 | Yun et al. |
| 2014/0195230 | A1 | 7/2014 | Han et al. |
| 2014/0195233 | A1 | 7/2014 | Bapat et al. |
| 2014/0195244 | A1 | 7/2014 | Cha et al. |
| 2014/0195251 | A1 | 7/2014 | Zeinstra et al. |
| 2014/0195252 | A1 | 7/2014 | Gruber et al. |
| 2014/0198048 | A1 | 7/2014 | Unruh et al. |
| 2014/0203939 | A1 | 7/2014 | Harrington et al. |
| 2014/0205076 | A1 | 7/2014 | Kumar et al. |
| 2014/0207439 | A1 | 7/2014 | Venkatapathy et al. |
| 2014/0207446 | A1 | 7/2014 | Klein et al. |
| 2014/0207447 | A1 | 7/2014 | Jiang et al. |
| 2014/0207466 | A1 | 7/2014 | Smadi |
| 2014/0207468 | A1 | 7/2014 | Bartnik |
| 2014/0207582 | A1 | 7/2014 | Flinn et al. |
| 2014/0211944 | A1 | 7/2014 | Hayward et al. |
| 2014/0214429 | A1 | 7/2014 | Pantel |
| 2014/0214537 | A1 | 7/2014 | Yoo et al. |
| 2014/0215367 | A1 | 7/2014 | Kim et al. |
| 2014/0215513 | A1 | 7/2014 | Ramer et al. |
| 2014/0218372 | A1 | 8/2014 | Missig et al. |
| 2014/0222422 | A1 | 8/2014 | Sarikaya et al. |
| 2014/0222435 | A1 | 8/2014 | Li et al. |
| 2014/0222436 | A1 | 8/2014 | Binder et al. |
| 2014/0222678 | A1 | 8/2014 | Sheets et al. |
| 2014/0222967 | A1 | 8/2014 | Harrang et al. |
| 2014/0223377 | A1 | 8/2014 | Shaw et al. |
| 2014/0223481 | A1 | 8/2014 | Fundament |
| 2014/0226503 | A1 | 8/2014 | Cooper et al. |
| 2014/0229158 | A1 | 8/2014 | Zweig et al. |
| 2014/0229184 | A1 | 8/2014 | Shires |
| 2014/0230055 | A1 | 8/2014 | Boehl |
| 2014/0232570 | A1 | 8/2014 | Skinder et al. |

(56) References Cited

U.S. PATENT DOCUMENTS

| | | | |
|---|---|---|---|
| 2014/0232656 | A1 | 8/2014 | Pasquero et al. |
| 2014/0236595 | A1 | 8/2014 | Gray |
| 2014/0236986 | A1 | 8/2014 | Guzman |
| 2014/0237042 | A1 | 8/2014 | Ahmed et al. |
| 2014/0237366 | A1 | 8/2014 | Poulos et al. |
| 2014/0244248 | A1 | 8/2014 | Arisoy et al. |
| 2014/0244249 | A1 | 8/2014 | Mohamed et al. |
| 2014/0244254 | A1 | 8/2014 | Ju et al. |
| 2014/0244257 | A1 | 8/2014 | Colibro et al. |
| 2014/0244258 | A1 | 8/2014 | Song et al. |
| 2014/0244263 | A1 | 8/2014 | Pontual et al. |
| 2014/0244266 | A1 | 8/2014 | Brown et al. |
| 2014/0244268 | A1 | 8/2014 | Abdelsamie et al. |
| 2014/0244270 | A1 | 8/2014 | Han et al. |
| 2014/0244271 | A1 | 8/2014 | Lindahl |
| 2014/0244712 | A1 | 8/2014 | Walters et al. |
| 2014/0245140 | A1 | 8/2014 | Brown et al. |
| 2014/0247383 | A1 | 9/2014 | Dave et al. |
| 2014/0247926 | A1 | 9/2014 | Gainsboro et al. |
| 2014/0249812 | A1 | 9/2014 | Bou-Ghazale et al. |
| 2014/0249816 | A1 | 9/2014 | Pickering et al. |
| 2014/0249817 | A1 | 9/2014 | Hart et al. |
| 2014/0249820 | A1 | 9/2014 | Hsu et al. |
| 2014/0249821 | A1 | 9/2014 | Kennewick et al. |
| 2014/0250046 | A1 | 9/2014 | Winn et al. |
| 2014/0257809 | A1 | 9/2014 | Goel et al. |
| 2014/0257815 | A1 | 9/2014 | Zhao et al. |
| 2014/0257902 | A1 | 9/2014 | Moore et al. |
| 2014/0258324 | A1 | 9/2014 | Mauro et al. |
| 2014/0258357 | A1 | 9/2014 | Singh et al. |
| 2014/0258857 | A1 | 9/2014 | Dykstra-Erickson et al. |
| 2014/0258905 | A1 | 9/2014 | Lee et al. |
| 2014/0267022 | A1 | 9/2014 | Kim |
| 2014/0267599 | A1 | 9/2014 | Drouin et al. |
| 2014/0267933 | A1 | 9/2014 | Young |
| 2014/0272821 | A1 | 9/2014 | Pitschel et al. |
| 2014/0273979 | A1 | 9/2014 | Van Os et al. |
| 2014/0274005 | A1 | 9/2014 | Luna et al. |
| 2014/0274203 | A1 | 9/2014 | Ganong, III et al. |
| 2014/0274211 | A1 | 9/2014 | Sejnoha et al. |
| 2014/0278051 | A1 | 9/2014 | Mcgavran et al. |
| 2014/0278343 | A1 | 9/2014 | Tran |
| 2014/0278349 | A1 | 9/2014 | Grieves et al. |
| 2014/0278379 | A1 | 9/2014 | Coccaro et al. |
| 2014/0278390 | A1 | 9/2014 | Kingsbury et al. |
| 2014/0278391 | A1 | 9/2014 | Braho et al. |
| 2014/0278394 | A1 | 9/2014 | Bastyr et al. |
| 2014/0278406 | A1 | 9/2014 | Tsumura et al. |
| 2014/0278413 | A1 | 9/2014 | Pitschel et al. |
| 2014/0278426 | A1 | 9/2014 | Jost et al. |
| 2014/0278429 | A1 | 9/2014 | Ganong, III |
| 2014/0278435 | A1 | 9/2014 | Ganong, III et al. |
| 2014/0278436 | A1 | 9/2014 | Khanna et al. |
| 2014/0278438 | A1 | 9/2014 | Hart et al. |
| 2014/0278443 | A1 | 9/2014 | Gunn et al. |
| 2014/0278444 | A1 | 9/2014 | Larson et al. |
| 2014/0278513 | A1 | 9/2014 | Prakash et al. |
| 2014/0279622 | A1 | 9/2014 | Lamoureux et al. |
| 2014/0279739 | A1 | 9/2014 | Elkington et al. |
| 2014/0279787 | A1 | 9/2014 | Cheng et al. |
| 2014/0280072 | A1 | 9/2014 | Coleman |
| 2014/0280107 | A1 | 9/2014 | Heymans et al. |
| 2014/0280138 | A1 | 9/2014 | Li et al. |
| 2014/0280292 | A1 | 9/2014 | Skinder |
| 2014/0280353 | A1 | 9/2014 | Delaney et al. |
| 2014/0280450 | A1 | 9/2014 | Luna |
| 2014/0280757 | A1 | 9/2014 | Tran |
| 2014/0281944 | A1 | 9/2014 | Winer |
| 2014/0281983 | A1 | 9/2014 | Xian et al. |
| 2014/0281997 | A1 | 9/2014 | Fleizach et al. |
| 2014/0282003 | A1 | 9/2014 | Gruber et al. |
| 2014/0282007 | A1 | 9/2014 | Fleizach |
| 2014/0282045 | A1 | 9/2014 | Ayanam et al. |
| 2014/0282178 | A1 | 9/2014 | Borzello et al. |
| 2014/0282201 | A1 | 9/2014 | Pasquero et al. |
| 2014/0282203 | A1 | 9/2014 | Pasquero et al. |
| 2014/0282559 | A1 | 9/2014 | Verduzco et al. |
| 2014/0282586 | A1 | 9/2014 | Shear et al. |
| 2014/0282743 | A1 | 9/2014 | Howard et al. |
| 2014/0288990 | A1 | 9/2014 | Moore et al. |
| 2014/0289508 | A1 | 9/2014 | Wang |
| 2014/0297267 | A1 | 10/2014 | Spencer et al. |
| 2014/0297281 | A1 | 10/2014 | Togawa et al. |
| 2014/0297284 | A1 | 10/2014 | Gruber et al. |
| 2014/0297288 | A1 | 10/2014 | Yu et al. |
| 2014/0298395 | A1 | 10/2014 | Yang et al. |
| 2014/0304086 | A1 | 10/2014 | Dasdan et al. |
| 2014/0304605 | A1 | 10/2014 | Ohmura et al. |
| 2014/0309990 | A1 | 10/2014 | Gandrabur et al. |
| 2014/0309996 | A1 | 10/2014 | Zhang |
| 2014/0310001 | A1 | 10/2014 | Kalns et al. |
| 2014/0310002 | A1 | 10/2014 | Nitz et al. |
| 2014/0310348 | A1 | 10/2014 | Keskitalo et al. |
| 2014/0310365 | A1 | 10/2014 | Sample et al. |
| 2014/0310595 | A1 | 10/2014 | Acharya et al. |
| 2014/0313007 | A1 | 10/2014 | Harding |
| 2014/0315492 | A1 | 10/2014 | Woods |
| 2014/0316585 | A1 | 10/2014 | Boesveld et al. |
| 2014/0317030 | A1 | 10/2014 | Shen et al. |
| 2014/0317502 | A1 | 10/2014 | Brown et al. |
| 2014/0324429 | A1 | 10/2014 | Weilhammer et al. |
| 2014/0324884 | A1 | 10/2014 | Lindahl et al. |
| 2014/0330560 | A1 | 11/2014 | Venkatesha et al. |
| 2014/0330569 | A1 | 11/2014 | Kolavennu et al. |
| 2014/0330951 | A1 | 11/2014 | Sukoff et al. |
| 2014/0335823 | A1 | 11/2014 | Heredia et al. |
| 2014/0337037 | A1 | 11/2014 | Chi |
| 2014/0337048 | A1 | 11/2014 | Brown et al. |
| 2014/0337266 | A1 | 11/2014 | Wolverton et al. |
| 2014/0337370 | A1* | 11/2014 | Aravamudan .......... G10L 15/22 707/759 |
| 2014/0337371 | A1 | 11/2014 | Li |
| 2014/0337438 | A1 | 11/2014 | Govande et al. |
| 2014/0337621 | A1 | 11/2014 | Nakhimov |
| 2014/0337751 | A1 | 11/2014 | Lim et al. |
| 2014/0337814 | A1 | 11/2014 | Kalns et al. |
| 2014/0342762 | A1 | 11/2014 | Hajdu et al. |
| 2014/0343834 | A1 | 11/2014 | Demerchant et al. |
| 2014/0343943 | A1 | 11/2014 | Al-Telmissani |
| 2014/0343946 | A1 | 11/2014 | Torok et al. |
| 2014/0344205 | A1 | 11/2014 | Luna et al. |
| 2014/0344627 | A1 | 11/2014 | Schaub et al. |
| 2014/0344687 | A1 | 11/2014 | Durham et al. |
| 2014/0347181 | A1 | 11/2014 | Luna et al. |
| 2014/0350847 | A1 | 11/2014 | Ichinokawa |
| 2014/0350924 | A1 | 11/2014 | Zurek et al. |
| 2014/0350933 | A1 | 11/2014 | Bak et al. |
| 2014/0351741 | A1 | 11/2014 | Medlock et al. |
| 2014/0351760 | A1 | 11/2014 | Skory et al. |
| 2014/0358519 | A1 | 12/2014 | Mirkin et al. |
| 2014/0358521 | A1 | 12/2014 | Mikutel et al. |
| 2014/0358523 | A1 | 12/2014 | Sheth et al. |
| 2014/0358549 | A1 | 12/2014 | O'Connor et al. |
| 2014/0359637 | A1 | 12/2014 | Yan |
| 2014/0359709 | A1 | 12/2014 | Nassar et al. |
| 2014/0361973 | A1 | 12/2014 | Raux et al. |
| 2014/0363074 | A1 | 12/2014 | Dolfing et al. |
| 2014/0364149 | A1 | 12/2014 | Marti et al. |
| 2014/0365209 | A1* | 12/2014 | Evermann .............. G06F 40/35 704/9 |
| 2014/0365214 | A1 | 12/2014 | Bayley |
| 2014/0365216 | A1 | 12/2014 | Gruber et al. |
| 2014/0365226 | A1 | 12/2014 | Sinha |
| 2014/0365227 | A1 | 12/2014 | Cash et al. |
| 2014/0365407 | A1 | 12/2014 | Brown et al. |
| 2014/0365505 | A1 | 12/2014 | Clark et al. |
| 2014/0365880 | A1 | 12/2014 | Bellegarda |
| 2014/0365885 | A1 | 12/2014 | Carson et al. |
| 2014/0365895 | A1 | 12/2014 | Magahern et al. |
| 2014/0365922 | A1 | 12/2014 | Yang |
| 2014/0365945 | A1 | 12/2014 | Karunamuni et al. |
| 2014/0370817 | A1 | 12/2014 | Luna |
| 2014/0370841 | A1 | 12/2014 | Roberts et al. |
| 2014/0372112 | A1 | 12/2014 | Xue et al. |

(56) References Cited

U.S. PATENT DOCUMENTS

2014/0372356 A1 12/2014 Bilal et al.
2014/0372468 A1 12/2014 Collins et al.
2014/0372931 A1 12/2014 Zhai et al.
2014/0379326 A1 12/2014 Sarikaya et al.
2014/0379334 A1 12/2014 Fry
2014/0379341 A1 12/2014 Seo et al.
2014/0379798 A1 12/2014 Bunner et al.
2014/0380285 A1 12/2014 Gabel et al.
2015/0003797 A1 1/2015 Schmidt
2015/0004958 A1 1/2015 Wang et al.
2015/0005009 A1 1/2015 Tomkins et al.
2015/0006148 A1 1/2015 Goldszmit et al.
2015/0006157 A1 1/2015 Silva et al.
2015/0006167 A1 1/2015 Kato et al.
2015/0006176 A1 1/2015 Pogue et al.
2015/0006178 A1 1/2015 Peng et al.
2015/0006184 A1 1/2015 Marti et al.
2015/0006199 A1 1/2015 Snider et al.
2015/0012260 A1* 1/2015 Chakladar .......... G01C 21/3664 704/9
2015/0012271 A1 1/2015 Peng et al.
2015/0012862 A1 1/2015 Ikeda et al.
2015/0019219 A1 1/2015 Tzirkel-Hancock et al.
2015/0019221 A1 1/2015 Lee et al.
2015/0019944 A1 1/2015 Kalgi
2015/0019954 A1 1/2015 Dalal et al.
2015/0019974 A1 1/2015 Doi et al.
2015/0025405 A1 1/2015 Vairavan et al.
2015/0025890 A1 1/2015 Jagatheesan et al.
2015/0026620 A1 1/2015 Kwon et al.
2015/0027178 A1 1/2015 Scalisi
2015/0031416 A1 1/2015 Labowicz et al.
2015/0032443 A1 1/2015 Karov et al.
2015/0032457 A1 1/2015 Koo et al.
2015/0033219 A1 1/2015 Breiner et al.
2015/0033275 A1 1/2015 Natani et al.
2015/0034855 A1 2/2015 Shen
2015/0038161 A1 2/2015 Jakobson et al.
2015/0039292 A1 2/2015 Suleman et al.
2015/0039295 A1 2/2015 Soschen
2015/0039299 A1 2/2015 Weinstein et al.
2015/0039305 A1 2/2015 Huang
2015/0039606 A1 2/2015 Salaka et al.
2015/0040012 A1 2/2015 Faaborg et al.
2015/0045003 A1 2/2015 Vora et al.
2015/0045007 A1 2/2015 Cash
2015/0045068 A1 2/2015 Soffer et al.
2015/0046434 A1 2/2015 Lim et al.
2015/0046537 A1 2/2015 Rakib
2015/0046828 A1 2/2015 Desai et al.
2015/0050633 A1 2/2015 Christmas et al.
2015/0050923 A1 2/2015 Tu et al.
2015/0051754 A1 2/2015 Kwon et al.
2015/0053779 A1 2/2015 Adamek et al.
2015/0053781 A1 2/2015 Nelson et al.
2015/0055879 A1 2/2015 Yang
2015/0058013 A1 2/2015 Pakhomov et al.
2015/0058018 A1 2/2015 Georges et al.
2015/0058720 A1 2/2015 Smadja et al.
2015/0058785 A1 2/2015 Ookawara
2015/0065149 A1 3/2015 Russell et al.
2015/0065200 A1 3/2015 Namgung et al.
2015/0066479 A1 3/2015 Pasupalak et al.
2015/0066494 A1 3/2015 Salvador et al.
2015/0066496 A1 3/2015 Deoras et al.
2015/0066506 A1 3/2015 Romano et al.
2015/0066516 A1 3/2015 Nishikawa et al.
2015/0066817 A1 3/2015 Slayton et al.
2015/0067485 A1 3/2015 Kim et al.
2015/0067819 A1 3/2015 Shribman et al.
2015/0067822 A1 3/2015 Randall
2015/0071121 A1 3/2015 Patil et al.
2015/0073788 A1 3/2015 Sak et al.
2015/0073804 A1 3/2015 Senior et al.
2015/0074524 A1 3/2015 Nicholson et al.
2015/0074615 A1 3/2015 Han et al.
2015/0081295 A1 3/2015 Yun et al.
2015/0082180 A1 3/2015 Ames et al.
2015/0082229 A1 3/2015 Ouyang et al.
2015/0086174 A1 3/2015 Abecassis et al.
2015/0088511 A1 3/2015 Bharadwaj et al.
2015/0088514 A1 3/2015 Typrin
2015/0088518 A1 3/2015 Kim et al.
2015/0088522 A1 3/2015 Hendrickson et al.
2015/0088523 A1 3/2015 Schuster
2015/0088998 A1 3/2015 Isensee et al.
2015/0092520 A1 4/2015 Robison et al.
2015/0094834 A1 4/2015 Vega et al.
2015/0095031 A1 4/2015 Conkie et al.
2015/0095159 A1 4/2015 Kennewick et al.
2015/0095268 A1 4/2015 Greenzeiger et al.
2015/0095278 A1 4/2015 Flinn et al.
2015/0100144 A1 4/2015 Lee et al.
2015/0100313 A1 4/2015 Sharma
2015/0100316 A1 4/2015 Williams et al.
2015/0100537 A1 4/2015 Grieves et al.
2015/0100983 A1 4/2015 Pan
2015/0106061 A1 4/2015 Yang et al.
2015/0106085 A1 4/2015 Lindahl
2015/0106093 A1 4/2015 Weeks et al.
2015/0106737 A1 4/2015 Montoy-Wilson et al.
2015/0113407 A1 4/2015 Hoffert et al.
2015/0113435 A1 4/2015 Phillips
2015/0120296 A1 4/2015 Stern et al.
2015/0120641 A1 4/2015 Soon-Shiong et al.
2015/0120723 A1 4/2015 Deshmukh et al.
2015/0121216 A1 4/2015 Brown et al.
2015/0123898 A1 5/2015 Kim et al.
2015/0127337 A1 5/2015 Heigold et al.
2015/0127348 A1 5/2015 Follis
2015/0127350 A1 5/2015 Agiomyrgiannakis
2015/0128058 A1 5/2015 Anajwala
2015/0133049 A1 5/2015 Lee et al.
2015/0133109 A1 5/2015 Freeman et al.
2015/0134318 A1 5/2015 Cuthbert et al.
2015/0134322 A1 5/2015 Cuthbert et al.
2015/0134323 A1 5/2015 Cuthbert et al.
2015/0134334 A1 5/2015 Sachidanandam et al.
2015/0135085 A1 5/2015 Shoham et al.
2015/0135123 A1 5/2015 Carr et al.
2015/0140934 A1 5/2015 Abdurrahman et al.
2015/0140990 A1 5/2015 Kim et al.
2015/0141150 A1 5/2015 Zha
2015/0142420 A1 5/2015 Sarikaya et al.
2015/0142438 A1 5/2015 Dai et al.
2015/0142440 A1 5/2015 Parkinson et al.
2015/0142447 A1 5/2015 Kennewick et al.
2015/0142851 A1 5/2015 Gupta et al.
2015/0143419 A1 5/2015 Bhagwat et al.
2015/0148013 A1 5/2015 Baldwin et al.
2015/0149177 A1 5/2015 Kalns et al.
2015/0149182 A1 5/2015 Kalns et al.
2015/0149354 A1 5/2015 Mccoy
2015/0149469 A1 5/2015 Xu et al.
2015/0149899 A1 5/2015 Bernstein et al.
2015/0149964 A1 5/2015 Bernstein et al.
2015/0154001 A1 6/2015 Knox et al.
2015/0154185 A1 6/2015 Waibel
2015/0154976 A1 6/2015 Mutagi
2015/0160855 A1 6/2015 Bi
2015/0161291 A1 6/2015 Gur et al.
2015/0161370 A1 6/2015 North et al.
2015/0161521 A1 6/2015 Shah et al.
2015/0161989 A1 6/2015 Hsu et al.
2015/0162000 A1 6/2015 Di Censo et al.
2015/0162001 A1 6/2015 Kar et al.
2015/0162006 A1 6/2015 Kummer
2015/0163558 A1 6/2015 Wheatley
2015/0169081 A1 6/2015 Neels et al.
2015/0169284 A1 6/2015 Quast et al.
2015/0169336 A1 6/2015 Harper et al.
2015/0169696 A1 6/2015 Krishnappa et al.
2015/0170073 A1 6/2015 Baker
2015/0170664 A1 6/2015 Doherty et al.

(56) References Cited

U.S. PATENT DOCUMENTS

| | | | |
|---|---|---|---|
| 2015/0172262 | A1 | 6/2015 | Ortiz, Jr. et al. |
| 2015/0172463 | A1 | 6/2015 | Quast et al. |
| 2015/0178388 | A1 | 6/2015 | Winnemoeller et al. |
| 2015/0178785 | A1 | 6/2015 | Salonen |
| 2015/0179168 | A1 | 6/2015 | Hakkani-Tur et al. |
| 2015/0179176 | A1 | 6/2015 | Ryu et al. |
| 2015/0181285 | A1 | 6/2015 | Zhang et al. |
| 2015/0185964 | A1 | 7/2015 | Stout |
| 2015/0185993 | A1 | 7/2015 | Wheatley et al. |
| 2015/0185996 | A1 | 7/2015 | Brown et al. |
| 2015/0186012 | A1 | 7/2015 | Coleman et al. |
| 2015/0186110 | A1 | 7/2015 | Kannan |
| 2015/0186154 | A1 | 7/2015 | Brown et al. |
| 2015/0186155 | A1 | 7/2015 | Brown et al. |
| 2015/0186156 | A1 | 7/2015 | Brown et al. |
| 2015/0186351 | A1 | 7/2015 | Hicks et al. |
| 2015/0186538 | A1 | 7/2015 | Yan et al. |
| 2015/0186783 | A1 | 7/2015 | Byrne et al. |
| 2015/0186892 | A1 | 7/2015 | Zhang et al. |
| 2015/0187355 | A1 | 7/2015 | Parkinson et al. |
| 2015/0187369 | A1 | 7/2015 | Dadu et al. |
| 2015/0189362 | A1 | 7/2015 | Lee et al. |
| 2015/0193379 | A1 | 7/2015 | Mehta |
| 2015/0193391 | A1 | 7/2015 | Khvostichenko et al. |
| 2015/0193392 | A1 | 7/2015 | Greenblatt et al. |
| 2015/0194152 | A1 | 7/2015 | Katuri et al. |
| 2015/0194165 | A1 | 7/2015 | Faaborg et al. |
| 2015/0195379 | A1 | 7/2015 | Zhang et al. |
| 2015/0195606 | A1 | 7/2015 | McDevitt |
| 2015/0199077 | A1 | 7/2015 | Zuger et al. |
| 2015/0199960 | A1 | 7/2015 | Huo et al. |
| 2015/0199965 | A1 | 7/2015 | Leak et al. |
| 2015/0199967 | A1 | 7/2015 | Reddy et al. |
| 2015/0201064 | A1 | 7/2015 | Bells et al. |
| 2015/0201077 | A1 | 7/2015 | Konig et al. |
| 2015/0205425 | A1 | 7/2015 | Kuscher et al. |
| 2015/0205568 | A1 | 7/2015 | Matsuoka |
| 2015/0205632 | A1 | 7/2015 | Gaster |
| 2015/0205858 | A1 | 7/2015 | Xie et al. |
| 2015/0206529 | A1 | 7/2015 | Kwon et al. |
| 2015/0208226 | A1 | 7/2015 | Kuusilinna et al. |
| 2015/0212791 | A1 | 7/2015 | Kumar et al. |
| 2015/0213140 | A1 | 7/2015 | Volkert |
| 2015/0213796 | A1 | 7/2015 | Waltermann et al. |
| 2015/0215258 | A1 | 7/2015 | Nowakowski et al. |
| 2015/0215350 | A1 | 7/2015 | Slayton et al. |
| 2015/0217870 | A1 | 8/2015 | Mccullough et al. |
| 2015/0220264 | A1 | 8/2015 | Lewis et al. |
| 2015/0220507 | A1 | 8/2015 | Mohajer et al. |
| 2015/0220715 | A1 | 8/2015 | Kim et al. |
| 2015/0220972 | A1 | 8/2015 | Subramanya et al. |
| 2015/0221302 | A1 | 8/2015 | Han et al. |
| 2015/0221304 | A1 | 8/2015 | Stewart |
| 2015/0221307 | A1 | 8/2015 | Shah et al. |
| 2015/0222586 | A1 | 8/2015 | Ebersman et al. |
| 2015/0224848 | A1 | 8/2015 | Eisenhour |
| 2015/0227505 | A1 | 8/2015 | Morimoto |
| 2015/0227633 | A1 | 8/2015 | Shapira |
| 2015/0228274 | A1 | 8/2015 | Leppanen et al. |
| 2015/0228275 | A1 | 8/2015 | Watanabe et al. |
| 2015/0228281 | A1 | 8/2015 | Raniere |
| 2015/0228283 | A1 | 8/2015 | Ehsani et al. |
| 2015/0228292 | A1 | 8/2015 | Goldstein et al. |
| 2015/0230095 | A1 | 8/2015 | Smith et al. |
| 2015/0234556 | A1 | 8/2015 | Shaofeng et al. |
| 2015/0234636 | A1 | 8/2015 | Barnes, Jr. |
| 2015/0234800 | A1 | 8/2015 | Patrick et al. |
| 2015/0235434 | A1 | 8/2015 | Miller et al. |
| 2015/0237301 | A1 | 8/2015 | Shi et al. |
| 2015/0242091 | A1 | 8/2015 | Lu et al. |
| 2015/0242385 | A1 | 8/2015 | Bao et al. |
| 2015/0243278 | A1 | 8/2015 | Kibre et al. |
| 2015/0243279 | A1 | 8/2015 | Morse et al. |
| 2015/0243283 | A1 | 8/2015 | Halash et al. |
| 2015/0244665 | A1 | 8/2015 | Choi et al. |
| 2015/0245154 | A1 | 8/2015 | Dadu et al. |
| 2015/0248651 | A1 | 9/2015 | Akutagawa et al. |
| 2015/0248886 | A1 | 9/2015 | Sarikaya et al. |
| 2015/0249715 | A1 | 9/2015 | Helvik et al. |
| 2015/0253146 | A1 | 9/2015 | Annapureddy et al. |
| 2015/0253885 | A1 | 9/2015 | Kagan et al. |
| 2015/0254057 | A1 | 9/2015 | Klein et al. |
| 2015/0254058 | A1 | 9/2015 | Klein et al. |
| 2015/0254333 | A1 | 9/2015 | Fife et al. |
| 2015/0255071 | A1 | 9/2015 | Chiba |
| 2015/0256873 | A1 | 9/2015 | Klein et al. |
| 2015/0261298 | A1 | 9/2015 | Li |
| 2015/0261496 | A1 | 9/2015 | Faaborg et al. |
| 2015/0261850 | A1 | 9/2015 | Mittal |
| 2015/0262583 | A1 | 9/2015 | Kanda et al. |
| 2015/0269139 | A1 | 9/2015 | McAteer et al. |
| 2015/0269617 | A1 | 9/2015 | Mikurak |
| 2015/0269677 | A1 | 9/2015 | Milne |
| 2015/0269943 | A1 | 9/2015 | VanBlon et al. |
| 2015/0277574 | A1 | 10/2015 | Jain et al. |
| 2015/0278199 | A1 | 10/2015 | Hazen et al. |
| 2015/0278348 | A1 | 10/2015 | Paruchuri et al. |
| 2015/0278370 | A1 | 10/2015 | Stratvert et al. |
| 2015/0278737 | A1 | 10/2015 | Chen Huebscher et al. |
| 2015/0279358 | A1 | 10/2015 | Kingsbury et al. |
| 2015/0279360 | A1 | 10/2015 | Mengibar et al. |
| 2015/0279366 | A1 | 10/2015 | Krestnikov et al. |
| 2015/0281380 | A1 | 10/2015 | Wang et al. |
| 2015/0281401 | A1 | 10/2015 | Le et al. |
| 2015/0286627 | A1 | 10/2015 | Chang et al. |
| 2015/0286716 | A1 | 10/2015 | Snibbe et al. |
| 2015/0286937 | A1 | 10/2015 | Hildebrand |
| 2015/0287401 | A1 | 10/2015 | Lee et al. |
| 2015/0287409 | A1 | 10/2015 | Jang |
| 2015/0287411 | A1 | 10/2015 | Kojima et al. |
| 2015/0288629 | A1 | 10/2015 | Choi et al. |
| 2015/0294086 | A1 | 10/2015 | Kare et al. |
| 2015/0294377 | A1 | 10/2015 | Chow |
| 2015/0294516 | A1 | 10/2015 | Chiang |
| 2015/0294670 | A1 | 10/2015 | Roblek et al. |
| 2015/0295915 | A1 | 10/2015 | Xiu |
| 2015/0296065 | A1 | 10/2015 | Narita et al. |
| 2015/0301796 | A1 | 10/2015 | Visser et al. |
| 2015/0302316 | A1 | 10/2015 | Buryak et al. |
| 2015/0302855 | A1 | 10/2015 | Kim et al. |
| 2015/0302856 | A1 | 10/2015 | Kim et al. |
| 2015/0302857 | A1 | 10/2015 | Yamada |
| 2015/0302870 | A1 | 10/2015 | Burke et al. |
| 2015/0308470 | A1 | 10/2015 | Graham et al. |
| 2015/0309691 | A1 | 10/2015 | Seo et al. |
| 2015/0309997 | A1 | 10/2015 | Lee et al. |
| 2015/0310114 | A1 | 10/2015 | Ryger et al. |
| 2015/0310858 | A1 | 10/2015 | Li et al. |
| 2015/0310862 | A1 | 10/2015 | Dauphin et al. |
| 2015/0310879 | A1 | 10/2015 | Buchanan et al. |
| 2015/0310888 | A1 | 10/2015 | Chen |
| 2015/0312182 | A1 | 10/2015 | Langholz |
| 2015/0312409 | A1 | 10/2015 | Czarnecki et al. |
| 2015/0314454 | A1 | 11/2015 | Breazeal et al. |
| 2015/0317069 | A1 | 11/2015 | Clements et al. |
| 2015/0317310 | A1 | 11/2015 | Eiche et al. |
| 2015/0319264 | A1 | 11/2015 | Allen et al. |
| 2015/0319411 | A1 | 11/2015 | Kasmir et al. |
| 2015/0324041 | A1 | 11/2015 | Varley et al. |
| 2015/0324334 | A1 | 11/2015 | Lee et al. |
| 2015/0324362 | A1 | 11/2015 | Glass et al. |
| 2015/0331664 | A1 | 11/2015 | Osawa et al. |
| 2015/0331711 | A1 | 11/2015 | Huang et al. |
| 2015/0332667 | A1 | 11/2015 | Mason |
| 2015/0334346 | A1 | 11/2015 | Cheatham, III et al. |
| 2015/0339049 | A1 | 11/2015 | Kasemset et al. |
| 2015/0339391 | A1 | 11/2015 | Kang et al. |
| 2015/0340033 | A1 | 11/2015 | Di Fabbrizio et al. |
| 2015/0340034 | A1 | 11/2015 | Schalkwyk et al. |
| 2015/0340040 | A1 | 11/2015 | Mun et al. |
| 2015/0340042 | A1 | 11/2015 | Sejnoha et al. |
| 2015/0341717 | A1 | 11/2015 | Song et al. |
| 2015/0346845 | A1 | 12/2015 | Di Censo et al. |
| 2015/0347086 | A1 | 12/2015 | Liedholm et al. |

(56) References Cited

U.S. PATENT DOCUMENTS

2015/0347381 A1 12/2015 Bellegarda
2015/0347382 A1 12/2015 Dolfing et al.
2015/0347383 A1 12/2015 Willmore et al.
2015/0347385 A1 12/2015 Flor et al.
2015/0347393 A1 12/2015 Futrell et al.
2015/0347552 A1 12/2015 Habouzit et al.
2015/0347733 A1 12/2015 Tsou et al.
2015/0347985 A1 12/2015 Gross et al.
2015/0348533 A1 12/2015 Saddler et al.
2015/0348547 A1 12/2015 Paulik et al.
2015/0348548 A1 12/2015 Piernot et al.
2015/0348549 A1 12/2015 Giuli et al.
2015/0348551 A1 12/2015 Gruber et al.
2015/0348554 A1 12/2015 Orr et al.
2015/0348555 A1 12/2015 Sugita
2015/0348565 A1 12/2015 Rhoten et al.
2015/0349934 A1 12/2015 Pollack et al.
2015/0350031 A1 12/2015 Burks et al.
2015/0350342 A1 12/2015 Thorpe et al.
2015/0350594 A1 12/2015 Mate et al.
2015/0352999 A1 12/2015 Bando et al.
2015/0355879 A1 12/2015 Beckhardt et al.
2015/0356410 A1 12/2015 Faith et al.
2015/0363587 A1 12/2015 Ahn et al.
2015/0364128 A1 12/2015 Zhao et al.
2015/0364140 A1* 12/2015 Thörn .................... G06F 3/167 704/235
2015/0365251 A1 12/2015 Kinoshita et al.
2015/0370455 A1* 12/2015 Van Os .................. G06F 3/016 345/173
2015/0370531 A1 12/2015 Faaborg
2015/0370780 A1 12/2015 Wang et al.
2015/0370787 A1 12/2015 Akbacak et al.
2015/0370884 A1 12/2015 Hurley et al.
2015/0371215 A1 12/2015 Zhou et al.
2015/0371529 A1 12/2015 Dolecki
2015/0371639 A1 12/2015 Foerster et al.
2015/0371663 A1 12/2015 Gustafson et al.
2015/0371664 A1 12/2015 Bar-Or et al.
2015/0371665 A1 12/2015 Naik et al.
2015/0373183 A1 12/2015 Woolsey et al.
2015/0379118 A1 12/2015 Wickenkamp et al.
2015/0379414 A1 12/2015 Yeh et al.
2015/0379993 A1 12/2015 Subhojit et al.
2015/0381923 A1 12/2015 Wickenkamp et al.
2015/0382047 A1 12/2015 Van Os et al.
2015/0382079 A1 12/2015 Lister et al.
2015/0382147 A1 12/2015 Clark et al.
2016/0004499 A1 1/2016 Kim et al.
2016/0004690 A1 1/2016 Bangalore et al.
2016/0005320 A1 1/2016 DeCharms et al.
2016/0006795 A1 1/2016 Yunten
2016/0012038 A1 1/2016 Edwards et al.
2016/0014476 A1 1/2016 Caliendo, Jr. et al.
2016/0018872 A1 1/2016 Tu et al.
2016/0018900 A1 1/2016 Tu et al.
2016/0018959 A1 1/2016 Yamashita et al.
2016/0019886 A1 1/2016 Hong
2016/0021414 A1 1/2016 Padi et al.
2016/0026258 A1 1/2016 Ou et al.
2016/0027431 A1 1/2016 Kurzweil et al.
2016/0028666 A1 1/2016 Li
2016/0028802 A1 1/2016 Balasingh et al.
2016/0029316 A1 1/2016 Mohan et al.
2016/0034042 A1 2/2016 Joo
2016/0034811 A1 2/2016 Paulik et al.
2016/0036953 A1 2/2016 Lee et al.
2016/0041809 A1 2/2016 Clayton et al.
2016/0042735 A1 2/2016 Vibbert et al.
2016/0042748 A1 2/2016 Jain et al.
2016/0043905 A1 2/2016 Fiedler
2016/0048666 A1 2/2016 Dey et al.
2016/0050254 A1 2/2016 Rao et al.
2016/0055422 A1 2/2016 Li
2016/0061623 A1 3/2016 Pahwa et al.
2016/0062459 A1 3/2016 Publicover et al.
2016/0062605 A1 3/2016 Agarwal et al.
2016/0063094 A1 3/2016 Udupa et al.
2016/0063095 A1 3/2016 Nassar et al.
2016/0063998 A1 3/2016 Krishnamoorthy et al.
2016/0065155 A1 3/2016 Bharj et al.
2016/0065626 A1 3/2016 Jain et al.
2016/0066020 A1 3/2016 Mountain
2016/0070581 A1 3/2016 Soon-Shiong
2016/0071516 A1 3/2016 Lee et al.
2016/0071517 A1 3/2016 Beaver et al.
2016/0071521 A1 3/2016 Haughay
2016/0072940 A1 3/2016 Cronin
2016/0077794 A1 3/2016 Kim et al.
2016/0078359 A1 3/2016 Csurka et al.
2016/0078860 A1 3/2016 Paulik et al.
2016/0080165 A1 3/2016 Ehsani et al.
2016/0080475 A1 3/2016 Singh et al.
2016/0085295 A1 3/2016 Shimy et al.
2016/0085827 A1 3/2016 Chadha et al.
2016/0086116 A1 3/2016 Rao et al.
2016/0086599 A1 3/2016 Kurata et al.
2016/0088335 A1 3/2016 Zucchetta
2016/0091871 A1 3/2016 Marti et al.
2016/0091967 A1 3/2016 Prokofieva et al.
2016/0092434 A1 3/2016 Bellegarda
2016/0092447 A1 3/2016 Pathurudeen et al.
2016/0092766 A1 3/2016 Sainath et al.
2016/0093291 A1 3/2016 Kim
2016/0093298 A1 3/2016 Naik et al.
2016/0093301 A1 3/2016 Bellegarda et al.
2016/0093304 A1 3/2016 Kim et al.
2016/0094700 A1 3/2016 Lee et al.
2016/0094889 A1 3/2016 Venkataraman et al.
2016/0094979 A1 3/2016 Naik et al.
2016/0098991 A1 4/2016 Luo et al.
2016/0098992 A1 4/2016 Renard et al.
2016/0099892 A1 4/2016 Palakovich et al.
2016/0099984 A1 4/2016 Karagiannis et al.
2016/0104480 A1 4/2016 Sharifi
2016/0104486 A1 4/2016 Penilla et al.
2016/0111091 A1 4/2016 Bakish
2016/0112746 A1 4/2016 Zhang et al.
2016/0112792 A1 4/2016 Lee et al.
2016/0117386 A1 4/2016 Ajmera et al.
2016/0118048 A1 4/2016 Heide
2016/0119338 A1 4/2016 Cheyer
2016/0125048 A1 5/2016 Hamada
2016/0125071 A1 5/2016 Gabbai
2016/0132046 A1 5/2016 Beoughter et al.
2016/0132290 A1 5/2016 Raux
2016/0132484 A1 5/2016 Nauze et al.
2016/0132488 A1 5/2016 Clark et al.
2016/0133254 A1 5/2016 Vogel et al.
2016/0139662 A1 5/2016 Dabhade
2016/0140951 A1 5/2016 Agiomyrgiannakis et al.
2016/0140962 A1 5/2016 Sharifi
2016/0147725 A1 5/2016 Patten et al.
2016/0148610 A1 5/2016 Kennewick, Jr. et al.
2016/0148612 A1 5/2016 Guo et al.
2016/0149966 A1 5/2016 Remash et al.
2016/0150020 A1 5/2016 Farmer et al.
2016/0151668 A1 6/2016 Barnes et al.
2016/0154624 A1 6/2016 Son et al.
2016/0154880 A1 6/2016 Hoarty
2016/0155442 A1 6/2016 Kannan et al.
2016/0155443 A1 6/2016 Khan et al.
2016/0156574 A1 6/2016 Hum et al.
2016/0162456 A1 6/2016 Munro et al.
2016/0163311 A1 6/2016 Crook et al.
2016/0163312 A1 6/2016 Naik et al.
2016/0170710 A1 6/2016 Kim et al.
2016/0170966 A1 6/2016 Kolo
2016/0171980 A1 6/2016 Liddell et al.
2016/0173578 A1 6/2016 Sharma et al.
2016/0173617 A1 6/2016 Allinson
2016/0173960 A1 6/2016 Snibbe et al.
2016/0179462 A1 6/2016 Bjorkengren
2016/0179464 A1 6/2016 Reddy et al.

(56) References Cited

U.S. PATENT DOCUMENTS

2016/0179787 A1 6/2016 Deleeuw
2016/0180840 A1 6/2016 Siddiq et al.
2016/0180844 A1 6/2016 Vanblon et al.
2016/0182410 A1 6/2016 Janakiraman et al.
2016/0182709 A1 6/2016 Kim et al.
2016/0188181 A1 6/2016 Smith
2016/0188738 A1 6/2016 Gruber et al.
2016/0189198 A1 6/2016 Daniel et al.
2016/0189715 A1 6/2016 Nishikawa
2016/0189717 A1 6/2016 Kannan et al.
2016/0196110 A1 7/2016 Yehoshua et al.
2016/0198319 A1 7/2016 Huang et al.
2016/0203002 A1 7/2016 Kannan et al.
2016/0203193 A1 7/2016 Kevin et al.
2016/0210551 A1 7/2016 Lee et al.
2016/0210981 A1 7/2016 Lee
2016/0212206 A1 7/2016 Wu et al.
2016/0212208 A1 7/2016 Kulkarni et al.
2016/0212488 A1 7/2016 Os et al.
2016/0217784 A1 7/2016 Gelfenbeyn et al.
2016/0217794 A1 7/2016 Imoto et al.
2016/0224540 A1 8/2016 Stewart et al.
2016/0224559 A1 8/2016 Hicks et al.
2016/0224774 A1 8/2016 Pender
2016/0225372 A1 8/2016 Cheung et al.
2016/0227107 A1 8/2016 Beaumont
2016/0227633 A1 8/2016 Sun et al.
2016/0232500 A1 8/2016 Wang et al.
2016/0239568 A1 8/2016 Packer et al.
2016/0239645 A1 8/2016 Heo et al.
2016/0239848 A1 8/2016 Chang et al.
2016/0240187 A1 8/2016 Fleizach et al.
2016/0240189 A1 8/2016 Lee et al.
2016/0240192 A1 8/2016 Raghuvir
2016/0247061 A1 8/2016 Trask et al.
2016/0249319 A1 8/2016 Dotan-Cohen et al.
2016/0253312 A1 9/2016 Rhodes
2016/0253528 A1 9/2016 Gao et al.
2016/0259623 A1 9/2016 Sumner et al.
2016/0259656 A1 9/2016 Sumner et al.
2016/0259779 A1 9/2016 Labský et al.
2016/0260431 A1 9/2016 Newendorp et al.
2016/0260433 A1 9/2016 Sumner et al.
2016/0260434 A1 9/2016 Gelfenbeyn et al.
2016/0260436 A1 9/2016 Lemay et al.
2016/0262442 A1 9/2016 Davila et al.
2016/0266871 A1 9/2016 Schmid et al.
2016/0267904 A1 9/2016 Biadsy et al.
2016/0274938 A1 9/2016 Strinati et al.
2016/0275941 A1 9/2016 Bellegarda et al.
2016/0275947 A1 9/2016 Li et al.
2016/0282824 A1 9/2016 Smallwood et al.
2016/0282956 A1 9/2016 Ouyang et al.
2016/0283185 A1 9/2016 Mclaren et al.
2016/0284005 A1 9/2016 Daniel et al.
2016/0284199 A1 9/2016 Dotan-Cohen et al.
2016/0285808 A1 9/2016 Franklin et al.
2016/0286045 A1 9/2016 Shaltiel et al.
2016/0293157 A1 10/2016 Chen et al.
2016/0293168 A1 10/2016 Chen
2016/0294755 A1 10/2016 Prabhu
2016/0299685 A1 10/2016 Zhai et al.
2016/0299882 A1 10/2016 Hegerty et al.
2016/0299883 A1 10/2016 Zhu et al.
2016/0299977 A1 10/2016 Hreha
2016/0300571 A1 10/2016 Foerster et al.
2016/0301639 A1 10/2016 Liu et al.
2016/0306683 A1 10/2016 Standley et al.
2016/0307566 A1 10/2016 Bellegarda
2016/0308799 A1 10/2016 Schubert et al.
2016/0309035 A1 10/2016 Li
2016/0313906 A1 10/2016 Kilchenko et al.
2016/0314788 A1 10/2016 Jitkoff et al.
2016/0314789 A1 10/2016 Marcheret et al.
2016/0314792 A1 10/2016 Alvarez et al.
2016/0315996 A1 10/2016 Ha et al.
2016/0317924 A1 11/2016 Tanaka et al.
2016/0321239 A1 11/2016 Iso-Sipilä et al.
2016/0321261 A1 11/2016 Spasojevic et al.
2016/0321358 A1 11/2016 Kanani et al.
2016/0322043 A1 11/2016 Bellegarda
2016/0322044 A1 11/2016 Jung et al.
2016/0322045 A1 11/2016 Hatfield et al.
2016/0322048 A1 11/2016 Amano et al.
2016/0322050 A1 11/2016 Wang et al.
2016/0328147 A1 11/2016 Zhang et al.
2016/0328205 A1 11/2016 Agrawal et al.
2016/0328893 A1 11/2016 Cordova et al.
2016/0329060 A1 11/2016 Ito et al.
2016/0334973 A1 11/2016 Reckhow et al.
2016/0335138 A1 11/2016 Surti et al.
2016/0335139 A1 11/2016 Hurley et al.
2016/0335532 A1 11/2016 Sanghavi et al.
2016/0336007 A1 11/2016 Hanazawa et al.
2016/0336010 A1 11/2016 Lindahl
2016/0336011 A1 11/2016 Koll et al.
2016/0336024 A1 11/2016 Choi et al.
2016/0337299 A1 11/2016 Lane et al.
2016/0337301 A1 11/2016 Rollins et al.
2016/0342317 A1 11/2016 Lim et al.
2016/0342685 A1 11/2016 Basu et al.
2016/0342781 A1 11/2016 Jeon
2016/0350650 A1 12/2016 Leeman-Munk et al.
2016/0351190 A1 12/2016 Piernot et al.
2016/0352567 A1 12/2016 Robbins et al.
2016/0352924 A1 12/2016 Senarath et al.
2016/0357304 A1 12/2016 Hatori et al.
2016/0357728 A1 12/2016 Bellegarda et al.
2016/0357790 A1 12/2016 Elkington et al.
2016/0357861 A1 12/2016 Carlhian et al.
2016/0357870 A1 12/2016 Hentschel et al.
2016/0358598 A1 12/2016 Williams et al.
2016/0358600 A1 12/2016 Nallasamy et al.
2016/0358619 A1 12/2016 Ramprashad et al.
2016/0359771 A1 12/2016 Sridhar
2016/0360039 A1 12/2016 Sanghavi et al.
2016/0360336 A1 12/2016 Gross et al.
2016/0360382 A1 12/2016 Gross et al.
2016/0364378 A1 12/2016 Futrell et al.
2016/0365101 A1 12/2016 Foy et al.
2016/0371250 A1 12/2016 Rhodes
2016/0372112 A1 12/2016 Miller et al.
2016/0372119 A1 12/2016 Sak et al.
2016/0378747 A1 12/2016 Orr et al.
2016/0379091 A1 12/2016 Lin et al.
2016/0379626 A1 12/2016 Deisher et al.
2016/0379632 A1 12/2016 Hoffmeister et al.
2016/0379633 A1 12/2016 Lehman et al.
2016/0379639 A1 12/2016 Weinstein et al.
2016/0379641 A1 12/2016 Liu et al.
2017/0000348 A1 1/2017 Karsten et al.
2017/0003931 A1 1/2017 Dvortsov et al.
2017/0004824 A1 1/2017 Yoo et al.
2017/0005818 A1 1/2017 Gould
2017/0006329 A1 1/2017 Jang et al.
2017/0011091 A1 1/2017 Chehreghani
2017/0011279 A1 1/2017 Soldevila et al.
2017/0011303 A1 1/2017 Annapureddy et al.
2017/0011742 A1* 1/2017 Jing ........................ G10L 15/22
2017/0013124 A1 1/2017 Havelka et al.
2017/0013331 A1 1/2017 Watanabe et al.
2017/0018271 A1 1/2017 Khan et al.
2017/0019987 A1 1/2017 Dragone et al.
2017/0023963 A1 1/2017 Davis et al.
2017/0025124 A1 1/2017 Mixter et al.
2017/0026318 A1 1/2017 Daniel et al.
2017/0026509 A1 1/2017 Rand
2017/0027522 A1 2/2017 Van Hasselt et al.
2017/0031576 A1 2/2017 Saoji et al.
2017/0032783 A1 2/2017 Lord et al.
2017/0032787 A1 2/2017 Dayal
2017/0032791 A1 2/2017 Elson et al.
2017/0039283 A1 2/2017 Bennett et al.
2017/0039475 A1 2/2017 Cheyer et al.

(56) References Cited

U.S. PATENT DOCUMENTS

2017/0040002 A1 2/2017 Basson et al.
2017/0041388 A1 2/2017 Tal et al.
2017/0047063 A1 2/2017 Ohmura et al.
2017/0052760 A1 2/2017 Johnson et al.
2017/0053652 A1 2/2017 Choi et al.
2017/0055895 A1 3/2017 Jardins et al.
2017/0060853 A1 3/2017 Lee et al.
2017/0061423 A1 3/2017 Bryant et al.
2017/0068423 A1 3/2017 Napolitano et al.
2017/0068513 A1 3/2017 Stasior et al.
2017/0068550 A1 3/2017 Zeitlin
2017/0068670 A1 3/2017 Orr et al.
2017/0069308 A1 3/2017 Aleksic et al.
2017/0075653 A1 3/2017 Dawidowsky et al.
2017/0076720 A1 3/2017 Gopalan et al.
2017/0076721 A1 3/2017 Bargetzi et al.
2017/0078490 A1 3/2017 Kaminsky et al.
2017/0083179 A1 3/2017 Gruber et al.
2017/0083285 A1 3/2017 Meyers et al.
2017/0083504 A1 3/2017 Huang
2017/0084277 A1 3/2017 Sharifi
2017/0085547 A1 3/2017 De Aguiar et al.
2017/0085696 A1 3/2017 Abkairov
2017/0090428 A1 3/2017 Oohara
2017/0090569 A1 3/2017 Levesque
2017/0091168 A1 3/2017 Bellegarda et al.
2017/0091169 A1 3/2017 Bellegarda et al.
2017/0091612 A1 3/2017 Gruber et al.
2017/0092259 A1 3/2017 Jeon
2017/0092270 A1 3/2017 Newendorp et al.
2017/0092278 A1 3/2017 Evermann et al.
2017/0093356 A1 3/2017 Cudak et al.
2017/0097743 A1 4/2017 Hameed et al.
2017/0102837 A1 4/2017 Toumpelis
2017/0102915 A1 4/2017 Kuscher et al.
2017/0103749 A1 4/2017 Zhao et al.
2017/0103752 A1 4/2017 Senior et al.
2017/0105190 A1 4/2017 Logan et al.
2017/0110117 A1 4/2017 Chakladar et al.
2017/0110125 A1 4/2017 Xu et al.
2017/0116177 A1 4/2017 Walia
2017/0116982 A1 4/2017 Gelfenbeyn et al.
2017/0116987 A1 4/2017 Kang et al.
2017/0116989 A1 4/2017 Yadgar et al.
2017/0124190 A1 5/2017 Wang et al.
2017/0124311 A1 5/2017 Li et al.
2017/0125016 A1 5/2017 Wang
2017/0127124 A9 5/2017 Wilson et al.
2017/0131778 A1 5/2017 Iyer
2017/0132019 A1 5/2017 Karashchuk et al.
2017/0132199 A1 5/2017 Vescovi et al.
2017/0133007 A1 5/2017 Drewes
2017/0140041 A1 5/2017 Dotan-Cohen et al.
2017/0140052 A1 5/2017 Bufe, III et al.
2017/0140644 A1 5/2017 Hwang et al.
2017/0140760 A1 5/2017 Sachdev
2017/0147722 A1 5/2017 Greenwood
2017/0147841 A1 5/2017 Stagg et al.
2017/0148044 A1 5/2017 Fukuda et al.
2017/0154033 A1 6/2017 Lee
2017/0154055 A1 6/2017 Dimson et al.
2017/0155940 A1 6/2017 Jin et al.
2017/0155965 A1 6/2017 Ward
2017/0161018 A1 6/2017 Lemay et al.
2017/0161268 A1 6/2017 Badaskar
2017/0161293 A1 6/2017 Ionescu et al.
2017/0161393 A1 6/2017 Oh et al.
2017/0161500 A1 6/2017 Yang
2017/0162191 A1 6/2017 Grost et al.
2017/0162202 A1 6/2017 Anthony et al.
2017/0162203 A1 6/2017 Huang et al.
2017/0169506 A1 6/2017 Wishne et al.
2017/0169818 A1 6/2017 Vanblon et al.
2017/0169819 A1 6/2017 Mese et al.
2017/0177080 A1 6/2017 Deleeuw
2017/0177547 A1 6/2017 Ciereszko et al.
2017/0178619 A1 6/2017 Naik et al.
2017/0178620 A1 6/2017 Fleizach et al.
2017/0178626 A1 6/2017 Gruber et al.
2017/0180499 A1 6/2017 Gelfenbeyn et al.
2017/0185375 A1 6/2017 Martel et al.
2017/0185581 A1 6/2017 Bojja et al.
2017/0186429 A1 6/2017 Giuli et al.
2017/0187711 A1 6/2017 Joo et al.
2017/0193083 A1 7/2017 Bhatt et al.
2017/0195493 A1 7/2017 Sudarsan et al.
2017/0195495 A1 7/2017 Deora et al.
2017/0195636 A1 7/2017 Child et al.
2017/0199870 A1 7/2017 Zheng et al.
2017/0199874 A1 7/2017 Patel et al.
2017/0200066 A1 7/2017 Wang et al.
2017/0201609 A1 7/2017 Salmenkaita et al.
2017/0201613 A1 7/2017 Engelke et al.
2017/0206899 A1 7/2017 Bryant et al.
2017/0215052 A1 7/2017 Koum et al.
2017/0220212 A1 8/2017 Yang et al.
2017/0221486 A1 8/2017 Kurata et al.
2017/0223189 A1 8/2017 Meredith et al.
2017/0227935 A1 8/2017 Su et al.
2017/0228367 A1 8/2017 Pasupalak et al.
2017/0228382 A1 8/2017 Haviv et al.
2017/0229121 A1 8/2017 Taki et al.
2017/0230429 A1 8/2017 Garmark et al.
2017/0230497 A1 8/2017 Kim et al.
2017/0230709 A1 8/2017 Van Os et al.
2017/0235361 A1 8/2017 Rigazio et al.
2017/0235618 A1 8/2017 Lin et al.
2017/0235721 A1 8/2017 Almosallam et al.
2017/0236512 A1 8/2017 Williams et al.
2017/0236514 A1 8/2017 Nelson
2017/0238039 A1 8/2017 Sabattini
2017/0242478 A1 8/2017 Ma
2017/0242653 A1 8/2017 Lang et al.
2017/0242657 A1 8/2017 Jarvis et al.
2017/0242840 A1 8/2017 Lu et al.
2017/0243468 A1 8/2017 Dotan-Cohen et al.
2017/0243576 A1 8/2017 Millington et al.
2017/0243586 A1 8/2017 Civelli et al.
2017/0249309 A1 8/2017 Sarikaya
2017/0256256 A1 9/2017 Wang et al.
2017/0262051 A1 9/2017 Tall et al.
2017/0263247 A1 9/2017 Kang et al.
2017/0263248 A1 9/2017 Gruber et al.
2017/0263249 A1 9/2017 Akbacak et al.
2017/0263254 A1 9/2017 Dewan et al.
2017/0264451 A1 9/2017 Yu et al.
2017/0264711 A1 9/2017 Natarajan et al.
2017/0270822 A1 9/2017 Cohen
2017/0270912 A1 9/2017 Levit et al.
2017/0278514 A1* 9/2017 Mathias ................ G06F 40/284
2017/0285915 A1 10/2017 Napolitano et al.
2017/0286397 A1 10/2017 Gonzalez
2017/0287472 A1 10/2017 Ogawa et al.
2017/0289305 A1 10/2017 Liensberger et al.
2017/0295446 A1 10/2017 Shivappa
2017/0301348 A1 10/2017 Chen et al.
2017/0308552 A1 10/2017 Soni et al.
2017/0308609 A1 10/2017 Berkhin et al.
2017/0311005 A1 10/2017 Lin
2017/0316775 A1 11/2017 Le et al.
2017/0316782 A1 11/2017 Haughay
2017/0319123 A1 11/2017 Voss et al.
2017/0323637 A1 11/2017 Naik
2017/0329466 A1 11/2017 Krenkler et al.
2017/0329490 A1 11/2017 Esinovskaya et al.
2017/0329572 A1 11/2017 Shah et al.
2017/0329630 A1 11/2017 Jann et al.
2017/0330567 A1 11/2017 Van Wissen et al.
2017/0336920 A1 11/2017 Chan et al.
2017/0337035 A1 11/2017 Choudhary et al.
2017/0337478 A1 11/2017 Sarikaya et al.
2017/0345411 A1 11/2017 Raitio et al.
2017/0345420 A1 11/2017 Barnett, Jr.
2017/0345429 A1 11/2017 Hardee et al.

(56) References Cited

U.S. PATENT DOCUMENTS

2017/0346949 A1 11/2017 Sanghavi et al.
2017/0351487 A1 12/2017 Avilés-Casco et al.
2017/0352346 A1 12/2017 Paulik et al.
2017/0352350 A1 12/2017 Booker et al.
2017/0357478 A1 12/2017 Piersol et al.
2017/0357529 A1 12/2017 Venkatraman et al.
2017/0357632 A1 12/2017 Pagallo et al.
2017/0357633 A1 12/2017 Wang et al.
2017/0357637 A1 12/2017 Nell et al.
2017/0357640 A1 12/2017 Bellegarda et al.
2017/0357716 A1 12/2017 Bellegarda et al.
2017/0358300 A1 12/2017 Laurens et al.
2017/0358301 A1 12/2017 Raitio et al.
2017/0358302 A1 12/2017 Orr et al.
2017/0358303 A1 12/2017 Walker, II et al.
2017/0358304 A1 12/2017 Castillo et al.
2017/0358305 A1 12/2017 Kudurshian et al.
2017/0358317 A1 12/2017 James
2017/0359680 A1 12/2017 Ledvina et al.
2017/0365251 A1 12/2017 Park et al.
2017/0371509 A1 12/2017 Jung et al.
2017/0371885 A1 12/2017 Aggarwal et al.
2017/0374093 A1 12/2017 Dhar et al.
2017/0374176 A1 12/2017 Agrawal et al.
2018/0004372 A1 1/2018 Zurek et al.
2018/0004396 A1 1/2018 Ying
2018/0005112 A1 1/2018 Iso-Sipila et al.
2018/0007060 A1 1/2018 Leblang et al.
2018/0007096 A1 1/2018 Levin et al.
2018/0007538 A1 1/2018 Naik et al.
2018/0012596 A1 1/2018 Piernot et al.
2018/0018248 A1 1/2018 Bhargava et al.
2018/0018590 A1 1/2018 Szeto et al.
2018/0018814 A1 1/2018 Patrik et al.
2018/0024985 A1 1/2018 Asano
2018/0025124 A1 1/2018 Mohr et al.
2018/0025287 A1 1/2018 Mathew et al.
2018/0028918 A1 2/2018 Tang et al.
2018/0033431 A1 2/2018 Newendorp et al.
2018/0033435 A1 2/2018 Jacobs, II
2018/0033436 A1 2/2018 Zhou
2018/0034961 A1* 2/2018 Engelke .................. G10L 15/22
2018/0046340 A1 2/2018 Mall
2018/0047201 A1 2/2018 Filev et al.
2018/0047391 A1 2/2018 Baik et al.
2018/0047393 A1 2/2018 Tian et al.
2018/0047406 A1 2/2018 Park
2018/0052909 A1 2/2018 Sharifi et al.
2018/0054505 A1 2/2018 Hart et al.
2018/0060032 A1 3/2018 Boesen
2018/0060301 A1 3/2018 Li et al.
2018/0060312 A1 3/2018 Won
2018/0060555 A1 3/2018 Boesen
2018/0061400 A1 3/2018 Carbune et al.
2018/0061401 A1 3/2018 Sarikaya et al.
2018/0062691 A1 3/2018 Barnett, Jr.
2018/0063308 A1 3/2018 Crystal et al.
2018/0063324 A1 3/2018 Van Meter, II
2018/0063624 A1 3/2018 Boesen
2018/0067904 A1 3/2018 Li
2018/0067914 A1 3/2018 Chen et al.
2018/0067918 A1 3/2018 Bellegarda et al.
2018/0068074 A1 3/2018 Shen
2018/0069743 A1 3/2018 Bakken et al.
2018/0075847 A1 3/2018 Lee et al.
2018/0075849 A1 3/2018 Khoury et al.
2018/0077095 A1 3/2018 Deyle et al.
2018/0082692 A1 3/2018 Khoury et al.
2018/0088969 A1 3/2018 Vanblon et al.
2018/0089166 A1 3/2018 Meyer et al.
2018/0089588 A1 3/2018 Ravi et al.
2018/0090143 A1 3/2018 Saddler et al.
2018/0091604 A1 3/2018 Yamashita et al.
2018/0091847 A1 3/2018 Wu et al.
2018/0096683 A1 4/2018 James et al.
2018/0096690 A1 4/2018 Mixter et al.
2018/0101599 A1 4/2018 Kenneth et al.
2018/0101925 A1 4/2018 Brinig et al.
2018/0102914 A1 4/2018 Kawachi et al.
2018/0107917 A1 4/2018 Hewavitharana et al.
2018/0107945 A1 4/2018 Gao et al.
2018/0108346 A1 4/2018 Paulik et al.
2018/0108351 A1 4/2018 Beckhardt et al.
2018/0108357 A1 4/2018 Liu
2018/0113673 A1 4/2018 Sheynblat
2018/0314362 A1 4/2018 Kim et al.
2018/0121432 A1 5/2018 Parson et al.
2018/0122376 A1 5/2018 Kojima
2018/0122378 A1 5/2018 Mixter et al.
2018/0126260 A1 5/2018 Chansoriya et al.
2018/0129967 A1 5/2018 Herreshoff
2018/0130470 A1 5/2018 Lemay et al.
2018/0130471 A1 5/2018 Trufinescu et al.
2018/0137856 A1 5/2018 Gilbert
2018/0137857 A1 5/2018 Zhou et al.
2018/0137865 A1 5/2018 Ling
2018/0143857 A1 5/2018 Anbazhagan et al.
2018/0143967 A1 5/2018 Anbazhagan et al.
2018/0144465 A1 5/2018 Hsieh et al.
2018/0144615 A1 5/2018 Kinney et al.
2018/0144746 A1 5/2018 Mishra et al.
2018/0144748 A1 5/2018 Leong
2018/0146089 A1 5/2018 Rauenbuehler et al.
2018/0150744 A1 5/2018 Orr et al.
2018/0152557 A1 5/2018 White et al.
2018/0157372 A1 6/2018 Kurabayashi
2018/0157992 A1 6/2018 Susskind et al.
2018/0158548 A1 6/2018 Taheri et al.
2018/0158552 A1 6/2018 Liu et al.
2018/0165857 A1 6/2018 Lee et al.
2018/0166076 A1 6/2018 Higuchi et al.
2018/0167884 A1 6/2018 Dawid et al.
2018/0173403 A1 6/2018 Carbune et al.
2018/0173542 A1 6/2018 Chan et al.
2018/0174406 A1 6/2018 Arashi et al.
2018/0174576 A1 6/2018 Soltau et al.
2018/0174597 A1 6/2018 Lee et al.
2018/0182376 A1 6/2018 Gysel et al.
2018/0188840 A1 7/2018 Tamura et al.
2018/0188948 A1 7/2018 Ouyang et al.
2018/0189267 A1 7/2018 Takiel
2018/0190263 A1 7/2018 Calef, III
2018/0190273 A1 7/2018 Karimli et al.
2018/0190279 A1 7/2018 Anderson et al.
2018/0191670 A1 7/2018 Suyama
2018/0196683 A1 7/2018 Radebaugh et al.
2018/0210874 A1 7/2018 Fuxman et al.
2018/0213448 A1 7/2018 Segal et al.
2018/0217810 A1 8/2018 Agrawal
2018/0218735 A1 8/2018 Hunt et al.
2018/0221783 A1 8/2018 Gamero
2018/0225131 A1 8/2018 Tommy et al.
2018/0225274 A1 8/2018 Tommy et al.
2018/0232203 A1 8/2018 Gelfenbeyn et al.
2018/0232688 A1 8/2018 Pike et al.
2018/0233132 A1 8/2018 Herold et al.
2018/0233140 A1 8/2018 Koishida et al.
2018/0247065 A1 8/2018 Rhee et al.
2018/0253209 A1 9/2018 Jaygarl et al.
2018/0253652 A1 9/2018 Palzer et al.
2018/0260680 A1 9/2018 Finkelstein et al.
2018/0268023 A1 9/2018 Korpusik et al.
2018/0268106 A1 9/2018 Velaga
2018/0270343 A1 9/2018 Rout et al.
2018/0275839 A1 9/2018 Kocienda et al.
2018/0276197 A1 9/2018 Nell et al.
2018/0277113 A1 9/2018 Hartung et al.
2018/0278740 A1 9/2018 Choi et al.
2018/0285056 A1 10/2018 Cutler et al.
2018/0293984 A1 10/2018 Lindahl
2018/0293988 A1 10/2018 Huang et al.
2018/0293989 A1 10/2018 De et al.
2018/0299878 A1 10/2018 Cella et al.
2018/0300317 A1 10/2018 Bradbury

(56) References Cited

U.S. PATENT DOCUMENTS

2018/0300400 A1 10/2018 Paulus
2018/0300608 A1 10/2018 Sevrens et al.
2018/0308470 A1 10/2018 Park et al.
2018/0308477 A1 10/2018 Nagasaka
2018/0308480 A1 10/2018 Jang et al.
2018/0308485 A1 10/2018 Kudurshian et al.
2018/0308486 A1 10/2018 Saddler et al.
2018/0314552 A1 11/2018 Kim et al.
2018/0315416 A1 11/2018 Berthelsen et al.
2018/0322112 A1 11/2018 Bellegarda et al.
2018/0322881 A1 11/2018 Min et al.
2018/0324518 A1 11/2018 Dusan et al.
2018/0329677 A1 11/2018 Gruber et al.
2018/0329957 A1 11/2018 Frazzingaro et al.
2018/0329982 A1 11/2018 Patel et al.
2018/0329998 A1 11/2018 Thomson et al.
2018/0330714 A1 11/2018 Paulik et al.
2018/0330721 A1 11/2018 Thomson et al.
2018/0330722 A1 11/2018 Newendorp et al.
2018/0330723 A1 11/2018 Acero et al.
2018/0330729 A1 11/2018 Golipour et al.
2018/0330730 A1 11/2018 Garg et al.
2018/0330731 A1 11/2018 Zeitlin et al.
2018/0330733 A1 11/2018 Orr et al.
2018/0330737 A1 11/2018 Paulik et al.
2018/0332118 A1 11/2018 Phipps et al.
2018/0332389 A1 11/2018 Ekkizogloy et al.
2018/0335903 A1 11/2018 Coffman et al.
2018/0336049 A1 11/2018 Mukherjee et al.
2018/0336184 A1 11/2018 Bellegarda et al.
2018/0336197 A1 11/2018 Skilling et al.
2018/0336275 A1 11/2018 Graham et al.
2018/0336439 A1 11/2018 Kliger et al.
2018/0336449 A1 11/2018 Adan et al.
2018/0336880 A1 11/2018 Arik et al.
2018/0336885 A1 11/2018 Mukherjee et al.
2018/0336892 A1 11/2018 Kim et al.
2018/0336894 A1 11/2018 Graham et al.
2018/0336904 A1 11/2018 Piercy et al.
2018/0336905 A1 11/2018 Kim et al.
2018/0336911 A1 11/2018 Dahl et al.
2018/0336920 A1 11/2018 Bastian et al.
2018/0338191 A1 11/2018 Van Scheltinga et al.
2018/0341643 A1 11/2018 Alders et al.
2018/0343557 A1 11/2018 Naik et al.
2018/0349084 A1 12/2018 Nagasaka et al.
2018/0349346 A1 12/2018 Hatori et al.
2018/0349349 A1 12/2018 Bellegarda et al.
2018/0349447 A1 12/2018 Maccartney et al.
2018/0349472 A1 12/2018 Kohlschuetter et al.
2018/0349728 A1 12/2018 Wang et al.
2018/0350345 A1 12/2018 Naik
2018/0350353 A1 12/2018 Gruber et al.
2018/0357073 A1 12/2018 Johnson et al.
2018/0357308 A1 12/2018 Cheyer
2018/0358015 A1 12/2018 Cash et al.
2018/0358019 A1 12/2018 Mont-Reynaud
2018/0365653 A1 12/2018 Cleaver et al.
2018/0366105 A1 12/2018 Kim
2018/0373487 A1 12/2018 Gruber et al.
2018/0373493 A1 12/2018 Watson et al.
2018/0373796 A1 12/2018 Rathod
2018/0374484 A1 12/2018 Huang et al.
2019/0005024 A1 1/2019 Somech et al.
2019/0012141 A1 1/2019 Piersol et al.
2019/0012445 A1 1/2019 Lesso et al.
2019/0012449 A1 1/2019 Cheyer
2019/0012599 A1 1/2019 El Kaliouby et al.
2019/0013018 A1 1/2019 Rekstad
2019/0013025 A1 1/2019 Alcorn et al.
2019/0014450 A1 1/2019 Gruber et al.
2019/0019077 A1 1/2019 Griffin et al.
2019/0027152 A1 1/2019 Huang et al.
2019/0034040 A1 1/2019 Shah et al.
2019/0034826 A1 1/2019 Ahmad et al.
2019/0035405 A1 1/2019 Haughay
2019/0037258 A1 1/2019 Justin et al.
2019/0042059 A1 2/2019 Baer
2019/0042627 A1 2/2019 Osotio et al.
2019/0043507 A1 2/2019 Huang et al.
2019/0044854 A1 2/2019 Yang et al.
2019/0045040 A1 2/2019 Lee et al.
2019/0051309 A1 2/2019 Kim et al.
2019/0057697 A1 2/2019 Giuli et al.
2019/0065144 A1 2/2019 Sumner et al.
2019/0065993 A1 2/2019 Srinivasan et al.
2019/0066674 A1 2/2019 Jaygarl et al.
2019/0068810 A1 2/2019 Okamoto et al.
2019/0173996 A1 2/2019 Butcher et al.
2019/0073607 A1 3/2019 Jia et al.
2019/0073998 A1 3/2019 Leblang et al.
2019/0074009 A1 3/2019 Kim et al.
2019/0074015 A1 3/2019 Orr et al.
2019/0074016 A1 3/2019 Orr et al.
2019/0079476 A1 3/2019 Funes
2019/0080685 A1 3/2019 Johnson, Jr.
2019/0080698 A1 3/2019 Miller
2019/0082044 A1 3/2019 Olivia et al.
2019/0087412 A1 3/2019 Seyed et al.
2019/0087455 A1 3/2019 He et al.
2019/0095050 A1 3/2019 Gruber et al.
2019/0095171 A1 3/2019 Carson et al.
2019/0102145 A1 4/2019 Wilberding et al.
2019/0102378 A1 4/2019 Piernot et al.
2019/0102381 A1 4/2019 Futrell et al.
2019/0103103 A1 4/2019 Ni et al.
2019/0103112 A1 4/2019 Walker et al.
2019/0116264 A1 4/2019 Sanghavi et al.
2019/0122666 A1 4/2019 Raitio et al.
2019/0122692 A1 4/2019 Binder et al.
2019/0124019 A1 4/2019 Leon et al.
2019/0129499 A1 5/2019 Li
2019/0129615 A1 5/2019 Sundar et al.
2019/0130901 A1* 5/2019 Kato ....................... G10L 15/07
2019/0132694 A1 5/2019 Hanes et al.
2019/0134501 A1 5/2019 Feder et al.
2019/0138704 A1 5/2019 Shrivastava et al.
2019/0139541 A1 5/2019 Andersen et al.
2019/0139563 A1 5/2019 Chen et al.
2019/0141494 A1 5/2019 Gross et al.
2019/0147052 A1 5/2019 Lu et al.
2019/0147369 A1 5/2019 Gupta et al.
2019/0147880 A1 5/2019 Booker et al.
2019/0149972 A1 5/2019 Parks et al.
2019/0156830 A1 5/2019 Devaraj et al.
2019/0158994 A1 5/2019 Gross et al.
2019/0164546 A1 5/2019 Piernot et al.
2019/0172467 A1 6/2019 Kim et al.
2019/0179607 A1 6/2019 Thangarathnam et al.
2019/0179890 A1 6/2019 Evermann
2019/0180770 A1 6/2019 Kothari et al.
2019/0182176 A1 6/2019 Niewczas
2019/0187787 A1 6/2019 White et al.
2019/0188326 A1 6/2019 Daianu et al.
2019/0188328 A1 6/2019 Oyenan et al.
2019/0189118 A1 6/2019 Piernot et al.
2019/0189125 A1 6/2019 Van Os et al.
2019/0197053 A1 6/2019 Graham et al.
2019/0213601 A1 7/2019 Hackman et al.
2019/0213774 A1 7/2019 Jiao et al.
2019/0213999 A1 7/2019 Grupen et al.
2019/0214024 A1 7/2019 Gruber et al.
2019/0220245 A1 7/2019 Martel et al.
2019/0220246 A1 7/2019 Orr et al.
2019/0220247 A1 7/2019 Lemay et al.
2019/0220704 A1 7/2019 Schulz-Trieglaff et al.
2019/0220727 A1 7/2019 Dohrmann et al.
2019/0222684 A1 7/2019 Li et al.
2019/0230215 A1 7/2019 Zhu et al.
2019/0230426 A1 7/2019 Chun
2019/0236130 A1 8/2019 Li et al.
2019/0236459 A1 8/2019 Cheyer et al.
2019/0244618 A1 8/2019 Newendorp et al.
2019/0251167 A1 8/2019 Krishnapura et al.

(56) References Cited

U.S. PATENT DOCUMENTS

2019/0251339 A1 8/2019 Hawker
2019/0251960 A1 8/2019 Maker et al.
2019/0251972 A1* 8/2019 Li .......................... G10L 15/26
2019/0259386 A1 8/2019 Kudurshian et al.
2019/0272825 A1 9/2019 O'Malley et al.
2019/0272831 A1 9/2019 Kajarekar
2019/0273963 A1 9/2019 Jobanputra et al.
2019/0278841 A1 9/2019 Pusateri et al.
2019/0287012 A1 9/2019 Asli et al.
2019/0287522 A1 9/2019 Lambourne et al.
2019/0295529 A1 9/2019 Tomita
2019/0295540 A1 9/2019 Grima
2019/0295544 A1 9/2019 Garcia et al.
2019/0303442 A1 10/2019 Peitz et al.
2019/0310765 A1 10/2019 Napolitano et al.
2019/0311708 A1 10/2019 Bengio et al.
2019/0311720 A1 10/2019 Pasko
2019/0318722 A1 10/2019 Bromand
2019/0318724 A1 10/2019 Chao et al.
2019/0318725 A1 10/2019 Le Roux et al.
2019/0318732 A1 10/2019 Huang et al.
2019/0318735 A1 10/2019 Chao et al.
2019/0318739 A1 10/2019 Garg et al.
2019/0339784 A1 11/2019 Lemay et al.
2019/0341027 A1 11/2019 Vescovi et al.
2019/0341056 A1 11/2019 Paulik et al.
2019/0347063 A1 11/2019 Liu et al.
2019/0348022 A1 11/2019 Park et al.
2019/0354548 A1 11/2019 Orr et al.
2019/0355346 A1 11/2019 Bellegarda
2019/0355384 A1 11/2019 Sereshki et al.
2019/0361729 A1 11/2019 Gruber et al.
2019/0369748 A1 12/2019 Hindi et al.
2019/0369842 A1 12/2019 Dolbakian et al.
2019/0369868 A1 12/2019 Jin et al.
2019/0370292 A1 12/2019 Irani et al.
2019/0370323 A1 12/2019 Davidson et al.
2019/0371315 A1 12/2019 Newendorp et al.
2019/0371316 A1 12/2019 Weinstein et al.
2019/0371317 A1 12/2019 Irani et al.
2019/0371331 A1 12/2019 Schramm et al.
2019/0372902 A1 12/2019 Piersol
2019/0373102 A1 12/2019 Weinstein et al.
2019/0385418 A1 12/2019 Mixter et al.
2019/0387352 A1 12/2019 Jot et al.
2020/0019609 A1 1/2020 Yu et al.
2020/0020326 A1 1/2020 Srinivasan et al.
2020/0035224 A1 1/2020 Ward et al.
2020/0042334 A1 2/2020 Radebaugh et al.
2020/0043482 A1 2/2020 Gruber et al.
2020/0043489 A1 2/2020 Bradley et al.
2020/0044485 A1 2/2020 Smith et al.
2020/0051583 A1 2/2020 Wu et al.
2020/0053218 A1 2/2020 Gray
2020/0058299 A1 2/2020 Lee et al.
2020/0065601 A1 2/2020 Andreassen
2020/0073629 A1 3/2020 Lee et al.
2020/0075018 A1 3/2020 Chen
2020/0076538 A1 3/2020 Soultan et al.
2020/0081615 A1 3/2020 Yi et al.
2020/0090393 A1 3/2020 Shin et al.
2020/0091958 A1 3/2020 Curtis et al.
2020/0092625 A1 3/2020 Raffle
2020/0098362 A1 3/2020 Piernot et al.
2020/0098368 A1 3/2020 Lemay et al.
2020/0104357 A1 4/2020 Bellegarda et al.
2020/0104362 A1 4/2020 Yang et al.
2020/0104369 A1 4/2020 Bellegarda
2020/0104668 A1 4/2020 Sanghavi et al.
2020/0105260 A1 4/2020 Piernot et al.
2020/0117717 A1 4/2020 Ramamurti et al.
2020/0118566 A1 4/2020 Zhou
2020/0118568 A1 4/2020 Kudurshian et al.
2020/0125820 A1 4/2020 Kim et al.
2020/0127988 A1 4/2020 Bradley et al.
2020/0134316 A1 4/2020 Krishnamurthy et al.
2020/0135180 A1 4/2020 Mukherjee et al.
2020/0135209 A1 4/2020 Delfarah et al.
2020/0137230 A1 4/2020 Spohrer
2020/0143812 A1 5/2020 Walker, II et al.
2020/0143819 A1 5/2020 Delcroix et al.
2020/0152186 A1 5/2020 Koh et al.
2020/0159579 A1 5/2020 Shear et al.
2020/0159651 A1 5/2020 Myers
2020/0160179 A1 5/2020 Chien et al.
2020/0169637 A1 5/2020 Sanghavi et al.
2020/0175566 A1 6/2020 Bender et al.
2020/0176004 A1 6/2020 Kleijn et al.
2020/0176018 A1 6/2020 Feinauer et al.
2020/0184964 A1 6/2020 Myers et al.
2020/0184966 A1 6/2020 Yavagal
2020/0193997 A1 6/2020 Piernot et al.
2020/0210142 A1 7/2020 Mu et al.
2020/0218780 A1 7/2020 Jun et al.
2020/0219517 A1 7/2020 Wang et al.
2020/0221155 A1 7/2020 Hansen et al.
2020/0227034 A1 7/2020 Summa et al.
2020/0227044 A1 7/2020 Lindahl
2020/0243069 A1 7/2020 Amores et al.
2020/0249985 A1 8/2020 Zeitlin
2020/0252508 A1 8/2020 Gray
2020/0258508 A1 8/2020 Aggarwal et al.
2020/0267222 A1 8/2020 Phipps et al.
2020/0272485 A1 8/2020 Karashchuk et al.
2020/0279556 A1 9/2020 Gruber et al.
2020/0279576 A1 9/2020 Binder et al.
2020/0279627 A1 9/2020 Nida et al.
2020/0285327 A1 9/2020 Hindi et al.
2020/0286472 A1 9/2020 Newendorp et al.
2020/0286493 A1 9/2020 Orr et al.
2020/0294487 A1* 9/2020 Donohoe ................ G10L 15/22
2020/0294494 A1 9/2020 Suyama et al.
2020/0298394 A1 9/2020 Han et al.
2020/0301950 A1 9/2020 Theo et al.
2020/0302356 A1 9/2020 Gruber et al.
2020/0302919 A1 9/2020 Greborio et al.
2020/0302925 A1 9/2020 Shah et al.
2020/0302930 A1 9/2020 Chen et al.
2020/0302932 A1 9/2020 Schramm et al.
2020/0304955 A1 9/2020 Gross et al.
2020/0304972 A1 9/2020 Gross et al.
2020/0305084 A1 9/2020 Freeman et al.
2020/0310513 A1 10/2020 Nicholson et al.
2020/0312315 A1 10/2020 Li et al.
2020/0312317 A1 10/2020 Kothari et al.
2020/0314191 A1 10/2020 Madhavan et al.
2020/0319850 A1 10/2020 Stasior et al.
2020/0327895 A1 10/2020 Gruber et al.
2020/0334492 A1 10/2020 Zheng et al.
2020/0342849 A1 10/2020 Yu et al.
2020/0342863 A1 10/2020 Aggarwal et al.
2020/0356243 A1 11/2020 Meyer et al.
2020/0356634 A1 11/2020 Srinivasan et al.
2020/0357391 A1 11/2020 Ghoshal et al.
2020/0357406 A1 11/2020 York et al.
2020/0357409 A1 11/2020 Sun et al.
2020/0364411 A1 11/2020 Evermann
2020/0365155 A1 11/2020 Milden
2020/0372633 A1 11/2020 Lee, II et al.
2020/0372904 A1 11/2020 Vescovi et al.
2020/0372905 A1 11/2020 Wang et al.
2020/0374243 A1 11/2020 Jina et al.
2020/0379610 A1 12/2020 Ford et al.
2020/0379640 A1 12/2020 Bellegarda et al.
2020/0379726 A1 12/2020 Blatz et al.
2020/0379727 A1 12/2020 Blatz et al.
2020/0379728 A1 12/2020 Gada et al.
2020/0380389 A1 12/2020 Eldeeb et al.
2020/0380956 A1 12/2020 Rossi et al.
2020/0380963 A1 12/2020 Chappidi et al.
2020/0380966 A1 12/2020 Acero et al.
2020/0380973 A1 12/2020 Novitchenko et al.
2020/0380980 A1 12/2020 Shum et al.
2020/0380985 A1 12/2020 Gada et al.

(56) References Cited

U.S. PATENT DOCUMENTS

| | | | |
|---|---|---|---|
| 2020/0382616 | A1 | 12/2020 | Vaishampayan et al. |
| 2020/0382635 | A1 | 12/2020 | Vora et al. |
| 2021/0110106 | A1 | 12/2020 | Vescovi et al. |
| 2021/0006943 | A1 | 1/2021 | Gross et al. |
| 2021/0011557 | A1 | 1/2021 | Lemay et al. |
| 2021/0012775 | A1 | 1/2021 | Kang et al. |
| 2021/0012776 | A1 | 1/2021 | Peterson et al. |
| 2021/0043190 | A1 | 2/2021 | Wang et al. |
| 2021/0065698 | A1 | 3/2021 | Topcu et al. |
| 2021/0067631 | A1 | 3/2021 | Van Os et al. |
| 2021/0072953 | A1 | 3/2021 | Amarilio et al. |
| 2021/0074264 | A1 | 3/2021 | Liang et al. |
| 2021/0090314 | A1 | 3/2021 | Hussen et al. |
| 2021/0097998 | A1 | 4/2021 | Kim et al. |
| 2021/0104232 | A1 | 4/2021 | Lee et al. |
| 2021/0105528 | A1 | 4/2021 | Van Os et al. |
| 2021/0110115 | A1 | 4/2021 | Moritz et al. |
| 2021/0110254 | A1 | 4/2021 | Duy et al. |
| 2021/0124597 | A1 | 4/2021 | Ramakrishnan et al. |
| 2021/0127220 | A1 | 4/2021 | Mathieu et al. |
| 2021/0141839 | A1 | 5/2021 | Tang et al. |
| 2021/0149629 | A1 | 5/2021 | Martel et al. |
| 2021/0149996 | A1 | 5/2021 | Bellegarda |
| 2021/0150151 | A1 | 5/2021 | Jiaming et al. |
| 2021/0151041 | A1 | 5/2021 | Gruber et al. |
| 2021/0151070 | A1 | 5/2021 | Binder et al. |
| 2021/0152684 | A1 | 5/2021 | Weinstein et al. |
| 2021/0165826 | A1 | 6/2021 | Graham et al. |
| 2021/0191603 | A1 | 6/2021 | Napolitano et al. |
| 2021/0191968 | A1 | 6/2021 | Orr et al. |
| 2021/0216760 | A1 | 7/2021 | Dominic et al. |
| 2021/0224032 | A1 | 7/2021 | Ryan et al. |
| 2021/0224474 | A1 | 7/2021 | Jerome et al. |
| 2021/0233532 | A1 | 7/2021 | Aram et al. |
| 2021/0248804 | A1 | 8/2021 | Hussen et al. |
| 2021/0249009 | A1 | 8/2021 | Manjunath et al. |
| 2021/0258881 | A1 | 8/2021 | Freeman et al. |
| 2021/0264913 | A1 | 8/2021 | Schramm et al. |
| 2021/0271333 | A1 | 9/2021 | Hindi et al. |
| 2021/0281965 | A1 | 9/2021 | Malik et al. |
| 2021/0294569 | A1 | 9/2021 | Piersol et al. |
| 2021/0294571 | A1 | 9/2021 | Carson et al. |
| 2021/0306812 | A1 | 9/2021 | Gross et al. |
| 2021/0312931 | A1 | 10/2021 | Paulik et al. |
| 2021/0318901 | A1 | 10/2021 | Gruber et al. |
| 2021/0327409 | A1 | 10/2021 | Naik |
| 2021/0334528 | A1 | 10/2021 | Bray et al. |
| 2021/0335342 | A1 | 10/2021 | Yuan et al. |
| 2021/0349605 | A1 | 11/2021 | Nonaka et al. |
| 2021/0349608 | A1 | 11/2021 | Blatz et al. |
| 2021/0350799 | A1 | 11/2021 | Hansen et al. |
| 2021/0350803 | A1 | 11/2021 | Hansen et al. |
| 2021/0350810 | A1 | 11/2021 | Phipps et al. |
| 2021/0352115 | A1 | 11/2021 | Hansen et al. |
| 2021/0357172 | A1 | 11/2021 | Sinesio et al. |
| 2021/0365161 | A1 | 11/2021 | Ellis et al. |
| 2021/0365174 | A1 | 11/2021 | Ellis et al. |
| 2021/0366480 | A1 | 11/2021 | Lemay et al. |
| 2021/0373851 | A1 | 12/2021 | Stasior et al. |
| 2021/0375290 | A1 | 12/2021 | Hu et al. |
| 2021/0377381 | A1 | 12/2021 | Aggarwal et al. |
| 2021/0390259 | A1 | 12/2021 | Hildick-Smith et al. |
| 2021/0390955 | A1 | 12/2021 | Piernot et al. |
| 2021/0407318 | A1 | 12/2021 | Pitschel et al. |
| 2021/0407502 | A1 | 12/2021 | Vescovi et al. |

FOREIGN PATENT DOCUMENTS

| | | | |
|---|---|---|---|
| AU | 2015101171 | A4 | 10/2015 |
| AU | 2018100187 | A4 | 3/2018 |
| AU | 2017222436 | A1 | 10/2018 |
| CA | 2666438 | C | 6/2013 |
| CN | 102065260 | A | 3/2011 |
| CN | 102324233 | A | 1/2012 |
| CN | 102340590 | A | 2/2012 |
| CN | 102346557 | A | 2/2012 |
| CN | 102346719 | A | 2/2012 |
| CN | 102368256 | A | 3/2012 |
| CN | 102402985 | A | 4/2012 |
| CN | 102405463 | A | 4/2012 |
| CN | 102449438 | A | 5/2012 |
| CN | 102495406 | A | 6/2012 |
| CN | 102498457 | A | 6/2012 |
| CN | 102510426 | A | 6/2012 |
| CN | 102520789 | A | 6/2012 |
| CN | 101661754 | B | 7/2012 |
| CN | 102629246 | A | 8/2012 |
| CN | 102651217 | A | 8/2012 |
| CN | 102663016 | A | 9/2012 |
| CN | 102681761 | A | 9/2012 |
| CN | 102681896 | A | 9/2012 |
| CN | 102682769 | A | 9/2012 |
| CN | 102682771 | A | 9/2012 |
| CN | 102685295 | A | 9/2012 |
| CN | 102693725 | A | 9/2012 |
| CN | 102694909 | A | 9/2012 |
| CN | 202453859 | U | 9/2012 |
| CN | 102722478 | A | 10/2012 |
| CN | 102737104 | A | 10/2012 |
| CN | 102750087 | A | 10/2012 |
| CN | 102792320 | A | 11/2012 |
| CN | 102801853 | A | 11/2012 |
| CN | 102820033 | A | 12/2012 |
| CN | 102844738 | A | 12/2012 |
| CN | 102866828 | A | 1/2013 |
| CN | 102870065 | A | 1/2013 |
| CN | 102882752 | A | 1/2013 |
| CN | 102890936 | A | 1/2013 |
| CN | 102915731 | A | 2/2013 |
| CN | 102917004 | A | 2/2013 |
| CN | 102917271 | A | 2/2013 |
| CN | 102918493 | A | 2/2013 |
| CN | 102955652 | A | 3/2013 |
| CN | 103035240 | A | 4/2013 |
| CN | 103035251 | A | 4/2013 |
| CN | 103038728 | A | 4/2013 |
| CN | 103064956 | A | 4/2013 |
| CN | 103093334 | A | 5/2013 |
| CN | 103093755 | A | 5/2013 |
| CN | 103109249 | A | 5/2013 |
| CN | 103135916 | A | 6/2013 |
| CN | 103187053 | A | 7/2013 |
| CN | 103198831 | A | 7/2013 |
| CN | 103209369 | A | 7/2013 |
| CN | 103217892 | A | 7/2013 |
| CN | 103226949 | A | 7/2013 |
| CN | 103236260 | A | 8/2013 |
| CN | 103246638 | A | 8/2013 |
| CN | 103268315 | A | 8/2013 |
| CN | 103280218 | A | 9/2013 |
| CN | 103292437 | A | 9/2013 |
| CN | 103327063 | A | 9/2013 |
| CN | 103365279 | A | 10/2013 |
| CN | 103366741 | A | 10/2013 |
| CN | 203249629 | U | 10/2013 |
| CN | 103390016 | A | 11/2013 |
| CN | 103412789 | A | 11/2013 |
| CN | 103414949 | A | 11/2013 |
| CN | 103426428 | A | 12/2013 |
| CN | 103455234 | A | 12/2013 |
| CN | 103456303 | A | 12/2013 |
| CN | 103456306 | A | 12/2013 |
| CN | 103457837 | A | 12/2013 |
| CN | 103475551 | A | 12/2013 |
| CN | 103477592 | A | 12/2013 |
| CN | 103533143 | A | 1/2014 |
| CN | 103533154 | A | 1/2014 |
| CN | 103543902 | A | 1/2014 |
| CN | 103562863 | A | 2/2014 |
| CN | 103582896 | A | 2/2014 |
| CN | 103593054 | A | 2/2014 |
| CN | 103608859 | A | 2/2014 |
| CN | 103620605 | A | 3/2014 |
| CN | 103645876 | A | 3/2014 |

(56) References Cited

FOREIGN PATENT DOCUMENTS

| | | | |
|---|---|---|---|
| CN | 103677261 | A | 3/2014 |
| CN | 103714816 | A | 4/2014 |
| CN | 103716454 | A | 4/2014 |
| CN | 103727948 | A | 4/2014 |
| CN | 103744761 | A | 4/2014 |
| CN | 103760984 | A | 4/2014 |
| CN | 103765385 | A | 4/2014 |
| CN | 103778527 | A | 5/2014 |
| CN | 103780758 | A | 5/2014 |
| CN | 103792985 | A | 5/2014 |
| CN | 103794212 | A | 5/2014 |
| CN | 103795850 | A | 5/2014 |
| CN | 103809548 | A | 5/2014 |
| CN | 103841268 | A | 6/2014 |
| CN | 103885663 | A | 6/2014 |
| CN | 103902373 | A | 7/2014 |
| CN | 103930945 | A | 7/2014 |
| CN | 103942932 | A | 7/2014 |
| CN | 103959751 | A | 7/2014 |
| CN | 203721183 | U | 7/2014 |
| CN | 103971680 | A | 8/2014 |
| CN | 104007832 | A | 8/2014 |
| CN | 104036774 | A | 9/2014 |
| CN | 104038621 | A | 9/2014 |
| CN | 104050153 | A | 9/2014 |
| CN | 104090652 | A | 10/2014 |
| CN | 104113471 | A | 10/2014 |
| CN | 104125322 | A | 10/2014 |
| CN | 104144377 | A | 11/2014 |
| CN | 104145304 | A | 11/2014 |
| CN | 104169837 | A | 11/2014 |
| CN | 104180815 | A | 12/2014 |
| CN | 104185868 | A | 12/2014 |
| CN | 104240701 | A | 12/2014 |
| CN | 104243699 | A | 12/2014 |
| CN | 104281259 | A | 1/2015 |
| CN | 104281390 | A | 1/2015 |
| CN | 104284257 | A | 1/2015 |
| CN | 104284486 | A | 1/2015 |
| CN | 104335207 | A | 2/2015 |
| CN | 104335234 | A | 2/2015 |
| CN | 104350454 | A | 2/2015 |
| CN | 104360990 | A | 2/2015 |
| CN | 104374399 | A | 2/2015 |
| CN | 104423625 | A | 3/2015 |
| CN | 104423780 | A | 3/2015 |
| CN | 104427104 | A | 3/2015 |
| CN | 104463552 | A | 3/2015 |
| CN | 104464733 | A | 3/2015 |
| CN | 104487929 | A | 4/2015 |
| CN | 104516522 | A | 4/2015 |
| CN | 104573472 | A | 4/2015 |
| CN | 104575493 | A | 4/2015 |
| CN | 104575501 | A | 4/2015 |
| CN | 104584010 | A | 4/2015 |
| CN | 104584096 | A | 4/2015 |
| CN | 104584601 | A | 4/2015 |
| CN | 104604274 | A | 5/2015 |
| CN | 104679472 | A | 6/2015 |
| CN | 104699746 | A | 6/2015 |
| CN | 104731441 | A | 6/2015 |
| CN | 104769584 | A | 7/2015 |
| CN | 104798012 | A | 7/2015 |
| CN | 104821167 | A | 8/2015 |
| CN | 104821934 | A | 8/2015 |
| CN | 104836909 | A | 8/2015 |
| CN | 104854583 | A | 8/2015 |
| CN | 104867492 | A | 8/2015 |
| CN | 104869342 | A | 8/2015 |
| CN | 104951077 | A | 9/2015 |
| CN | 104967748 | A | 10/2015 |
| CN | 104969289 | A | 10/2015 |
| CN | 104978963 | A | 10/2015 |
| CN | 105025051 | A | 11/2015 |
| CN | 105027197 | A | 11/2015 |
| CN | 105093526 | A | 11/2015 |
| CN | 105100356 | A | 11/2015 |
| CN | 105144136 | A | 12/2015 |
| CN | 105164678 | A | 12/2015 |
| CN | 105164719 | A | 12/2015 |
| CN | 105190607 | A | 12/2015 |
| CN | 105247511 | A | 1/2016 |
| CN | 105247551 | A | 1/2016 |
| CN | 105264524 | A | 1/2016 |
| CN | 105278681 | A | 1/2016 |
| CN | 105320251 | A | 2/2016 |
| CN | 105320726 | A | 2/2016 |
| CN | 105379234 | A | 3/2016 |
| CN | 105430186 | A | 3/2016 |
| CN | 105471705 | A | 4/2016 |
| CN | 105472587 | A | 4/2016 |
| CN | 105516441 | A | 4/2016 |
| CN | 105556592 | A | 5/2016 |
| CN | 105808200 | A | 7/2016 |
| CN | 105830048 | A | 8/2016 |
| CN | 105869641 | A | 8/2016 |
| CN | 105872222 | A | 8/2016 |
| CN | 105917311 | A | 8/2016 |
| CN | 106030699 | A | 10/2016 |
| CN | 106062734 | A | 10/2016 |
| CN | 106415412 | A | 2/2017 |
| CN | 106462383 | A | 2/2017 |
| CN | 106463114 | A | 2/2017 |
| CN | 106465074 | A | 2/2017 |
| CN | 106534469 | A | 3/2017 |
| CN | 106558310 | A | 4/2017 |
| CN | 106773742 | A | 5/2017 |
| CN | 106776581 | A | 5/2017 |
| CN | 107004412 | A | 8/2017 |
| CN | 107450800 | A | 12/2017 |
| CN | 107480161 | A | 12/2017 |
| CN | 107491285 | A | 12/2017 |
| CN | 107491468 | A | 12/2017 |
| CN | 107506037 | A | 12/2017 |
| CN | 107545262 | A | 1/2018 |
| CN | 107608998 | A | 1/2018 |
| CN | 107615378 | A | 1/2018 |
| CN | 107623616 | A | 1/2018 |
| CN | 107786730 | A | 3/2018 |
| CN | 107852436 | A | 3/2018 |
| CN | 107871500 | A | 4/2018 |
| CN | 107919123 | A | 4/2018 |
| CN | 107924313 | A | 4/2018 |
| CN | 107978313 | A | 5/2018 |
| CN | 108647681 | A | 10/2018 |
| CN | 109447234 | A | 3/2019 |
| CN | 109657629 | A | 4/2019 |
| CN | 110135411 | A | 8/2019 |
| CN | 110263144 | A | 9/2019 |
| CN | 105164719 | B | 11/2019 |
| CN | 110531860 | A | 12/2019 |
| CN | 110598671 | A | 12/2019 |
| CN | 110647274 | A | 1/2020 |
| CN | 110825469 | A | 2/2020 |
| CN | 111316203 | A | 6/2020 |
| DE | 202016008226 | U1 | 5/2017 |
| EP | 2431842 | A2 | 3/2012 |
| EP | 2523109 | A1 | 11/2012 |
| EP | 2523188 | A1 | 11/2012 |
| EP | 2551784 | A1 | 1/2013 |
| EP | 2555536 | A1 | 2/2013 |
| EP | 2575128 | A2 | 4/2013 |
| EP | 2632129 | A1 | 8/2013 |
| EP | 2639792 | A1 | 9/2013 |
| EP | 2669889 | A2 | 12/2013 |
| EP | 2672229 | A2 | 12/2013 |
| EP | 2672231 | A2 | 12/2013 |
| EP | 2675147 | A1 | 12/2013 |
| EP | 2680257 | A1 | 1/2014 |
| EP | 2683147 | A1 | 1/2014 |
| EP | 2683175 | A1 | 1/2014 |
| EP | 2672231 | A3 | 4/2014 |
| EP | 2717259 | A2 | 4/2014 |
| EP | 2725577 | A2 | 4/2014 |

(56) References Cited

FOREIGN PATENT DOCUMENTS

| | | | |
|---|---|---|---|
| EP | 2733598 | A2 | 5/2014 |
| EP | 2733896 | A1 | 5/2014 |
| EP | 2743846 | A2 | 6/2014 |
| EP | 2760015 | A1 | 7/2014 |
| EP | 2779160 | A1 | 9/2014 |
| EP | 2781883 | A2 | 9/2014 |
| EP | 2787683 | A1 | 10/2014 |
| EP | 2801890 | A1 | 11/2014 |
| EP | 2801972 | A1 | 11/2014 |
| EP | 2801974 | A2 | 11/2014 |
| EP | 2824564 | A1 | 1/2015 |
| EP | 2849177 | A1 | 3/2015 |
| EP | 2879402 | A1 | 6/2015 |
| EP | 2881939 | A1 | 6/2015 |
| EP | 2891049 | A1 | 7/2015 |
| EP | 2915021 | A2 | 9/2015 |
| EP | 2930715 | A1 | 10/2015 |
| EP | 2938022 | A1 | 10/2015 |
| EP | 2940556 | A1 | 11/2015 |
| EP | 2947859 | A1 | 11/2015 |
| EP | 2950307 | A1 | 12/2015 |
| EP | 2957986 | A1 | 12/2015 |
| EP | 2973380 | A2 | 1/2016 |
| EP | 2985984 | A2 | 2/2016 |
| EP | 2891049 | A4 | 3/2016 |
| EP | 3032532 | A1 | 6/2016 |
| EP | 3035329 | A1 | 6/2016 |
| EP | 3038333 | A1 | 6/2016 |
| EP | 3115905 | A1 | 1/2017 |
| EP | 3125097 | A2 | 2/2017 |
| EP | 2672231 | B1 | 5/2017 |
| EP | 3161612 | A1 | 5/2017 |
| EP | 3200185 | A1 | 8/2017 |
| EP | 3224708 | A1 | 10/2017 |
| EP | 3227771 | A1 | 10/2017 |
| EP | 3246916 | A1 | 11/2017 |
| EP | 3270658 | A1 | 1/2018 |
| EP | 3300074 | A1 | 3/2018 |
| EP | 2973380 | B1 | 8/2018 |
| EP | 2983065 | B1 | 8/2018 |
| EP | 3392876 | A1 | 10/2018 |
| EP | 3401773 | A1 | 11/2018 |
| EP | 2973002 | B1 | 6/2019 |
| EP | 3506151 | A1 | 7/2019 |
| EP | 3323058 | B1 | 2/2020 |
| IN | 2011MU03716 | A | 2/2012 |
| IN | 2012MU01227 | A | 6/2012 |
| JP | 2003-244292 | A | 8/2003 |
| JP | 2012-14394 | A | 1/2012 |
| JP | 2012-33997 | A | 2/2012 |
| JP | 2012-63536 | A | 3/2012 |
| JP | 2012-508530 | A | 4/2012 |
| JP | 2012-89020 | A | 5/2012 |
| JP | 2012-116442 | A | 6/2012 |
| JP | 2012-142744 | A | 7/2012 |
| JP | 2012-147063 | A | 8/2012 |
| JP | 2012-150804 | A | 8/2012 |
| JP | 2012-164070 | A | 8/2012 |
| JP | 2012-518847 | A | 8/2012 |
| JP | 2012-220959 | A | 11/2012 |
| JP | 2013-37688 | A | 2/2013 |
| JP | 2013-46171 | A | 3/2013 |
| JP | 2013-511214 | A | 3/2013 |
| JP | 2013-65284 | A | 4/2013 |
| JP | 2013-73240 | A | 4/2013 |
| JP | 2013-513315 | A | 4/2013 |
| JP | 2013-80476 | A | 5/2013 |
| JP | 2013-517566 | A | 5/2013 |
| JP | 2013-134430 | A | 7/2013 |
| JP | 2013-140520 | A | 7/2013 |
| JP | 2013-527947 | A | 7/2013 |
| JP | 2013-528012 | A | 7/2013 |
| JP | 2013-156349 | A | 8/2013 |
| JP | 2013-535059 | A | 9/2013 |
| JP | 2013-200423 | A | 10/2013 |
| JP | 2013-205999 | A | 10/2013 |
| JP | 2013-238936 | A | 11/2013 |
| JP | 2013-258600 | A | 12/2013 |
| JP | 2014-2586 | A | 1/2014 |
| JP | 2014-10688 | A | 1/2014 |
| JP | 2014-26629 | A | 2/2014 |
| JP | 2014-507903 | A | 3/2014 |
| JP | 2014-60600 | A | 4/2014 |
| JP | 2014-72586 | A | 4/2014 |
| JP | 2014-77969 | A | 5/2014 |
| JP | 2014-89711 | A | 5/2014 |
| JP | 2014-109889 | A | 6/2014 |
| JP | 2014-124332 | A | 7/2014 |
| JP | 2014-126600 | A | 7/2014 |
| JP | 2014-127754 | A | 7/2014 |
| JP | 2014-140121 | A | 7/2014 |
| JP | 2014-518409 | A | 7/2014 |
| JP | 2014-145842 | A | 8/2014 |
| JP | 2014-146940 | A | 8/2014 |
| JP | 2014-150323 | A | 8/2014 |
| JP | 2014-524627 | A | 9/2014 |
| JP | 2014-191272 | A | 10/2014 |
| JP | 2014-219614 | A | 11/2014 |
| JP | 2014-222514 | A | 11/2014 |
| JP | 2015-4928 | A | 1/2015 |
| JP | 2015-8001 | A | 1/2015 |
| JP | 2015-18365 | A | 1/2015 |
| JP | 2015-501022 | A | 1/2015 |
| JP | 2015-501034 | A | 1/2015 |
| JP | 2015-504619 | A | 2/2015 |
| JP | 2015-41845 | A | 3/2015 |
| JP | 2015-52500 | A | 3/2015 |
| JP | 2015-81971 | A | 4/2015 |
| JP | 2015-94848 | A | 5/2015 |
| JP | 2015-519675 | A | 7/2015 |
| JP | 2015-524974 | A | 8/2015 |
| JP | 2015-526776 | A | 9/2015 |
| JP | 2015-527683 | A | 9/2015 |
| JP | 2015-528140 | A | 9/2015 |
| JP | 2015-528918 | A | 10/2015 |
| JP | 2016-508007 | A | 3/2016 |
| JP | 2016-71247 | A | 5/2016 |
| JP | 2016-119615 | A | 6/2016 |
| JP | 2016-151928 | A | 8/2016 |
| JP | 2016-524193 | A | 8/2016 |
| JP | 2016-536648 | A | 11/2016 |
| JP | 2017-19331 | A | 1/2017 |
| JP | 2017-537361 | A | 12/2017 |
| JP | 6291147 | B1 | 2/2018 |
| JP | 2018-101242 | A | 6/2018 |
| JP | 2018-525950 | A | 9/2018 |
| JP | 2018-536889 | A | 12/2018 |
| KR | 10-2012-0020164 | A | 3/2012 |
| KR | 10-2012-0031722 | A | 4/2012 |
| KR | 10-2012-0082371 | A | 7/2012 |
| KR | 10-2012-0084472 | A | 7/2012 |
| KR | 10-1178310 | B1 | 8/2012 |
| KR | 10-2012-0120316 | A | 11/2012 |
| KR | 10-2012-0137424 | A | 12/2012 |
| KR | 10-2012-0137435 | A | 12/2012 |
| KR | 10-2012-0137440 | A | 12/2012 |
| KR | 10-2012-0138826 | A | 12/2012 |
| KR | 10-2012-0139827 | A | 12/2012 |
| KR | 10-1193668 | B1 | 12/2012 |
| KR | 10-2013-0035983 | A | 4/2013 |
| KR | 10-2013-0086750 | A | 8/2013 |
| KR | 10-2013-0090947 | A | 8/2013 |
| KR | 10-2013-0108563 | A | 10/2013 |
| KR | 10-1334342 | B1 | 11/2013 |
| KR | 10-2013-0131252 | A | 12/2013 |
| KR | 10-2013-0133629 | A | 12/2013 |
| KR | 10-2014-0007282 | A | 1/2014 |
| KR | 10-2014-0024271 | A | 2/2014 |
| KR | 10-2014-0025996 | A | 3/2014 |
| KR | 10-2014-0031283 | A | 3/2014 |
| KR | 10-2014-0033574 | A | 3/2014 |
| KR | 10-2014-0055204 | A | 5/2014 |
| KR | 10-2014-0059697 | A | 5/2014 |
| KR | 10-2014-0068752 | A | 6/2014 |

(56) References Cited

FOREIGN PATENT DOCUMENTS

| | | | |
|---|---|---|---|
| KR | 10-2014-0088449 | A | 7/2014 |
| KR | 10-2014-0093949 | A | 7/2014 |
| KR | 10-2014-0106715 | A | 9/2014 |
| KR | 10-2014-0107253 | A | 9/2014 |
| KR | 10-2014-0147557 | A | 12/2014 |
| KR | 10-2015-0006454 | A | 1/2015 |
| KR | 10-2015-0013631 | A | 2/2015 |
| KR | 10-1506510 | B1 | 3/2015 |
| KR | 10-2015-0038375 | A | 4/2015 |
| KR | 10-2015-0041974 | A | 4/2015 |
| KR | 10-2015-0043512 | A | 4/2015 |
| KR | 10-2015-0095624 | A | 8/2015 |
| KR | 10-1555742 | B1 | 9/2015 |
| KR | 10-2015-0113127 | A | 10/2015 |
| KR | 10-2015-0131262 | A | 11/2015 |
| KR | 10-2015-0138109 | A | 12/2015 |
| KR | 10-2016-0004351 | A | 1/2016 |
| KR | 10-2016-0010523 | A | 1/2016 |
| KR | 10-2016-0040279 | A | 4/2016 |
| KR | 10-2016-0065503 | A | 6/2016 |
| KR | 10-2016-0101079 | A | 8/2016 |
| KR | 10-2016-0101198 | A | 8/2016 |
| KR | 10-2016-0127165 | A | 11/2016 |
| KR | 10-2016-0140694 | A | 12/2016 |
| KR | 10-2016-0147854 | A | 12/2016 |
| KR | 10-2017-0036805 | A | 4/2017 |
| KR | 10-2017-0104006 | A | 9/2017 |
| KR | 10-2017-0107058 | A | 9/2017 |
| KR | 10-1776673 | B1 | 9/2017 |
| KR | 10-2018-0032632 | A | 3/2018 |
| KR | 10-2018-0034637 | A | 4/2018 |
| KR | 10-2018-0135877 | A | 12/2018 |
| KR | 10-1959328 | B1 | 3/2019 |
| RU | 2012141604 | A | 4/2014 |
| TW | 201227715 | A | 7/2012 |
| TW | 201245989 | A | 11/2012 |
| TW | 201312548 | A | 3/2013 |
| TW | 201407184 | A | 2/2014 |
| TW | 201610982 | A | 3/2016 |
| TW | 201629750 | A | 8/2016 |
| WO | 2010/109358 | A1 | 9/2010 |
| WO | 2010/144651 | A2 | 12/2010 |
| WO | 2011/088053 | A2 | 7/2011 |
| WO | 2011/133573 | A2 | 10/2011 |
| WO | 2011/097309 | A3 | 12/2011 |
| WO | 2011/088053 | A3 | 1/2012 |
| WO | 2012/008434 | A1 | 1/2012 |
| WO | 2012/019020 | A1 | 2/2012 |
| WO | 2012/019637 | A1 | 2/2012 |
| WO | 2012/033312 | A1 | 3/2012 |
| WO | 2012/056463 | A1 | 5/2012 |
| WO | 2012/063260 | A2 | 5/2012 |
| WO | 2012/084965 | A1 | 6/2012 |
| WO | 2012/092562 | A1 | 7/2012 |
| WO | 2012/112331 | A2 | 8/2012 |
| WO | 2012/129231 | A1 | 9/2012 |
| WO | 2012/063260 | A3 | 10/2012 |
| WO | 2012/135157 | A2 | 10/2012 |
| WO | 2012/154317 | A1 | 11/2012 |
| WO | 2012/154748 | A1 | 11/2012 |
| WO | 2012/155079 | A2 | 11/2012 |
| WO | 2012/160567 | A1 | 11/2012 |
| WO | 2012/167168 | A2 | 12/2012 |
| WO | 2012/173902 | A2 | 12/2012 |
| WO | 2013/009578 | A2 | 1/2013 |
| WO | 2013/022135 | A1 | 2/2013 |
| WO | 2013/022223 | A2 | 2/2013 |
| WO | 2013/048880 | A1 | 4/2013 |
| WO | 2013/049358 | A1 | 4/2013 |
| WO | 2013/057153 | A1 | 4/2013 |
| WO | 2013/101489 | A1 | 7/2013 |
| WO | 2013/118988 | A1 | 8/2013 |
| WO | 2013/122310 | A1 | 8/2013 |
| WO | 2013/128999 | A1 | 9/2013 |
| WO | 2013/133533 | A1 | 9/2013 |
| WO | 2013/137660 | A1 | 9/2013 |
| WO | 2013/163113 | A1 | 10/2013 |
| WO | 2013/163857 | A1 | 11/2013 |
| WO | 2013/169842 | A2 | 11/2013 |
| WO | 2013/173504 | A1 | 11/2013 |
| WO | 2013/173511 | A2 | 11/2013 |
| WO | 2013/176847 | A1 | 11/2013 |
| WO | 2013/184953 | A1 | 12/2013 |
| WO | 2013/184990 | A1 | 12/2013 |
| WO | 2014/003138 | A1 | 1/2014 |
| WO | 2014/004544 | A2 | 1/2014 |
| WO | 2014/018580 | A1 | 1/2014 |
| WO | 2014/021967 | A1 | 2/2014 |
| WO | 2014/022148 | A1 | 2/2014 |
| WO | 2014/028735 | A2 | 2/2014 |
| WO | 2014/028797 | A1 | 2/2014 |
| WO | 2014/031505 | A1 | 2/2014 |
| WO | 2014/032461 | A1 | 3/2014 |
| WO | 2014/040022 | A2 | 3/2014 |
| WO | 2014/046475 | A1 | 3/2014 |
| WO | 2014/047047 | A1 | 3/2014 |
| WO | 2014/048855 | A1 | 4/2014 |
| WO | 2014/066352 | A1 | 5/2014 |
| WO | 2014/070872 | A2 | 5/2014 |
| WO | 2014/073825 | A1 | 5/2014 |
| WO | 2014/078965 | A1 | 5/2014 |
| WO | 2014/093339 | A1 | 6/2014 |
| WO | 2014/093911 | A2 | 6/2014 |
| WO | 2014/096506 | A1 | 6/2014 |
| WO | 2014/124332 | A2 | 8/2014 |
| WO | 2014/137074 | A1 | 9/2014 |
| WO | 2014/138604 | A1 | 9/2014 |
| WO | 2014/143959 | A2 | 9/2014 |
| WO | 2014/144395 | A2 | 9/2014 |
| WO | 2014/144579 | A1 | 9/2014 |
| WO | 2014/144949 | A2 | 9/2014 |
| WO | 2014/149473 | A1 | 9/2014 |
| WO | 2014/151153 | A2 | 9/2014 |
| WO | 2014/124332 | A3 | 10/2014 |
| WO | 2014/159578 | A1 | 10/2014 |
| WO | 2014/159581 | A1 | 10/2014 |
| WO | 2014/162570 | A1 | 10/2014 |
| WO | 2014/169269 | A1 | 10/2014 |
| WO | 2014/173189 | A1 | 10/2014 |
| WO | 2013/173504 | A8 | 12/2014 |
| WO | 2014/197336 | A1 | 12/2014 |
| WO | 2014/197339 | A1 | 12/2014 |
| WO | 2014/197635 | A2 | 12/2014 |
| WO | 2014/197730 | A1 | 12/2014 |
| WO | 2014/200728 | A1 | 12/2014 |
| WO | 2014/204659 | A2 | 12/2014 |
| WO | 2014/210392 | A2 | 12/2014 |
| WO | 2015/018440 | A1 | 2/2015 |
| WO | 2015/020942 | A1 | 2/2015 |
| WO | 2015/029379 | A1 | 3/2015 |
| WO | 2015/030796 | A1 | 3/2015 |
| WO | 2015/036817 | A1 | 3/2015 |
| WO | 2015/041882 | A1 | 3/2015 |
| WO | 2015/041892 | A1 | 3/2015 |
| WO | 2015/047932 | A1 | 4/2015 |
| WO | 2015/053485 | A1 | 4/2015 |
| WO | 2015/054141 | A1 | 4/2015 |
| WO | 2015/080530 | A1 | 6/2015 |
| WO | 2015/084659 | A1 | 6/2015 |
| WO | 2015/092943 | A1 | 6/2015 |
| WO | 2015/094169 | A1 | 6/2015 |
| WO | 2015/094369 | A1 | 6/2015 |
| WO | 2015/098306 | A1 | 7/2015 |
| WO | 2015/099939 | A1 | 7/2015 |
| WO | 2015/112625 | A1 | 7/2015 |
| WO | 2015/116151 | A1 | 8/2015 |
| WO | 2015/121449 | A1 | 8/2015 |
| WO | 2015/151133 | A1 | 10/2015 |
| WO | 2015/153310 | A1 | 10/2015 |
| WO | 2015/157013 | A1 | 10/2015 |
| WO | 2015/183401 | A1 | 12/2015 |
| WO | 2015/183699 | A1 | 12/2015 |
| WO | 2015/184186 | A1 | 12/2015 |
| WO | 2015/184387 | A1 | 12/2015 |

(56) References Cited

FOREIGN PATENT DOCUMENTS

| | | | |
|---|---|---|---|
| WO | 2015/200207 | A1 | 12/2015 |
| WO | 2016/027933 | A1 | 2/2016 |
| WO | 2016/028946 | A1 | 2/2016 |
| WO | 2016/033257 | A1 | 3/2016 |
| WO | 2016/039992 | A1 | 3/2016 |
| WO | 2016/040721 | A1 | 3/2016 |
| WO | 2016/051519 | A1 | 4/2016 |
| WO | 2016/052164 | A1 | 4/2016 |
| WO | 2016/054230 | A1 | 4/2016 |
| WO | 2016/057268 | A1 | 4/2016 |
| WO | 2016/075081 | A1 | 5/2016 |
| WO | 2016/085775 | A2 | 6/2016 |
| WO | 2016/085776 | A1 | 6/2016 |
| WO | 2016/089029 | A1 | 6/2016 |
| WO | 2016/100139 | A1 | 6/2016 |
| WO | 2016/111881 | A1 | 7/2016 |
| WO | 2016/144840 | A1 | 9/2016 |
| WO | 2016/144982 | A1 | 9/2016 |
| WO | 2016/144983 | A1 | 9/2016 |
| WO | 2016/175354 | A1 | 11/2016 |
| WO | 2016/187149 | A1 | 11/2016 |
| WO | 2016/190950 | A1 | 12/2016 |
| WO | 2016/209444 | A1 | 12/2016 |
| WO | 2016/209924 | A1 | 12/2016 |
| WO | 2017/044160 | A1 | 3/2017 |
| WO | 2017/044257 | A1 | 3/2017 |
| WO | 2017/044260 | A1 | 3/2017 |
| WO | 2017/044629 | A1 | 3/2017 |
| WO | 2017/053311 | A1 | 3/2017 |
| WO | 2017/058293 | A1 | 4/2017 |
| WO | 2017/059388 | A1 | 4/2017 |
| WO | 2017/071420 | A1 | 5/2017 |
| WO | 2017/142116 | A1 | 8/2017 |
| WO | 2017/160487 | A1 | 9/2017 |
| WO | 2017/200777 | A1 | 11/2017 |
| WO | 2017/203484 | A1 | 11/2017 |
| WO | 2017/213678 | A1 | 12/2017 |
| WO | 2017/213682 | A1 | 12/2017 |
| WO | 2017/218194 | A1 | 12/2017 |
| WO | 2018/009397 | A1 | 1/2018 |
| WO | 2018/044633 | A1 | 3/2018 |
| WO | 2018/067528 | A1 | 4/2018 |
| WO | 2018/176053 | A1 | 9/2018 |
| WO | 2018/209152 | A1 | 11/2018 |
| WO | 2018/213401 | A1 | 11/2018 |
| WO | 2018/213415 | A1 | 11/2018 |
| WO | 2019/067930 | A1 | 4/2019 |
| WO | 2019/078576 | A1 | 4/2019 |
| WO | 2019/079017 | A1 | 4/2019 |
| WO | 2019/143397 | A1 | 7/2019 |
| WO | 2019/147429 | A1 | 8/2019 |
| WO | 2019/236217 | A1 | 12/2019 |
| WO | 2020/010530 | A1 | 1/2020 |

OTHER PUBLICATIONS

Working with the Dragon Bar; Jun. 27, 2016; Nuance Communications, Inc; pp. 1-2.*

Kumar et al., Voice Typing: A New Speech Interaction Model for Dictation on Touchscreen Devices; May 2012; CHI '12: Proceedings of the SIGCHI Conference on Human Factors in Computing Systems; 9 Pages.*

Office Action received for Danish Patent Application No. PA202070237, mailed on Jul. 14, 2022, 3 pages.

Office Action received for European Patent Application No. 18726271.2, dated Mar. 9, 2022, 7 pages.

International Preliminary Report on Patentability received for PCT Patent Application No. PCT/US2018/029399, dated Nov. 28, 2019, 14 pages.

International Search Report and Written Opinion received for PCT Patent Application No. PCT/US2018/029399, dated Nov. 13, 2018, 20 pages.

Invitation to Pay Search Fees received for European Patent Application No. 18726271.2, dated Oct. 13, 2021, 3 pages.

Office Action received for Danish Patent Application No. PA201770411, dated Dec. 6, 2018, 4 pages.

Office Action received for Danish Patent Application No. PA201770411, dated Feb. 24, 2020, 5 pages.

Office Action received for Danish Patent Application No. PA201770411, dated Mar. 26, 2019, 5 pages.

Office Action received for Danish Patent Application No. PA202070237, dated Jan. 28, 2021, 3 pages.

Office Action received for Danish Patent Application No. PA202070237, dated Jun. 7, 2021, 5 pages.

Robbins, Mike F., "Automatically place an Android Phone on Vibrate at Work", Available online at: https://mikefrobbins.com/2016/07/21/automatically-place-an-android-phone-on-vibrate-at-work/, Jul. 21, 2016, pp. 1-11.

Search Report and Opinion received for Danish Patent Application No. PA202070237, dated Aug. 14, 2020, 8 pages.

Abdelaziz et al., "Speaker-Independent Speech-Driven Visual Speech Synthesis using Domain-Adapted Acoustic Models", May 15, 2019, 9 pages.

"Accessibility on iOS", Apple Inc., Online available at: https://developer.apple.com/accessibility/ios/, Retrieved on Jul. 26, 2021, 2 pages.

"Alexa, Turn Up the Heat!, Smartthings Samsung [online]", Online available at: <https://web.archive.org/web/20160329142041/https://blog.smartthings.com/news/smartthingsupdates/alexa-turn-up-the-heat/>, Mar. 3, 2016, 3 pages.

Alfred App, "Alfred", Online available at: <http://www.alfredapp.com/>, retrieved on Feb. 8, 2012, 5 pages.

Alsharif et al., "Long Short-Term Memory Neural Network for Keyboard Gesture Decoding", IEEE International Conference on Acoustics, Speech and Signal Processing (ICASSP), Brisbane, Australia, Sep. 2015, 5 pages.

Apple Differential Privacy Team, "Learning with Privacy at Scale", Apple Machine Learning Blog, vol. 1, No. 8, Online available at: <https://machinelearning.apple.com/2017/12/06/learning-with-privacy-at-scale.html>, Dec. 2017, 9 pages.

Apple, "VoiceOver for Os X", Online available at: <http://www.apple.com/accessibility/voiceover/>, May 19, 2014, pp. 1-3.

"Ask Alexa—Things That Are Smart Wiki", Online available at: <http://thingsthataresmart.wiki/index.php?title=Ask_Alexa&oldid=4283>, Jun. 8, 2016, pp. 1-31.

Bell, Jason, "Machine Learning Hands-On for Developers and Technical Professionals", Wiley, 2014, 82 pages.

Bellegarda, Jeromer, "Chapter 1: Spoken Language Understanding for Natural Interaction: The Siri Experience", Natural Interaction with Robots, Knowbots and Smartphones, 2014, pp. 3-14.

Bellegarda, Jeromer, "Spoken Language Understanding for Natural Interaction: The Siri Experience", Slideshow retrieved from: <https://www.uni-ulm.de/fileadmin/website_uni_ulm/iui.iwsds2012/files/Bellegarda.pdf>, International Workshop on Spoken Dialog Systems (IWSDS), May 2012, pp. 1-43.

Bodapati et al., "Neural Word Decomposition Models for Abusive Language Detection", Proceedings of the Third Workshop on Abusive Language Online, Aug. 1, 2019, pp. 135-145.

Burgess, Brian, "Amazon Echo Tip: Enable the Wake Up Sound", Online available at: <https://www.groovypost.com/howto/amazon-echo-tip-enable-wake-up-sound/>, Jun. 30, 2015, 4 pages.

Butcher, Mike, "EVI Arrives in Town to go Toe-to-Toe with Siri", TechCrunch, Jan. 23, 2012, pp. 1-2.

Büttner et al., "The Design Space of Augmented and Virtual Reality Applications for Assistive Environments in Manufacturing: A Visual Approach", In Proceedings of the 10th International Conference on PErvasive Technologies Related to Assistive Environments (PETRA '17), Island of Rhodes, Greece, Online available at: https://dl.acm.org/doi/pdf/10.1145/3056540.3076193, Jun. 21-23, 2017, pp. 433-440.

Cambria et al., "Jumping NLP curves: A Review of Natural Language Processing Research.", IEEE Computational Intelligence magazine, 2014, vol. 9, May 2014, pp. 48-57.

(56) References Cited

OTHER PUBLICATIONS

Caraballo et al., "Language Identification Based on a Discriminative Text Categorization Technique", Iberspeech 2012—VII Jornadas En Tecnologia Del Habla and III Iberian Sltech Workshop, Nov. 21, 2012, pp. 1-10.
Chang et al., "Monaural Multi-Talker Speech Recognition with Attention Mechanism and Gated Convolutional Networks", Interspeech 2018, Sep. 2-6, 2018, pp. 1586-1590.
Chen et al., "A Convolutional Neural Network with Dynamic Correlation Pooling", 13th International Conference on Computational Intelligence and Security, IEEE, 2017, pp. 496-499.
Chen et al., "Progressive Joint Modeling in Unsupervised Single-Channel Overlapped Speech Recognition", IEEE/ACM Transactions on Audio, Speech, and Language Processing, vol. 26, No. 1, Jan. 2018, pp. 184-196.
Chen, Angela, "Amazon's Alexa now handles patient health information", Available online at: <https://www.theverge.com/2019/4/4/18295260/amazon-hipaa-alexa-echo-patient-health-information-privacy-voice-assistant>, Apr. 4, 2019, 2 pages.
Chen, Yi, "Multimedia Siri Finds and Plays Whatever You Ask for", PSFK Report, Feb. 9, 2012, pp. 1-9.
Chenghao, Yuan, "MacroDroid", Online available at: https://www.ifanr.com/weizhizao/612531, Jan. 25, 2016, 7 pages (Official Copy Only). {See communication under 37 CFR § 1.98(a) (3)}.
Cheyer, Adam, "Adam Cheyer—About", Online available at: <http://www.adam.cheyer.com/about.html>, retrieved on Sep. 17, 2012, pp. 1-2.
Colt, Sam, "Here's One Way Apple's Smartwatch Could Be Better Than Anything Else", Business Insider, Aug. 21, 2014, pp. 1-4.
Conneau et al., "Supervised Learning of Universal Sentence Representations from Natural Language Inference Data", Proceedings of the 2017 Conference on Empirical Methods in Natural Language Processing, Copenhagen, Denmark, Sep. 7-11, 2017, pp. 670-680.
Czech Lucas, "A System for Recognizing Natural Spelling of English Words", Diploma Thesis, Karlsruhe Institute of Technology, May 7, 2014, 107 pages.
Dai et al., "Transformer-XL: Attentive Language Models Beyond a Fixed-Length Context", Online available at: arXiv:1901.02860v3, Jun. 2, 2019, 20 pages.
Delcroix et al., "Context Adaptive Deep Neural Networks for Fast Acoustic Model Adaptation", ICASSP, 2015, pp. 4535-4539.
Delcroix et al., "Context Adaptive Neural Network for Rapid Adaptation of Deep CNN Based Acoustic Models", Interspeech 2016, Sep. 8-12, 2016, pp. 1573-1577.
Derrick, Amanda, "How to Set Up Google Home for Multiple Users", Lifewire, Online available at:—<https://www.lifewire.com/set-up-google-home-multiple-users-4685691>, Jun. 8, 2020, 9 pages.
Dighe et al., "Lattice-Based Improvements for Voice Triggering Using Graph Neural Networks", in 2020 IEEE International Conference on Acoustics, Speech and Signal Processing (ICASSP), Jan. 25, 2020, 5 pages.
Dihelson, "How Can I Use Voice or Phrases as Triggers to Macrodroid?", Macrodroid Forums, Online Available at: <https://www.tapatalk.com/groups/macrodroid/how-can-i-use-voice-or-phrases-as-triggers-to-macr-t4845.html>, May 9, 2018, 5 pages.
"DIRECTV™ Voice", Now Part of the DIRECTTV Mobile App for Phones, Sep. 18, 2013, 5 pages.
Dwork et al., "The Algorithmic Foundations of Differential Privacy", Foundations and Trends in Theoretical Computer Science: vol. 9: No. 3-4, 211-407, 2014, 281 pages.
Eder et al., "At the Lower End of Language—Exploring the Vulgar and Obscene Side of German", Proceedings of the Third Workshop on Abusive Language Online, Florence, Italy, Aug. 1, 2019, pp. 119-128.
Edim, et al., "A Multi-Agent Based Virtual Personal Assistant for E-Health Service", Journal of Information Engineering and Applications, vol. 3, No. 11, 2013, 9 pages.
Evi, "Meet Evi: The One Mobile Application that Provides Solutions for your Everyday Problems", Feb. 2012, 3 pages.
Filipowicz, Luke, "How to use the QuickType keyboard in iOS 8", Online available at: <https://www.imore.com/comment/568232>, Oct. 11, 2014, pp. 1-17.
Findlater et al., "Beyond QWERTY: Augmenting Touch-Screen Keyboards with Multi-Touch Gestures for Non-Alphanumeric Input", CHI '12, May 5-10, 2012, 4 pages.
Ganin et al., "Unsupervised Domain Adaptation by Backpropagation", in Proceedings of the 32nd International Conference on Machine Learning, vol. 37, Jul. 2015, 10 pages.
Gatys et al., "Image Style Transfer Using Convolutional Neural Networks", Proceedings of IEEE International Conference on Acoustics, Speech and Signal Processing (ICASSP), 2016, pp. 2414-2423.
Geyer et al., "Differentially Private Federated Learning: A Client Level Perspective", arXiv:1712.07557v2, Mar. 2018, 7 pages.
Ghauth et al., "Text Censoring System for Filtering Malicious Content Using Approximate String Matching and Bayesian Filtering", Proc. 4th INNS Symposia Series on Computational Intelligence in Information Systems, Bandar Seri Begawan, Brunei, 2015, pp. 149-158.
Goodfellow et al., "Generative Adversarial Networks", Proceedings of the Neural Information Processing Systems, Dec. 2014, 9 pages.
Graves, Alex, "Sequence Transduction with Recurrent Neural Networks", Proceeding of International Conference of Machine Learning (ICML) Representation Learning Workshop, Nov. 14, 2012, 9 pages.
Gu et al., "BadNets: Evaluating Backdooring Attacks on Deep Neural Networks", IEEE Access, vol. 7, Mar. 21, 2019, pp. 47230-47244.
Guim, Mark, "How to Set a Person-Based Reminder with Cortana", Online available at: <http://www.wpcentral.com/how-to-person-based-reminder-cortana>, Apr. 26, 2014, 15 pages.
Guo et al., "StateLens: A Reverse Engineering Solution for Making Existing Dynamic Touchscreens Accessible", In Proceedings of the 32nd Annual Symposium on User Interface Software and Technology (UIST '19), New Orleans, LA, USA, Online available at: https://dl.acm.org/doi/pdf/10.1145/3332165.3347873, Oct. 20-23, 2019, pp. 371-385.
Guo et al., "Time-Delayed Bottleneck Highway Networks Using a DFT Feature for Keyword Spotting", IEEE International Conference on Acoustics, Speech and Signal Processing (ICASSP). IEEE, 2018, 5 pages.
Guo et al., "VizLens: A Robust and Interactive Screen Reader for Interfaces in the Real World", In Proceedings of the 29th Annual Symposium on User Interface Software and Technology (UIST '16), Tokyo, Japan, Online available at: https://dl.acm.org/doi/pdf/10.1145/2984511.2984518, Oct. 16-19, 2016, pp. 651-664.
Gupta et al., "I-vector-based Speaker Adaptation of Deep Neural Networks for French Broadcast Audio Transcription", ICASSP, 2014, 2014, pp. 6334-6338.
Gupta, Naresh, "Inside Bluetooth Low Energy", Artech House, 2013, 274 pages.
Hardawar, Devindra, "Driving App Waze Builds its own Siri for Hands-Free Voice Control", Online available at:—<http://venturebeat.com/2012/02/09/driving-app-waze-builds-its-own-siri-for-hands-free-voice-control/>, retrieved on Feb. 9, 2012, 4 pages.
Hashimoto, Yoshiyuki, "Simple Guide for iPhone Siri, which can be Operated with your Voice", Shuwa System Co. Ltd., vol. 1, Jul. 5, 2012, pp. 8, 130, 131.
Haung et al., "A Study for Improving Device-Directed Speech Detection Toward Frictionless Human-Machine Interaction", in Proc. Interspeech, 2019, 5 pages.
Hawkeye, "Learn where people look in your products", Online Available at: https://www.usehawkeye.com, 2019, 6 pages.
"Headset Button Controller v7.3 APK Full APP Download for Andriod, Blackberry, iPhone", Online available at: <http://fullappdownload.com/headset-button-controller-v7-3-apk/>, Jan. 27, 2014, 11 pages.
Heller et al., "AudioScope: Smartphones as Directional Microphones in Mobile Audio Augmented Reality Systems", In Proceedings of the 33rd Annual ACM Conference on Human Factors in Computing Systems (CHI '15), Crossings, Seoul, Korea, Online available at: https://dl.acm.org/doi/pdf/10.1145/2702123.2702159, Apr. 18-23, 2015, pp. 949-952.

(56) References Cited

OTHER PUBLICATIONS

Henderson et al., "Efficient Natural Language Response Suggestion for Smart Reply", Available Online at: https://static.googleusercontent.com/media/research.google.com/en//pubs/archive/1846e8a466c079eae7e90727e27caf5f98f10e0c.pdf, 2017, 15 pages.

Hershey et al., "Deep Clustering: Discriminative Embeddings for Segmentation and Separation", Proc. ICASSP, Mar. 2016, 6 pages.

Hinton et al., "Distilling the Knowledge in a Neural Network", arXiv preprintarXiv:1503.02531, Mar. 2, 2015, 9 pages.

Hutsko et al., "iPhone All-in-One for Dummies", 3rd Edition, 2013, 98 pages.

id3.org, "id3v2.4.0-Frames", Online available at: <http://id3.org/id3v2.4.0-frames?action=print>, retrieved on Jan. 22, 2015, pp. 1-41.

Idasallinen, "What's The 'Like' Meter Based on?", Online Available at: <https://community.spotify.com/t5/Content-Questions/What-s-the-like-meter-based-on/td-p/1209974>, Sep. 22, 2015, 6 pages.

INews and Tech,"How to Use the QuickType Keyboard in IOS 8", Online available at: <http://www.inewsandtech.com/how-to-use-the-quicktype-keyboard-in-ios-8/>, Sep. 17, 2014, 6 pages.

"Interactive Voice", Online available at: <http://www.helloivee.com/company/>, retrieved on Feb. 10, 2014, 2 pages.

Invitation to Pay Addition Fees and Partial International Search Report received for PCT Patent Application No. PCT/US2018/029399, dated Jul. 5, 2018, 9 pages.

"IPhone 6 Smart Guide Full Version for SoftBank", Gijutsu-Hyohron Co. Ltd., vol. 1, Dec. 1, 2014, 4 pages (Official Copy Only). {See communication under 37 CFR § 1.98(a) (3)}.

Isik et al., "Single-Channel Multi-Speaker Separation using Deep Clustering", Interspeech 2016, Sep. 8-12, 2016, pp. 545-549.

Jeon et al., "Voice Trigger Detection from LVCSR Hypothesis Lattices Using Bidirectional Lattice Recurrent Neural Networks", International Conference on Acoustics, Speech and Signal Processing (ICASSP). IEEE, Feb. 29, 2020, 5 pages.

Jonsson et al., "Proximity-based Reminders Using Bluetooth", 2014 IEEE International Conference on Pervasive Computing and Communications Demonstrations, 2014, pp. 151-153.

Jouvet et al., "Evaluating Grapheme-to-phoneme Converters in Automatic Speech Recognition Context", IEEE, 2012, pp. 4821-4824.

Kannan et al., "Smart Reply: Automated Response Suggestion for Email", Available Online at: https://arxiv.org/pdf/1606.04870.pdf, Jun. 15, 2016, 10 pages.

Karn, Ujjwal, "An Intuitive Explanation of Convolutional Neural Networks", The Data Science Blog, Aug. 11, 2016, 23 pages.

Kastrenakes, Jacob, "Siri's creators will unveil their new AI bot on Monday", The Verge, Online available at: <https://web.archive.org/web/20160505090418/https://www.theverge.com/2016/5/4/11593564/viv-labs-unveiling-monday-new-ai-from-siri-creators>, May 4, 2016, 3 pages.

Kazmucha Allyson, "How to Send Map Locations Using iMessage", iMore.com, Online available at: <http://www.imore.com/how-use-imessage-share-your-location-your-iphone>, Aug. 2, 2012, 6 pages.

Kickstarter, "Ivee Sleek: Wi-Fi Voice-Activated Assistant", Online available at: <https://www.kickstarter.com/projects/ivee/ivee-sleek-wi-fi-voice-activated-assistant>, retrieved on Feb. 10, 2014, pp. 1-13.

King et al., "Robust Speech Recognition via Anchor Word Representations", Interspeech 2017, Aug. 20-24, 2017, pp. 2471-2475.

Kondrat, Tomek, "Automation for Everyone with MacroDroid", Online available at: https://www.xda-developers.com/automation-for-everyone-with-macrodroid/, Nov. 17, 2013, 6 pages.

Kruger et al., "Virtual World Accessibility with the Perspective Viewer", Proceedings of ICEAPVI, Athens, Greece, Feb. 12-14, 2015, 6 pages.

Kumar, Shiu, "Ubiquitous Smart Home System Using Android Application", International Journal of Computer Networks & Communications (IJCNC) vol. 6, No. 1, Jan. 2014, pp. 33-43.

Kumatani et al., "Direct Modeling of Raw Audio with DNNS for Wake Word Detection", in 2017 IEEE Automatic Speech Recognition and Understanding Workshop (ASRU), 2017, 6 pages.

Lee, Sungjin, "Structured Discriminative Model for Dialog State Tracking", Proceedings of the SIGDIAL 2013 Conference, Aug. 22-24, 2013, pp. 442-451.

Lin, Luyuan, "An Assistive Handwashing System with Emotional Intelligence", Using Emotional Intelligence in Cognitive Intelligent Assistant Systems, 2014, 101 pages.

"Link Your Voice to Your Devices with Voice Match, Google Assistant Help", Online available at: <https://support.google.com/assistant/answer/9071681?co=GENIE.Platform%3DAndroid&hl=en>, Retrieved on Jul. 1, 2020, 2 pages.

Liou et al., "Autoencoder for Words", Neurocomputing, vol. 139, Sep. 2014, pp. 84-96.

Liu et al., "Accurate Endpointing with Expected Pause Duration", Sep. 6-10, 2015, pp. 2912-2916.

Loukides et al., "What Is the Internet of Things?", O'Reilly Media Inc., Online Available at: <https://www.oreilly.com/library/view/what-is-the/9781491975633/>, 2015, 31 pages.

Luo et al., "Speaker-Independent Speech Separation With Deep Attractor Network", IEEE/ACM Transactions on Audio, Speech, and Language Processing, vol. 26, No. 4, Apr. 2018, pp. 787-796.

Maas et al., "Combining Acoustic Embeddings and Decoding Features for End-Of-Utterance Detection in Real-Time Far-Field Speech Recognition Systems", in 2018 IEEE International Conference on Acoustics, Speech and Signal Processing (ICASSP). IEEE, 2018, 5 pages.

Mallidi et al., "Device-Directed Utterance Detection", Proc. Interspeech, Aug. 7, 2018, 4 pages.

"Meet Ivee, Your Wi-Fi Voice Activated Assistant", Available Online at: <http://www.helloivee.com/>, retrieved on Feb. 10, 2014, 8 pages.

"Method to Provide Remote Voice Navigation Capability on the Device", IP.com, Jul. 21, 2016, 4 pages.

Mhatre et al., "Donna Interactive Chat-bot acting as a Personal Assistant", International Journal of Computer Applications (0975-8887), vol. 140, No. 10, Apr. 2016, 6 pages.

Microsoft Soundscape—A map delivered in 3D sound, Microsoft Research, Online available at: https://www.microsoft.com/en-us/research/product/soundscape/, Retrieved on Jul. 26, 2021, 5 pages.

Mikolov et al., "Linguistic Regularities in Continuous Space Word Representations", Proceedings of NAACL-HLT, Jun. 9-14, 2013, pp. 746-751.

Miller, Chance, "Google Keyboard Updated with New Personalized Suggestions Feature", Online available at:—<http://9to5google.com/2014/03/19/google-keyboard-updated-with-new-personalized-suggestions-feature/>, Mar. 19, 2014, 4 pages.

Mnih et al., "Human-Level Control Through Deep Reinforcement Learning", Nature, vol. 518, Feb. 26, 2015, pp. 529-533.

"Mobile Speech Solutions, Mobile Accessibility", SVOX AG Product Information Sheet, Online available at: <http://www.svox.com/site/bra840604/con782768/mob965831936.aSQ?osLang=1>, Sep. 27, 2012, 1 page.

Müller et al., "A Taxonomy for Information Linking in Augmented Reality", AVR 2016, Part I, LNCS 9768, 2016, pp. 368-387.

Muller et al., "Control Theoretic Models of Pointing", ACM Transactions on Computer-Human Interaction, Aug. 2017, 36 pages.

My Cool Aids, "What's New", Online available at: http://www.mycoolaids.com/>, 2012, 1 page.

Nakamura et al., "Study of Information Clouding Methods to Prevent Spoilers of Sports Match", Proceedings of the International Working Conference on Advanced Visual Interfaces (AVI'12), ISBN: 978-1-4503-1287-5, May 2012, pp. 661-664.

Nakamura et al., "Study of Methods to Diminish Spoilers of Sports Match: Potential of a Novel Concept "Information Clouding"", vol. 54, No. 4, ISSN: 1882-7764. Online available at: <https://ipsj.ixsq.nii.ac.jp/ej/index.php?active_action=repository_view_main_item_detail&page_id=13&block_id=8&item_id=91589&item_no=1>, Apr. 2013, pp. 1402-1412 (Official Copy Only). {See communication under 37 CFR § 1.98(a) (3)}.

(56) References Cited

OTHER PUBLICATIONS

"Natural Language Interface Using Constrained Intermediate Dictionary of Results", List of Publications Manually reviewed for the Search of U.S. Pat. No. 7,177,798, Mar. 22, 2013, 1 page.
NDTV, "Sony SmartWatch 2 Launched in India for Rs. 14,990", available at: <http://gadgets.ndtv.com/others/news/sony-smartwatch-2-launched-in-india-for-rs-14990-420319>, Sep. 18, 2013, 4 pages.
Norouzian et al., "Exploring Attention Mechanism for Acoustic based Classification of Speech Utterances into System-Directed and Non-System-Directed", International Conference on Acoustics, Speech and Signal Processing (ICASSP). IEEE, Feb. 1, 2019, 5 pages.
Office Action received for Danish Patent Application No. PA202070237, dated Dec. 2, 2021, 2 pages.
Osxdaily, "Get a List of Siri Commands Directly from Siri", Online available at: <http://osxdaily.com/2013/02/05/list-siri-commands/>, Feb. 5, 2013, 15 pages.
Pathak et al., "Privacy-preserving Speech Processing: Cryptographic and String-matching Frameworks Show Promise", In: IEEE signal processing magazine, Online available at:—<http://www.merl.com/publications/docs/TR2013-063.pdf>, Feb. 13, 2013, 16 pages.
Patra et al., "A Kernel-Based Approach for Biomedical Named Entity Recognition", Scientific World Journal, vol. 2013, 2013, pp. 1-7.
Pavlopoulos et al., "ConvAI at SemEval-2019 Task 6: Offensive Language Identification and Categorization with Perspective and BERT", Proceedings of the 13th International Workshop on Semantic Evaluation (SemEval-2019), Jun. 6-7, 2019, pp. 571-576.
PC Mag, "How to Voice Train Your Google Home Smart Speaker", Online available at: <https://in.pcmag.com/google-home/126520/how-to-voice-train-your-google-home-smart-speaker>, Oct. 25, 2018, 12 pages.
Pennington et al., "GloVe: Global Vectors for Word Representation", Proceedings of the Conference on Empirical Methods Natural Language Processing (EMNLP), Doha, Qatar, Oct. 25-29, 2014, pp. 1532-1543.
Philips, Chris, "Thumbprint Radio: A Uniquely Personal Station Inspired by All of Your Thumbs Up", Pandora News, Online Available at: <https://blog.pandora.com/author/chris-phillips/>, Dec. 14, 2015, 7 pages.
Ping et al., "Deep Voice 3: Scaling Text to Speech with Convolutional Sequence Learning", Available online at: https://arxiv.org/abs/1710.07654, Feb. 22, 2018, 16 pages.
"Pose, Cambridge Dictionary Definition of Pose", Available online at: <https://dictionary.cambridge.org/dictionary/english/pose>, 4 pages.
Qian et al., "Single-channel Multi-talker Speech Recognition With Permutation Invariant Training", Speech Communication, Issue 104, 2018, pp. 1-11.
"Radio Stations Tailored to You Based on the Music You Listen to on iTunes", Apple Announces iTunes Radio, Press Release, Jun. 10, 2013, 3 pages.
Rasch, Katharina, "Smart Assistants for Smart Homes", Doctoral Thesis in Electronic and Computer Systems, 2013, 150 pages.
Raux, Antoine, "High-Density Dialog Management The Topic Stack", Adventures in High Density, Online available at: https://medium.com/adventures-in-high-density/high-density-dialog-management-23efcf91db1e, Aug. 1, 2018, 10 pages.
Ravi, Sujith, "Google AI Blog: On-device Machine Intelligence", Available Online at: https://ai.googleblog.com/2017/02/on-device-machine-intelligence.html, Feb. 9, 2017, 4 pages.
Ritchie, Rene, "QuickType keyboard in iOS 8: Explained", Online Available at: <https://www.imore.com/quicktype-keyboards-ios-8-explained>, Jun. 21, 2014, pp. 1-19.
Rodrigues et al., "Exploring Mixed Reality in Specialized Surgical Environments", In Proceedings of the 2017 CHI Conference Extended Abstracts on Human Factors in Computing Systems (CHI EA '17), Denver, CO, USA, Online available at: https://dl.acm.org/doi/pdf/10.1145/3027063.3053273, May 6-11, 2017, pp. 2591-2598.
Ross et al., "Epidemiology as a Framework for Large-Scale Mobile Application Accessibility Assessment", In Proceedings of the 19th International ACM SIGACCESS Conference on Computers and Accessibility (ASSETS '17), Baltimore, MD, USA, Online available at: https://dl.acm.org/doi/pdf/10.1145/3132525.3132547, Oct. 29-Nov. 1, 2017, pp. 2-11.
Routines, "SmartThings Support", Online available at: <https://web.archive.org/web/20151207165701/https://support.smartthings.com/hc/en-us/articles/205380034-Routines>, 2015, 3 pages.
Rowland et al., "Designing Connected Products: UX for the Consumer Internet of Things", O'Reilly, May 2015, 452 pages.
Santos et al., "Fighting Offensive Language on Social Media with Unsupervised Text Style Transfer", Proceedings of the 56th Annual Meeting of the Association for Computational Linguistics (vol. 2: Short Papers), May 20, 2018, 6 pages.
Schenk et al., "GazeEverywhere: Enabling Gaze-only User Interaction on an Unmodified Desktop PC in Everyday Scenarios", In Proceedings of the 2017 CHI Conference on Human Factors in Computing Systems (CHI'17). ACM, New York, NY, 30343044. Online Available at: https://doi.org/10.1145/3025453.3025455, May 6-11, 2017, 11 pages.
Search Report received for Danish Patent Application No. PA201770411, dated Oct. 30, 2017, 9 pages.
Seehafer Brent, "Activate Google Assistant on Galaxy S7 with Screen off", Online available at: <https://productforums.google.com/forum/#!topic/websearch/Ip3qIGBHLVI>, Mar. 8, 2017, 4 pages.
Selfridge et al., "Interact: Tightly-coupling Multimodal Dialog with an Interactive Virtual Assistant", International Conference on Multimodal Interaction, ACM, Nov. 9, 2015, pp. 381-382.
Senior et al., "Improving DNN Speaker Independence With I-Vector Inputs", ICASSP, 2014, pp. 225-229.
Seroter et al., "SOA Patterns with BizTalk Server 2013 and Microsoft Azure", Packt Publishing, Jun. 2015, 454 pages.
Settle et al., "End-to-End Multi-Speaker Speech Recognition", Proc. ICASSP, Apr. 2018, 6 pages.
Shen et al., "Style Transfer from Non-Parallel Text by Cross-Alignment", 31st Conference on Neural Information Processing Systems (NIPS 2017), 2017, 12 pages.
Sigtia et al., "Efficient Voice Trigger Detection for Low Resource Hardware", in Proc. Interspeech 2018, Sep. 2-6, 2018, pp. 2092-2096.
Sigtia et al., "Multi-Task Learning for Voice Trigger Detection", in IEEE International Conference on Acoustics, Speech and Signal Processing (ICASSP), 2020, Apr. 20, 2020, 5 pages.
Simonite, Tom, "Confronting Siri: Microsoft Launches Digital Assistant Cortana", 2014, 2 pages (Official Copy Only). {See communication under 37 CFR § 1.98(a) (3)}.
"Skilled at Playing my iPhone 5", Beijing Hope Electronic Press, Jan. 2013, 6 pages (Official Copy Only). {See communication under 37 CFR § 1.98(a) (3)}.
"SmartThings +Amazon Echo", Smartthings Samsung [online], Online available at: <https://web.archive.org/web/20160509231428/https://blog.smartthings.com/featured/alexa-turn-on-my-smartthings/>, Aug. 21, 2015, 3 pages.
Smith, Jake, "Amazon Alexa Calling: How to Set it up and Use it on Your Echo", iGeneration, May 30, 2017, 5 pages.
Song, Yang, "Research of Chinese Continuous Digital Speech Input System Based on HTK", Computer and Digital Engineering, vol. 40, No. 4, Dec. 31, 2012, 5 pages (Official Copy Only). {See communication under 37 CFR § 1.98(a) (3)}.
Speicher et al., "What is Mixed Reality?", In Proceedings of the 2019 CHI Conference on Human Factors in Computing Systems (CHI '19). ACM, Article 537, Glasgow, Scotland, UK, Online available at: https://dl.acm.org/doi/pdf/10.1145/3290605.3300767, May 4-9, 2019, 15 pages.
Sperber et al., "Self-Attentional Models for Lattice Inputs", in Proceedings of the 57th Annual Meeting of the Association for Computational Linguistics, Florence, Italy, Association for Computational Linguistics, Jun. 4, 2019, 13 pages.
SRI, "SRI Speech: Products: Software Development Kits: EduSpeak", Online available at: <http://web.archive.org/web/20090828084033/http://www.speechatsri.com/products/eduspeak>shtml, retrieved on Jun. 20, 2013, pp. 1-2.

(56) References Cited

OTHER PUBLICATIONS

Sundaram et al., "Latent Perceptual Mapping with Data-Driven Variable-Length Acoustic Units for Template-Based Speech Recognition", ICASSP 2012, Mar. 2012, pp. 4125-4128.
Sundermeyer et al., "From Feedforward to Recurrent LSTM Neural Networks for Language Modeling.", IEEE Transactions to Audio, Speech, and Language Processing, vol. 23, No. 3, Mar. 2015, pp. 517-529.
Sundermeyer et al., "LSTM Neural Networks for Language Modeling", INTERSPEECH 2012, Sep. 9-13, 2012, pp. 194-197.
Sutskever et al., "Sequence to Sequence Learning with Neural Networks", Proceedings of the 27th International Conference on Neural Information Processing Systems, 2014, 9 pages.
Tamar et al., "Value Iteration Networks", Advances in Neural Information Processing Systems, vol. 29, 2016, 16 pages.
Tan et al., "Knowledge Transfer in Permutation Invariant Training for Single-channel Multi-talker Speech Recognition", ICASSP 2018, 2018, pp. 5714-5718.
Tech Target Contributor, "AI Accelerator", Available online at: https://searchenterpriseai.techtarget.com/definition/AI-accelerator, Apr. 2018, 3 pages.
Tech With Brett, "Everything the Google Nest Hub Can Do", Available online at: https://www.youtube.com/watch?v=x3vdytgru2E, Nov. 12, 2018, 13 pages.
Tkachenko, Sergey, "Chrome will automatically create Tab Groups", Available online at: https://winaero.com/chrome-will-automatically-create-tab-groups/, Sep. 18, 2020, 5 pages.
Tkachenko, Sergey, "Enable Tab Groups Auto Create in Google Chrome", Available online at: https://winaero.com/enable-tab-groups-auto-create-in-google-chrome/, Nov. 30, 2020, 5 pages.
Tofel et al., "SpeakToit: A Personal Assistant for Older iPhones, iPads", Apple News, Tips and Reviews, Feb. 9, 2012, 7 pages.
"Use Macrodroid skillfully to automatically clock in with Ding Talk", Online available at: https://blog.csdn.net/qq_26614295/article/details/84304541, Nov. 20, 2018, 11 pages (Official Copy Only). {See communication under 37 CFR § 1.98(a) (3)}.
Vaswani et al., "Attention Is All You Need", 31st Conference on Neural Information Processing Systems (NIPS 2017), 2017, pp. 1-11.
Vazquez et al., "An Assisted Photography Framework to Help Visually Impaired Users Properly Aim a Camera", ACM Transactions on Computer-Human Interaction, vol. 21, No. 5, Article 25, Online available at: https://dl.acm.org/doi/pdf/10.1145/2651380, Nov. 2014, 29 pages.
Villemure et al., "The Dragon Drive Innovation Showcase: Advancing the State-of-the-art in Automotive Assistants", 2018, 7 pages.
Walker, Amy, "NHS Gives Amazon Free Use of Health Data Under Alexa Advice Deal", Available online at: <https://www.theguardian.com/society/2019/dec/08/nhs-gives-amazon-free-use-of-health-data-under-alexa-advice-deal>, 3 pages.
Wang et al., "End-to-end Anchored Speech Recognition", Proc. ICASSP2019, May 12-17, 2019, 5 pages.
Wang et al., "Tacotron: Towards End to End Speech Synthesis", Available online at: https://arxiv.org/abs/1703.10135, Apr. 6, 2017, 10 pages.
Wang et al., "Training Deep Neural Networks with 8-bit Floating Point Numbers", 32nd Conference on Neural Information Processing Systems (Neurl PS 2018), 2018, 10 pages.
Wei et al., "Design and Implement on Smart Home System", 2013 Fourth International Conference on Intelligent Systems Design and Engineering Applications, Available online at: https://ieeexplore.ieee.org/document/6843433, 2013, pp. 229-231.
Weng et al., "Deep Neural Networks for Single-Channel Multi-Talker Speech Recognition", IEEE/ACM Transactions on Audio, Speech, and Language Processing, vol. 23, No. 10, Oct. 2015, pp. 1670-1679.
"What's on Spotify?", Music for everyone, Online Available at: <https://web.archive.org/web/20160428115328/https://www.spotify.com/us/>, Apr. 28, 2016, 6 pages.
Wikipedia, "Home Automation", Online Available at: <https://en.wikipedia.org/w/index.php?title=Home_automation&oldid=686569068>, Oct. 19, 2015, 9 pages.
Wikipedia, "Siri", Online Available at: <https://en.wikipedia.org/w/index.php?title=Siri&oldid=689697795>, Nov. 8, 2015, 13 pages.
Wikipedia, "Virtual Assistant", Wikipedia, Online Available at: <https://en.wikipedia.org/w/index.php?title=Virtual_assistant&oldid=679330666>, Sep. 3, 2015, 4 pages.
Win et al., "Myanmar Text to Speech System based on Tacotron-2", International Conference on Information and Communication Tehcnology Convergence (ICTC), Oct. 21-23, 2020, pp. 578-583.
Wu et al., "Monophone-Based Background Modeling for Two-Stage On-device Wake Word Detection", in 2018 IEEE International Conference on Acoustics, Speech and Signal Processing (ICASSP), Apr. 2018, 5 pages.
X.AI, "How it Works", Online available at: <https://web.archive.org/web/20160531201426/https://x.ai/how-it-works/>, May 31, 2016, 6 pages.
Xiang et al., "Correcting Phoneme Recognition Errors in Learning Word Pronunciation through Speech Interaction", Speech Communication, vol. 55, No. 1, Jan. 1, 2013, pp. 190-203.
Xu et al., "Policy Optimization of Dialogue Management in Spoken Dialogue System for Out-of-Domain Utterances", 2016 International Conference on Asian Language Processing (IALP), IEEE, Nov. 21, 2016, pp. 10-13.
Xu et al., "Show, Attend and Tell: Neural Image Caption Generation with Visual Attention", Proceedings of the 32nd International Conference on Machine Learning, Lille, France, 2015, 10 pages.
Yan et al., "A Scalable Approach to Using DNN-derived Features in GMM-HMM Based Acoustic Modeling for LVCSR", 14th Annual Conference of the International Speech Communication Association, InterSpeech 2013, Aug. 2013, pp. 104-108.
Yates, Michael C., "How Can I Exit Google Assistant After I'm Finished with it", Online available at:—<https://productforums.google.com/forum/#!msg/phone-by-google/faECnR2RJwA/gKNtOkQgAQAJ>, Jan. 11, 2016, 2 pages.
Ye et al., "iPhone 4S Native Secret", Jun. 30, 2012, 1 page (Official Copy Only). {See communication under 37 CFR § 1.98(a) (3)}.
Yeh Jui-Feng, "Speech Act Identification Using Semantic Dependency Graphs With Probabilistic Context-free Grammars", ACM Transactions on Asian and Low-Resource Language Information Processing, vol. 15, No. 1, Dec. 2015, pp. 5.1-5.28.
Young et al., "POMDP-Based Statistical Spoken Dialog Systems: A Review", Proceedings of the IEEE, vol. 101, No. 5, 2013, 18 pages.
Yu et al., "Permutation Invariant Training of Deep Models for Speaker-Independent Multi-talker Speech Separation", Proc. ICASSP, 2017, 5 pages.
Yu et al., "Recognizing Multi-talker Speech with Permutation Invariant Training", Interspeech 2017, Aug. 20-24, 2017, pp. 2456-2460.
Zainab, "Google Input Tools Shows Onscreen Keyboard in Multiple Languages [Chrome]", Online available at: <http://www.addictivetips.com/internet-tips/google-input-tools-shows-multiple-language-onscreen-keyboards-chrome/>, Jan. 3, 2012, 3 pages.
Zhan et al., "Play with Android Phones", Feb. 29, 2012, 1 page (Official Copy Only). {See communication under 37 CFR § 1.98(a) (3)}.
Zhang et al., "Interaction Proxies for Runtime Repair and Enhancement of Mobile Application Accessibility", In Proceedings of the 2017 CHI Conference on Human Factors in Computing Systems (CHI '17). ACM, Denver, CO, USA, Online available at: https://dl.acm.org/doi/pdf/10.1145/3025453.3025846, May 6-11, 2017, pp. 6024-6037.
Zhang et al., "Very Deep Convolutional Networks for End-To-End Speech Recognition", IEEE International Conference on Acoustics, Speech and Signal Processing (ICASSP), 2017, 5 pages.
Zhao et al., "CueSee: Exploring Visual Cues for People with Low Vision to Facilitate a Visual Search Task", In Proceedings of the 2016 ACM International Joint Conference on Pervasive and Ubiquitous Computing. ACM, UbiComp '16, Heidelberg, Germany, Online available at: https://dl.acm.org/doi/pdf/10.1145/2971648.2971730, Sep. 12-16, 2016, pp. 73-84.

(56) References Cited

OTHER PUBLICATIONS

Zhao et al., "Enabling People with Visual Impairments to Navigate Virtual Reality with a Haptic and Auditory Cane Simulation", In Proceedings of the 2018 CHI Conference on Human Factors in Computing Systems (CHI '18). ACM, Article 116, Montréal, QC, Canada, Online available at: https://dl.acm.org/doi/pdf/10.1145/3173574.3173690, Apr. 21-26, 2018, 14 pages.

Zhao et al., "SeeingVR: A Set of Tools to Make Virtual Reality More Accessible to People with Low Vision", In Proceedings of the 2019 CHI Conference on Human Factors in Computing Systems (CHI '19). ACM, Article 111, Glasgow, Scotland, UK, Online available at: https://dl.acm.org/doi/pdf/10.1145/3290605.3300341, May 4-9, 2019, 14 pages.

Zheng et al., "Intent Detection and Semantic Parsing for Navigation Dialogue Language Processing", 2017 IEEE 20th International Conference on Intelligent Transportation Systems (ITSC), 2017, 6 pages.

Zhong et al., "JustSpeak: Enabling Universal Voice Control on Android", W4A'14, Proceedings of the 11th Web for All Conference, No. 36, Apr. 7-9, 2014, 8 pages.

Zhou et al., "Learning Dense Correspondence via 3D-guided Cycle Consistency", Proceedings of the IEEE Conference on Computer Vision and Pattern Recognition (CVPR), 2016, 10 pages.

Zmolikova et al., "Speaker-Aware Neural Network Based Beamformer for Speaker Extraction in Speech Mixtures", Interspeech 2017, Aug. 20-24, 2017, pp. 2655-2659.

Notice of Allowance received for Chinese Patent Application No. 201880031599.1, dated Feb. 21, 2023, 5 pages (3 pages of English Translation and 2 pages of Official Copy).

Office Action received for European Patent Application No. 18726271.2, dated Jul. 27, 2023, 3 pages.

Office Action received for Chinese Patent Application No. 201880031599.1, mailed on Sep. 7, 2022, 17 pages (9 pages of English Translation and 8 pages of Official Copy).

* cited by examiner

MULTI-MODAL INTERFACES HAVING SELECTION DISAMBIGUATION AND TEXT MODIFICATION CAPABILITY

This application is a continuation of U.S. Nonprovisional patent application Ser. No. 15/917,410, entitled "MULTI-MODAL INTERFACES," filed on Mar. 9, 2018, which claims priority from U.S. Provisional Patent Application Ser. No. 62/506,571, entitled "MULTI-MODAL INTERFACES," filed on May 15, 2017, the content of which is hereby incorporated by reference in its entirety for all purposes.

FIELD

The present disclosure relates generally to user interfaces and, more specifically, to multi-modal user interfaces.

BACKGROUND

Intelligent automated assistants (or digital assistants) can provide a beneficial interface between human users and electronic devices. Such assistants can allow users to interact with devices or systems using natural language in spoken and/or text forms. For example, a user can provide a speech input including a user request to a digital assistant operating on an electronic device. The digital assistant can interpret the user's intent from the speech input and operationalize the user's intent into one or more tasks. The tasks can then be performed by executing one or more services of the electronic device, and a relevant output responsive to the user request can be returned to the user. Typically, however, digital assistants are limited in the manner in which they provide interaction between human users and electronic devices. In many instances such interactions are limited to a single mode of interaction.

SUMMARY

Example methods are disclosed herein. An example method includes, at an electronic device having one or more processors and a touch-sensitive display, receiving a first user input of a first input type, the first user input including a plurality of words; displaying, on the touch-sensitive display, the plurality of words; receiving a second user input of a second input type indicating a selection of a word of the plurality of words, the second input type different than the first input type; receiving a third user input; modifying the selected word based on the third user input to provide a modified one or more words; and displaying, on the touch-sensitive display, the modified one or more words.

An example method includes, at an electronic device having one or more processors, receiving context information associated with the electronic device; determining whether one or more criteria for disabling an output type are met based on the context information associated with the electronic device; and in accordance with a determination that the one or more criteria for disabling the output type are met, disabling the output type.

An example method includes, at an electronic device having one or more processors, receiving a user input of a first input type, the user input indicative of a task; performing the task in response to the user input; determining whether the task may be performed in response to a user input of a second input type; and in accordance with a determination that the task may be performed in response to a user input of a second input type, providing an output indicative of the user input of the second input type.

An example method includes, at an electronic device having one or more processors, receiving a user input of a first input type, the user input indicative of a task; determining whether additional input is required to perform the task; and in accordance with a determination that additional input is required to perform the task: requesting a user input of a second input type; receiving the user input of the second input type; and performing the task based on the user input of the second input type.

Example non-transitory computer-readable media are disclosed herein. An example non-transitory computer-readable storage medium stores one or more programs. The one or more programs comprise instructions, which when executed by one or more processors of an electronic device having a touch-sensitive display, cause the electronic device to receive a first user input of a first input type, the first user input including a plurality of words; display, on the touch-sensitive display, the plurality of words; receive a second user input of a second input type indicating a selection of a word of the plurality of words, the second input type different than the first input type; receive a third user input; modify the selected word based on the third user input to provide a modified one or more words; and display, on the touch-sensitive display, the modified one or more words.

An example non-transitory computer-readable storage medium stores one or more programs. The one or more programs comprise instructions, which when executed by one or more processors of an electronic device, cause the electronic device to receive context information associated with the electronic device; determine whether one or more criteria for disabling an output type are met based on the context information associated with the electronic device; and in accordance with a determination that the one or more criteria for disabling the output type are met, disable the output type.

An example non-transitory computer-readable storage medium stores one or more programs. The one or more programs comprise instructions, which when executed by one or more processors of an electronic device, cause the electronic device to receive a user input of a first input type, the user input indicative of a task; perform the task in response to the user input; determine whether the task may be performed in response to a user input of a second input type; and in accordance with a determination that the task may be performed in response to a user input of a second input type, provide an output indicative of the user input of the second input type.

An example non-transitory computer-readable storage medium stores one or more programs. The one or more programs comprise instructions, which when executed by one or more processors of an electronic device, cause the electronic device to receive a user input of a first input type, the user input indicative of a task; determine whether additional input is required to perform the task; and in accordance with a determination that additional input is required to perform the task: request a user input of a second input type; receive the user input of the second input type; and perform the task based on the user input of the second input type.

Example electronic devices are disclosed herein. An example electronic device comprises one or more processors; a memory; and one or more programs, where the one or more programs are stored in the memory and configured to be executed by the one or more processors, the one or more programs including instructions for receiving a first user input of a first input type, the first user input including a plurality of words; displaying, on the touch-sensitive display, the plurality of words; receiving a second user input of a second input type indicating a selection of a word of the plurality of words, the second input type different than the first input type; receiving a third user input; modifying the selected word based on the third user input to provide a modified one or more words; and displaying, on the touch-sensitive display, the modified one or more words.

An example electronic device comprises one or more processors; a memory; and one or more programs, where the one or more programs are stored in the memory and configured to be executed by the one or more processors, the one or more programs including instructions for receiving context information associated with the electronic device; determining whether one or more criteria for disabling an output type are met based on the context information associated with the electronic device; and in accordance with a determination that the one or more criteria for disabling the output type are met, disabling the output type.

An example electronic device comprises one or more processors; a memory; and one or more programs, where the one or more programs are stored in the memory and configured to be executed by the one or more processors, the one or more programs including instructions for receiving a user input of a first input type, the user input indicative of a task; performing the task in response to the user input; determining whether the task may be performed in response to a user input of a second input type; and in accordance with a determination that the task may be performed in response to a user input of a second input type, providing an output indicative of the user input of the second input type.

An example electronic device comprises one or more processors; a memory; and one or more programs, where the one or more programs are stored in the memory and configured to be executed by the one or more processors, the one or more programs including instructions for receiving a user input of a first input type, the user input indicative of a task; determining whether additional input is required to perform the task; and in accordance with a determination that additional input is required to perform the task: requesting a user input of a second input type; receiving the user input of the second input type; and performing the task based on the user input of the second input type.

An example electronic device comprises means for receiving a first user input of a first input type, the first user input including a plurality of words; means for displaying, on the touch-sensitive display, the plurality of words; means for receiving a second user input of a second input type indicating a selection of a word of the plurality of words, the second input type different than the first input type; means for receiving a third user input; modifying the selected word based on the third user input to provide a modified one or more words; and means for displaying, on the touch-sensitive display, the modified one or more words.

An example electronic device comprises means for receiving context information associated with the electronic device; means for determining whether one or more criteria for disabling an output type are met based on the context information associated with the electronic device; and means for, in accordance with a determination that the one or more criteria for disabling the output type are met, disabling the output type.

An example electronic device comprises means for receiving a user input of a first input type, the user input indicative of a task; means for performing the task in response to the user input; means for determining whether the task may be performed in response to a user input of a second input type; and means for, in accordance with a determination that the task may be performed in response to a user input of a second input type, providing an output indicative of the user input of the second input type.

An example electronic device comprises means for receiving a user input of a first input type, the user input indicative of a task; means for determining whether additional input is required to perform the task; and means for, in accordance with a determination that additional input is required to perform the task: requesting a user input of a second input type; receiving the user input of the second input type; and performing the task based on the user input of the second input type.

Receiving a user input indicating a selection of a word of the plurality of words and modifying the selected word based on the third user input to provide a modified one or more words allows the electronic device to intuitively and reliably interact with a user of the electronic device. Improving interactions between a user and the electronic device in this manner enhances the operability of the electronic device and makes the user-device interface more efficient which, additionally, reduces power usage and improves battery life of the device by enabling the user to use the device more quickly and efficiently.

Determining whether one or more criteria for disabling an output type are met based on the context information associated with the electronic device and selectively disabling the output type allows the electronic device to provide outputs in an intuitive and appropriate manner. Improving the manner in which outputs are provided enhances user experience by ensuring that outputs are provided to the user according to user preferences and circumstances. Further, selectively disabling outputs ensures that outputs are not needlessly provided to a user, which, additionally, reduces power usage and improves battery life of the devices.

Determining whether a task may be performed in response to a user input and selectively providing an output indicative of the user input allows the electronic device to indicate to a user additional and alternative ways in which the electronic device may be operated. Indicating alternative inputs to a user in this manner enhances the operability of the device and makes the user-device interface more efficient (e.g., by ensuring that a user is aware of intuitive, reliable, and/or efficient inputs that may be used, for instance, to provide user requests to a digital assistant of the electronic device) which, additionally, reduces power usage and improves battery life of the device by enabling the user to use the device more quickly and efficiently.

Determining whether additional input is required to perform a task and requesting the additional input according to an input of a particular type allows the electronic device to request input in a manner determined to be most intuitive and/or efficient for providing the input. Improving the manner in which inputs are provided enhances the operability of the device and makes the user-device interface more efficient (e.g., by indicating the input type that is best used to provide inputs having the input type) which, additionally, reduces power usage and improves battery life of the device by enabling the user to use the device more quickly and efficiently.

DETAILED DESCRIPTION

In the following description of examples, reference is made to the accompanying drawings in which are shown by way of illustration specific examples that can be practiced. It is to be understood that other examples can be used and structural changes can be made without departing from the scope of the various examples.

Although the following description uses terms "first," "second," etc. to describe various elements, these elements should not be limited by the terms. These terms are only used to distinguish one element from another. For example, a first input could be termed a second input, and, similarly, a second input could be termed a first input, without departing from the scope of the various described examples. The first input and the second input are both inputs and, in some cases, are separate and different inputs.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1. System and Environment

Figure 1:
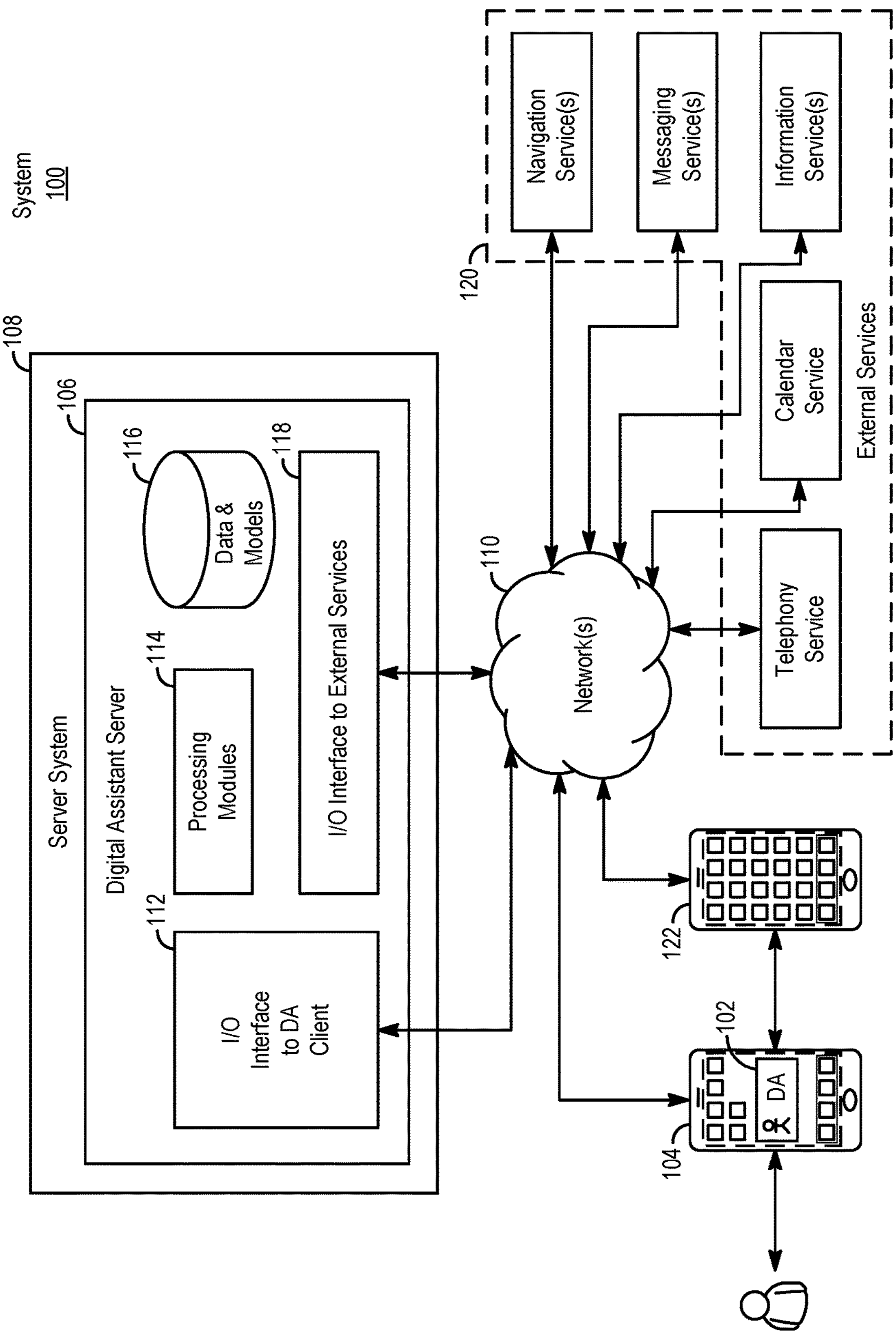
FIG. 1 is a block diagram illustrating a system and environment for implementing a digital assistant, according to various examples.

FIG. 1 illustrates a block diagram of system 100 according to various examples. In some examples, system 100 implements a digital assistant. The terms "digital assistant," "virtual assistant," "intelligent automated assistant," or "automatic digital assistant" refer to any information processing system that interprets natural language input in spoken and/or textual form to infer user intent, and performs actions based on the inferred user intent. For example, to act on an inferred user intent, the system performs one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant is capable of accepting a user request at least partially in the form of a natural language command, request, statement, narrative, and/or inquiry. Typically, the user request seeks either an informational answer or performance of a task by the digital assistant. A satisfactory response to the user request includes a provision of the requested informational answer, a performance of the requested task, or a combination of the two. For example, a user asks the digital assistant a question, such as "Where am I right now?" Based on the user's current location, the digital assistant answers, "You are in Central Park near the west gate." The user also requests the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant sometimes interacts with the user in a continuous dialogue involving multiple exchanges of information over an extended period of time.

There are numerous other ways of interacting with a digital assistant to request information or performance of various tasks. In addition to providing verbal responses and taking programmed actions, the digital assistant also provides responses in other visual or audio forms, e.g., as text, alerts, music, videos, animations, etc.

As shown in FIG. 1, in some examples, a digital assistant is implemented according to a client-server model. The digital assistant includes client-side portion 102 (hereafter "DA client 102") executed on user device 104 and server-side portion 106 (hereafter "DA server 106") executed on server system 108. DA client 102 communicates with DA server 106 through one or more networks 110. DA client 102 provides client-side functionalities such as user-facing input and output processing and communication with DA server 106. DA server 106 provides server-side functionalities for any number of DA clients 102 each residing on a respective user device 104.

In some examples, DA server 106 includes client-facing I/O interface 112, one or more processing modules 114, data and models 116, and I/O interface to external services 118. The client-facing I/O interface 112 facilitates the client-facing input and output processing for DA server 106. One or more processing modules 114 utilize data and models 116 to process speech input and determine the user's intent based on natural language input. Further, one or more processing modules 114 perform task execution based on inferred user intent. In some examples, DA server 106 communicates with external services 120 through network(s) 110 for task completion or information acquisition. I/O interface to external services 118 facilitates such communications.

User device 104 can be any suitable electronic device. In some examples, user device is a portable multifunctional device (e.g., device 200, described below with reference to FIG. 2A), a multifunctional device (e.g., device 400, described below with reference to FIG. 4), or a personal electronic device (e.g., device 600, described below with reference to FIG. 6A-6B.) A portable multifunctional device is, for example, a mobile telephone that also contains other functions, such as PDA and/or music player functions. Specific examples of portable multifunction devices include the iPhone®, iPod Touch®, and iPad® devices from Apple Inc. of Cupertino, California Other examples of portable multifunction devices include, without limitation, laptop or tablet computers. Further, in some examples, user device 104 is a non-portable multifunctional device. In particular, user device 104 is a desktop computer, a game console, a television, or a television set-top box. In some examples, user device 104 includes a touch-sensitive surface (e.g., touch screen displays and/or touchpads). Further, user device 104 optionally includes one or more other physical user-interface devices, such as a physical keyboard, a mouse, and/or a joystick. Various examples of electronic devices, such as multifunctional devices, are described below in greater detail.

Examples of communication network(s) 110 include local area networks (LAN) and wide area networks (WAN), e.g., the Internet. Communication network(s) 110 is implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more standalone data processing apparatus or a distributed network of computers. In some examples, server system 108 also employs various virtual devices and/or services of third-party service providers (e.g., third-party cloud service providers) to provide the underlying computing resources and/or infrastructure resources of server system 108.

In some examples, user device 104 communicates with DA server 106 via second user device 122. Second user device 122 is similar or identical to user device 104. For example, second user device 122 is similar to devices 200, 400, or 600 described below with reference to FIGS. 2A, 4, and 6A-6B. User device 104 is configured to communicatively couple to second user device 122 via a direct communication connection, such as Bluetooth, NFC, BTLE, or the like, or via a wired or wireless network, such as a local Wi-Fi network. In some examples, second user device 122 is configured to act as a proxy between user device 104 and DA server 106. For example, DA client 102 of user device 104 is configured to transmit information (e.g., a user request received at user device 104) to DA server 106 via second user device 122. DA server 106 processes the information and return relevant data (e.g., data content responsive to the user request) to user device 104 via second user device 122.

In some examples, user device 104 is configured to communicate abbreviated requests for data to second user device 122 to reduce the amount of information transmitted from user device 104. Second user device 122 is configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it should be appreciated that system 100, in some examples, includes any number and type of user devices configured in this proxy configuration to communicate with DA server system 106.

Although the digital assistant shown in FIG. 1 includes both a client-side portion (e.g., DA client 102) and a server-side portion (e.g., DA server 106), in some examples, the functions of a digital assistant are implemented as a standalone application installed on a user device. In addition, the divisions of functionalities between the client and server portions of the digital assistant can vary in different implementations. For instance, in some examples, the DA client is a thin-client that provides only user-facing input and output processing functions, and delegates all other functionalities of the digital assistant to a backend server.

2. Electronic Devices

Figure 2A:
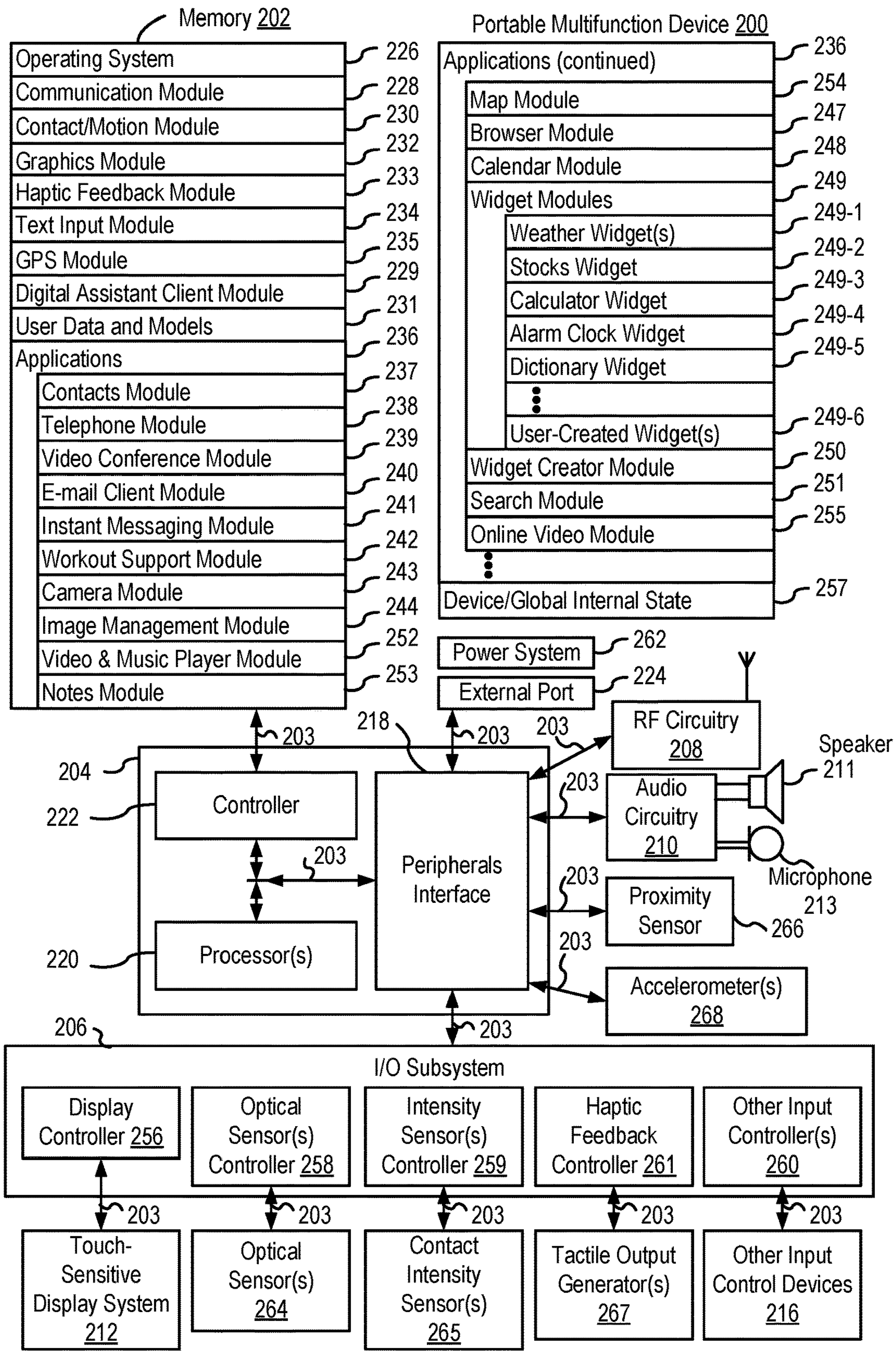
FIG. 2A is a block diagram illustrating a portable multifunction device implementing the client-side portion of a digital assistant, according to various examples.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 includes one or more computer-readable storage mediums. The computer-readable storage mediums are, for example, tangible and non-transitory. Memory 202 includes high-speed random access memory and also includes non-volatile memory, such as one or more magnetic disk storage devices, flash memory devices, or other non-volatile solid-state memory devices. Memory controller 222 controls access to memory 202 by other components of device 200.

In some examples, a non-transitory computer-readable storage medium of memory 202 is used to store instructions (e.g., for performing aspects of processes described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of the processes described below) are stored on a non-transitory computer-readable storage medium (not shown) of the server system 108 or are divided between the non-transitory computer-readable storage medium of memory 202 and the non-transitory computer-readable storage medium of server system 108.

Peripherals interface 218 is used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 are implemented on a single chip, such as chip 204. In some other embodiments, they are implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data are retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button disengages a lock of touch screen 212 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) turns power to device 200 on or off. The user is able to customize a functionality of one or more of the buttons. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output includes graphics, text, icons, video, and any combination thereof (collectively termed "graphics"). In some embodiments, some or all of the visual output correspond to user-interface objects.

Touch screen 212 has a touch-sensitive surface, sensor, or set of sensors that accepts input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user-interface objects (e.g., one or more soft keys, icons, web pages, or images) that are displayed on touch screen 212. In an exemplary embodiment, a point of contact between touch screen 212 and the user corresponds to a finger of the user.

Touch screen 212 uses LCD (liquid crystal display) technology, LPD (light emitting polymer display) technology, or LED (light emitting diode) technology, although other display technologies may be used in other embodiments. Touch screen 212 and display controller 256 detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone® and iPod Touch® from Apple Inc. of Cupertino, California.

A touch-sensitive display in some embodiments of touch screen 212 is analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some embodiments of touch screen 212 is as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 has, for example, a video resolution in excess of 100 dpi. In some embodiments, the touch screen has a video resolution of approximately 160 dpi. The user makes contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 includes a touchpad (not shown) for activating or deactivating particular functions. In some embodiments, the touchpad is a touch-sensitive area of the device that, unlike the touch screen, does not display visual output. The touchpad is a touch-sensitive surface that is separate from touch screen 212 or an extension of the touch-sensitive surface formed by the touch screen.

Device 200 also includes power system 262 for powering the various components. Power system 262 includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 200 also includes one or more optical sensors 264. FIG. 2A shows an optical sensor coupled to optical sensor controller 258 in I/O subsystem 206. Optical sensor 264 includes charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 captures still images or video. In some embodiments, an optical sensor is located on the back of device 200, opposite touch screen display 212 on the front of the device so that the touch screen display is used as a viewfinder for still and/or video image acquisition. In some embodiments, an optical sensor is located on the front of the device so that the user's image is obtained for video conferencing while the user views the other video conference participants on the touch screen display. In some embodiments, the position of optical sensor 264 can be changed by the user (e.g., by rotating the lens and the sensor in the device housing) so that a single optical sensor 264 is used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 also includes one or more proximity sensors 266. FIG. 2A shows proximity sensor 266 coupled to peripherals interface 218. Alternately, proximity sensor 266 is coupled to input controller 260 in I/O subsystem 206. Proximity sensor 266 is performed as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 also includes one or more accelerometers 268. FIG. 2A shows accelerometer 268 coupled to peripherals interface 218. Alternately, accelerometer 268 is coupled to an input controller 260 in I/O subsystem 206. Accelerometer 268 performs, for example, as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

Figure 4:
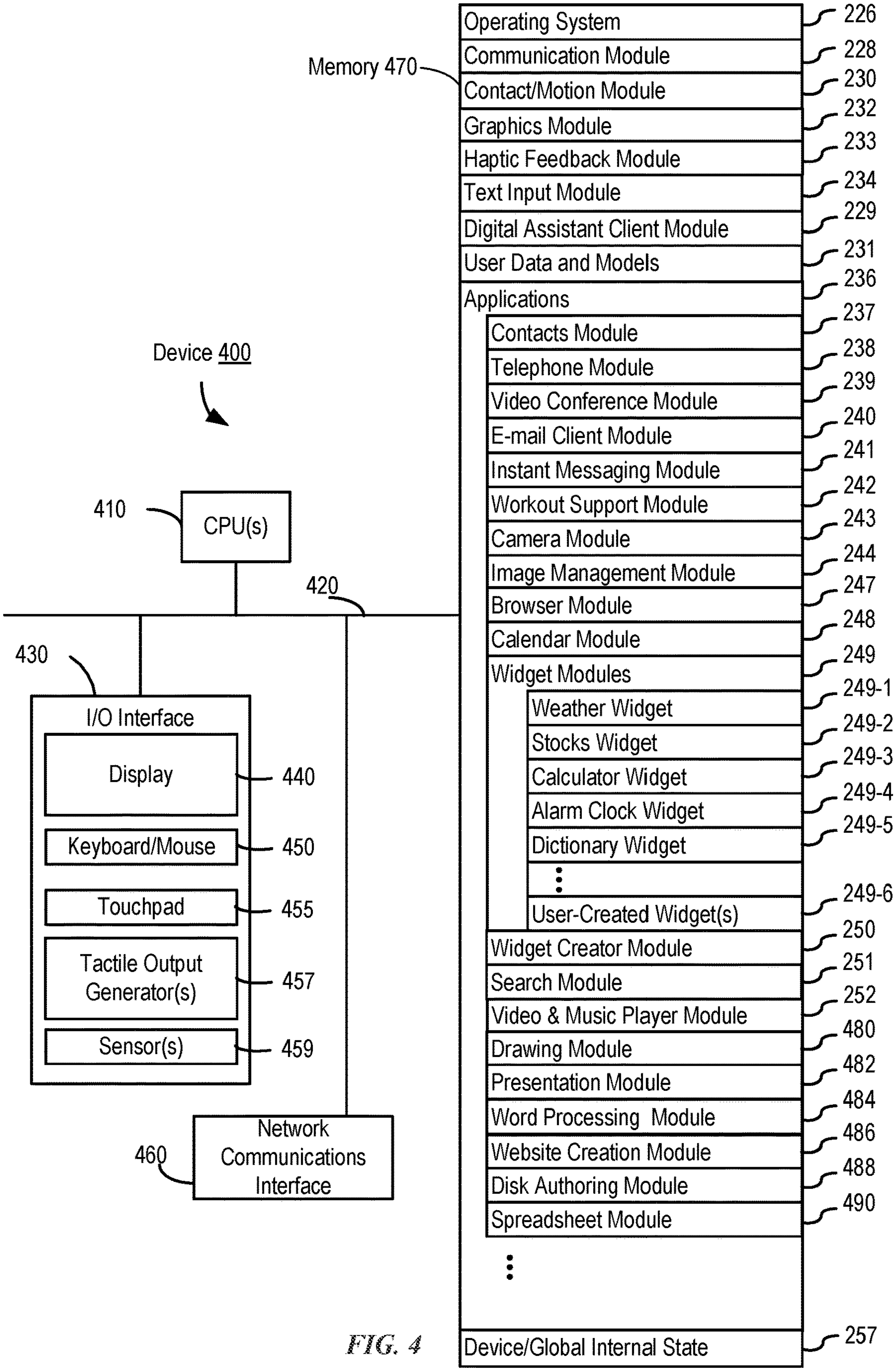
FIG. 4 is a block diagram of an exemplary multifunction device with a display and a touch-sensitive surface, according to various examples.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 stores data and models, such as user data and models 231. Furthermore, in some embodiments, memory 202 (FIG. 2A) or 470 (FIG. 4) stores device/global internal state 257, as shown in FIGS. 2A and 4. Device/global internal state 257 includes one or more of: active application state, indicating which applications, if any, are currently active; display state, indicating what applications, views or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data, and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which is, in some examples, a component of graphics module 232, provides soft keyboards for entering text in various applications (e.g., contacts 237, email 240, IM 241, browser 247, and any other application that needs text input).

GPS module 235 determines the location of the device and provides this information for use in various applications (e.g., to telephone 238 for use in location-based dialing; to camera 243 as picture/video metadata; and to applications that provide location-based services such as weather widgets, local yellow page widgets, and map/navigation widgets).

Digital assistant client module 229 includes various client-side digital assistant instructions to provide the client-side functionalities of the digital assistant. For example, digital assistant client module 229 is capable of accepting voice input (e.g., speech input), text input, touch input, and/or gestural input through various user interfaces (e.g., microphone 213, accelerometer(s) 268, touch-sensitive display system 212, optical sensor(s) 229, other input control devices 216, etc.) of portable multifunction device 200. Digital assistant client module 229 is also capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output is provided as voice, sound, alerts, text messages, menus, graphics, videos, animations, vibrations, and/or combinations of two or more of the above. During operation, digital assistant client module 229 communicates with DA server 106 using RF circuitry 208.

User data and models 231 include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 include various models (e.g., speech recognition models, statistical language models, natural language processing models, ontology, task flow models, service models, etc.) for processing user input and determining user intent.

In some examples, digital assistant client module 229 utilizes the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 provides the contextual information or a subset thereof with the user input to DA server 106 to help infer the user's intent. In some examples, the digital assistant also uses the contextual information to determine how to prepare and deliver outputs to the user. Contextual information is referred to as context data.

In some examples, the contextual information that accompanies the user input includes sensor information, e.g., lighting, ambient noise, ambient temperature, images or videos of the surrounding environment, etc. In some examples, the contextual information can also includes the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 is provided to DA server 106 as contextual information associated with a user input.

In some examples, the digital assistant client module 229 selectively provides information (e.g., user data 231) stored on the portable multifunction device 200 in response to requests from DA server 106. In some examples, digital assistant client module 229 also elicits additional input from the user via a natural language dialogue or other user interfaces upon request by DA server 106. Digital assistant client module 229 passes the additional input to DA server 106 to help DA server 106 in intent deduction and/or fulfillment of the user's intent expressed in the user request.

A more detailed description of a digital assistant is described below with reference to FIGS. 7A-C. It should be recognized that digital assistant client module 229 can include any number of the sub-modules of digital assistant module 726 described below.

Applications 236 include the following modules (or sets of instructions), or a subset or superset thereof:

- Contacts module 237 (sometimes called an address book or contact list);
- Telephone module 238;
- Video conference module 239;
- E-mail client module 240;
- Instant messaging (IM) module 241;
- Workout support module 242;
- Camera module 243 for still and/or video images;
- Image management module 244;
- Video player module;
- Music player module;
- Browser module 247;
- Calendar module 248;
- Widget modules 249, which includes, in some examples, one or more of: weather widget 249-1, stocks widget 249-2, calculator widget 249-3, alarm clock widget 249-4, dictionary widget 249-5, and other widgets obtained by the user, as well as user-created widgets 249-6;
- Widget creator module 250 for making user-created widgets 249-6;
- Search module 251;
- Video and music player module 252, which merges video player module and music player module;
- Notes module 253;
- Map module 254; and/or
- Online video module 255.

Examples of other applications 236 that are stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 are used to manage an address book or contact list (e.g., stored in application internal state 292 of contacts module 237 in memory 202 or memory 470), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 238, video conference module 239, e-mail 240, or IM 241; and so forth.

In conjunction with RF circuitry 208, audio circuitry 210, speaker 211, microphone 213, touch screen 212, display controller 256, contact/motion module 230, graphics module 232, and text input module 234, telephone module 238 are used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication uses any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, e-mail client module 240 includes executable instructions to create, send, receive, and manage e-mail in response to user instructions. In conjunction with image management module 244, e-mail client module 240 makes it very easy to create and send e-mails with still or video images taken with camera module 243.

In conjunction with RF circuitry 208, touch screen 212, display controller 256, contact/motion module 230, graphics module 232, and text input module 234, the instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, e-mail client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that can be downloaded and used by a user (e.g., weather widget 249-1, stocks widget 249-2, calculator widget 249-3, alarm clock widget 249-4, and dictionary widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 208, touch screen 212, display controller 256, contact/motion module 230, graphics module 232, text input module 234, and browser module 247, the widget creator module 250 are used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 are used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, e-mail client module 240, and browser module 247, online video module 255 includes instructions that allow the user to access, browse, receive (e.g., by streaming and/or download), play back (e.g., on the touch screen or on an external, connected display via external port 224), send an e-mail with a link to a particular online video, and otherwise manage online videos in one or more file formats, such as H.264. In some embodiments, instant messaging module 241, rather than e-mail client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules can be combined or otherwise rearranged in various embodiments. For example, video player module can be combined with music player module into a single module (e.g., video and music player module 252, FIG. 2A). In some embodiments, memory 202 stores a subset of the modules and data structures identified above. Furthermore, memory 202 stores additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 is reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
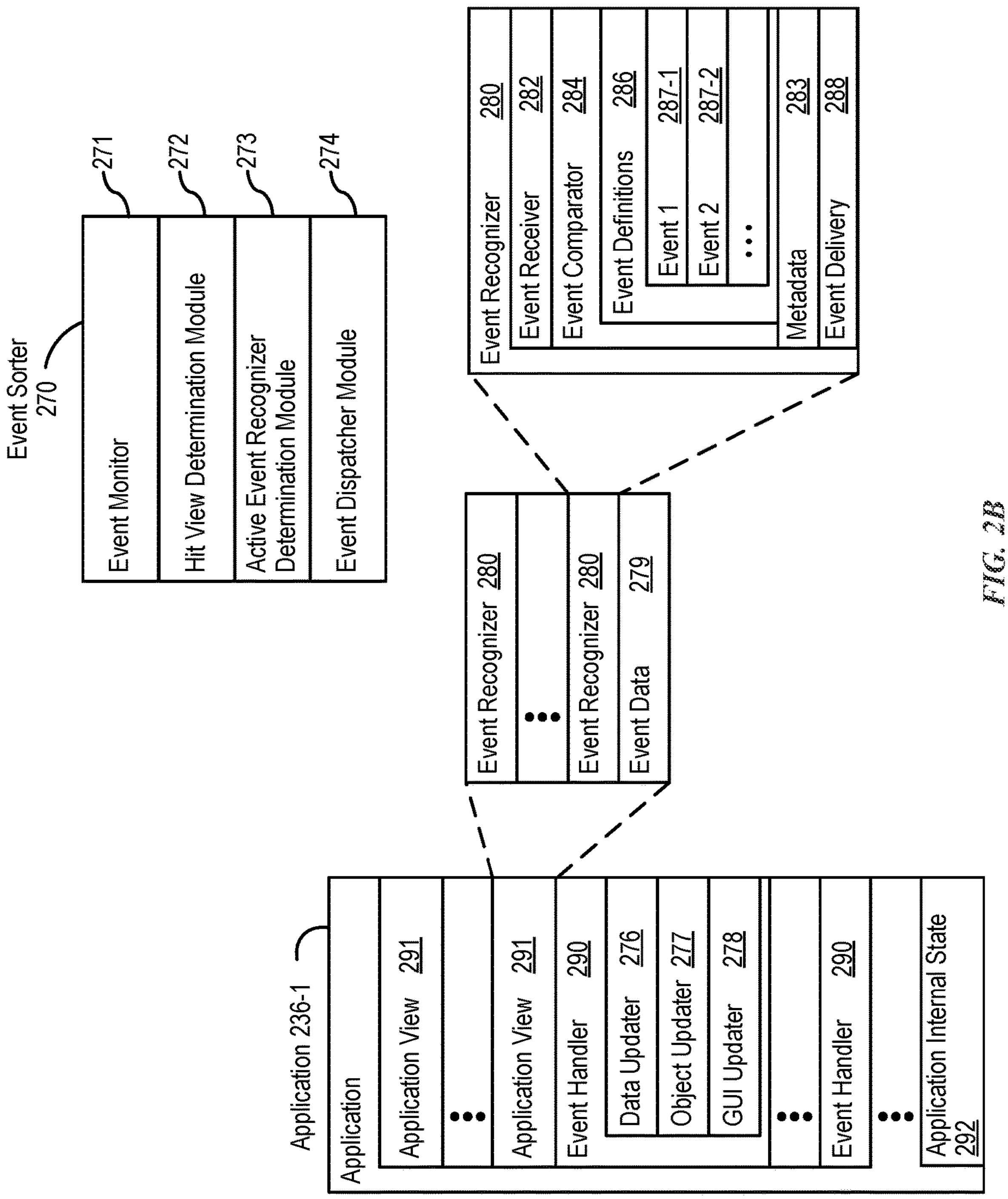
FIG. 2B is a block diagram illustrating exemplary components for event handling, according to various examples.

FIG. 2B is a block diagram illustrating exemplary components for event handling in accordance with some embodiments. In some embodiments, memory 202 (FIG. 2A) or 470 (FIG. 4) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of: resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected correspond to programmatic levels within a programmatic or view hierarchy of the application. For example, the lowest level view in which a touch is detected is called the hit view, and the set of events that are recognized as proper inputs is determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module, or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 utilizes or calls data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizer 280 also includes at least a subset of: metadata 283, and event delivery instructions 288 (which include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
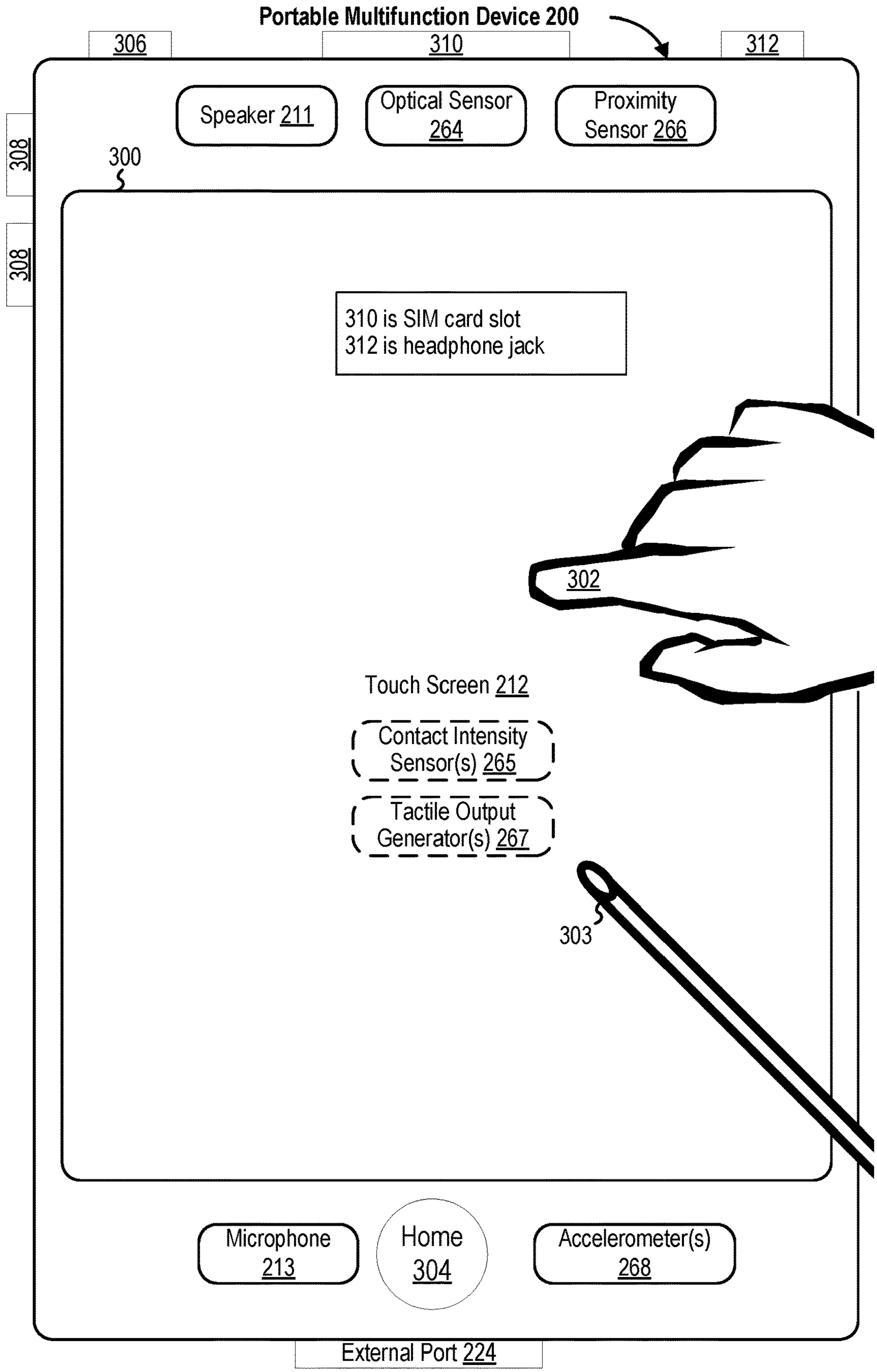
FIG. 3 illustrates a portable multifunction device implementing the client-side portion of a digital assistant, according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 also includes one or more physical buttons, such as "home" or menu button 304. As described previously, menu button 304 is used to navigate to any application 236 in a set of applications that is executed on device 200. Alternatively, in some embodiments, the menu button is implemented as a soft key in a GUI displayed on touch screen 212.

In one embodiment, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4 is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4 is, in some examples, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are combined or otherwise rearranged in various embodiments. In some embodiments, memory 470 stores a subset of the modules and data structures identified above. Furthermore, memory 470 stores additional modules and data structures not described above.

Attention is now directed towards embodiments of user interfaces that can be implemented on, for example, portable multifunction device 200.

Figure 5A:
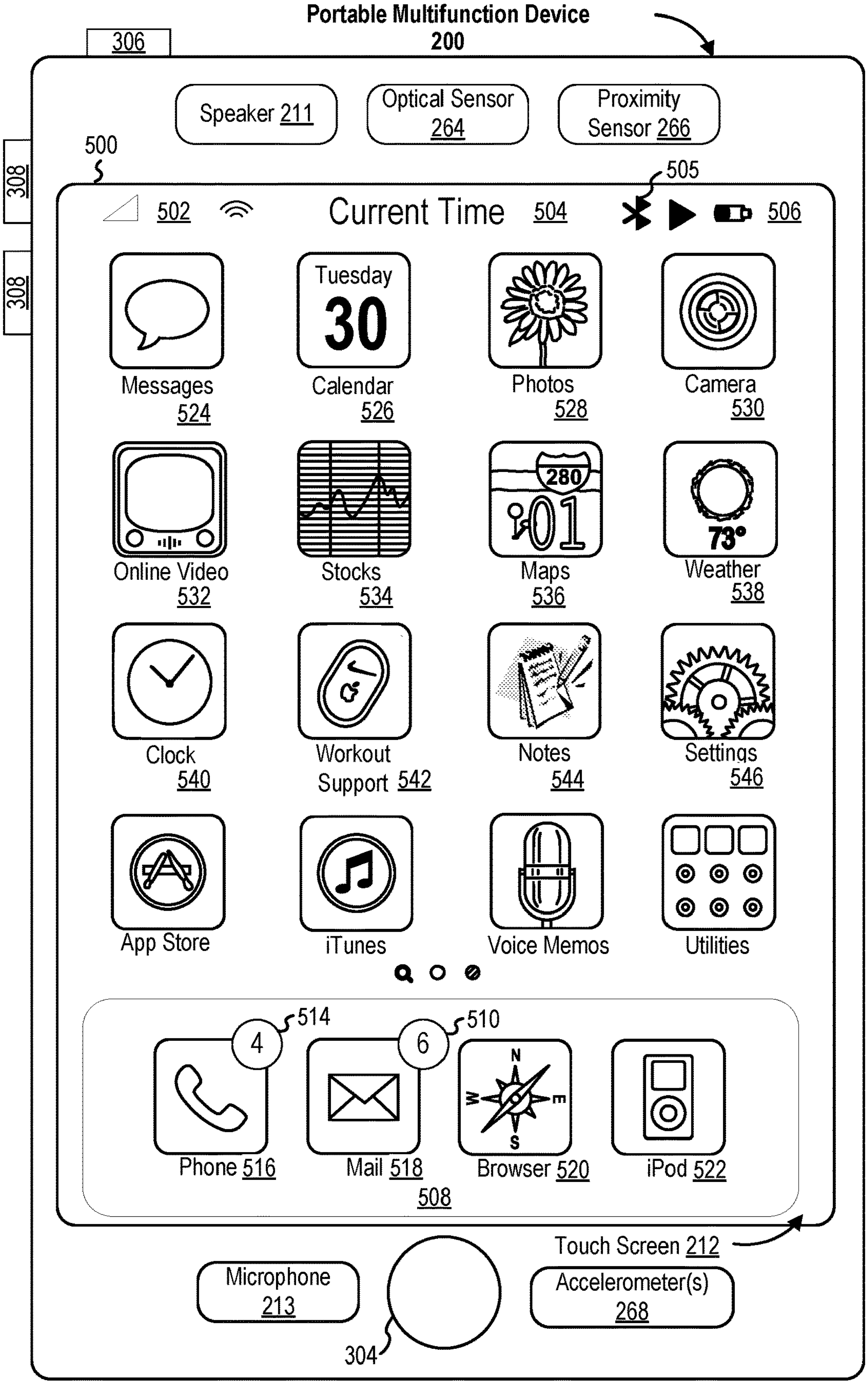
FIG. 5A illustrates an exemplary user interface for a menu of applications on a portable multifunction device, according to various examples.

FIG. 5A illustrates an exemplary user interface for a menu of applications on portable multifunction device 200 in accordance with some embodiments. Similar user interfaces are implemented on device 400. In some embodiments, user interface 500 includes the following elements, or a subset or superset thereof:

Signal strength indicator(s) 502 for wireless communication(s), such as cellular and Wi-Fi signals;

Time 504;

Bluetooth indicator 505;

Battery status indicator 506;

Tray 508 with icons for frequently used applications, such as:

- Icon 516 for telephone module 238, labeled "Phone," which optionally includes an indicator 514 of the number of missed calls or voicemail messages;
- Icon 518 for e-mail client module 240, labeled "Mail," which optionally includes an indicator 510 of the number of unread e-mails;
- Icon 520 for browser module 247, labeled "Browser;" and
- Icon 522 for video and music player module 252, also referred to as iPod (trademark of Apple Inc.) module 252, labeled "iPod;" and Icons for other applications, such as:

- Icon 524 for IM module 241, labeled "Messages;"
- Icon 526 for calendar module 248, labeled "Calendar;"
- Icon 528 for image management module 244, labeled "Photos;"
- Icon 530 for camera module 243, labeled "Camera;"
- Icon 532 for online video module 255, labeled "Online Video;"
- Icon 534 for stocks widget 249-2, labeled "Stocks;"
- Icon 536 for map module 254, labeled "Maps;"
- Icon 538 for weather widget 249-1, labeled "Weather;"
- Icon 540 for alarm clock widget 249-4, labeled "Clock;"
- Icon 542 for workout support module 242, labeled "Workout Support;"
- Icon 544 for notes module 253, labeled "Notes;" and
- Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 is optionally labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 5B:
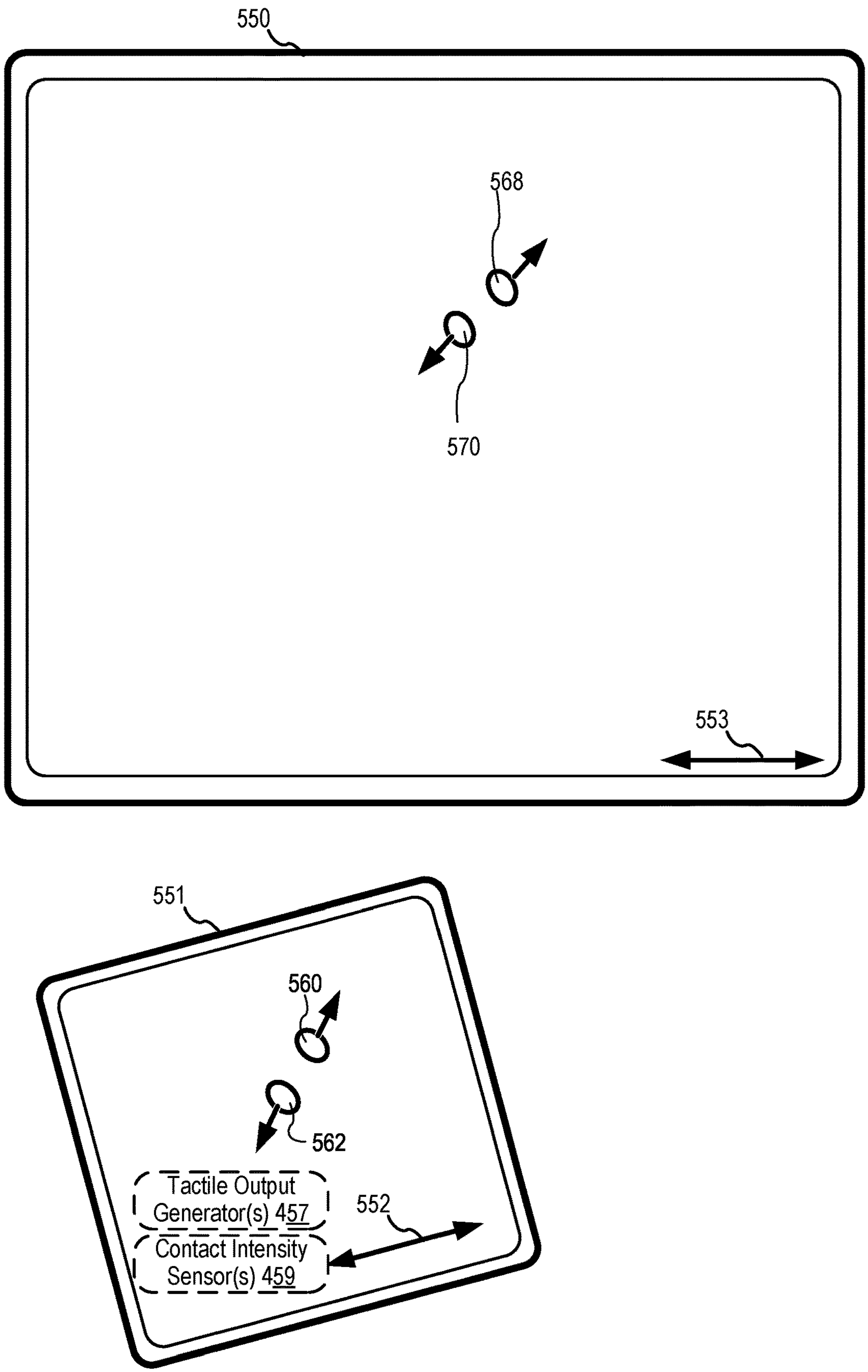
FIG. 5B illustrates an exemplary user interface for a multifunction device with a touch-sensitive surface that is separate from the display, according to various examples.

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 457) for detecting intensity of contacts on touch-sensitive surface 551 and/or one or more tactile output generators 459 for generating tactile outputs for a user of device 400.

Although some of the examples which follow will be given with reference to inputs on touch screen display 212 (where the touch-sensitive surface and the display are combined), in some embodiments, the device detects inputs on a touch-sensitive surface that is separate from the display, as shown in FIG. 5B. In some embodiments, the touch-sensitive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, 560 corresponds to 568 and 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
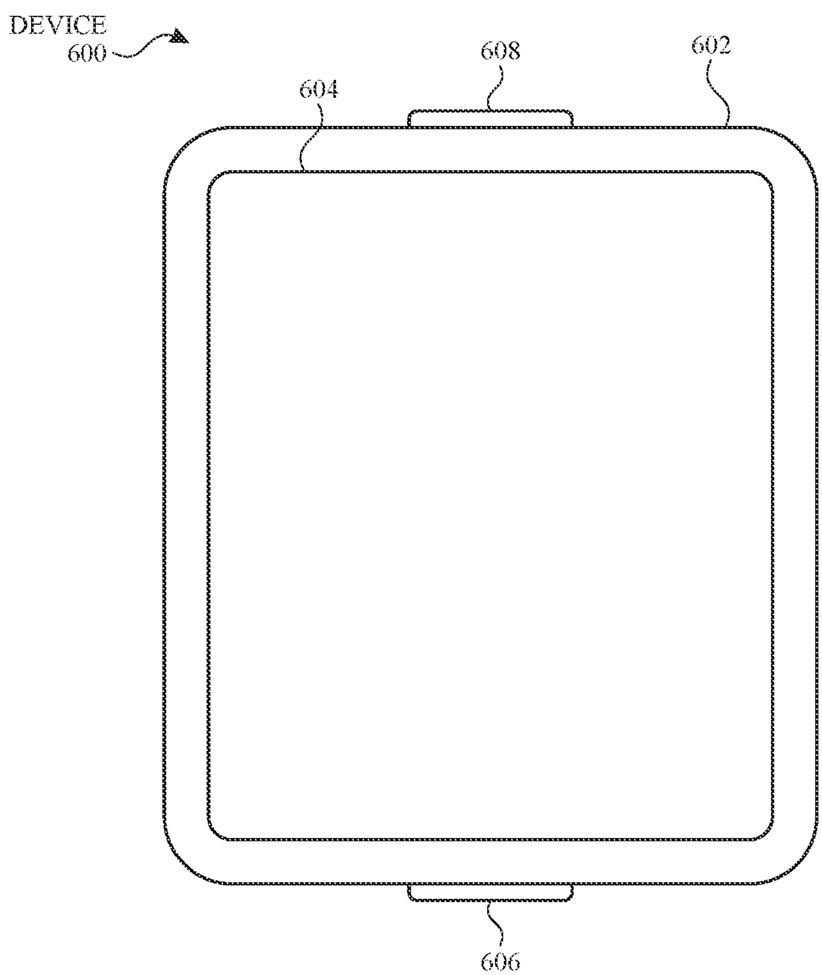
FIG. 6A illustrates a personal electronic device, according to various examples.

FIG. 6A illustrates exemplary personal electronic device 600. Device 600 includes body 602. In some embodiments, device 600 includes some or all of the features described with respect to devices 200 and 400 (e.g., FIGS. 2A-4). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) has one or more intensity sensors for detecting intensity of contacts (e.g., touches) being applied. The one or more intensity sensors of touch screen 604 (or the touch-sensitive surface) provide output data that represents the intensity of touches. The user interface of device 600 responds to touches based on their intensity, meaning that touches of different intensities can invoke different user interface operations on device 600.

Techniques for detecting and processing touch intensity are found, for example, in related applications: International Patent Application Serial No. PCT/US2013/040061, titled "Device, Method, and Graphical User Interface for Displaying User Interface Objects Corresponding to an application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 600 has one or more input mechanisms 606 and 608. Input mechanisms 606 and 608, if included, are physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms permit device 600 to be worn by a user.

Figure 6B:
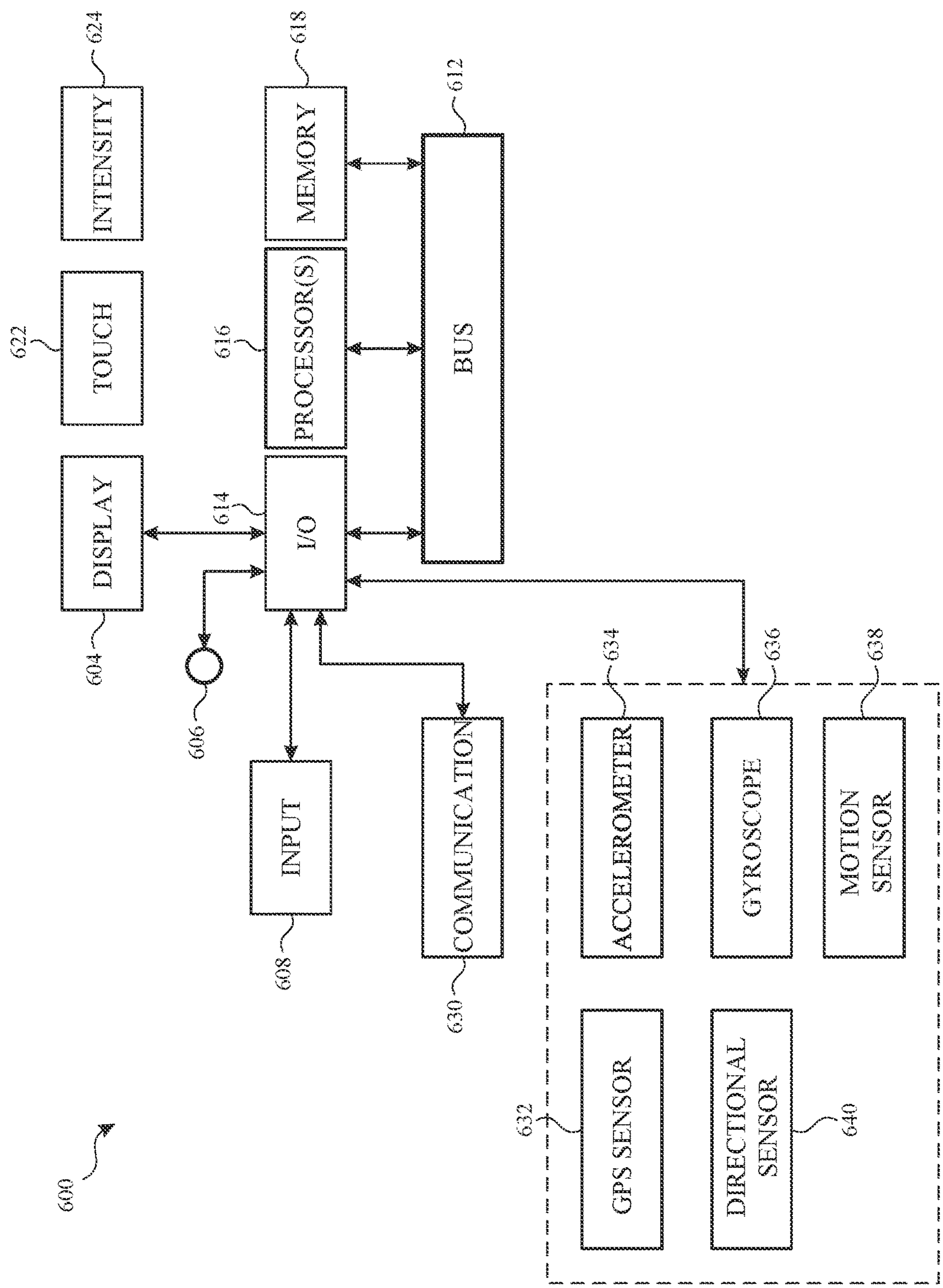
FIG. 6B is a block diagram illustrating a personal electronic device, according to various examples.

FIG. 6B depicts exemplary personal electronic device 600. In some embodiments, device 600 includes some or all of the components described with respect to FIGS. 2A, 2B, and 4. Device 600 has bus 612 that operatively couples I/O section 614 with one or more computer processors 616 and memory 618. I/O section 614 is connected to display 604, which can have touch-sensitive component 622 and, optionally, touch-intensity sensitive component 624. In addition, I/O section 614 is connected with communication unit 630 for receiving application and operating system data, using Wi-Fi, Bluetooth, near field communication (NFC), cellular, and/or other wireless communication techniques. Device 600 includes input mechanisms 606 and/or 608. Input mechanism 606 is a rotatable input device or a depressible and rotatable input device, for example. Input mechanism 608 is a button, in some examples.

Input mechanism 608 is a microphone, in some examples. Personal electronic device 600 includes, for example, various sensors, such as GPS sensor 632, accelerometer 634, directional sensor 640 (e.g., compass), gyroscope 636, motion sensor 638, and/or a combination thereof, all of which are operatively connected to I/O section 614.

Memory 618 of personal electronic device 600 is a non-transitory computer-readable storage medium, for storing computer-executable instructions, which, when executed by one or more computer processors 616, for example, cause the computer processors to perform the techniques and processes described below. The computer-executable instructions, for example, are also stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. Personal electronic device 600 is not limited to the components and configuration of FIG. 6B, but can include other or additional components in multiple configurations.

As used here, the term "affordance" refers to a user-interactive graphical user interface object that is, for example, displayed on the display screen of devices 200, 400, and/or 600 (FIGS. 2A, 4, 6A-6B). For example, an image (e.g., icon), a button, and text (e.g., hyperlink) each constitutes an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4 or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface receives a continuous swipe contact transitioning from a start location and reaching an end location, at which point the intensity of the contact increases. In this example, the characteristic intensity of the contact at the end location is based on only a portion of the continuous swipe contact, and not the entire swipe contact (e.g., only the portion of the swipe contact at the end location). In some embodiments, a smoothing algorithm is applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

3. Digital Assistant System

Figure 7A:
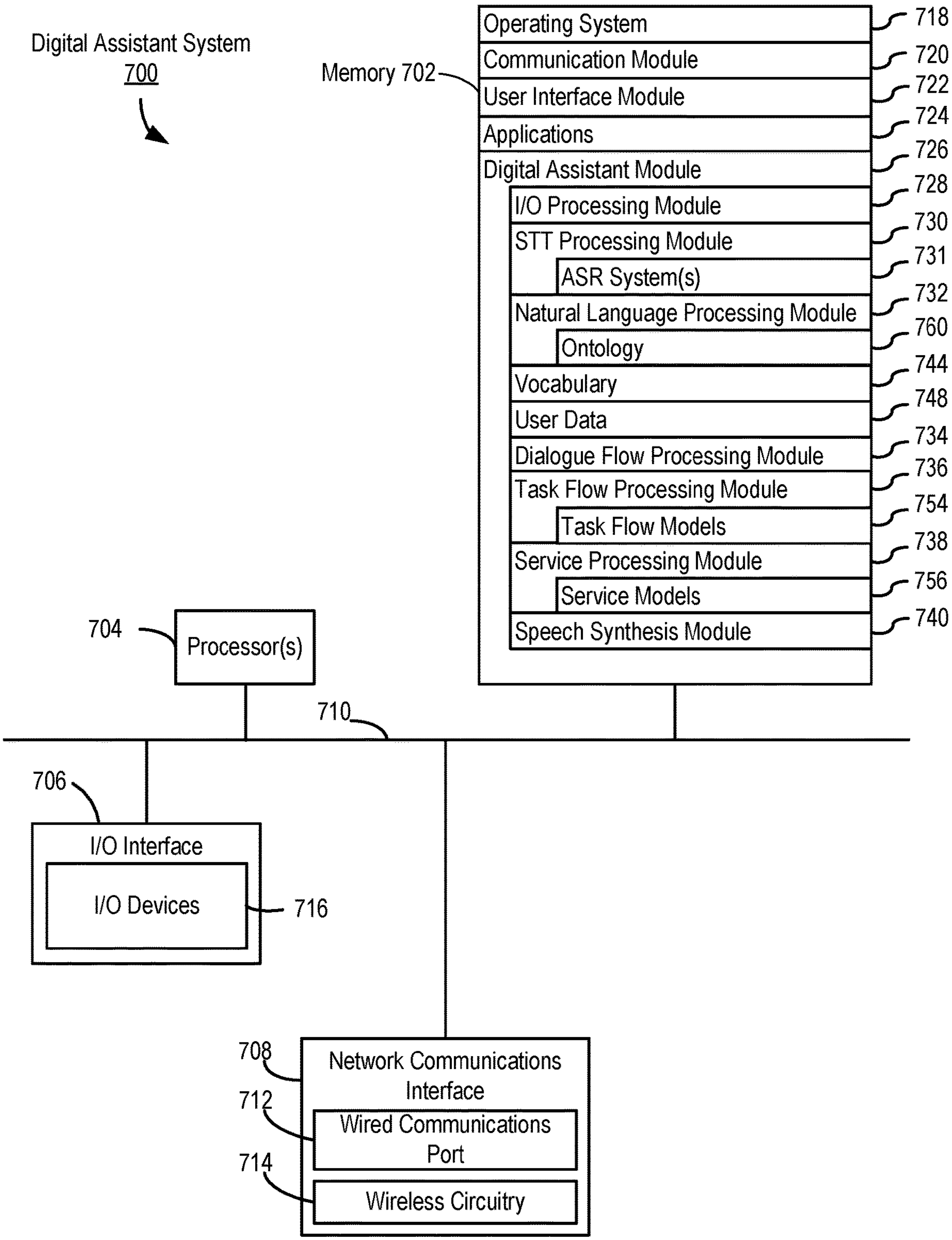
FIG. 7A is a block diagram illustrating a digital assistant system or a server portion thereof, according to various examples.

FIG. 7A illustrates a block diagram of digital assistant system 700 in accordance with various examples. In some examples, digital assistant system 700 is implemented on a standalone computer system. In some examples, digital assistant system 700 is distributed across multiple computers. In some examples, some of the modules and functions of the digital assistant are divided into a server portion and a client portion, where the client portion resides on one or more user devices (e.g., devices 104, 122, 200, 400, or 600) and communicates with the server portion (e.g., server system 108) through one or more networks, e.g., as shown in FIG. 1. In some examples, digital assistant system 700 is an implementation of server system 108 (and/or DA server 106) shown in FIG. 1. It should be noted that digital assistant system 700 is only one example of a digital assistant system, and that digital assistant system 700 can have more or fewer components than shown, can combine two or more components, or can have a different configuration or arrangement of the components. The various components shown in FIG. 7A are implemented in hardware, software instructions for execution by one or more processors, firmware, including one or more signal processing and/or application specific integrated circuits, or a combination thereof.

Digital assistant system 700 includes memory 702, one or more processors 704, input/output (I/O) interface 706, and network communications interface 708. These components can communicate with one another over one or more communication buses or signal lines 710.

In some examples, memory 702 includes a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 couples input/output devices 716 of digital assistant system 700, such as displays, keyboards, touch screens, and microphones, to user interface module 722. I/O interface 706, in conjunction with user interface module 722, receives user inputs (e.g., voice input, keyboard inputs, touch inputs, etc.) and processes them accordingly. In some examples, e.g., when the digital assistant is implemented on a standalone user device, digital assistant system 700 includes any of the components and I/O communication interfaces described with respect to devices 200, 400, or 600 in FIGS. 2A, 4, 6A-6B, respectively. In some examples, digital assistant system 700 represents the server portion of a digital assistant implementation, and can interact with the user through a client-side portion residing on a user device (e.g., devices 104, 200, 400, or 600).

In some examples, the network communications interface 708 includes wired communication port(s) 712 and/or wireless transmission and reception circuitry 714. The wired communication port(s) receives and send communication signals via one or more wired interfaces, e.g., Ethernet, Universal Serial Bus (USB), FIREWIRE, etc. The wireless circuitry 714 receives and sends RF signals and/or optical signals from/to communications networks and other communications devices. The wireless communications use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 enables communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, stores programs, modules, instructions, and data structures including all or a subset of: operating system 718, communications module 720, user interface module 722, one or more applications 724, and digital assistant module 726. In particular, memory 702, or the computer-readable storage media of memory 702, stores instructions for performing the processes described below. One or more processors 704 execute these programs, modules, and instructions, and reads/writes from/to the data structures.

Operating system 718 (e.g., Darwin, RTXC, LINUX, UNIX, iOS, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

Communications module 720 facilitates communications between digital assistant system 700 with other devices over network communications interface 708. For example, communications module 720 communicates with RF circuitry 208 of electronic devices such as devices 200, 400, and 600 shown in FIG. 2A, 4, 6A-6B, respectively. Communications module 720 also includes various components for handling data received by wireless circuitry 714 and/or wired communications port 712.

User interface module 722 receives commands and/or inputs from a user via I/O interface 706 (e.g., from a keyboard, touch screen, pointing device, controller, and/or microphone), and generate user interface objects on a display. User interface module 722 also prepares and delivers outputs (e.g., speech, sound, animation, text, icons, vibrations, haptic feedback, light, etc.) to the user via the I/O interface 706 (e.g., through displays, audio channels, speakers, touch-pads, etc.).

Applications 724 include programs and/or modules that are configured to be executed by one or more processors 704. For example, if the digital assistant system is implemented on a standalone user device, applications 724 include user applications, such as games, a calendar application, a navigation application, or an email application. If digital assistant system 700 is implemented on a server, applications 724 include resource management applications, diagnostic applications, or scheduling applications, for example.

Memory 702 also stores digital assistant module 726 (or the server portion of a digital assistant). In some examples, digital assistant module 726 includes the following sub-modules, or a subset or superset thereof: input/output processing module 728, speech-to-text (STT) processing module 730, natural language processing module 732, dialogue flow processing module 734, task flow processing module 736, service processing module 738, and speech synthesis module 740. Each of these modules has access to one or more of the following systems or data and models of the digital assistant module 726, or a subset or superset thereof: ontology 760, vocabulary index 744, user data 748, task flow models 754, service models 756, and ASR systems.

In some examples, using the processing modules, data, and models implemented in digital assistant module 726, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
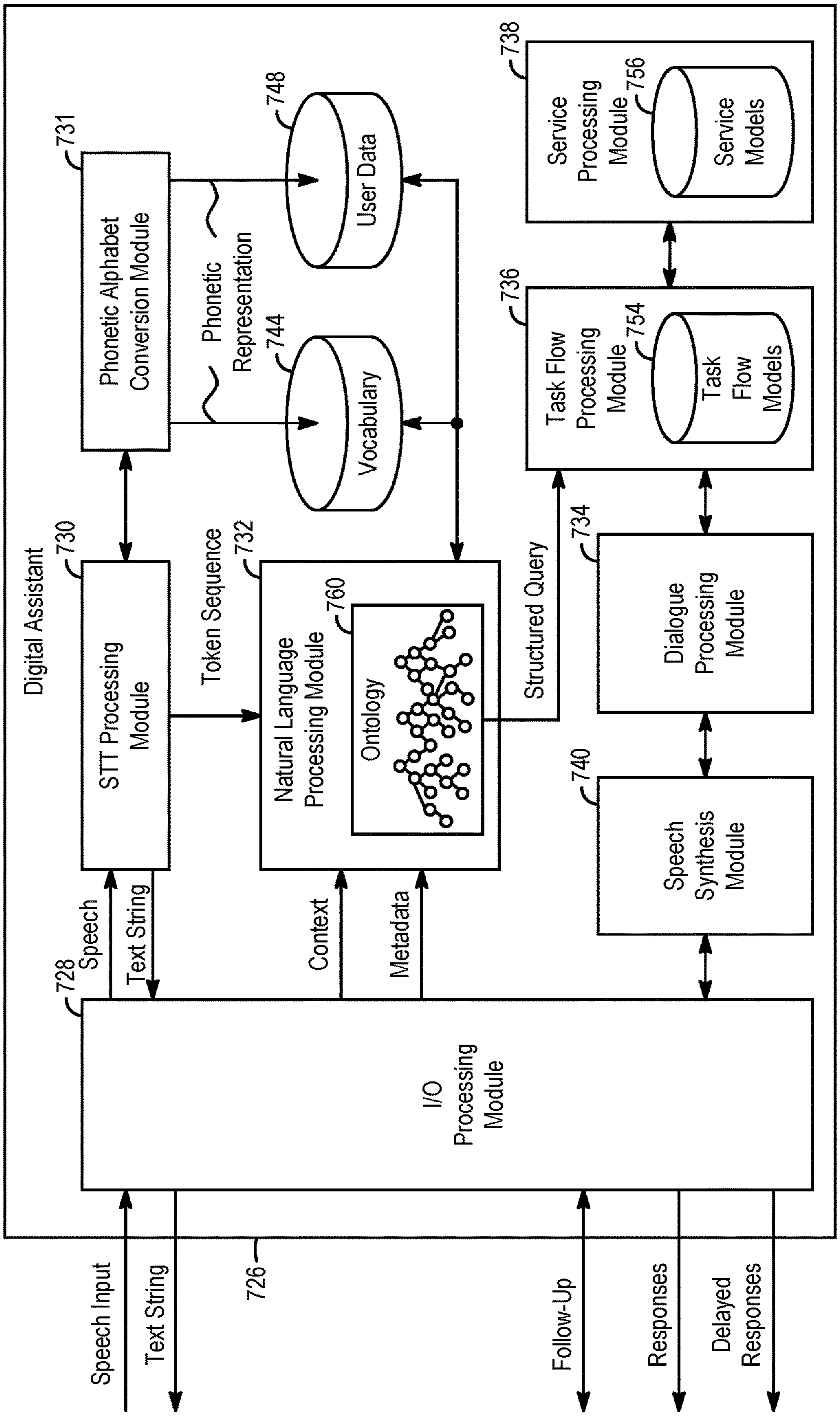
FIG. 7B illustrates the functions of the digital assistant shown in FIG. 7A, according to various examples.

In some examples, as shown in FIG. 7B, I/O processing module 728 interacts with the user through I/O devices 716 in FIG. 7A or with a user device (e.g., devices 104, 200, 400, or 600) through network communications interface 708 in FIG. 7A to obtain user input (e.g., a speech input) and to provide responses (e.g., as speech outputs) to the user input. I/O processing module 728 optionally obtains contextual information associated with the user input from the user device, along with or shortly after the receipt of the user input. The contextual information includes user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 also sends follow-up questions to, and receive answers from, the user regarding the user request. When a user request is received by I/O processing module 728 and the user request includes speech input, I/O processing module 728 forwards the speech input to STT processing module 730 (or speech recognizer) for speech-to-text conversions.

STT processing module 730 includes one or more ASR systems. The one or more ASR systems can process the speech input that is received through I/O processing module 728 to produce a recognition result. Each ASR system includes a front-end speech pre-processor. The front-end speech pre-processor extracts representative features from the speech input. For example, the front-end speech pre-processor performs a Fourier transform on the speech input to extract spectral features that characterize the speech input as a sequence of representative multi-dimensional vectors. Further, each ASR system includes one or more speech recognition models (e.g., acoustic models and/or language models) and implements one or more speech recognition engines. Examples of speech recognition models include Hidden Markov Models, Gaussian-Mixture Models, Deep Neural Network Models, n-gram language models, and other statistical models. Examples of speech recognition engines include the dynamic time warping based engines and weighted finite-state transducers (WFST) based engines. The one or more speech recognition models and the one or more speech recognition engines are used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input is processed at least partially by a third-party service or on the user's device (e.g., device 104, 200, 400, or 600) to produce the recognition result. Once STT processing module 730 produces recognition results containing a text string (e.g., words, or sequence of words, or sequence of tokens), the recognition result is passed to natural language processing module 732 for intent deduction. In some examples, STT processing module 730 produces multiple candidate text representations of the speech input. Each candidate text representation is a sequence of words or tokens corresponding to the speech input. In some examples, each candidate text representation is associated with a speech recognition confidence score. Based on the speech recognition confidence scores, STT processing module 730 ranks the candidate text representations and provides the n-best (e.g., n highest ranked) candidate text representation(s) to natural language processing module 732 for intent deduction, where n is a predetermined integer greater than zero. For example, in one example, only the highest ranked (n=1) candidate text representation is passed to natural language processing module 732 for intent deduction. In another example, the five highest ranked (n=5) candidate text representations are passed to natural language processing module 732 for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 730 includes and/or accesses a vocabulary of recognizable words via phonetic alphabet conversion module 731. Each vocabulary word is associated with one or more candidate pronunciations of the word represented in a speech recognition phonetic alphabet. In particular, the vocabulary of recognizable words includes a word that is associated with a plurality of candidate pronunciations. For example, the vocabulary includes the word "tomato" that is associated with the candidate pronunciations of /tə'meɪroʊ/ and /tə'mɑtoʊ/ . Further, vocabulary words are associated with custom candidate pronunciations that are based on previous speech inputs from the user. Such custom candidate pronunciations are stored in STT processing module 730 and are associated with a particular user via the user's profile on the device. In some examples, the candidate pronunciations for words are determined based on the spelling of the word and one or more linguistic and/or phonetic rules. In some examples, the candidate pronunciations are manually generated, e.g., based on known canonical pronunciations.

In some examples, the candidate pronunciations are ranked based on the commonness of the candidate pronunciation. For example, the candidate pronunciation /tə'meɪroʊ/ is ranked higher than /tə'mɑtoʊ/, because the former is a more commonly used pronunciation (e.g., among all users, for users in a particular geographical region, or for any other appropriate subset of users). In some examples, candidate pronunciations are ranked based on whether the candidate pronunciation is a custom candidate pronunciation associated with the user. For example, custom candidate pronunciations are ranked higher than canonical candidate pronunciations. This can be useful for recognizing proper nouns having a unique pronunciation that deviates from canonical pronunciation. In some examples, candidate pronunciations are associated with one or more speech characteristics, such as geographic origin, nationality, or ethnicity. For example, the candidate pronunciation /tə'meɪroʊ/ is associated with the United States, whereas the candidate pronunciation /tə'mɑtoʊ/ is associated with Great Britain. Further, the rank of the candidate pronunciation is based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation /tə'meɪroʊ/ (associated with the United States) is ranked higher than the candidate pronunciation /tə'mɑtoʊ/ (associated with Great Britain). In some examples, one of the ranked candidate pronunciations is selected as a predicted pronunciation (e.g., the most likely pronunciation).

When a speech input is received, STT processing module 730 is used to determine the phonemes corresponding to the speech input (e.g., using an acoustic model), and then attempt to determine words that match the phonemes (e.g., using a language model). For example, if STT processing module 730 first identifies the sequence of phonemes /tə'meɪroʊ/ corresponding to a portion of the speech input, it can then determine, based on vocabulary index 744, that this sequence corresponds to the word "tomato."

In some examples, STT processing module 730 uses approximate matching techniques to determine words in an utterance. Thus, for example, the STT processing module 730 determines that the sequence of phonemes /tə'meɪroʊ/ corresponds to the word "tomato," even if that particular sequence of phonemes is not one of the candidate sequence of phonemes for that word.

Natural language processing module 732 ("natural language processor") of the digital assistant takes the n-best candidate text representation(s) ("word sequence(s)" or "token sequence(s)") generated by STT processing module 730, and attempts to associate each of the candidate text representations with one or more "actionable intents" recognized by the digital assistant. An "actionable intent" (or "user intent") represents a task that can be performed by the digital assistant, and can have an associated task flow implemented in task flow models 754. The associated task flow is a series of programmed actions and steps that the digital assistant takes in order to perform the task. The scope of a digital assistant's capabilities is dependent on the number and variety of task flows that have been implemented and stored in task flow models 754, or in other words, on the number and variety of "actionable intents" that the digital assistant recognizes. The effectiveness of the digital assistant, however, also dependents on the assistant's ability to infer the correct "actionable intent(s)" from the user request expressed in natural language.

In some examples, in addition to the sequence of words or tokens obtained from STT processing module 730, natural language processing module 732 also receives contextual information associated with the user request, e.g., from I/O processing module 728. The natural language processing module 732 optionally uses the contextual information to clarify, supplement, and/or further define the information contained in the candidate text representations received from STT processing module 730. The contextual information includes, for example, user preferences, hardware, and/or software states of the user device, sensor information collected before, during, or shortly after the user request, prior interactions (e.g., dialogue) between the digital assistant and the user, and the like. As described herein, contextual information is, in some examples, dynamic, and changes with time, location, content of the dialogue, and other factors.

In some examples, the natural language processing is based on, e.g., ontology 760. Ontology 760 is a hierarchical structure containing many nodes, each node representing either an "actionable intent" or a "property" relevant to one or more of the "actionable intents" or other "properties." As noted above, an "actionable intent" represents a task that the digital assistant is capable of performing, i.e., it is "actionable" or can be acted on. A "property" represents a parameter associated with an actionable intent or a sub-aspect of another property. A linkage between an actionable intent node and a property node in ontology 760 defines how a parameter represented by the property node pertains to the task represented by the actionable intent node.

In some examples, ontology 760 is made up of actionable intent nodes and property nodes. Within ontology 760, each actionable intent node is linked to one or more property nodes either directly or through one or more intermediate property nodes. Similarly, each property node is linked to one or more actionable intent nodes either directly or through one or more intermediate property nodes. For example, as shown in FIG. 7C, ontology 760 includes a "restaurant reservation" node (i.e., an actionable intent node). Property nodes "restaurant," "date/time" (for the reservation), and "party size" are each directly linked to the actionable intent node (i.e., the "restaurant reservation" node).

Figure 7C:
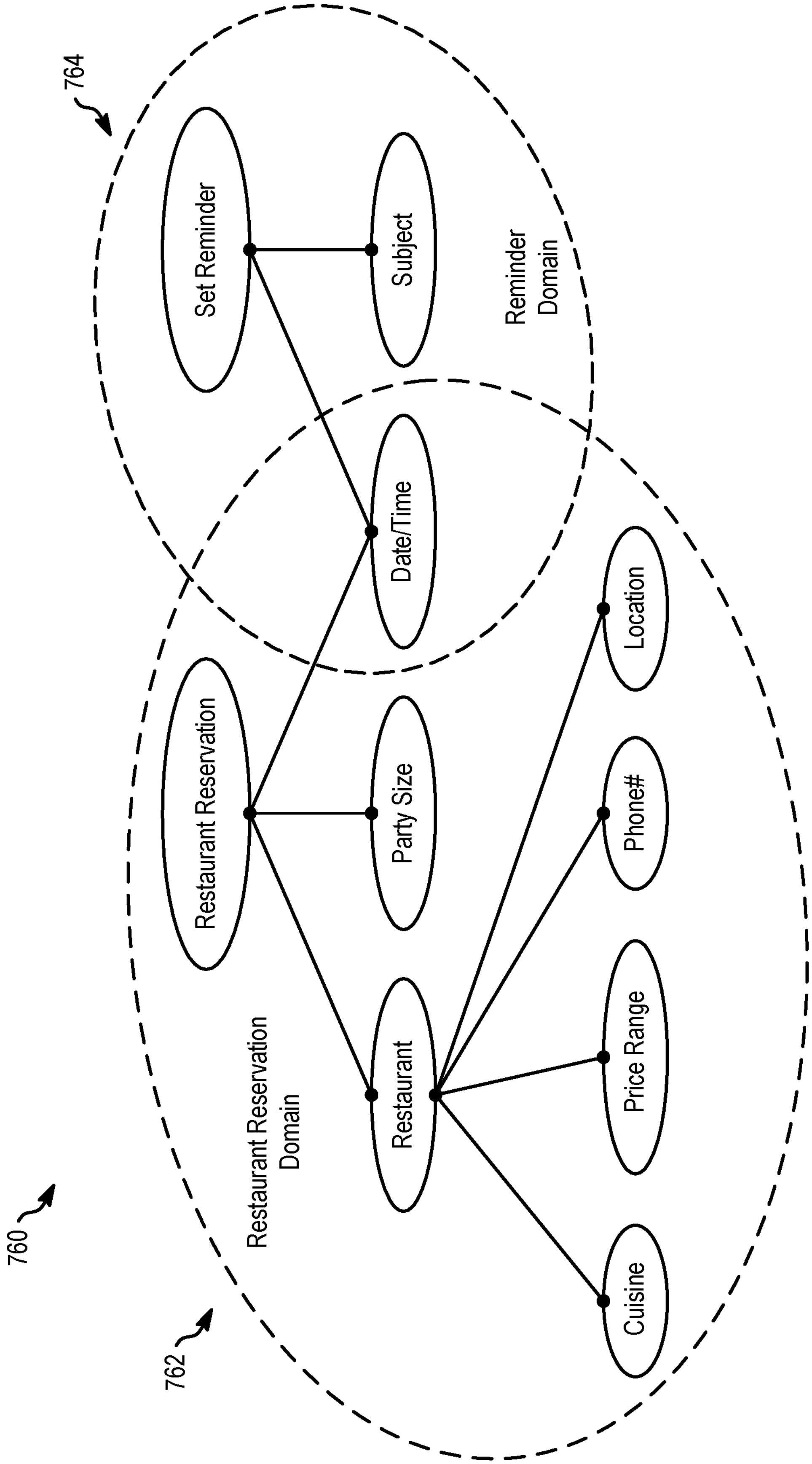
FIG. 7C illustrates a portion of an ontology, according to various examples.

In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, as shown in FIG. 7C, ontology 760 also includes a "set reminder" node (i.e., another actionable intent node). Property nodes "date/time" (for setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in ontology 760.

An actionable intent node, along with its linked concept nodes, is described as a "domain." In the present discussion, each domain is associated with a respective actionable intent, and refers to the group of nodes (and the relationships there between) associated with the particular actionable intent. For example, ontology 760 shown in FIG. 7C includes an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 includes the actionable intent node "set reminder," and property nodes "subject" and "date/time." In some examples, ontology 760 is made up of many domains. Each domain shares one or more property nodes with one or more other domains. For example, the "date/time" property node is associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains include, for example, "find a movie," "initiate a phone call," "find directions," "schedule a meeting," "send a message," and "provide an answer to a question," "read a list," "providing navigation instructions," "provide instructions for a task" and so on. A "send a message" domain is associated with a "send a message" actionable intent node, and further includes property nodes such as "recipient(s)," "message type," and "message body." The property node "recipient" is further defined, for example, by the sub-property nodes such as "recipient name" and "message address."

In some examples, ontology 760 includes all the domains (and hence actionable intents) that the digital assistant is capable of understanding and acting upon. In some examples, ontology 760 is modified, such as by adding or removing entire domains or nodes, or by modifying relationships between the nodes within the ontology 760.

In some examples, nodes associated with multiple related actionable intents are clustered under a "super domain" in ontology 760. For example, a "travel" super-domain includes a cluster of property nodes and actionable intent nodes related to travel. The actionable intent nodes related to travel includes "airline reservation," "hotel reservation," "car rental," "get directions," "find points of interest," and so on. The actionable intent nodes under the same super domain (e.g., the "travel" super domain) have many property nodes in common. For example, the actionable intent nodes for "airline reservation," "hotel reservation," "car rental," "get directions," and "find points of interest" share one or more of the property nodes "start location," "destination," "departure date/time," "arrival date/time," and "party size."

In some examples, each node in ontology 760 is associated with a set of words and/or phrases that are relevant to the property or actionable intent represented by the node. The respective set of words and/or phrases associated with each node are the so-called "vocabulary" associated with the node. The respective set of words and/or phrases associated with each node are stored in vocabulary index 744 in association with the property or actionable intent represented by the node. For example, returning to FIG. 7B, the vocabulary associated with the node for the property of "restaurant" includes words such as "food," "drinks," "cuisine," "hungry," "eat," "pizza," "fast food," "meal," and so on. For another example, the vocabulary associated with the node for the actionable intent of "initiate a phone call" includes words and phrases such as "call," "phone," "dial," "ring," "call this number," "make a call to," and so on. The vocabulary index 744 optionally includes words and phrases in different languages.

Natural language processing module 732 receives the candidate text representations (e.g., text string(s) or token sequence(s)) from STT processing module 730, and for each candidate representation, determines what nodes are implicated by the words in the candidate text representation. In some examples, if a word or phrase in the candidate text representation is found to be associated with one or more nodes in ontology 760 (via vocabulary index 744), the word or phrase "triggers" or "activates" those nodes. Based on the quantity and/or relative importance of the activated nodes, natural language processing module 732 selects one of the actionable intents as the task that the user intended the digital assistant to perform. In some examples, the domain that has the most "triggered" nodes is selected. In some examples, the domain having the highest confidence value (e.g., based on the relative importance of its various triggered nodes) is selected. In some examples, the domain is selected based on a combination of the number and the importance of the triggered nodes. In some examples, additional factors are considered in selecting the node as well, such as whether the digital assistant has previously correctly interpreted a similar request from a user.

User data 748 includes user-specific information, such as user-specific vocabulary, user preferences, user address, user's default and secondary languages, user's contact list, and other short-term or long-term information for each user. In some examples, natural language processing module 732 uses the user-specific information to supplement the information contained in the user input to further define the user intent. For example, for a user request "invite my friends to my birthday party," natural language processing module 732 is able to access user data 748 to determine who the "friends" are and when and where the "birthday party" would be held, rather than requiring the user to provide such information explicitly in his/her request.

It should be recognized that in some examples, natural language processing module 732 is implemented using one or more machine learning mechanisms (e.g., neural networks). In particular, the one or more machine learning mechanisms are configured to receive a candidate text representation and contextual information associated with the candidate text representation. Based on the candidate text representation and the associated contextual information, the one or more machine learning mechanism are configured to determine intent confidence scores over a set of candidate actionable intents. Natural language processing module 732 can select one or more candidate actionable intents from the set of candidate actionable intents based on the determined intent confidence scores. In some examples, an ontology (e.g., ontology 760) is also used to select the one or more candidate actionable intents from the set of candidate actionable intents.

Other details of searching an ontology based on a token string is described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 generates a structured query to represent the identified actionable intent. In some examples, the structured query includes parameters for one or more nodes within the domain for the actionable intent, and at least some of the parameters are populated with the specific information and requirements specified in the user request. For example, the user says "Make me a dinner reservation at a sushi place at 7." In this case, natural language processing module 732 is able to correctly identify the actionable intent to be "restaurant reservation" based on the user input. According to the ontology, a structured query for a "restaurant reservation" domain includes parameters such as {Cuisine}, {Time}, {Date}, {Party Size}, and the like. In some examples, based on the speech input and the text derived from the speech input using STT processing module 730, natural language processing module 732 generates a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as {Party Size} and {Date} is not specified in the structured query based on the information currently available. In some examples, natural language processing module 732 populates some parameters of the structured query with received contextual information. For example, in some examples, if the user requested a sushi restaurant "near me," natural language processing module 732 populates a {location} parameter in the structured query with GPS coordinates from the user device.

In some examples, natural language processing module 732 identifies multiple candidate actionable intents for each candidate text representation received from STT processing module 730. Further, in some examples, a respective structured query (partial or complete) is generated for each identified candidate actionable intent. Natural language processing module 732 determines an intent confidence score for each candidate actionable intent and ranks the candidate actionable intents based on the intent confidence scores. In some examples, natural language processing module 732 passes the generated structured query (or queries), including any completed parameters, to task flow processing module 736 ("task flow processor"). In some examples, the structured query (or queries) for the m-best (e.g., m highest ranked) candidate actionable intents are provided to task flow processing module 736, where m is a predetermined integer greater than zero. In some examples, the structured query (or queries) for the m-best candidate actionable intents are provided to task flow processing module 736 with the corresponding candidate text representation(s).

Other details of inferring a user intent based on multiple candidate actionable intents determined from multiple candidate text representations of a speech input are described in U.S. Utility application Ser. No. 14/298,725 for "System and Method for Inferring User Intent From Speech Inputs," filed Jun. 6, 2014, the entire disclosure of which is incorporated herein by reference.

Task flow processing module 736 is configured to receive the structured query (or queries) from natural language processing module 732, complete the structured query, if necessary, and perform the actions required to "complete" the user's ultimate request. In some examples, the various procedures necessary to complete these tasks are provided in task flow models 754. In some examples, task flow models 754 include procedures for obtaining additional information from the user and task flows for performing actions associated with the actionable intent.

As described above, in order to complete a structured query, task flow processing module 736 needs to initiate additional dialogue with the user in order to obtain additional information, and/or disambiguate potentially ambiguous utterances. When such interactions are necessary, task flow processing module 736 invokes dialogue flow processing module 734 to engage in a dialogue with the user. In some examples, dialogue flow processing module 734 determines how (and/or when) to ask the user for the additional information and receives and processes the user responses. The questions are provided to and answers are received from the users through I/O processing module 728. In some examples, dialogue flow processing module 734 presents dialogue output to the user via audio and/or visual output, and receives input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 generates questions such as "For how many people?" and "On which day?" to pass to the user. Once answers are received from the user, dialogue flow processing module 734 then populates the structured query with the missing information, or pass the information to task flow processing module 736 to complete the missing information from the structured query.

Once task flow processing module 736 has completed the structured query for an actionable intent, task flow processing module 736 proceeds to perform the ultimate task associated with the actionable intent. Accordingly, task flow processing module 736 executes the steps and instructions in the task flow model according to the specific parameters contained in the structured query. For example, the task flow model for the actionable intent of "restaurant reservation" includes steps and instructions for contacting a restaurant and actually requesting a reservation for a particular party size at a particular time. For example, using a structured query such as: {restaurant reservation, restaurant=ABC Café, date=Mar. 12, 2012, time=7 pm, party size=5}, task flow processing module 736 performs the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some examples, task flow processing module 736 employs the assistance of service processing module 738 ("service processing module") to complete a task requested in the user input or to provide an informational answer requested in the user input. For example, service processing module 738 acts on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service are specified by a respective service model among service models 756. Service processing module 738 accesses the appropriate service model for a service and generate requests for the service in accordance with the protocols and APIs required by the service according to the service model.

For example, if a restaurant has enabled an online reservation service, the restaurant submits a service model specifying the necessary parameters for making a reservation and the APIs for communicating the values of the necessary parameter to the online reservation service. When requested by task flow processing module 736, service processing module 738 establishes a network connection with the online reservation service using the web address stored in the service model, and send the necessary parameters of the reservation (e.g., time, date, party size) to the online reservation interface in a format according to the API of the online reservation service.

In some examples, natural language processing module 732, dialogue flow processing module 734, and task flow processing module 736 are used collectively and iteratively to infer and define the user's intent, obtain information to further clarify and refine the user intent, and finally generate a response (i.e., an output to the user, or the completion of a task) to fulfill the user's intent. The generated response is a dialogue response to the speech input that at least partially fulfills the user's intent. Further, in some examples, the generated response is output as a speech output. In these examples, the generated response is sent to speech synthesis module 740 (e.g., speech synthesizer) where it can be processed to synthesize the dialogue response in speech form. In yet other examples, the generated response is data content relevant to satisfying a user request in the speech input.

In examples where task flow processing module 736 receives multiple structured queries from natural language processing module 732, task flow processing module 736 initially processes the first structured query of the received structured queries to attempt to complete the first structured query and/or execute one or more tasks or actions represented by the first structured query. In some examples, the first structured query corresponds to the highest ranked actionable intent. In other examples, the first structured query is selected from the received structured queries based on a combination of the corresponding speech recognition confidence scores and the corresponding intent confidence scores. In some examples, if task flow processing module 736 encounters an error during processing of the first structured query (e.g., due to an inability to determine a necessary parameter), the task flow processing module 736 can proceed to select and process a second structured query of the received structured queries that corresponds to a lower ranked actionable intent. The second structured query is selected, for example, based on the speech recognition confidence score of the corresponding candidate text representation, the intent confidence score of the corresponding candidate actionable intent, a missing necessary parameter in the first structured query, or any combination thereof.

Speech synthesis module 740 is configured to synthesize speech outputs for presentation to the user. Speech synthesis module 740 synthesizes speech outputs based on text provided by the digital assistant. For example, the generated dialogue response is in the form of a text string. Speech synthesis module 740 converts the text string to an audible speech output. Speech synthesis module 740 uses any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis module 740 is configured to synthesize individual words based on phonemic strings corresponding to the words. For example, a phonemic string is associated with a word in the generated dialogue response. The phonemic string is stored in metadata associated with the word. Speech synthesis model 740 is configured to directly process the phonemic string in the metadata to synthesize the word in speech form.

In some examples, instead of (or in addition to) using speech synthesis module 740, speech synthesis is performed on a remote device (e.g., the server system 108), and the synthesized speech is sent to the user device for output to the user. For example, this can occur in some implementations where outputs for a digital assistant are generated at a server system. And because server systems generally have more processing power or resources than a user device, it is possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

4. Multi-Modal Interfaces

Figure 8A:
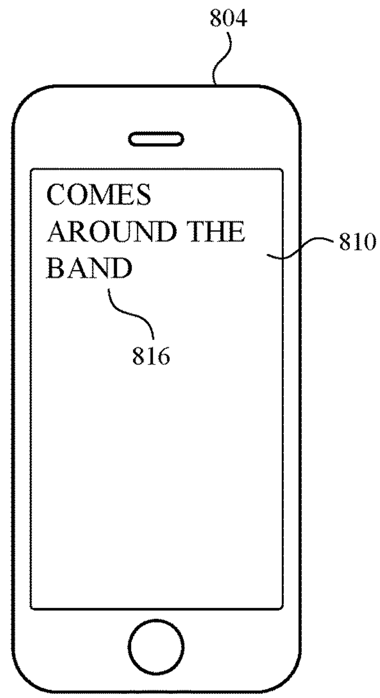
FIGS. 8A-C provide illustrations of multi-modal interaction with an electronic device, according to various examples.
Figure 8B:
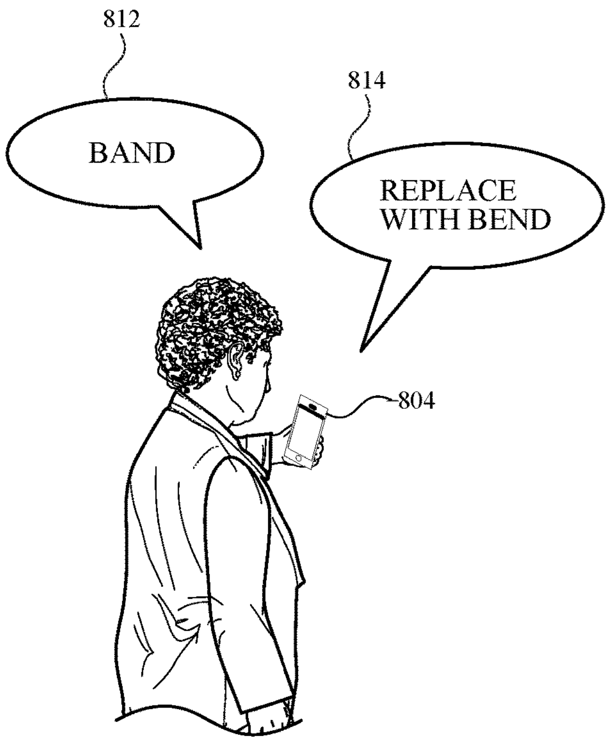
Figure 8C:
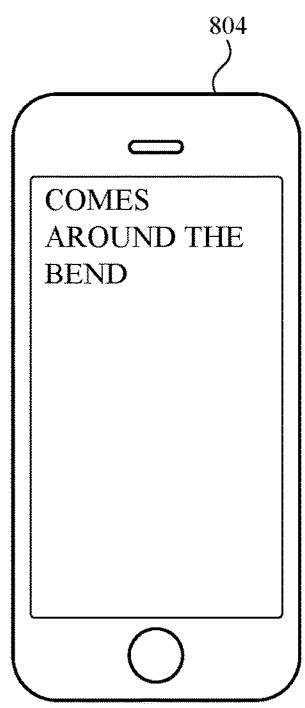

FIGS. 8A-C illustrate various electronic devices of an environment and exemplary user interfaces of the electronic devices, according to various examples. These figures are also used to illustrate one or more of the processes described below, including the process 1300 of FIG. 13.

FIG. 8A illustrates an electronic device 804. The electronic device 804 may be any device described herein, including but not limited to devices 104, 200, 400, and 600 (FIGS. 1, 2A, 4, and 6A-6B). Thus, while the electronic device 804 is depicted as a mobile device, it will be appreciated that the electronic device 804 may be a device of any type, such as a phone, laptop computer, desktop computer, tablet, wearable device (e.g., smart watch), set-top box, television, home automation device (e.g., thermostat), or any combination or subcombination thereof.

In operation, the electronic device 804 receives a first user input from a user of the electronic device 804. The first user input may be a user input of any type including, but not limited to, a touch input, a speech input (e.g., natural-language speech input), a switch input (e.g., a user toggles a physical switch of the electronic device), and/or a typed input (e.g., user enters text using a keyboard interfaced with the electronic device 804).

In some examples, the first user includes a plurality of words. In the illustrated example, a typed user input received by the electronic device 804 includes the words "Comes around the band", which are in turn displayed on a display (e.g., touch-sensitive display) of the electronic device 804. The plurality of words may be provided during operation of a messaging application, email application, word processing application, or any other application of the electronic device 804.

In examples in which the first user input is a speech input (e.g., natural-language speech input), the electronic device may provide a text representation of the speech input and display the text representation as described. In some examples, providing a text representation in manner may include providing one or more candidate text representations (e.g., text strings) of the speech input, for instance, using an STT processing module of the electronic device 804, such as the STT processing module 730. As described, each of the candidate text representations may be associated with a speech recognition confidence score, and the candidate text representations may be ranked accordingly. The highest ranking candidate text representation may be selected as the text representation of the speech input and displayed on the display of the electronic device 804.

In some examples, the first user input includes a command, for instance to send a message or email to a contact (e.g., "send a message to Tom saying I'll be there in five"). In response, the electronic device 804 may initiate the proper application, populate the interface of the application with one or more words provided in the first user input ("I'll be there in five.")

Thereafter, the electronic device 804 receives a second user input from a user of the electronic device 804. The second user input may be a user input of any type, including but not limited to, a touch input, a speech input, a switch input, a typed input, and/or an input provided by a device interfaced with the electronic device 804 (e.g., mouse click). In some examples, the second user input is a user input of a different user input type than the first user input. The first user input may be a typed user input and the second user input may be a speech input, for instance.

In some examples, the second user input may indicate a selection of one or more words of the plurality of words. By way of example, the second user input can specify a word of the plurality of words. With reference to FIG. 8B, the user input 812 may be a natural-language speech input reciting the word "band" of the words of the first user input. The user's reference to the term "band" may serve as a selection of the word "band" of the plurality of words. In other examples, the second user input can reference a word of the plurality of words. In the illustrated example, a user could, for instance, provide a speech input reciting "fourth word", "last word", or "first word of third line" to reference the word "band" of the plurality of words.

In some examples, the second user input is based on one or more characteristics of the user's appearance or behavior. By way of example, the electronic device 804 may determine a direction and/or target of a user's gaze (e.g., using known facial recognition methods), and based on the direction and/or target of the user's gaze, determine if the user is looking at a particular location of the display of the electronic device 804. If it is determined that the user is looking at one or more words displayed by the electronic device 804, the user's gaze may serve as a selection of the one or more words. With reference to FIGS. 8A-8B, instead of reciting "band", the user may look at a location 816 on the display of the electronic device 804 where the word "band" is displayed.

Figure 9A:
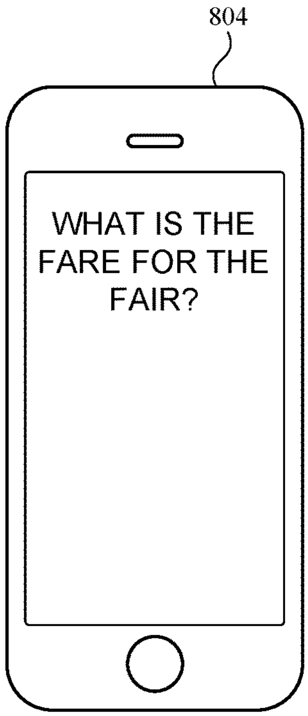
FIGS. 9A-9C provide illustrations of multi-modal interaction with an electronic device, according to various examples.
Figure 9B:
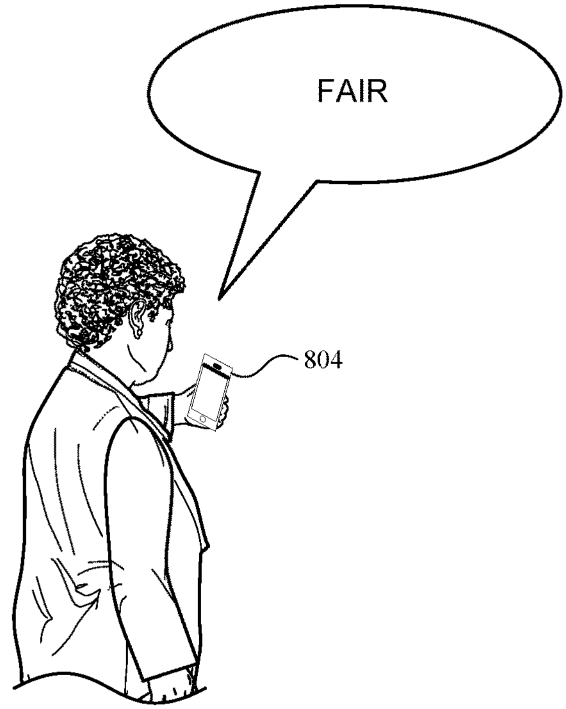
Figure 9C:
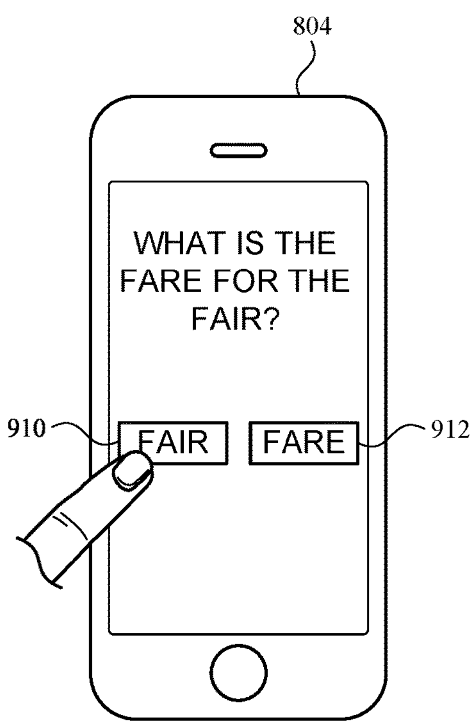

In some examples, determining the selected one or more words of the second user input may require disambiguation. With reference to FIGS. 9A-9C, the electronic device 804 may request a user provide additional user input to disambiguate the selected one or more words. As illustrated, the electronic device 804 may receive a first user input and display words of the first user input on a display of the electronic device 804 (FIG. 9A). The user may thereafter provide a second user input (e.g., "Fair") indicating a selection of a word of the first user input (FIG. 9B). The electronic device 804 then determines whether the selected word requires disambiguation. If so, the electronic device 804 determines a plurality of candidate words for the selected word(s) and provides (e.g., displays) the plurality of candidate words to the user. The user may select a candidate word of the plurality of candidate words to be used as the selected word, as described herein. As depicted in FIG. 9C, the electronic device 804 may determine that each of the candidate words "fare" and "fair" potentially correspond to the word specified by the user in the second user input. Accordingly, the electronic device 804 may provide a respective affordance for each of the candidate words by which each candidate word can be selected. The user may select the affordance 910 using a touch input, for instance, to identify "fair" as the selected word. While description is made herein with respect to disambiguation of a term of the second user input, it will be appreciated that one or more words of other inputs (e.g., first user input, third user input) may be disambiguated in a same or similar manner.

The electronic device 804 further receives a third user input from a user of the electronic device 804. The third user input may be a user input of any type, including but not limited to, a touch input, a speech input, a switch input, a typed input, and/or an input provided by a device interfaced with the electronic device 804. In some examples, the third user input is a user input of a different type than the first user input. Further, in some examples, the third user input is a user input of a same user input type than the second user input.

In some examples, the third user input includes a command (e.g., request to a digital assistant of the electronic device 804). The command may, for instance, be a command to modify one or more words of the plurality of words of the first user input, such as the selected word(s) indicated by the second user input. In some examples, the command is a command to modify formatting and/or text effects of the one or more words. The command may, for instance, specify that one or more words are to be capitalized, italicized, bolded, or underlined (e.g., "Italicize"). In other examples, the command may specify that spelling of a word is to be corrected and/or otherwise modified ("Pluralize it" or "Use the British spelling").

In some examples, the command is a command to replace the selected word with another word provided by the user of the electronic device 804. The replacement word may be specified by the third user input in some instances. With reference to FIG. 8B, the user input 814 may be a natural-language speech input including a request for a digital assistant of the electronic device 804, for instance, to replace the word "band" with the word "bend" (e.g., "Replace with bend").

In some examples, the electronic device 804 determines a task based on the third user input. The electronic device 804 may, for instance, determine a task corresponding to a command of the third user input. By way of example, the electronic device 804 may determine one or more candidate intents based on a text representation of the third input (or may determine candidate intents for each of the n-best candidate text representations of the third input), for instance, using the natural language processing module 732. Each of the candidate intents may be associated with an intent confidence score, and the candidate intents may be ranked accordingly. Further, in some examples, a structured query (partial or complete) is generated for each candidate intent.

Thereafter, candidate tasks are determined based on the m-best (e.g., highest ranked) candidate intents, for instance, using the task flow processing module 736. In some examples, the candidate tasks are identified based on the structured query for each of the m-best (e.g., highest ranked) candidate intents. By way of example, as described, the structured queries may be implemented according to one or more task flows, such as task flows 754, to determine tasks associated with the candidate intents. The electronic device 804 can then identify the highest ranking candidate task as the task associated with the command of the third input.

The electronic device 804 modifies the selected word(s) based on the third user input to provide a modified word (or words). If the third user input includes a command, for instance, the electronic device 804 modifies the selected word(s) according to the command. With reference to FIG. 8C, the electronic device replaces the selected word "band" with the word "bend" according to the user input 814 (FIG. 8B), and displays the modified word(s) on the display of the electronic device 804. In examples in which the electronic device 804 determines candidate user intents based on the third user input and selects a task associated with the highest ranking user intent, modifying the selected word(s) includes performing the task associated with the selected user intent.

While description is made herein with respect to the electronic device 804 receiving separate second and third user inputs (e.g., user inputs 812, 814), it will be appreciated that in some examples, the second and third user inputs may be provided to the electronic device 804 as a single user input (e.g., "Replace band with bend"). The combined user input may both indicate a selection of a word of the first user input (e.g., "band") and specify a command for modifying and/or replacing the selected word (e.g., "replace with bend"). Thus, in some examples, the electronic device 804 may be configured to semantically parse user inputs to identify portions of user inputs indicating a selection a word and portions of user inputs specifying a manner in which selected words are to be modified or replaced.

The operations described above with reference to FIG. 8 are optionally implemented by components depicted in FIGS. 1-4, 6A-6B, and 7A-7C. For example, the operations of process 800 may be implemented by any device (or component thereof) described herein, including but not limited to, devices 104, 200, 400, 600, and 804. It would be clear to a person having ordinary skill in the art how other processes are implemented based on the components depicted in FIGS. 1-4, 6A-6B, and 7A-7C.

Figure 10A:
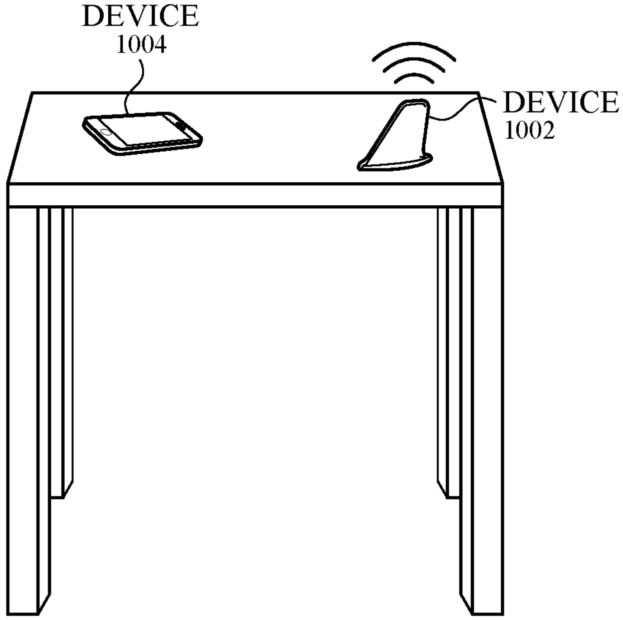
FIG. 10A illustrates various electronic devices of an environment, according to various examples.
Figure 10B:
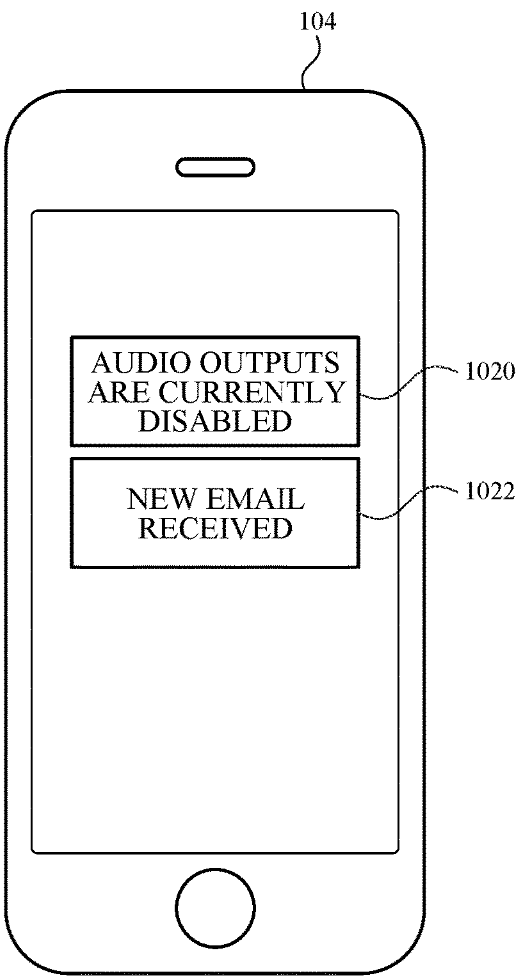
FIGS. 10B-C illustrate exemplary user interfaces of an electronic device, according to various examples.
Figure 10C:
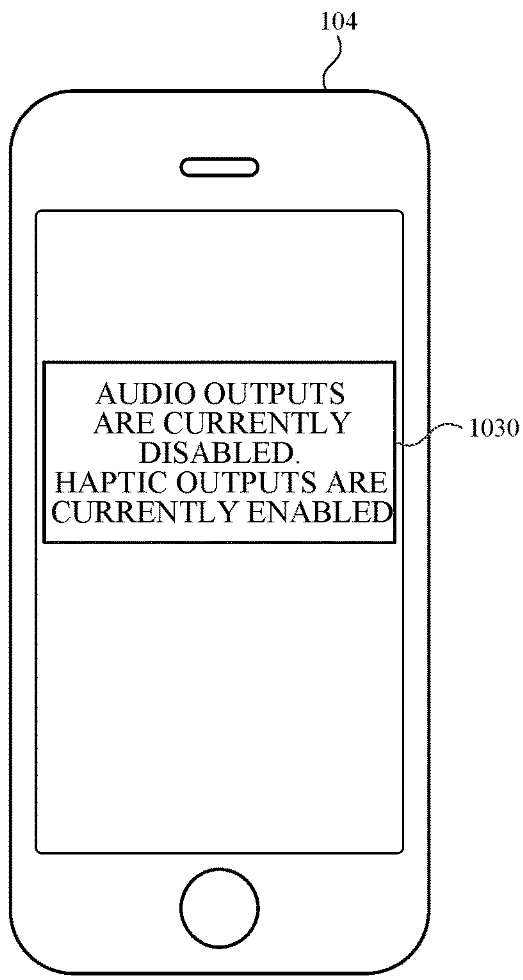

FIGS. 10A-C illustrates various electronic devices of an environment and exemplary user interfaces of the electronic devices, according to various examples. These figures are also used to illustrate one or more of the processes described below, including the process 1400 of FIG. 14.

FIG. 10A illustrates electronic devices 1002, 1004, 1006 of an environment. Each of the devices 1002-1006 may be any device described herein, including but not limited to devices 104, 200, 400, and 600 (FIGS. 1, 2A, 4, and 6A-6B). Accordingly, each device may be a device of any type, such as a phone, laptop computer, desktop computer, tablet, wearable device (e.g., smart watch), set-top box, television, or any combination or subcombination thereof. In the illustrated example, the electronic device 1002 is an electronic device configured to provide a signal (e.g., wireless signal) to one or more electronic devices of the environment, such as the electronic device 1004. The electronic device 1004 is a mobile device in some examples, as depicted. While the illustrated example is described herein with reference to electronic devices 1002 and 1004, it will be appreciated that a fewer or greater number of devices may be used in other implementations. Further, while operation of an electronic device is described with reference to electronic device 1004, it will be appreciated that such operation could be implemented using any electronic device(s) described herein.

In operation, the electronic device 1004 receives context information of (e.g., associated with) the electronic device 1004. Context information of the electronic device 1004 includes information indicative of an environment of the electronic device 1004 in some examples. By way of example, context information may include information describing the acoustic environment of the electronic device 1004. The context information may indicate noise intensity (e.g., volume) of the environment and/or one or more types of noise of the environment. As another example, context information may include information describing visual aspects of the environment of the electronic device 1004. The context information may indicate light intensity of the environment and/or type of light (e.g., infrared) of the environment. As yet another example, context information may include information describing haptic aspects of the environment of the electronic device 1004. The context information may indicate whether the electronic device is moving (e.g., in a car), stationary (e.g., on a table as illustrated in FIG. 10A), held by a user, resting on a surface, or any combination thereof. As yet another example, the context information may include information describing a location of the electronic device 1004. The context may indicate, for instance, whether the electronic device is 1004 at a home or office of the user, at a theater, concert, airport, etc.

Context information of the electronic device 1004 includes information stored on the electronic device and/or indicative of a state of the electronic device 1004 in some examples. By way of example, the context information may include a calendar stored on the electronic device 1004. The electronic device 1004 may determine a location of the electronic device 1004 based on the calendar in some examples. As another example, context information may include information indicating whether one or switches (e.g., physical switches) of the electronic device are in a particular position. As yet another example, context information may include information indicating which output types of the electronic device 1004 are enabled. Output types include but are not limited to, auditory outputs, visual outputs, haptic outputs, and/or electronic outputs (e.g., providing a signal to, or otherwise communicating with, another device).

In some examples, context information may indicate whether the electronic device 1004 has received, or is currently receiving, one or more signals, such as a signal provided by another electronic device (e.g., electronic device 1002). The signal may, for instance, indicate one or more output types, a location of the electronic device 1002 (e.g., theater), one or more device types, or any combination thereof. Output types indicated by the signal may indicate those output types that are to be enabled in response to the signal and/or output types that are to be disabled in response to the signal, as described in further detail below.

In some examples, the electronic device 1004 determines context information of the electronic device 1004, for instance, using one or more sensors or components (e.g., camera, GPS unit) of the electronic device 1004. In other examples, the electronic device receives context information of the electronic device 1004 from one or more other electronic devices.

After receiving context information, the electronic device 1004 determines, based on the context information, whether one or more criteria for disabling an output type are met. In some examples, the electronic device 1004 determines whether the electronic device 1004 is located in one or more predetermined locations. The electronic device 1004 may, for instance, determine that criteria for disabling auditory outputs are met if the electronic device 1004 is determined to be in a location where auditory notifications are discouraged (e.g., theater or library). Additionally or alternatively, the electronic device may determine that criteria for disabling visual and auditory outputs are met if a user of the electronic device 1004 is scheduled to be in a meeting (e.g., determined based on calendar on device and/or location of device). In other examples, the electronic device 1004 determines whether a switch of the electronic device 1004 is in a particular position. The electronic device 1004 may, for instance, determine criteria for disabling auditory outputs are met if a switch of the electronic device 1004 is in a particular position. In yet other examples, the electronic device 1004 determines whether the electronic device 1004 is operating during a predetermined time or on a predetermined day (e.g., day of week, day of month, holiday). The electronic device 1004 may, for instance, determine criteria for disabling visual outputs are met if a current time is during a user's designated sleeping hours (e.g., 3:00 a.m.).

In some examples, the electronic device 1004 determines whether a particular signal is being (or has been) provided to the electronic device 1004 by another electronic device, such as the electronic device 1002. As described, the signal may identify one or more output types. For each of the identified output types, the electronic device 1004 may determine that criteria are met. In some examples, the signal does not specify output types. Rather, the electronic device 1004 may determine that criteria are met for one or more predetermined output types in response to the signal. As an example, the electronic device 1004 may be located in a concert hall and receive a signal from another electronic device, such as the electronic device 1002. Responsive to the signal, the electronic device 1004 may determine that criteria for disabling auditory outputs are met. The signal may further specify one or more device types (e.g., mobile device, speaker). Accordingly, criteria may be met only if a specified device type matches that of the electronic device 1004 in some examples.

In some examples, determining whether criteria for disabling an output type are met includes determining whether one or more thresholds are exceeded. Thresholds applied in this manner may include, but are not limited to, noise intensity thresholds, light intensity thresholds, haptic thresholds, or any combination thereof. As an example, if the environment of the electronic device 1004 has light intensity below a threshold light intensity, the electronic device may determine that criteria for disabling an output type, such as auditory outputs, are met.

If the electronic device 1004 determines that criteria for disabling an output type are met, the electronic device 1004 disables the output type. As described, output types may include visual outputs, auditory outputs, and/or haptic outputs. Accordingly, in response to determining that criteria for disabling an output type are met, the electronic device 1004 can disable visual outputs, auditory outputs, and/or haptic outputs of the electronic device 1004. It will be appreciated that such output types are intended to be exemplary and the electronic device 1004 may disable any type of output in this manner.

With reference to FIG. 10B, in some examples, the electronic device 1004 provides an output (e.g., output 1020) indicating that one or more output types have been disabled. The output is provided using a different output type than the one or more disabled output types in some examples (e.g., the electronic device may indicate that auditory outputs are disabled using a visual output). With reference to FIG. 10C, in some examples, the electronic device further provides an output identifying one or more enabled output types (e.g., output 1030).

In some examples, one or more output types may be disabled (e.g., manually disabled) by a user. The user can disable an output type by selecting an affordance provided by the electronic device 1004, toggling a switch of the electronic device 1004, and/or providing a request to a digital assistant of the electronic device 1004 to disable one or more specified output types (e.g., "Hey Siri, disable audio and vibration"). In some examples, a user may specify conditions for disabling the output types. The user may, for instance, specify a duration for which one or more output types are to be disabled (e.g., "Hey Siri, no interruptions for an hour"), or may specify a location at which one or more output types are to be disabled ("Hey Siri, no sound while I'm at school"). The electronic device 1004 may determine whether the electronic device 1004 is at the specified location, for instance, based on a physical location of the electronic device 1004 (e.g., GPS location indicates the electronic device 1004 is at a school of the user) or by referencing a calendar of a user of the electronic device 1004 (e.g., calendar of the user indicates the user is currently attending a class).

Once an output type has been disabled, the electronic device 1004 thereafter provides outputs according to the disabled outputs. By way of example, the electronic device may receive an input (e.g., natural-language speech input) from a user, determine a response to the input, and identify an output type associated with the response. If the output type associated with the response is enabled, the electronic device 1004 provides the output. If the output type associated with the response is disabled, the electronic device 1004 forgoes providing the output.

In some examples, the electronic device 1004 may provide an indication (e.g., using an enabled output type) that a response could not be provided. As an example, the electronic device 1004 may determine that because auditory output types are disabled, a natural-language speech output cannot be provided to a user in response to an input. Accordingly, the electronic device 1004 can instead provide a haptic output or visual output to indicate to a user that the auditory output was not provided.

In some examples, if the electronic device 1004 determines that an output type associated with a response is disabled, the electronic device 1004 identifies an alternative output type associated with the response and provides the response using the alternative output type. In this manner, the electronic device 1004 may provide a response to an input despite one or more output types being disabled. With reference to FIG. 10B, in some examples, the electronic device 1004 may be configured to provide an auditory output in response to receipt of an email when all output types are enabled. If auditory outputs are disabled (as indicated by output 1020), however, the electronic device 1004 may instead provide a visual output indicating that an email has been received (e.g., output 1022). As another example, in some instances, an auditory output may be a natural-language speech output. If auditory output types are disabled, the electronic device 1004 may instead provide the natural-language output as a natural-language text output on a display of the electronic device 1004.

The operations described above with reference to FIG. 8A-8C are optionally implemented by components depicted in FIGS. 1-4, 6A-6B, and 7A-7C. For example, the operations of process 800 may be implemented by any device (or component thereof) described herein, including but not limited to, devices 104, 200, 400, 600, and 1004. It would be clear to a person having ordinary skill in the art how other processes are implemented based on the components depicted in FIGS. 1-4, 6A-6B, and 7A-7C.

Figure 11A:
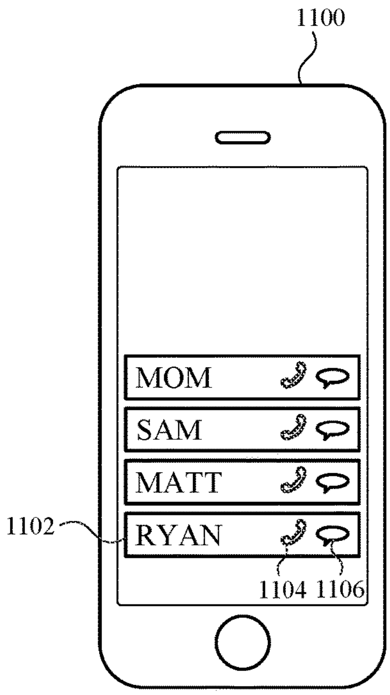
FIGS. 11A-11C provide illustrations of multi-modal interaction with an electronic device, according to various examples.
Figure 11B:
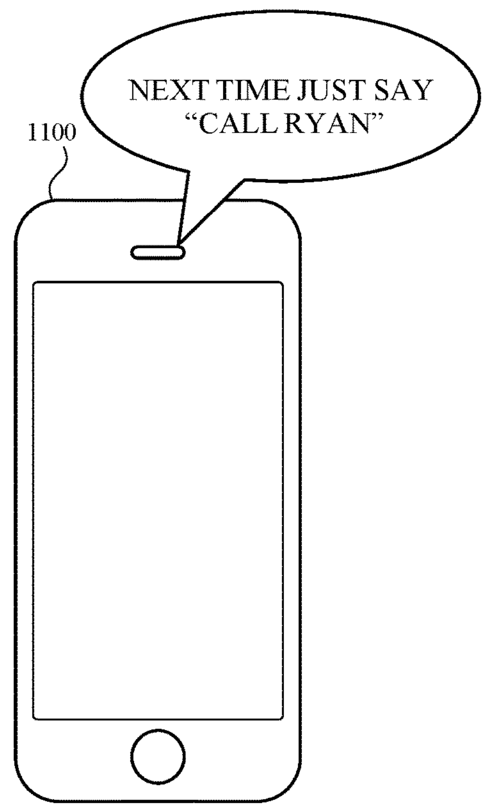
Figure 11C:
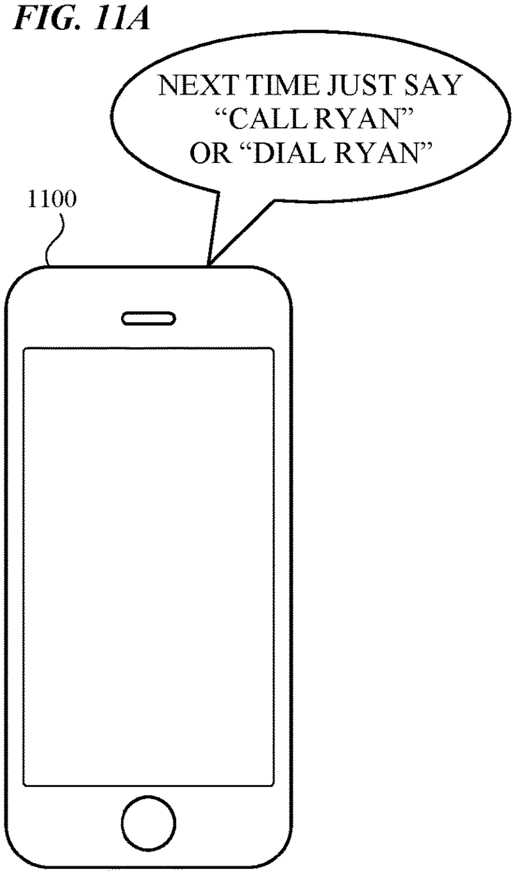

FIGS. 11A-11C illustrate exemplary techniques for providing multi-modal interfaces in accordance with some embodiments. These figures are also used to illustrate one or more of the processes described below, including the process 1500 of FIG. 15.

FIG. 11A shows an electronic device 1100. The electronic device 1100 may be any device described herein, including but not limited to devices 104, 200, 400, and 600 (FIGS. 1, 2A, 4, and 6A-6B). In the illustrated example, the electronic device 1100 is an electronic device having a touch-sensitive display, though it will be appreciated that the electronic device may be a device of any type, such as a phone, laptop computer, desktop computer, tablet, wearable device (e.g., smart watch), set-top box, television, or any combination or subcombination thereof.

In operation, the electronic device 1100 receives a user input from a user of the electronic device 1100. The user input may be a user input of any type. In some examples, the user input is a touch input, for instance, received using a touch-sensitive display of the electronic device 1100. In other examples, the user input is an auditory input (e.g., natural-language speech input). In yet other examples, the user input is a haptic (e.g., vibrational) input, or button press. With reference to FIG. 11A, the user input may be a touch input indicating a selection of an affordance provided (e.g., displayed) on the touch-sensitive display of the electronic device 1100. The user input may be selection of the affordance 1104 or the affordance 1106. In some examples, the user input is indicative of a task. Selection of the affordance 1104 may indicate a task for initiating a telephone call with a contact 1102 (i.e., "Ryan"), and selection of the affordance 1106 may indicate a task for initiating a messaging session with the contact 1102.

In response to the user input, the electronic device 1100 performs the task indicated by the user input. As described, in response to a user input selecting the affordance 1104, the electronic device 1100 initiates a telephone call with the contact 1102, and in response to selection of the affordance 1106, the electronic device 110 initiates a messaging session with the contact 1102.

After performing the task, the electronic device 1100 determines whether the task can be performed in response to a second, alternative user input different than the user input provided to the electronic device 1100. In some examples, the electronic device 1100 determines whether the task can be performed in response to an alternative user input having a same input type as the user input. Each of the user input and the alternative user input may be touch inputs, for instance. In other examples, the electronic device 1100 determines whether the task can be performed in response to an alternative user input having a different input type than the user input. The user input may be a touch input, and the alternative user input may be a speech input (e.g., natural-language speech input), for instance. In the illustrated example, the electronic device 1100 can determine whether the electronic device 1100 can initiate a phone call for the contact 1102 in response to an alternative touch input (e.g., selection of a different affordance) and/or a natural-language speech input ("Call Ryan"). In some examples, the electronic device 1100 determines the alternative user input a predetermined amount of time after performing the task.

In some examples, the electronic device 1100 selectively determines whether the task can be performed in response to an alternative user input. In at least one example, the electronic device 1100 determines a number of times that the task indicated by the user input has been performed. If the task indicated by the user input has been performed a number of times satisfying a predetermined threshold, the electronic device 1100 determines whether the task can be performed in response to an alternative user input. If the task indicated by the user input has not been performed a number of times satisfying the threshold, the electronic device 1100 forgoes determining whether the task can be performed in response to an alternative user input. In some examples, the electronic device 1100 determines a number of times that the task indicated by the user input has been performed in response to the user input. By way of example, the electronic device 1100 can determine the number of times a task has been performed in response to selection of a same affordance. The electronic device 1100 may then determine whether the determined number satisfies a threshold, as described, to selectively determine whether the task can be performed in response to an alternative user input.

If the electronic device 1100 determines that the task can be performed in response to an alternative user input different than the user input, the electronic device 1100 provides (e.g., outputs) the alternative user input to the user. In examples in which the alternative user input is a touch input, the electronic device 1100 may highlight one or more portions (e.g., affordances) of the touch-sensitive display of the electronic device 1100 to indicate to a user where on the touch-sensitive display to provide the alternative input to perform the task. The electronic device 1100 may further indicate to the user, using a natural-language output, that an alternative touch input is available ("Next time you can press here to make a call").

With reference to FIG. 11B, in examples in which the alternative user input is a natural-language speech input (e.g., "Call Ryan"), the electronic device 1100 can provide the alternative user input by including the alternative user input in a natural-language speech output (e.g., "Next time just say 'Call Ryan'") provided to the user. In some examples, the electronic device 1100 further displays the alternative speech input on a display of the electronic device 1100.

In some examples, the electronic device determines the natural-language speech input based on the task. For instance, the electronic device 1100 can determine one or more actionable intents associated with the task and determine one or more text representations of the natural-language speech input based on the one or more actionable intents. The electronic device 1100 can then select one of the one or more text representations to provide the user as the natural-language speech input. In some examples, each of the actionable intents and/or text representations are associated with a respective score and the electronic device 1100 selects a text representation based on the respective scores.

In some examples, the electronic device 1100 selectively provides the alternative user input to the user. In at least one example, the electronic device 1100 provides an output (e.g., natural-language output) requesting an additional user input, and based on the additional user input, the electronic device 1100 selectively provides the alternative user input to the user. After determining the alternative user input, the electronic device 1100 may, for instance, provide the natural-language output "There is a quicker way to do that next time. Would you like to know how?" In response, the user may indicate whether he or she would like to receive an output indicating the alternative user input. If the user answers affirmatively, the electronic device 1100 provides the alternative user input to the user. If the user answers negatively, the electronic device 1100 forgoes providing the alternative user input to the user.

In some examples, the electronic device 1100 determines and/or provides multiple alternative user inputs to the user. The electronic device 1100 may, for instance, determine multiple natural-language speech inputs that may be used to perform a task and present each of the multiple natural-language speech inputs to the user. With reference to FIG. 11C, the electronic device can indicate to a user that either of the natural-language speech inputs "Call Ryan" or "Dial Ryan" may be used to perform the task of initiating a telephone call for the contact 1102. In some examples, the electronic device 110 determines and/or provides alternative user inputs of different input types. The electronic device can, for instance, indicate that the natural-language speech input "Call Ryan" or a particular affordance may be used to perform a task.

In some examples, alternative user inputs are provided to the user based on user preferences and/or previous usage of the electronic device. In some examples, alternative user inputs provided by the electronic device are a same user input type as user inputs primarily used to perform the task using the electronic device 1100. If the user primarily performs the task using natural-language speech inputs, the electronic device 1100 may provide alternative user inputs that are natural-language speech inputs. In other examples, alternative user inputs provided by the electronic device are different user input types than user inputs typically used to operate the electronic device 1100. If the user primarily performs the task using natural-language speech inputs, the electronic device 1100 may provide alternative user inputs that are touch inputs.

While reference is made herein with respect to the electronic device 1100 determining and/or providing alternative user inputs after performing a task, it will be appreciated that the electronic device 1100 may determine and/or provide alternative user inputs prior to performing a task and/or concurrently while performing the task.

The operations described above with reference to FIG. 8A-8C are optionally implemented by components depicted in FIGS. 1-4, 6A-6B, and 7A-7C. For example, the operations of process 800 may be implemented by any device (or component thereof) described herein, including but not limited to, devices 104, 200, 400, 600, and 1100. It would be clear to a person having ordinary skill in the art how other processes are implemented based on the components depicted in FIGS. 1-4, 6A-6B, and 7A-7C.

Figure 12A:
FIGS. 12A-12B provide illustrations of multi-modal interaction with an electronic device, according to various examples.
Figure 12B:
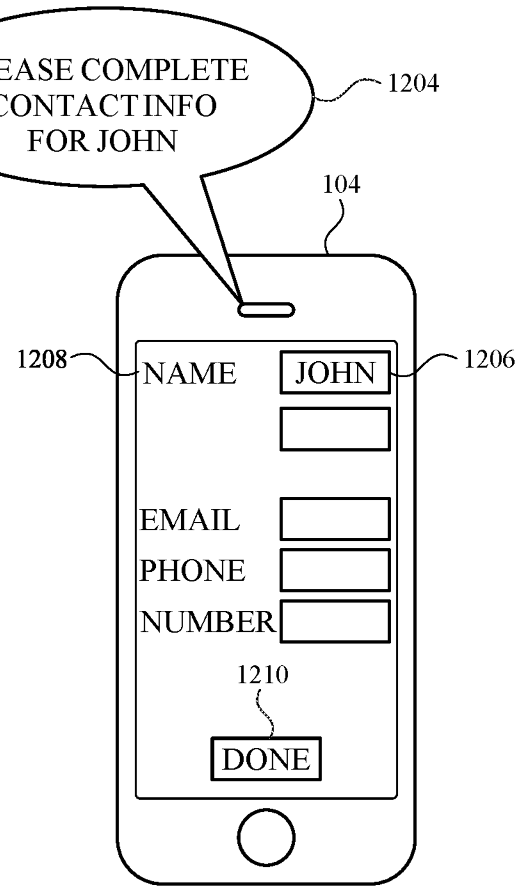

FIGS. 12A-12B illustrate exemplary techniques for providing multi-modal interfaces in accordance with some embodiments. These figures are also used to illustrate one or more of the processes described below, including the process 1600 of FIG. 16.

FIG. 12A shows an electronic device 1200. The electronic device 1200 may be any device described herein, including but not limited to devices 104, 200, 400, and 600 (FIGS. 1, 2A, 4, and 6A-6B). In the illustrated example, the electronic device 1200 is an electronic device having a touch-sensitive display, though it will be appreciated that the electronic device may be a device of any type, such as a phone, laptop computer, desktop computer, tablet, wearable device (e.g., smart watch), set-top box, television, or any combination or subcombination thereof.

In operation, the electronic device 1200 receives a first user input from a user of the electronic device 1200. The first user input may be a user input of any type. In some examples, the first user input is a speech input (e.g., natural-language speech input). With reference to FIG. 12A, the first user input 1202 may be a speech input indicative of a request to a digital assistant of the electronic device 1200, for instance, to create a new contact with a specified name (e.g., "Create a new contact for John"). In other examples, the first user input is a touch input received using a touch-sensitive display of the electronic device 1200. In yet other examples, the first user input is a haptic (e.g., vibrational) input, or button press.

In examples in which the first user input is a natural-language speech input, the electronic device 1200 processes the first user input 1202 to provide one or more candidate text representations (e.g., text strings) of the natural-language speech input, for instance, using the STT processing module 730. As described, each of the candidate text representations may be associated with a speech recognition confidence score, and the candidate text representations may be ranked accordingly. In other examples, the first user input is a textual input (e.g., inputted via a touchpad of the electronic device 800) and is provided as a candidate text representation, where n=1. Textual inputs provided as candidate text representations in this manner may be assigned a maximum speech recognition confidence score, or any other speech recognition confidence score. With reference to FIG. 12A, the digital assistant provides one or more candidate text representations including a text string "Create a new contact for John".

In some examples, the electronic device 1200 provides one or more candidate intents based on the n-best (e.g., highest ranked) candidate text representations, for instance, using the natural language processing module 732. Each of the candidate intents may be associated with an intent confidence score, and the candidate intents may be ranked accordingly. In some examples, multiple candidate intents are identified for each candidate text representation. Further, in some examples, a structured query (partial or complete) is generated for each candidate intent. With reference to FIG. 12A, the digital assistant of electronic device 1200 provides a candidate intent of "create contact" based on the candidate text representation "Create a new contact for John". Further, the digital assistant of the electronic device determines a structured query {create contact, name=John}.

Thereafter, candidate tasks are determined based on the m-best (e.g., highest ranked) candidate intents, for instance, using the task flow processing module 736. In some examples, the candidate tasks are identified based on the structured query for each of the m-best (e.g., highest ranked) candidate intents. By way of example, as described, the structured queries may be implemented according to one or more task flows, such as task flows 754, to determine tasks associated with the candidate intents.

In some examples, the electronic device 1200 determines whether additional input is required to perform the task. By way of example, the electronic device 1200 can determine whether a parameter needs to be confirmed, for instance, by a user of the electronic device 1200. The electronic device 1200 can determine that user input confirming or correcting spelling of a word is required to perform the task. In the illustrated example, the electronic device 1200 may determine that the spelling of the name "John" is required to be confirmed prior to generating the requested contact. In another example, the electronic device 1200 can determine whether additional parameters are required to perform the task. With reference to FIG. 12B, the electronic device 1200 may determine that additional information (e.g., surname, contact information) pertaining to the contact John is required prior to generating the requested contact.

In some examples, the electronic device determines whether additional input is required to perform the task based on context information of the electronic device. By way of example, the electronic device 1200 may require additional input based on an environment of the electronic device 1200. If the electronic device 1200 is in a loud environment, for instance, the electronic device 1200 may require confirmation of speech recognition prior to performing a task (e.g., saving text in a note). As another example, the electronic device 1200 may require additional input based on information stored in the electronic device. With reference to FIGS. 12A-12B, if a user requests that a contact be generated for a person named John, the electronic device 1200 may require entry of a surname if one or more existing contacts stored on the electronic device 1200 have a first name of John.

In some examples, the electronic device 1200 identifies a type of the task and determines whether additional input is required to perform the task based on the type of the task. Certain tasks, for instance, may require touch input confirmation prior to the task being performed. As an example, if the task is a task to send a message to another user, the electronic device 1200 may determine that confirmation of the message contents (e.g., by touch input) is required before the message may be sent message (e.g., the user confirms the message is correct).

In some examples, the electronic device 1200 determines whether additional input is required to perform a task by determining whether one or more structured queries are complete such that a task associated with each structured query may be successfully performed.

If the electronic device 1200 determines that additional input is required to perform a task, the electronic device 1200 requests a second user input. In some examples, the first user input and the second user input are user inputs of a same user input type (e.g., speech inputs). In other examples, the first user input and the second user input are user inputs of different types. The first user input is a speech input and the second user input is a touch input in some examples.

In some examples, requesting the additional user input includes requesting the second user input from a user of the electronic device 1200. Requesting the second user input includes prompting a user to provide the user input in some examples. As an example, with reference to FIG. 12B, the electronic device 1200 can provide an output (e.g., natural-language output) requesting that the user provide the second user input (e.g., "Please Complete Contact Info for John"). As another example, the electronic device 1200 can provide (e.g., display) one or more text entry fields and/or affordances by which the user can provide the additional user input.

In some examples, the electronic device 1200 identifies a data type associated with the task and/or the additional user input required to perform the task, determines an input type associated with the data type, and requests a user input of the determined input type. In this manner, the electronic device 1200 may request user input of an input type determined to be best for providing the requested user input. By way of example, the electronic device 1200 may determine that contact information (e.g., phone number) is required prior to generating a contact, and further determine that the contact information is best provided by way of touch input. The electronic device 1200 may thereafter provide a natural-language output requesting that a user provide the contact information by way of touch input (e.g., "Please use the displayed keypad to enter a phone number for the contact John in the highlighted field").

The electronic device 1200 thereafter receives the requested user input (e.g., second user input) from the user of the electronic device 1200.

In some examples, the electronic device 1200 determines that multiple user inputs are required before a task may be performed. Accordingly, the electronic device 1200 can request any number of user inputs such that the electronic device 1200 receives the additional input required to perform the task.

Once the additional input (e.g., second user input) has been received, the electronic device 1200 performs the task based, at least in part, on the additional input. By way of example, based on a structured query, a task flow processing module of the electronic device 1200 (e.g., task flow processing module 736) invokes programs, methods, services, APIs, or the like, to perform the task. In examples in which the electronic device requests multiple additional inputs, the electronic device 1200 performs the task based, at least in part, on each of the multiple additional inputs.

The operations described above with reference to FIGS. 8A-8C are optionally implemented by components depicted in FIGS. 1-4, 6A-6B, and 7A-7C. For example, the operations of process 800 may be implemented by any device (or component thereof) described herein, including but not limited to, devices 104, 200, 400, 600, and 1200. It would be clear to a person having ordinary skill in the art how other processes are implemented based on the components depicted in FIGS. 1-4, 6A-6B, and 7A-7C.

5. Processes for Providing Multi-Modal Interfaces

Figure 13:
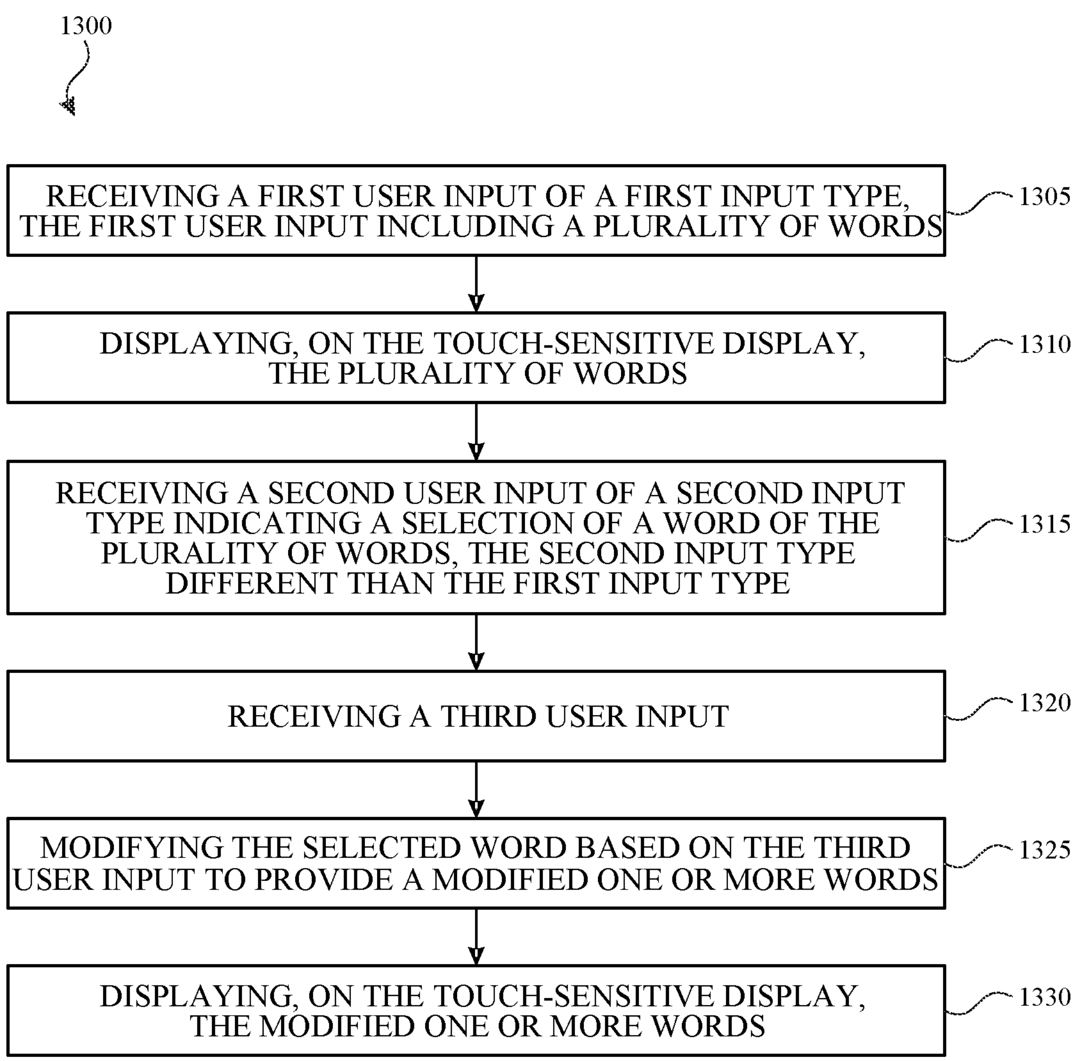
FIG. 13 illustrates a process for multi-modal interaction with an electronic device, according to various examples.

FIG. 13 illustrates a process 1300 for multi-modal interaction with an electronic device, according to various examples. Process 1300 is performed, for example, using one or more electronic devices implementing a digital assistant. In some examples, process 1300 is performed using a client-server system (e.g., system 100), and the blocks of process 1300 are divided up in any manner between the server (e.g., DA server 106) and a client device. In other examples, the blocks of process 1300 are divided up between the server and multiple client devices (e.g., a mobile phone and a smart watch). Thus, while portions of process 1300 are described herein as being performed by particular devices of a client-server system, it will be appreciated that process 1300 is not so limited. In other examples, process 1300 is performed using only a client device (e.g., user device 104) or only multiple client devices. In process 1300, some blocks are, optionally, combined, the order of some blocks is, optionally, changed, and some blocks are, optionally, omitted. In some examples, additional steps may be performed in combination with the process 1300.

At block 1305, the electronic device receives a first user input of a first input type. The first user input includes a plurality of words. In some examples, the first user input includes a first command. In some examples, the first user input includes a second command. In some examples, the first command is a command to modify capitalization of the selected word. In some examples, the first command is a command to modify spelling of the selected word. In some examples, the first command is a command to modify textual effects of the selected word.

At block 1310, the electronic device displays the plurality of words on a touch-sensitive display of the electronic device.

At block 1315, the electronic device receives a second user input of a second input type indicating a selection of a word of the plurality of words. The second input type is different than the first input type in some examples. In some examples, the second user input is associated with a direction of a user's gaze.

In some examples, the electronic device determines whether the selected word requires disambiguation. In accordance with a determination that the selected word requires disambiguation, the electronic device determines a plurality of candidate words and provides the plurality of candidate words.

At block 1320, the electronic device receives a third user input. In some examples, the first user input of the first input type is a typed input and the third user input is a speech input. In some examples, the third user input includes a replacement word. In some examples, the third user input includes a reference to a word of the plurality of words. In some examples, receiving a third user input includes receiving a selection of a candidate word of the plurality of candidate words.

In some examples, the electronic device determines a user intent based on the first input and determines a task associated with the user intent.

At block 1325, the electronic device modifies the selected word based on the third user input. In some examples, modifying the selected word based on the third user input to provide a modified one or more words includes modifying the one or more words based on the first command. In some examples, modifying the selected word based on the third user input to provide a modified one or more words includes performing the task. In some examples, modifying the selected word based on the third user input to provide a modified one or more words includes replacing the selected word with the replacement word. In some examples, modifying the selected word based on the third user input to provide a modified one or more words includes replacing the selected word with the selected candidate word.

At block 1330, the electronic device displays the modified one or more words on the touch-sensitive display. In some examples, displaying the modified one or more words includes determining a confidence score for each of the plurality of words and displaying the plurality of words based on the confidence score of each word of the plurality of words. In some examples, determining a confidence score includes determining a speech-to-text score, determining a natural-language score, and determining a confidence score based on the speech-to-text score and the natural-language score. In some examples, determining a confidence score for each of the plurality of words includes determining a confidence score each word of the plurality of words. In some examples, displaying the modified one or more words includes displaying the plurality of words using a word processing application, a messaging application, an email application, or any combination thereof.

Figure 14:
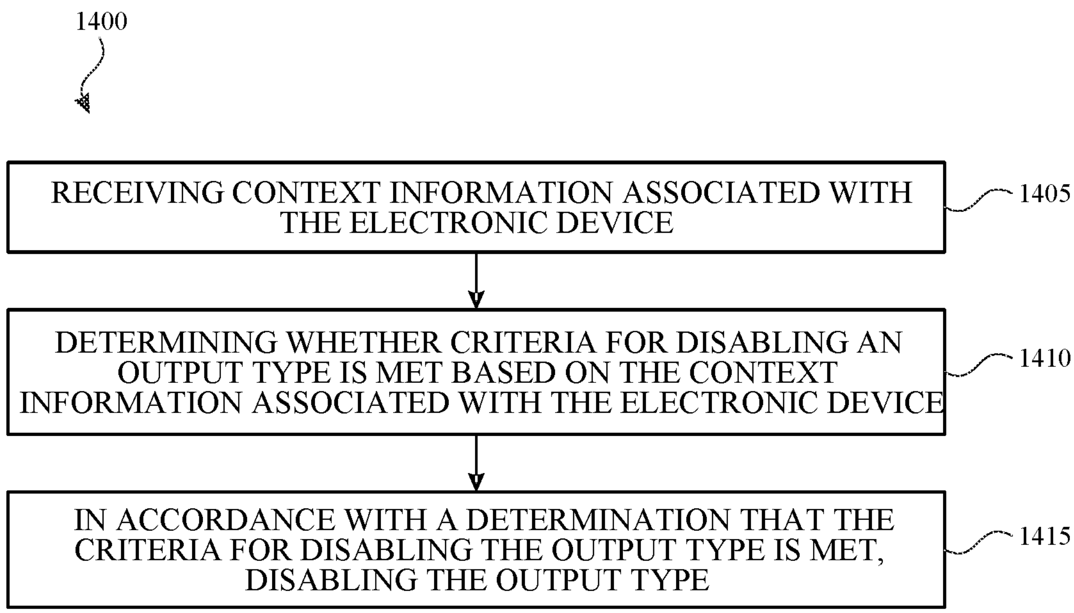
FIG. 14 illustrates a process for selectively disabling an output of an electronic device, according to various examples.

FIG. 14 illustrates a process 1400 for selectively disabling an output of an electronic device, according to various examples. Process 1400 is performed, for example, using one or more electronic devices implementing a digital assistant. In some examples, process 1400 is performed using a client-server system (e.g., system 100), and the blocks of process 1400 are divided up in any manner between the server (e.g., DA server 106) and a client device. In other examples, the blocks of process 1400 are divided up between the server and multiple client devices (e.g., a mobile phone and a smart watch). Thus, while portions of process 1400 are described herein as being performed by particular devices of a client-server system, it will be appreciated that process 1400 is not so limited. In other examples, process 1400 is performed using only a client device (e.g., user device 104) or only multiple client devices. In process 1400, some blocks are, optionally, combined, the order of some blocks is, optionally, changed, and some blocks are, optionally, omitted. In some examples, additional steps may be performed in combination with the process 1400.

At block 1405, the electronic device receives context information associated with the electronic device. In some examples, the context information is based on an environment of the electronic device. In some examples, receiving context information includes determining whether the electronic device is receiving a signal of a predetermined type. In some examples, the signal of the predetermined type is indicative of an output type.

At block 1410, the electronic device determines whether criteria for disabling an output type are met based on the context information associated with the electronic device.

At block 1415, in accordance with a determination that the criteria for disabling the output type are met, the electronic device disables the output type. In some examples, in accordance with a determination that the criteria for disabling the output type are met, the electronic device further provides a first output indicating that the output type is disabled. In some examples, providing the first output includes providing the first output using a second output typed different than the output type. In some examples, providing the first output indicating that the output type is disabled includes providing an output identifying one or more enabled output types.

In some examples, the electronic device receives a user input and disables one or more output types responsive to the user input.

In some examples, the electronic device receives an input and identifies an output type for providing a second output associated with the input. The electronic device determines if the identified output type is disabled. In accordance with a determination that the output type is disabled, the electronic device forgoes providing the second output. In accordance with a determination that the output type is not disabled, the electronic device provides the second output.

In some examples, in accordance with a determination that the output type is disabled, the electronic device provides a third output indicating that the second output was not provided.

In some examples, in accordance with a determination that the output type is disabled, the electronic device identifies an output type for providing a fourth output associated with the input and provides the fourth output.

Figure 15:
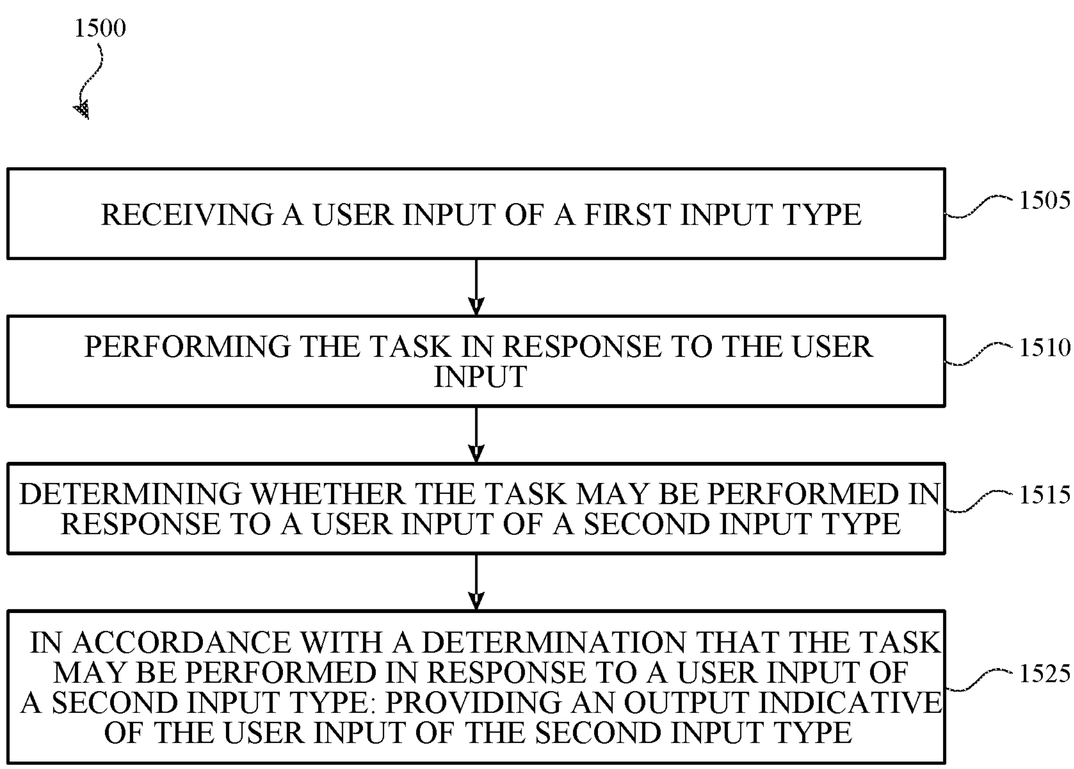
FIG. 15 illustrates a process for multi-modal interaction with an electronic device, according to various examples.

FIG. 15 illustrates a process 1500 for multi-modal interaction with an electronic device, according to various examples. In some examples, process 1500 is performed using a client-server system (e.g., system 100), and the blocks of process 1500 are divided up in any manner between the server (e.g., DA server 106) and a client device. In other examples, the blocks of process 1500 are divided up between the server and multiple client devices (e.g., a mobile phone and a smart watch). Thus, while portions of process 1500 are described herein as being performed by particular devices of a client-server system, it will be appreciated that process 1500 is not so limited. In other examples, process 1500 is performed using only a client device (e.g., user device 104) or only multiple client devices. In process 1500, some blocks are, optionally, combined, the order of some blocks is, optionally, changed, and some blocks are, optionally, omitted. In some examples, additional steps may be performed in combination with the process 1500.

At block 1505, the electronic device receives a user input of a first input type. The user input is indicative of a task in some examples.

At block 1510, the electronic device performs the task in response to the user input of the first input type. In some examples, the user input of the first input type is a touch input.

At block 1515, the electronic device determines whether the task may be performed in response to a user input of a second input type. In some examples, the user input of the second input type is a natural-language input. In some examples, determining whether the task may be performed in response to a user input of a second input type includes determining a number of times the task has been performed in response to the user input, determining whether the number of times the task has been performed in response to the user input satisfies a threshold, and in accordance with a determination that the number of times the task has been performed in response to the user input exceeds the threshold, determining whether the task may be performed in response to a user input of a second input type.

At block 1520, in accordance with a determination that the task may be performed in response to a user input of the second type, the electronic device provides an output indicative of the user input of the second input type. In some examples, the output is a natural-language output. In some examples, providing an output indicative of the user input of the second input type includes providing the output indicative of the user input of the second input type a predetermined amount of time after performing the task. In some examples, provides an output indicative of the user input of the second input type includes providing a second natural-language output, receiving a second user input requesting the output, and responsive to the second user input, providing the output.

In some examples, the electronic device determines whether the task may be performed in response to a second user input of the second input type. In accordance with a determination that the task may be performed in response to the second user input of the second input type, the electronic device provides output indicative of the second user input of the second input type.

Figure 16:
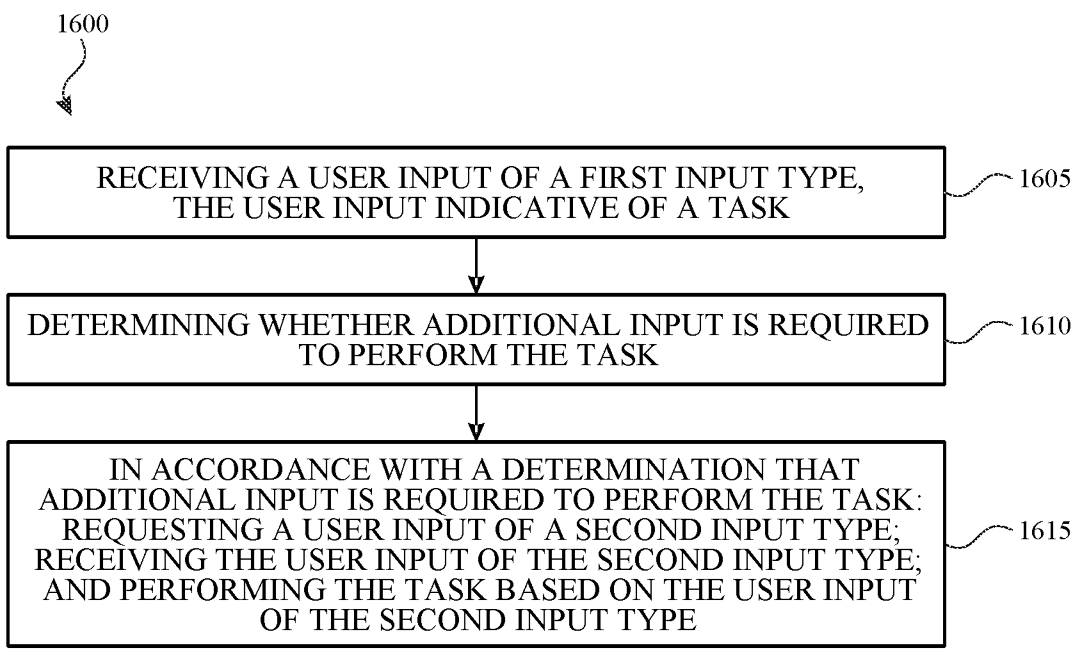
FIG. 16 illustrates a process for multi-modal interaction with an electronic device, according to various examples.

FIG. 16 illustrates a process 1600 for multi-modal interaction with an electronic device, according to various examples. Process 1600 is performed, for example, using one or more electronic devices implementing a digital assistant. In some examples, process 1600 is performed using a client-server system (e.g., system 100), and the blocks of process 1600 are divided up in any manner between the server (e.g., DA server 106) and a client device. In other examples, the blocks of process 1600 are divided up between the server and multiple client devices (e.g., a mobile phone and a smart watch). Thus, while portions of process 1600 are described herein as being performed by particular devices of a client-server system, it will be appreciated that process 1600 is not so limited. In other examples, process 1600 is performed using only a client device (e.g., user device 104) or only multiple client devices. In process 1600, some blocks are, optionally, combined, the order of some blocks is, optionally, changed, and some blocks are, optionally, omitted. In some examples, additional steps may be performed in combination with the process 1600.

At block 1605, the electronic device receives a user input of a first input type. The user input is indicative of a task in some examples.

At block 1610, the electronic device determines whether additional input is required to perform the task. In some examples, determining whether additional input is required to perform the task includes determining, based on context of the electronic device, whether additional input is required to perform the task. In some examples, determining whether additional input is required to perform the task includes identifying a type of the task.

At block 1615, in accordance with a determination that additional input is required to perform the task, the electronic device requests a user input of a second input type, receives the user input of the second input type, and performs the task based on the user input of the second input type. In some examples, requesting a user input of a second input type includes prompting a user to enter the user input of the second input type. In some examples, requesting a user input of a second input type includes identifying a data type associated with the task, determining an input type associated with the data type, and requesting a user input of the determined input type.

In some examples, the electronic device requests a user input of a third input type, receives the user input of the third input type, and performs the task based on the user input of the third input type.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In accordance with some implementations, an electronic device (e.g., a portable electronic device) is provided that comprises means for performing any of the methods or processes described herein.

In accordance with some implementations, an electronic device (e.g., a portable electronic device) is provided that comprises a processing unit configured to perform any of the methods or processes described herein.

In accordance with some implementations, an electronic device (e.g., a portable electronic device) is provided that comprises one or more processors and memory storing one or more programs for execution by the one or more processors, the one or more programs including instructions for performing any of the methods or processes described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. A method, comprising:

at an electronic device having one or more processors and a touch-sensitive display:

receiving a first user input of a first input type, the first user input corresponding to a plurality of words;

displaying, on a view of the touch-sensitive display, the plurality of words of the first user input;

receiving a second user input of a second input type indicating an attempted selection of a word of the plurality of words of the first user input, the second input type different than the first input type;

determining that more than one word of the plurality of words of the first user input potentially corresponds to the attempted selection;

simultaneously displaying, on the view of the touch-sensitive display, both the plurality of words and an affordance for each word of the plurality of words of the first user input that potentially corresponds to the attempted selection, wherein each affordance includes a copy of the word of the plurality of words associated with the affordance;

receiving a selection of one of the displayed words of the first user input that potentially corresponds to the attempted selection;

designating the selected one of the displayed words as a selected word of the plurality of words;

receiving a third user input;

modifying the selected word based on the third user input to provide a modified one or more words; and displaying, on the view of the touch-sensitive display, the modified one or more words.

2. The method of claim 1, wherein displaying, on the view of the touch-sensitive display, the plurality of words comprises:

determining a confidence score for each of the plurality of words; and displaying the plurality of words based on the confidence score of each word of the plurality of words.

3. The method of claim 2, wherein determining a confidence score for each of the plurality of words comprises:

for each word of the plurality of words:

determining a speech-to-text score;

determining a natural-language score; and determining a confidence score based on the speech-to-text score and the natural-language score.

4. The method of claim 1, wherein the first user input of the first input type is a typed input and wherein the third user input is a speech input.

5. The method of claim 4, wherein the speech input includes a first command and wherein modifying the selected word based on the third user input to provide a modified one or more words comprises modifying the one or more words based on the first command.

6. The method of claim 5, wherein the first command is a command to modify capitalization of the selected word.

7. The method of claim 5, wherein the first command is a command to modify spelling of the selected word.

8. The method of claim 5, wherein the first command is a command to modify textual effects of the selected word.

9. The method of claim 1, further comprising:

determining a user intent based on the third user input; and determining a task associated with the user intent, wherein modifying the selected word based on the third user input to provide a modified one or more words comprises performing the task.

10. The method of claim 9, wherein the third user input includes a replacement word and wherein modifying the selected word based on the third user input to provide a modified one or more words comprises replacing the selected word with the replacement word.

11. The method of claim 9, wherein the third user input includes a reference to a word of the plurality of words.

12. The method of claim 1, wherein the second user input corresponds to a direction of a user's gaze.

13. The method of claim 1, further comprising:

determining whether the selected word requires disambiguation;

in accordance with a determination that the selected word requires disambiguation, determining a plurality of candidate words; and providing the plurality of candidate words, wherein receiving the third user input comprises receiving a selection of a candidate word of the plurality of candidate words, wherein modifying the selected word based on the third user input to provide a modified one or more words comprises replacing the selected word with the selected candidate word.

14. The method of claim 13, wherein displaying, on the view of the touch-sensitive display, the plurality of words comprises:

displaying the plurality of words using a word processing application, a messaging application, an email application, or any combination thereof.

15. The method of claim 1, wherein the first input includes a second command.

16. The method of claim 1, wherein the second user input of the second input type is a speech input.

17. A non-transitory computer-readable storage medium storing one or more programs, the one or more programs comprising instructions, which when executed by one or more processors of an electronic device, cause the electronic device to:

receive a first user input of a first input type, the first user input corresponding to a plurality of words;

display, on a view of a touch-sensitive display, the plurality of words of the first user input;

receive a second user input of a second input type indicating an attempted selection of a word of the plurality of words of the first user input, the second input type different than the first input type;

determine that more than one word of the plurality of words of the first user input potentially corresponds to the attempted selection;

simultaneously display, on the view of the touch-sensitive display, both the plurality of words and an affordance for each word of the plurality of words of the first user input that potentially corresponds to the attempted selection, wherein each affordance includes a copy of the word of the plurality of words associated with the affordance;

receive a selection of one of the displayed words of the first user input that potentially corresponds to the attempted selection;

designate the selected one of the displayed words as a selected word of the plurality of words;

receive a third user input;

modify the selected word based on the third user input to provide a modified one or more words; and display, on the view of the touch-sensitive display, the modified one or more words.

18. The non-transitory computer-readable storage medium of claim 17, wherein the second user input of the second input type is a speech input.

19. The non-transitory computer-readable storage medium of claim 17, wherein displaying, on the view of the touch-sensitive display, the plurality of words comprises:

determining a confidence score for each of the plurality of words; and displaying the plurality of words based on the confidence score of each word of the plurality of words.

20. The non-transitory computer readable storage medium of claim 19, wherein determining a confidence score for each of the plurality of words comprises:

for each word of the plurality of words:

determining a speech-to-text score;

determining a natural-language score; and determining a confidence score based on the speech-to-text score and the natural-language score.

21. The non-transitory computer readable storage medium of claim 17, wherein the first user input of the first input type is a typed input and wherein the third user input is a speech input.

22. The non-transitory computer readable storage medium of claim 21, wherein the speech input includes a first command and wherein modifying the selected word based on the third user input to provide a modified one or more words comprises modifying the one or more words based on the first command.

23. The non-transitory computer readable storage medium of claim 21, wherein the first command is a command to modify capitalization of the selected word.

24. The non-transitory computer readable storage medium of claim 21, wherein the first command is a command to modify spelling of the selected word.

25. The non-transitory computer readable storage medium of claim 21, wherein the first command is a command to modify textual effects of the selected word.

26. The non-transitory computer readable storage medium of claim 17, wherein the one or more programs further comprise instructions, which when executed by the one or more processors of the electronic device, cause the electronic device to:

determine a user intent based on the third user input; and determine a task associated with the user intent, wherein modifying the selected word based on the third user input to provide a modified one or more words comprises performing the task.

27. The non-transitory computer readable storage medium of claim 26, wherein the third user input includes a replacement word and wherein modifying the selected word based on the third user input to provide a modified one or more words comprises replacing the selected word with the replacement word.

28. The non-transitory computer readable storage medium of claim 26, wherein the third user input includes a reference to a word of the plurality of words.

29. The non-transitory computer readable storage medium of claim 17, wherein the second user input corresponds to a direction of a user's gaze.

30. The non-transitory computer readable storage medium of claim 17, wherein the one or more programs further comprise instructions, which when executed by the one or more processors, cause the electronic device to:

determine whether the selected word requires disambiguation;

in accordance with a determination that the selected word requires disambiguation, determine a plurality of candidate words; and provide the plurality of candidate words, wherein receiving the third user input comprises receiving a selection of a candidate word of the plurality of candidate words, and wherein modifying the selected word based on the third user input to provide a modified one or more words comprises replacing the selected word with the selected candidate word.

31. The non-transitory computer readable storage medium of claim 30, wherein displaying, on the view of the touch-sensitive display, the plurality of words comprises:

displaying the plurality of words using a word processing application, a messaging application, an email application, or any combination thereof.

32. The non-transitory computer readable storage medium of claim 17, wherein the first input includes a second command.

33. An electronic device, comprising:

one or more processors;

a memory; and one or more programs, wherein the one or more programs are stored in the memory and configured to be executed by the one or more processors, the one or more programs including instructions for:

receiving a first user input of a first input type, the first user input corresponding to a plurality of words;

displaying, on a view of a touch-sensitive display, the plurality of words of the first user input;

receiving a second user input of a second input type indicating an attempted selection of a word of the plurality of words of the first user input, the second input type different than the first input type;

determining that more than one word of the plurality of words of the first user input potentially corresponds to the attempted selection;

simultaneously displaying, on the view of the touch-sensitive display, both the plurality of words and an affordance for each word of the plurality of words of the first user input that potentially corresponds to the attempted selection, wherein each affordance includes a copy of the word of the plurality of words associated with the affordance;

receiving a selection of one of the displayed words of the first user input that potentially corresponds to the attempted selection;

designating the selected one of the displayed words as a selected word of the plurality of words;

receiving a third user input;

modifying the selected word based on the third user input to provide a modified one or more words; and displaying, on the view of the touch-sensitive display, the modified one or more words.

34. The electronic device of claim 33, wherein the second user input of the second input type is a speech input.

35. The electronic device of claim 33, wherein displaying, on the view of the touch-sensitive display, the plurality of words comprises:

determining a confidence score for each of the plurality of words; and displaying the plurality of words based on the confidence score of each word of the plurality of words.

36. The electronic device of claim 35, wherein determining a confidence score for each of the plurality of words comprises:

for each word of the plurality of words:

determining a speech-to-text score;

determining a natural-language score; and determining a confidence score based on the speech-to-text score and the natural-language score.

37. The electronic device of claim 33, wherein the first user input of the first input type is a typed input and wherein the third user input is a speech input.

38. The electronic device of claim 37, wherein the speech input includes a first command and wherein modifying the selected word based on the third user input to provide a modified one or more words comprises modifying the one or more words based on the first command.

39. The electronic device of claim 38, wherein the first command is a command to modify capitalization of the selected word.

40. The electronic device of claim 38, wherein the first command is a command to modify spelling of the selected word.

41. The electronic device of claim 38, wherein the first command is a command to modify textual effects of the selected word.

42. The electronic device of claim 33, wherein the one or more programs further include instructions for:

determining a user intent based on the third user input; and determining a task associated with the user intent, wherein modifying the selected word based on the third user input to provide a modified one or more words comprises performing the task.

43. The electronic device of claim 42, wherein the third user input includes a replacement word and wherein modifying the selected word based on the third user input to provide a modified one or more words comprises replacing the selected word with the replacement word.

44. The electronic device of claim 42, wherein the third user input includes a reference to a word of the plurality of words.

45. The electronic device of claim 33, wherein the second user input corresponds to a direction of a user's gaze.

46. The electronic device of claim 33, wherein the one or more programs further include instructions for:

determining whether the selected word requires disambiguation;

in accordance with a determination that the selected word requires disambiguation, determining a plurality of candidate words; and providing the plurality of candidate words, wherein receiving the third user input comprises receiving a selection of a candidate word of the plurality of candidate words, and wherein modifying the selected word based on the third user input to provide a modified one or more words comprises replacing the selected word with the selected candidate word.

47. The electronic device of claim 46, wherein displaying, on the view of the touch-sensitive display, the plurality of words comprises:

displaying the plurality of words using a word processing application, a messaging application, an email application, or any combination thereof.

48. The electronic device of claim 33, wherein the first input includes a second command.

* * * * *